(12) United States Patent
Baloga et al.

(10) Patent No.: US 11,100,282 B1
(45) Date of Patent: Aug. 24, 2021

(54) TEMPLATE BASED CONTENT PREPARATION SYSTEM FOR USE WITH A PLURALITY OF SPACE TYPES

(71) Applicant: STEELCASE INC., Grand Rapids, MI (US)

(72) Inventors: Mark Baloga, East Grand Rapids, MI (US); Terry D. West, Caledonia, MI (US); Nicolas De Benoist, Grand Rapids, MI (US); Paul Noll, Grand Rapids, MI (US); Francis Gerard Graziano, Grand Rapids, MI (US); Paul Siebert, Chicago, IL (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

(21) Appl. No.: 16/905,060

(22) Filed: Jun. 18, 2020

Related U.S. Application Data

(63) Continuation of application No. 15/170,070, filed on Jun. 1, 2016, now Pat. No. 10,733,371.
(Continued)

(51) Int. Cl.
*G06F 3/0482* (2013.01)
*G06F 40/186* (2020.01)
(Continued)

(52) U.S. Cl.
CPC .......... *G06F 40/186* (2020.01); *G06F 3/0482* (2013.01); *G06F 3/04815* (2013.01); *G06F 3/04845* (2013.01); *G06F 3/04847* (2013.01); *G06Q 10/101* (2013.01); *G06T 15/00* (2013.01); *H04L 29/06414* (2013.01)

(58) Field of Classification Search
None
See application file for complete search history.

(56) References Cited

U.S. PATENT DOCUMENTS

| 4,751,399 A | 6/1988 | Koehring |
| 5,050,077 A | 9/1991 | Vincent |

(Continued)

FOREIGN PATENT DOCUMENTS

| AU | 2011203137 A1 | 7/2011 |
| AU | 2013203919 A1 | 5/2013 |

(Continued)

OTHER PUBLICATIONS

Citrix, GoToMeeting User Guide, Copyright 2015 Citrix Systems.
(Continued)

*Primary Examiner* — Rinna Yi
(74) *Attorney, Agent, or Firm* — Quarles & Brady LLP

(57) ABSTRACT

A system for use with different space types, each space type including emissive surfaces, each emissive surface controllable to present content within the space, the system comprising a database that includes a separate template for each space type, each template indicating surfaces associated with the space type, relative juxtapositions of the surfaces in the space and content types to be presented in each surface, a processor programmed to allow a user to select a space type, identify an associated space type template, identifying content types for each surface and storing the received content in a session specification for subsequent access.

18 Claims, 82 Drawing Sheets

Related U.S. Application Data

(60) Provisional application No. 62/169,645, filed on Jun. 2, 2015, provisional application No. 62/205,392, filed on Aug. 14, 2015.

(51) Int. Cl.
*G06T 15/00* (2011.01)
*G06F 3/0484* (2013.01)
*G06Q 10/10* (2012.01)
*G06F 3/0481* (2013.01)
*H04L 29/06* (2006.01)

(56) References Cited

U.S. PATENT DOCUMENTS

| | | |
|---|---|---|
| 5,086,385 A | 2/1992 | Launey |
| 5,097,672 A | 3/1992 | Takenaka |
| 5,293,097 A | 3/1994 | Elwell |
| 5,406,176 A | 4/1995 | Sugden |
| 5,455,487 A | 10/1995 | Mix |
| 5,476,221 A | 12/1995 | Seymour |
| 5,489,827 A | 2/1996 | Xia |
| 5,717,856 A | 2/1998 | Carleton |
| 5,898,579 A | 4/1999 | Boys |
| 5,915,091 A | 6/1999 | Ludwig |
| 6,038,542 A | 3/2000 | Ruckdashel |
| 6,100,663 A | 8/2000 | Boys |
| 6,140,921 A | 10/2000 | Baron |
| 6,144,942 A | 11/2000 | Ruckdashel |
| 6,177,905 B1 | 1/2001 | Welch |
| 6,266,612 B1 | 7/2001 | Dussell |
| 6,266,691 B1 | 7/2001 | Watanabe |
| 6,288,716 B1 | 9/2001 | Humpleman |
| 6,297,621 B1 | 10/2001 | Hui |
| 6,304,068 B1 | 10/2001 | Hui |
| 6,342,906 B1 | 1/2002 | Kumar |
| 6,360,101 B1 | 3/2002 | Irvin |
| 6,361,173 B1 | 3/2002 | Vlahos |
| 6,424,623 B1 | 7/2002 | Borgstahl |
| 6,434,158 B1 | 8/2002 | Harris |
| 6,434,159 B1 | 8/2002 | Woodward |
| 6,466,234 B1 | 10/2002 | Pyle |
| 6,487,180 B1 | 11/2002 | Borgstahl |
| 6,501,364 B1 | 12/2002 | Hui |
| 6,532,218 B1 | 3/2003 | Shaffer |
| 6,546,419 B1 | 4/2003 | Humpleman |
| 6,548,967 B1 | 4/2003 | Dowling |
| 6,587,782 B1 | 7/2003 | Nocek |
| 6,691,029 B2 | 2/2004 | Hughes |
| 6,724,159 B2 | 4/2004 | Gutta |
| 6,760,412 B1 | 7/2004 | Loucks |
| 6,760,749 B1 | 7/2004 | Dunlap |
| 6,803,744 B1 | 10/2004 | Sabo |
| 6,839,417 B2 | 1/2005 | Weisman |
| 6,850,837 B2 | 2/2005 | Paulauskas |
| 6,888,438 B2 | 5/2005 | Hui |
| 6,906,495 B2 | 6/2005 | Cheng |
| 7,000,660 B2 | 2/2006 | Chen |
| 7,003,728 B2 | 2/2006 | Berque |
| 7,027,995 B2 | 4/2006 | Kaufman |
| 7,042,196 B2 | 5/2006 | Ka Lai |
| 7,043,532 B1 | 5/2006 | Humpleman |
| 7,084,758 B1 | 8/2006 | Cole |
| 7,124,164 B1 | 10/2006 | Chemtob |
| 7,139,976 B2 | 11/2006 | Kausik |
| 7,149,776 B1 | 12/2006 | Roy |
| 7,163,263 B1 | 1/2007 | Kurrasch |
| 7,180,503 B2 | 2/2007 | Burr |
| 7,212,414 B2 | 5/2007 | Baarman |
| 7,221,937 B2 | 5/2007 | Lau |
| 7,239,110 B2 | 7/2007 | Cheng |
| 7,248,017 B2 | 7/2007 | Cheng |
| 7,266,383 B2 | 9/2007 | Anderson |
| 7,268,682 B2 | 9/2007 | Bialecki, Jr. |
| 7,293,243 B1 | 11/2007 | Ben-Shachar |
| 7,340,769 B2 | 3/2008 | Baugher |
| 7,370,269 B1 | 5/2008 | Prabhu |
| 7,393,053 B2 | 7/2008 | Kurrasch |
| 7,394,405 B2 | 7/2008 | Godden |
| 7,421,069 B2 | 9/2008 | Vernon |
| 7,474,058 B2 | 1/2009 | Baarman |
| 7,475,078 B2 | 1/2009 | Kiilerich |
| 7,495,414 B2 | 2/2009 | Hui |
| 7,499,462 B2 | 3/2009 | MacMullan |
| 7,518,267 B2 | 4/2009 | Baarman |
| 7,519,664 B2 | 4/2009 | Karaki |
| 7,522,878 B2 | 4/2009 | Baarman |
| 7,525,283 B2 | 4/2009 | Cheng |
| 7,526,525 B2 | 4/2009 | Hagale |
| 7,554,316 B2 | 6/2009 | Stevens |
| 7,554,437 B2 | 6/2009 | Axelsen |
| 7,576,514 B2 | 8/2009 | Hui |
| 7,577,522 B2 | 8/2009 | Rosenberg |
| 7,590,941 B2 | 9/2009 | Wee |
| 7,605,496 B2 | 10/2009 | Stevens |
| 7,612,528 B2 | 11/2009 | Baarman |
| 7,615,936 B2 | 11/2009 | Baarman |
| 7,619,366 B2 | 11/2009 | Diederiks |
| 7,622,891 B2 | 11/2009 | Cheng |
| 7,634,533 B2 | 12/2009 | Rudolph |
| 7,639,110 B2 | 12/2009 | Baarman |
| 7,639,514 B2 | 12/2009 | Baarman |
| 7,639,994 B2 | 12/2009 | Greene |
| 7,643,312 B2 | 1/2010 | Vanderelli |
| 7,649,454 B2 | 1/2010 | Singh |
| 7,664,870 B2 | 2/2010 | Baek |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,734,690 B2 | 6/2010 | Moromisato |
| 7,735,918 B2 | 6/2010 | Beck |
| 7,741,734 B2 | 6/2010 | Joannopoulos |
| 7,810,025 B2 | 10/2010 | Blair |
| 7,825,543 B2 | 11/2010 | Karalis |
| 7,844,306 B2 | 11/2010 | Shearer |
| 7,847,675 B1 | 12/2010 | Thyen |
| 7,849,135 B2 | 12/2010 | Agrawal |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,881,233 B2 | 2/2011 | Bieselin |
| 7,885,925 B1 | 2/2011 | Strong |
| 7,893,953 B2 | 2/2011 | Krestakos |
| 7,896,436 B2 | 3/2011 | Kurrasch |
| 7,898,105 B2 | 3/2011 | Greene |
| 7,904,209 B2 | 3/2011 | Podgorny |
| 7,915,858 B2 | 3/2011 | Liu |
| D636,333 S | 4/2011 | Kulikowski |
| 7,925,308 B2 | 4/2011 | Greene |
| 7,925,525 B2 | 4/2011 | Chin |
| 7,932,618 B2 | 4/2011 | Baarman |
| 7,941,133 B2 | 5/2011 | Aaron |
| 7,941,753 B2 | 5/2011 | Meisels |
| 7,948,448 B2 | 5/2011 | Hutchinson |
| 7,952,324 B2 | 5/2011 | Cheng |
| 7,953,369 B2 | 5/2011 | Baarman |
| 7,965,859 B2 | 6/2011 | Marks |
| 7,973,635 B2 | 7/2011 | Baarman |
| 7,973,657 B2 | 7/2011 | Ayed |
| 7,989,986 B2 | 8/2011 | Baarman |
| 7,999,669 B2 | 8/2011 | Singh |
| 8,004,235 B2 | 8/2011 | Baarman |
| 8,021,164 B2 | 9/2011 | Epstein |
| 8,022,576 B2 | 9/2011 | Joannopoulos |
| 8,024,661 B2 | 9/2011 | Bibliowicz |
| 8,026,908 B2 | 9/2011 | Ku |
| 8,028,020 B2 | 9/2011 | Huck |
| 8,032,705 B2 | 10/2011 | Klitsner |
| 8,035,255 B2 | 10/2011 | Kurs |
| 8,035,340 B2 | 10/2011 | Stevens |
| 8,039,995 B2 | 10/2011 | Stevens |

(56) References Cited

U.S. PATENT DOCUMENTS

| | | | |
|---|---|---|---|
| 8,040,103 | B2 | 10/2011 | Hui |
| 8,041,586 | B2 | 10/2011 | Jethani |
| 8,049,301 | B2 | 11/2011 | Hui |
| 8,054,854 | B2 | 11/2011 | Poslinski |
| 8,055,310 | B2 | 11/2011 | Beart |
| 8,055,644 | B2 | 11/2011 | Crowley |
| 8,057,069 | B2 | 11/2011 | Mangiardi |
| 8,061,864 | B2 | 11/2011 | Metcalf |
| 8,069,100 | B2 | 11/2011 | Taylor |
| 8,069,465 | B1 | 11/2011 | Bartholomay |
| 8,073,614 | B2 | 12/2011 | Coughlin |
| 8,076,800 | B2 | 12/2011 | Joannopoulos |
| 8,076,801 | B2 | 12/2011 | Karalis |
| 8,081,083 | B2 | 12/2011 | Hinterlong |
| 8,084,889 | B2 | 12/2011 | Joannopoulos |
| 8,091,029 | B1 | 1/2012 | Gay |
| 8,093,758 | B2 | 1/2012 | Hussmann |
| 8,097,983 | B2 | 1/2012 | Karalis |
| 8,097,984 | B2 | 1/2012 | Baarman |
| 8,102,235 | B2 | 1/2012 | Hui |
| 8,106,539 | B2 | 1/2012 | Schatz |
| 8,112,100 | B2 | 2/2012 | Frank |
| 8,115,448 | B2 | 2/2012 | John |
| 8,116,681 | B2 | 2/2012 | Baarman |
| 8,116,683 | B2 | 2/2012 | Baarman |
| 8,117,262 | B2 | 2/2012 | Kumar |
| 8,120,311 | B2 | 2/2012 | Baarman |
| 8,126,974 | B2 | 2/2012 | Lyle |
| 8,127,155 | B2 | 2/2012 | Baarman |
| 8,129,864 | B2 | 3/2012 | Baarman |
| 8,138,875 | B2 | 3/2012 | Baarman |
| 8,140,701 | B2 | 3/2012 | Rajan |
| 8,141,143 | B2 | 3/2012 | Lee |
| 8,149,104 | B2 | 4/2012 | Crum |
| 8,150,449 | B2 | 4/2012 | Onozawa |
| 8,159,090 | B2 | 4/2012 | Greene |
| 8,164,222 | B2 | 4/2012 | Baarman |
| 8,170,946 | B2 | 5/2012 | Blair |
| 8,174,152 | B2 | 5/2012 | Baumann |
| 8,180,663 | B2 | 5/2012 | Tischhauser |
| 8,188,856 | B2 | 5/2012 | Singh |
| 8,200,520 | B2 | 6/2012 | Chen |
| 8,204,272 | B2 | 6/2012 | Marks |
| 8,204,935 | B2 | 6/2012 | Vernon |
| 8,209,618 | B2 | 6/2012 | Garofalo |
| 8,214,061 | B2 | 7/2012 | Westrick, Jr. |
| 8,219,115 | B1 | 7/2012 | Nelissen |
| 8,222,827 | B2 | 7/2012 | Kuennen |
| 8,223,508 | B2 | 7/2012 | Baarman |
| 8,228,025 | B2 | 7/2012 | Ho |
| 8,228,026 | B2 | 7/2012 | Johnson |
| 8,234,189 | B2 | 7/2012 | Taylor |
| 8,238,125 | B2 | 8/2012 | Fells |
| 8,239,890 | B2 | 8/2012 | Kooman |
| 8,259,428 | B2 | 9/2012 | Mollema |
| 8,262,244 | B2 | 9/2012 | Metcalf |
| 8,266,535 | B2 | 9/2012 | Brown |
| 8,269,456 | B2 | 9/2012 | Hui |
| 8,270,320 | B2 | 9/2012 | Boyer |
| 8,280,453 | B2 | 10/2012 | Beart |
| 8,280,948 | B1 | 10/2012 | Chen |
| 8,290,479 | B2 | 10/2012 | Aaron |
| 8,296,669 | B2 | 10/2012 | Madonna |
| 8,299,753 | B2 | 10/2012 | Hui |
| 8,300,784 | B2 | 10/2012 | Choi |
| 8,301,077 | B2 | 10/2012 | Xue |
| 8,301,079 | B2 | 10/2012 | Baarman |
| 8,301,080 | B2 | 10/2012 | Baarman |
| 8,304,935 | B2 | 11/2012 | Karalis |
| 8,315,561 | B2 | 11/2012 | Baarman |
| 8,315,621 | B2 | 11/2012 | Lau |
| 8,315,650 | B2 | 11/2012 | Lau |
| 8,324,759 | B2 | 12/2012 | Karalis |
| 8,327,410 | B2 | 12/2012 | Andersen |
| 8,338,990 | B2 | 12/2012 | Baarman |
| 8,339,274 | B2 | 12/2012 | Van De Sluis |
| 8,341,532 | B2 | 12/2012 | Ryan |
| 8,346,166 | B2 | 1/2013 | Baarman |
| 8,346,167 | B2 | 1/2013 | Baarman |
| 8,350,971 | B2 | 1/2013 | Malone |
| 8,351,856 | B2 | 1/2013 | Baarman |
| 8,352,296 | B2 | 1/2013 | Taneja |
| 8,354,821 | B2 | 1/2013 | Cheng |
| 8,362,651 | B2 | 1/2013 | Hamam |
| 8,364,400 | B2 | 1/2013 | Coughlin |
| 8,370,516 | B2 | 2/2013 | Salesky |
| 8,373,310 | B2 | 2/2013 | Baarman |
| 8,373,386 | B2 | 2/2013 | Baarman |
| 8,375,103 | B2 | 2/2013 | Lin |
| 8,380,255 | B2 | 2/2013 | Shearer |
| 8,380,786 | B2 | 2/2013 | Hoffert |
| 8,385,894 | B2 | 2/2013 | Takehara |
| 8,390,669 | B2 | 3/2013 | Catchpole |
| 8,395,282 | B2 | 3/2013 | Joannopoulos |
| 8,395,283 | B2 | 3/2013 | Joannopoulos |
| 8,400,017 | B2 | 3/2013 | Kurs |
| 8,400,018 | B2 | 3/2013 | Joannopoulos |
| 8,400,019 | B2 | 3/2013 | Joannopoulos |
| 8,400,020 | B2 | 3/2013 | Joannopoulos |
| 8,400,021 | B2 | 3/2013 | Joannopoulos |
| 8,400,022 | B2 | 3/2013 | Joannopoulos |
| 8,400,023 | B2 | 3/2013 | Joannopoulos |
| 8,400,024 | B2 | 3/2013 | Joannopoulos |
| 8,407,289 | B2 | 3/2013 | Chen |
| 8,410,636 | B2 | 4/2013 | Kurs |
| 8,415,897 | B2 | 4/2013 | Choong |
| 8,421,407 | B2 | 4/2013 | Johnson |
| 8,423,288 | B2 | 4/2013 | Stahl |
| 8,432,062 | B2 | 4/2013 | Greene |
| 8,438,333 | B2 | 5/2013 | Edwards, III |
| 8,441,154 | B2 | 5/2013 | Karalis |
| 8,441,354 | B2 | 5/2013 | Padmanabhan |
| 8,443,035 | B2 | 5/2013 | Chen |
| 8,446,046 | B2 | 5/2013 | Fells |
| 8,446,450 | B2 | 5/2013 | Mauchly |
| 8,450,877 | B2 | 5/2013 | Baarman |
| 8,456,509 | B2 | 6/2013 | Khot |
| 8,457,888 | B2 | 6/2013 | Ranford |
| 8,461,719 | B2 | 6/2013 | Kesler |
| 8,461,720 | B2 | 6/2013 | Kurs |
| 8,461,721 | B2 | 6/2013 | Karalis |
| 8,461,722 | B2 | 6/2013 | Kurs |
| 8,461,817 | B2 | 6/2013 | Martin |
| 8,466,583 | B2 | 6/2013 | Karalis |
| 8,471,410 | B2 | 6/2013 | Karalis |
| 8,473,571 | B2 | 6/2013 | Penner |
| 8,476,788 | B2 | 7/2013 | Karalis |
| 8,482,158 | B2 | 7/2013 | Kurs |
| 8,482,160 | B2 | 7/2013 | Johnson |
| 8,484,494 | B2 | 7/2013 | Siegel |
| 8,487,480 | B1 | 7/2013 | Kesler |
| 8,489,329 | B2 | 7/2013 | Coughlin |
| 8,494,143 | B2 | 7/2013 | DeJana |
| 8,497,601 | B2 | 7/2013 | Hall |
| 8,499,119 | B2 | 7/2013 | Balraj |
| 8,504,663 | B2 | 8/2013 | Lowery |
| 8,508,077 | B2 | 8/2013 | Stevens |
| 8,510,255 | B2 | 8/2013 | Fadell |
| 8,519,668 | B2 | 8/2013 | Hui |
| 8,527,549 | B2 | 9/2013 | Cidon |
| 8,527,610 | B2 | 9/2013 | Koike |
| 8,528,014 | B2 | 9/2013 | Reynolds |
| 8,531,153 | B2 | 9/2013 | Baarman |
| 8,531,294 | B2 | 9/2013 | Slavin |
| 8,533,268 | B1 | 9/2013 | Vernon |
| 8,538,330 | B2 | 9/2013 | Baarman |
| D692,010 | S | 10/2013 | Verghese |
| 8,552,592 | B2 | 10/2013 | Schatz |
| 8,554,476 | B2 | 10/2013 | Coughlin |
| 8,554,477 | B2 | 10/2013 | Coughlin |
| 8,558,411 | B2 | 10/2013 | Baarman |
| 8,558,693 | B2 | 10/2013 | Martin |
| 8,560,024 | B2 | 10/2013 | Beart |
| 8,560,128 | B2 | 10/2013 | Ruff |

(56) References Cited

U.S. PATENT DOCUMENTS

| | | |
|---|---|---|
| 8,560,232 B2 | 10/2013 | Coughlin |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,594,291 B2 | 11/2013 | Bieselin |
| 8,598,721 B2 | 12/2013 | Baarman |
| 8,598,743 B2 | 12/2013 | Hall |
| 8,600,670 B2 | 12/2013 | Kim |
| 8,604,714 B2 | 12/2013 | Mohan |
| 8,610,400 B2 | 12/2013 | Stevens |
| 8,610,530 B2 | 12/2013 | Singh |
| 8,618,696 B2 | 12/2013 | Kurs |
| 8,618,749 B2 | 12/2013 | Kuennen |
| 8,618,770 B2 | 12/2013 | Baarman |
| 8,620,484 B2 | 12/2013 | Baarman |
| 8,620,841 B1 | 12/2013 | Filson |
| 8,621,245 B2 | 12/2013 | Shearer |
| D697,477 S | 1/2014 | Jonas, III |
| 8,622,314 B2 | 1/2014 | Fisher |
| 8,629,578 B2 | 1/2014 | Kurs |
| 8,629,755 B2 | 1/2014 | Hashim-Waris |
| 8,630,741 B1 | 1/2014 | Matsuoka |
| 8,631,126 B2 | 1/2014 | Veiseh |
| 8,638,062 B2 | 1/2014 | Baarman |
| 8,643,326 B2 | 2/2014 | Campanella |
| 8,650,600 B2 | 2/2014 | Ogle |
| 8,653,927 B2 | 2/2014 | Singh |
| 8,659,417 B1 | 2/2014 | Trundle |
| 8,660,790 B2 | 2/2014 | Stahl |
| 8,665,310 B2 | 3/2014 | Verthein |
| 8,666,051 B2 | 3/2014 | Gilzean |
| 8,667,401 B1 | 3/2014 | Lozben |
| 8,667,452 B2 | 3/2014 | Verghese |
| 8,669,676 B2 | 3/2014 | Karalis |
| 8,669,844 B2 | 3/2014 | Walker |
| 8,680,960 B2 | 3/2014 | Singh |
| 8,683,345 B2 | 3/2014 | Lee |
| 8,686,598 B2 | 4/2014 | Schatz |
| 8,686,647 B2 | 4/2014 | Ono |
| 8,687,452 B2 | 4/2014 | Kishibe |
| 8,688,100 B2 | 4/2014 | Aaron |
| 8,690,362 B2 | 4/2014 | Wendt |
| 8,692,410 B2 | 4/2014 | Schatz |
| 8,692,412 B2 | 4/2014 | Fiorello |
| 8,692,639 B2 | 4/2014 | Baarman |
| 8,692,641 B2 | 4/2014 | Singh |
| 8,692,642 B2 | 4/2014 | Singh |
| 8,694,026 B2 | 4/2014 | Forstall |
| 8,694,165 B2 | 4/2014 | Smith |
| 8,694,597 B1 | 4/2014 | Raj |
| 8,698,590 B2 | 4/2014 | Singh |
| 8,698,591 B2 | 4/2014 | Singh |
| 8,700,060 B2 | 4/2014 | Huang |
| 8,707,546 B2 | 4/2014 | Singh |
| 8,710,948 B2 | 4/2014 | Singh |
| 8,712,858 B2 | 4/2014 | Blair |
| 8,713,112 B2 | 4/2014 | Hewitt |
| D705,745 S | 5/2014 | Kurs et al. |
| 8,716,903 B2 | 5/2014 | Kurs |
| 8,717,400 B2 | 5/2014 | Ranganath |
| 8,719,070 B2 | 5/2014 | Jabbour |
| 8,723,366 B2 | 5/2014 | Fiorello |
| 8,729,737 B2 | 5/2014 | Schatz |
| 8,731,116 B2 | 5/2014 | Norconk |
| 8,742,625 B2 | 6/2014 | Baarman |
| 8,743,171 B2 | 6/2014 | Hiller |
| 8,743,198 B2 | 6/2014 | Padmanabh |
| 8,756,348 B2 | 6/2014 | Beel |
| 8,760,007 B2 | 6/2014 | Joannopoulos |
| 8,760,008 B2 | 6/2014 | Joannopoulos |
| 8,760,265 B2 | 6/2014 | Krueger |
| 8,766,484 B2 | 7/2014 | Baarman |
| 8,766,485 B2 | 7/2014 | Joannopoulos |
| 8,766,487 B2 | 7/2014 | Dibben |
| 8,767,032 B2 | 7/2014 | Rodman |
| 8,768,309 B2 | 7/2014 | Robbins |
| 8,772,971 B2 | 7/2014 | Joannopoulos |
| 8,772,972 B2 | 7/2014 | Joannopoulos |
| 8,772,973 B2 | 7/2014 | Kurs |
| 8,782,527 B2 | 7/2014 | Karlson |
| 8,788,448 B2 | 7/2014 | Fadell |
| 8,797,159 B2 | 8/2014 | Kirkpatrick |
| 8,810,379 B2 | 8/2014 | Murphy |
| 8,812,028 B2 | 8/2014 | Yariv |
| 8,813,196 B2 | 8/2014 | Weller |
| 8,819,136 B1 | 8/2014 | Vernon |
| 8,819,138 B2 | 8/2014 | Houston |
| 8,825,597 B1 | 9/2014 | Houston |
| 8,838,681 B2 | 9/2014 | Motes |
| 8,842,153 B2 | 9/2014 | Ranganath |
| 8,843,816 B2 | 9/2014 | Stull |
| 8,849,914 B2 | 9/2014 | Bove |
| 8,856,256 B1 | 10/2014 | Srinivasan |
| 8,866,619 B2 | 10/2014 | Knibbe |
| 8,872,432 B2 | 10/2014 | Kercso |
| 8,875,195 B2 | 10/2014 | Ogle |
| 8,878,439 B2 | 11/2014 | Noguchi |
| 8,887,069 B2 | 11/2014 | Tipirneni |
| 8,896,656 B2 | 11/2014 | Epstein |
| 8,898,231 B2 | 11/2014 | Crawford |
| 8,904,293 B2 | 12/2014 | Bastide |
| 8,909,702 B2 | 12/2014 | Golovchinsky |
| 9,098,502 B1 | 8/2015 | Horling |
| 9,176,214 B2 | 11/2015 | Berrett et al. |
| 9,247,828 B2 | 2/2016 | Cvek |
| 9,339,106 B2 | 5/2016 | Epstein |
| 9,380,682 B2 | 6/2016 | Mead |
| 9,465,524 B2 | 10/2016 | Epstein |
| 9,642,219 B2 | 5/2017 | Mead |
| 9,716,861 B1 | 7/2017 | Poel |
| 9,766,079 B1 | 9/2017 | Poel |
| 9,852,388 B1 | 12/2017 | Swieter |
| 9,871,978 B1 | 1/2018 | Epstein |
| 9,921,726 B1 | 3/2018 | Sculley |
| 9,955,318 B1 | 4/2018 | Scheper |
| 10,021,530 B2 | 7/2018 | Sigal |
| 10,038,952 B2 | 7/2018 | Labrosse |
| 10,057,963 B2 | 8/2018 | Mead |
| 10,121,113 B1 | 11/2018 | Swieter et al. |
| 10,161,752 B1 | 12/2018 | Poel |
| 10,225,707 B1 | 3/2019 | Scheper |
| 10,353,664 B2 | 7/2019 | Poel |
| 10,433,646 B1 | 10/2019 | Schmidt et al. |
| 10,459,611 B1 | 10/2019 | Sculley et al. |
| 10,614,694 B1 | 4/2020 | Zwier et al. |
| 2001/0051885 A1 | 12/2001 | Nardulli |
| 2002/0015097 A1 | 2/2002 | Martens |
| 2002/0130834 A1 | 9/2002 | Madarasz |
| 2003/0097284 A1 | 5/2003 | Shinozaki |
| 2003/0103075 A1 | 6/2003 | Rosselot |
| 2003/0218537 A1 | 11/2003 | Hoch |
| 2004/0001095 A1 | 1/2004 | Marques |
| 2004/0015401 A1 | 1/2004 | Lee et al. |
| 2004/0051813 A1 | 3/2004 | Marmaropoulos |
| 2004/0141605 A1 | 7/2004 | Chen |
| 2004/0153504 A1 | 8/2004 | Hutchinson |
| 2004/0210933 A1 | 10/2004 | Dresti |
| 2004/0215694 A1 | 10/2004 | Podolsky |
| 2004/0261013 A1 | 12/2004 | Wynn |
| 2005/0018826 A1 | 1/2005 | Benco |
| 2005/0027581 A1 | 2/2005 | Kjesbu |
| 2005/0071213 A1 | 3/2005 | Kumhyr |
| 2005/0160368 A1 | 7/2005 | Liu |
| 2005/0218739 A1 | 10/2005 | Maddin |
| 2005/0235329 A1 | 10/2005 | Karaoguz |
| 2005/0273372 A1 | 12/2005 | Bowne |
| 2005/0273493 A1 | 12/2005 | Buford |
| 2006/0009215 A1 | 1/2006 | Bogod |
| 2006/0015376 A1 | 1/2006 | Sattler |
| 2006/0021363 A1 | 2/2006 | Mizukoshi |
| 2006/0026502 A1 | 2/2006 | Dutta |

(56) References Cited

U.S. PATENT DOCUMENTS

| | | |
|---|---|---|
| 2006/0045107 A1 | 3/2006 | Kucenas |
| 2006/0080007 A1 | 4/2006 | Gerard |
| 2006/0080432 A1 | 4/2006 | Spataro |
| 2006/0168618 A1 | 7/2006 | Choi |
| 2006/0218027 A1 | 9/2006 | Carrion |
| 2007/0094065 A1 | 4/2007 | Wu |
| 2007/0106950 A1 | 5/2007 | Hutchinson |
| 2007/0118415 A1 | 5/2007 | Chen |
| 2007/0136095 A1 | 6/2007 | Weinstein |
| 2007/0162315 A1 | 7/2007 | Hodges |
| 2007/0197239 A1 | 8/2007 | Sane |
| 2007/0198744 A1 | 8/2007 | Wensley |
| 2007/0226034 A1 | 9/2007 | Khan |
| 2007/0282661 A1 | 12/2007 | Franco |
| 2007/0288291 A1 | 12/2007 | Earle |
| 2008/0028323 A1 | 1/2008 | Rosen |
| 2008/0091503 A1 | 4/2008 | Schirmer |
| 2008/0122635 A1 | 5/2008 | Fujikawa |
| 2008/0162198 A1 | 7/2008 | Jabbour |
| 2008/0184115 A1 | 7/2008 | Back |
| 2008/0201664 A1 | 8/2008 | O |
| 2008/0239994 A1 | 10/2008 | Xiong |
| 2008/0244417 A1 | 10/2008 | Simpson |
| 2008/0288355 A1 | 11/2008 | Rosen |
| 2008/0291021 A1 | 11/2008 | Bhogal |
| 2008/0300660 A1 | 12/2008 | John |
| 2009/0019367 A1 | 1/2009 | Cavagnari |
| 2009/0055234 A1 | 2/2009 | Li |
| 2009/0066486 A1 | 3/2009 | Kiekbusch |
| 2009/0094533 A1 | 4/2009 | Bozionek |
| 2009/0106567 A1 | 4/2009 | Baarman |
| 2009/0146982 A1 | 6/2009 | Thielman |
| 2009/0164581 A1 | 6/2009 | Bove |
| 2009/0210822 A1 | 8/2009 | Schindler |
| 2009/0212637 A1 | 8/2009 | Baarman |
| 2009/0271713 A1 | 10/2009 | Stull |
| 2009/0327227 A1 | 12/2009 | Chakra |
| 2010/0017245 A1 | 1/2010 | Kristiansen |
| 2010/0037151 A1 | 2/2010 | Ackerman |
| 2010/0070334 A1 | 3/2010 | Monteverde |
| 2010/0088239 A1 | 4/2010 | Blair |
| 2010/0102640 A1 | 4/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0153160 A1 | 6/2010 | Bezemer |
| 2010/0153983 A1 | 6/2010 | Philmon |
| 2010/0179854 A1 | 7/2010 | Shafer |
| 2010/0187911 A1 | 7/2010 | Joannopoulos |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0308939 A1 | 12/2010 | Kurs |
| 2010/0315483 A1 | 12/2010 | King |
| 2010/0319066 A1 | 12/2010 | Berry |
| 2011/0043049 A1 | 2/2011 | Karalis |
| 2011/0072482 A1 | 3/2011 | Lau |
| 2011/0074346 A1 | 3/2011 | Hall |
| 2011/0084804 A1 | 4/2011 | Khorashadi |
| 2011/0088056 A1 | 4/2011 | Ansari |
| 2011/0095618 A1 | 4/2011 | Schatz |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0223899 A1 | 9/2011 | Hiraide |
| 2011/0225563 A1 | 9/2011 | Kim |
| 2011/0231216 A1 | 9/2011 | Fyke |
| 2011/0244798 A1 | 10/2011 | Daigle |
| 2011/0270952 A1 | 11/2011 | Ray |
| 2011/0295392 A1 | 12/2011 | Cunnington |
| 2011/0296465 A1 | 12/2011 | Krishnan |
| 2012/0007441 A1 | 1/2012 | John |
| 2012/0016678 A1 | 1/2012 | Gruber |
| 2012/0022909 A1 | 1/2012 | Ayatollahi |
| 2012/0032484 A1 | 2/2012 | Cvek |
| 2012/0032522 A1 | 2/2012 | Schatz |
| 2012/0062345 A1 | 3/2012 | Kurs |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0086284 A1 | 4/2012 | Capanella |
| 2012/0086867 A1 | 4/2012 | Kesler |
| 2012/0089722 A1 | 4/2012 | Enholm |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |
| 2012/0206096 A1 | 8/2012 | John |
| 2012/0216129 A1 | 8/2012 | Ng |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324589 A1 | 12/2012 | Nukala |
| 2012/0331108 A1 | 12/2012 | Ferdowsi |
| 2012/0331394 A1 | 12/2012 | Trombley-Shapiro |

(56) References Cited

U.S. PATENT DOCUMENTS

| | | |
|---|---|---|
| 2013/0002533 A1* | 1/2013 | Burroughs ............. G16H 20/30 345/156 |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0088154 A1 | 4/2013 | Van Hoof |
| 2013/0099587 A1 | 4/2013 | Lou |
| 2013/0117158 A1 | 5/2013 | Cvek |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0199420 A1 | 8/2013 | Hjelm |
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki |
| 2013/0246901 A1 | 9/2013 | Massano |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0320773 A1 | 12/2013 | Schatz |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0028112 A1 | 1/2014 | Hui |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0047339 A1 | 2/2014 | Epstein |
| 2014/0049118 A1 | 2/2014 | Karalis |
| 2014/0052974 A1 | 2/2014 | Masters |
| 2014/0054961 A1 | 2/2014 | Metcalf |
| 2014/0062211 A1 | 3/2014 | Hamam |
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0103738 A1 | 4/2014 | Campanella |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0150059 A1 | 5/2014 | Uchida |
| 2014/0159589 A1 | 6/2014 | Pandharipande |
| 2014/0159652 A1 | 6/2014 | Hall |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0217785 A1 | 8/2014 | Arens |
| 2014/0229578 A1 | 8/2014 | Chu |
| 2014/0236659 A1 | 8/2014 | Hapse |
| 2014/0244043 A1 | 8/2014 | Foster |
| 2014/0253813 A1 | 9/2014 | Bakar |
| 2014/0259047 A1 | 9/2014 | Bakar |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson |
| 2014/0365568 A1 | 12/2014 | Huang |
| 2015/0012843 A1 | 1/2015 | Ouyang et al. |
| 2015/0035440 A1 | 2/2015 | Spero |
| 2015/0069915 A1 | 3/2015 | Ogawa |
| 2015/0179012 A1 | 6/2015 | Sharpe |
| 2015/0195620 A1 | 7/2015 | Buchner et al. |
| 2015/0200982 A1 | 7/2015 | Velagaleti |
| 2015/0201480 A1 | 7/2015 | Ogawa |
| 2015/0229644 A1 | 8/2015 | Nozawa |
| 2015/0296594 A1 | 10/2015 | Blum |
| 2015/0330780 A1 | 11/2015 | Yuzawa |
| 2015/0370272 A1 | 12/2015 | Reddy |
| 2016/0044071 A1 | 2/2016 | Sandholm |
| 2016/0171566 A1 | 6/2016 | Pugh |
| 2016/0304013 A1 | 10/2016 | Wolas |
| 2016/0327922 A1 | 11/2016 | Sekiguchi |
| 2016/0342950 A1 | 11/2016 | Pignataro |
| 2017/0046113 A1 | 2/2017 | Noyes et al. |
| 2017/0060350 A1 | 3/2017 | Zheng et al. |
| 2017/0208664 A1 | 7/2017 | Mead |
| 2018/0107444 A1 | 4/2018 | Dunn |
| 2019/0272141 A1 | 9/2019 | Poel |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 102870338 A | 1/2013 |
| EP | 0935263 A2 | 8/1999 |
| EP | 2367146 A1 | 9/2011 |
| EP | 2388977 A1 | 11/2011 |
| EP | 2439686 A1 | 4/2012 |
| KR | 20140007006 A | 1/2014 |
| WO | 2007008646 A2 | 1/2007 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2012037279 A1 | 3/2012 |
| WO | 2012170278 A3 | 12/2012 |
| WO | 2013008252 A2 | 1/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |

(56) References Cited

FOREIGN PATENT DOCUMENTS

| WO | 2014035263 A1 | 3/2014 |
|---|---|---|
| WO | 2014038966 A1 | 3/2014 |
| WO | 2014054953 A1 | 4/2014 |
| WO | 2014094107 A1 | 6/2014 |
| WO | 2014139781 A2 | 9/2014 |

OTHER PUBLICATIONS join.me forum and FAQ, Apr. 3, 2014.
Cisco, WebEx Meeting Center User Guide For Hosts, Presenters, and Participants, Version 8.23, Copyright 1997-2011 Cisco and/or its affiliates.
Krumm, et al., The NearMe Wireless Proximity Server, UbiComp 2004, The Sixth International Conference on Ubiquitous Computing, pp. 283-300, Sep. 7-10, 2004.
NFS Technology Group, Rendezvous—Technology for Meeting Room, Desk Scheduling and Event Management, http://myrendezvous.net/rendezvous-event-booking-software/calendar-management/.
Citrix, GoToWebinar User Guide, Copyright 2015 Citrix Systems.
CiviCRM Books: User and Administrator Guide for Version 4.5, Published Sep. 2014, http://book.civicrm.org/user/current/email/scheduled-reminders/.
Lee, TechnicLee_13 My Thoughts on Technology, Business, and Innovation, Posted in Outlook, Scripting, Jan. 20, 2012, http://techniclee.wordpress.com/2012/01/20/sending-a-meeting-reminder-email-in-outlook/.
Events and Room Reserve Scheduled Task Setup for Email Notifications, Article No. 268, Apr. 22, 2013, http://kb.evanced.info/article.php?id=268.
Oracle Communications, Oracle Data Sheet—Calendar Server, Copyright 2015 Oracle and/or its affiliates, http://www.oracle.com/us/industries/communications/communications-calendar-server-ds-071728.pdf.
Stirworks, Inc., The Height-Adjustable, Standing Stir Kinetic Desk, http://www.stirworks.com/, Copyright 2015 Stirworks, Inc., 6 pages.
Tam, et al., A Framework for Asynchronous Change Awareness in Collaborative Documents and Workspaces, International Journal of Human-Computer Studies, 2006, 64:583-598.

* cited by examiner

Session Specification Database

| Session | Space/Activity Template | Content Specification | Owner |
|---|---|---|---|
| S1 | T1/Presentation | MC-1 Agenda-1 | Mary White |
| S2 | T3/Presentation | MC-2 Agenda-2 | John Green |
| S3 | T2/Generation | Goals | Pete Brown |
| S4 | T3/Collaboration | Agenda-4 (Egalitarian - Real Time Content) | George Pink |
| ⋮ | | | |
| SZZ | | | |

| Space Type | Vessel Arrangement | Activity Type<br>Dyadic Collaboration<br>Content Type | Position |
|---|---|---|---|
| | | (PS-T4) | |
| T4 (Emissive 6 Totem Room) | Front Full Wall<br>    Central Window | (IS-T4-DC) | |
| |         (Cloud)<br>        (Fovial)<br>        (Grnd) | Scenic View<br>Main Content<br>Scenic View | |
| |     Left Window<br>        (Cloud)<br>        (Fovial)<br>        (Grnd) | Scenic View<br>Prior Content 1<br>Scenic View | |
| |     Right Window<br>        (Cloud)<br>        (Fovial)<br>        (Grnd) | Scenic View<br>Prior Content 2<br>Scenic View | |
| | Cleft Full Wall<br>        (Cloud)<br>        (Fovial)<br>        (Grnd) | Context Data Fd<br>Agenda (Context Data Fd)<br>Scenic View | |
| | Cright Full Wall<br>        (Cloud)<br>        (Fovial)<br>        (Grnd) | Context Data Fd<br>Main Content<br>Scenic View | |
| | Left Wall | | |
| |     Left Totem<br>        (Cloud)<br>        (Fovial)<br>        (Grnd) | Context Data Fd<br>Main Content<br>Scenic View | Aside 1 |
| |     Center Totem<br>        (Cloud)<br>        (Fovial)<br>        (Grnd) | Context Data Fd<br>Main Content<br>Scenic View | Aside 2 |
| |     Right Totem<br>        (Cloud)<br>        (Fovial)<br>        (Grnd) | Context Data Fd<br>Main Content<br>Scenic View | Rear Conferee 1-1 |
| | Right Wall | | |
| |     Left Totem<br>        (Cloud)<br>        (Fovial)<br>        (Grnd) | Context Data Fd<br>Main Content<br>Scenic View | Rear Conferee 1-2 |
| |     Center Totem<br>        (Cloud)<br>        (Fovial)<br>        (Grnd) | Context Data Fd<br>Main Content<br>Scenic View | Rear Conferee 2-1 |
| |     Right Totem<br>        (Cloud)<br>        (Fovial)<br>        (Grnd) | Context Data Fd<br>Main Content<br>Scenic View | Rear Conferee 2-2 |
| | Rear Full Wall<br>    Central Window<br>        (Fovial)<br>    Left Window<br>        (Fovial)<br>    Right Window<br>        (Fovial) | Main Content<br>Main Content<br>Main Content | |

Column labels: 1202 = Space Type, 1204 = Vessel Arrangement, 1200 = Space Template Database (Physically Moveable Vessels), 1206 = Activity Type, 1208 = (PS-T4 / IS-T4-DC), 1210 = Position

Fig. 60

TEMPLATE BASED CONTENT PREPARATION SYSTEM FOR USE WITH A PLURALITY OF SPACE TYPES

CROSS-REFERENCE TO RELATED APPLICATIONS

This application is a continuation of U.S. patent application Ser. No. 15/170,070 filed on Jun. 1, 2016, which is titled "TEMPLATE BASED CONTENT PREPARATION SYSTEM FOR USE WITH A PLURALITY OF SPACE TYPES," which claims priority to U.S. provisional patent application Ser. No. 62/169,645 filed on Jun. 2, 2015 which is titled "AFFORDANCE TEMPLATE SYSTEM AND METHOD" and to U.S. provisional patent application Ser. No. 62/205,392 which was filed on Aug. 14, 2015 and which is also titled "AFFORDANCE TEMPLATE SYSTEM AND METHOD," the disclosures of which are hereby incorporated by reference in their entirety.

STATEMENT REGARDING FEDERALLY SPONSORED RESEARCH OR DEVELOPMENT

Not applicable.

BACKGROUND OF THE DISCLOSURE

The field of the disclosure is resource use management and more specifically tools to help persons comprehend space types and affordance capabilities associated with different spaces and to develop characteristics of sessions to occur in the spaces so that the spaces and affordances can be used in ways that optimally support different types of activities within the spaces.

Throughout time people have attempted to equip their environments with the best tools and resources available for performing various tasks. For instance, in business and other environments where people need to interact on a regular basis, people are always searching for tools and resources to increase efficiency and achieve better or more optimized results. Many businesses and other entities (e.g., government, educational, charity, etc.) have recognized that communication and knowledge sharing among people is critical to their success. To help people communicate, share information and collaborate, most business and other entity facilities provide conference or meeting spaces that are designed and equipped to facilitate these and other activities.

Many early conference rooms included a set of stationary walls that divided the space from a larger ambient environment, a set of comfortable chairs arranged about a conference table within the space and some way for a conference session leader (e.g., a conferee making a presentation) to present analog content. Here, the phrase "analog content" is used to refer to information applied to a surface that is not in a persistent digital form. For instance, many conference spaces designed to support leader based activities included a blackboard or whiteboard for presenting or developing content during a session. As another instance, some conference spaces included flip charts (e.g., large (3 by 5 foot) pads of bound paper) on which content could be applied during a session. As yet one other instance, some conference spaces were equipped with overhead projector devices that directed light up through annotated clear foils to generate projected images on a pull down or up display screen surface. Here, pre-generated content could be applied to foils or content could be generated within a space during a session by apply ink via a pen to the foils.

In some cases whiteboards and flip charts have been equipped with cameras to obtain images of content applied thereto so that a persistent digital form of the content can be generated and archived for subsequent access. Here, after one or more conferees generate content on the whiteboard, the camera is used to take and store a digital image for access by conferees using personal computers or the like.

Over time, computers (e.g., laptops) and projectors have evolved and now enable users to prepare digital content that can be presented via the projectors on large projection screens. More recently, large flat panel and curved panel display screens have been developed and have reached a price point that enables companies to provide large panel displays within conference spaces that can be used by conferees to present digital content. In addition, electronic whiteboards have been developed that enable a conferee to simulate pen writing on an emissive surface via a stylus or the conferee's finger where a whiteboard processor trails the tip of the stylus or the conferee's finger with a trail of virtual ink. Many current electronic whiteboards can double as a shared computer display screen for sharing software program (e.g., Microsoft Word, Excel, Power Point, etc.) output and the touch sensitive displays can receive conferee input to control software programs (e.g., select on screen virtual icons, add content via a virtual keyboard, etc.).

While in person meetings are often preferred for various reasons, in many cases one or more employees or other persons that should participate in a conference session may not be able to attend in person. To allow at least some participation by remote conferees, audio and video systems have been developed. For instance, early systems simply linked remote conferees via a telephone to a conference space so that remote conferees could hear and participate in session discussions. More recently telepresence systems have been developed that provide high definition video and audio capabilities so that remote conferees are able to participate in conference activities more fully. In some cases two or more electronic panel displays or projectors are provided within one space, a first for a telepresence view of one or more remote conferees and a second for shared digital content. In other cases, software has been developed to divide a display surface of a single panel display screen into windows where one or more windows is used for viewing remote conferees and another is used for sharing digital content.

Hereinafter, unless indicated otherwise, the term "vessel" will be used to refer to any environmental affordance used to present information within a space including paper tools (e.g., a flip chart), blackboards, whiteboards, both electronic and non-electronic, overhead projectors and foils, projectors and mechanical projection screens, flat and/or curved electronic display screens, common screens, personal (e.g., laptop, tablet type device, etc.) device screens and any other manifestation for presenting content. In addition, where a single display screen or emissive surface is divided into sub-windows or spaces, each sub-window will be referred to herein as a separate vessel (e.g., a surface presenting four separate images in four separate windows on a single emissive surface would have four separate vessels).

Throughout the evolution of conference space affordances, unwritten standards or rules of thumb have developed that have simplified the tasks associated with content generation and presentation. A first particularly advantageous rule of thumb relates to spatial characteristics of shared content. Except for in specially designed and customized cases, the shapes of content presenting vessels have been restricted to rectangular. As examples, the general shape of flip pad paper is rectangular, conventional overhead projector screens and associated foiled has been rectangular, the shape of projection screens has been rectangular, the shape of flat panel displays is generally rectangular and even the general shape of most curved electronic displays is rectangular. This rule of thumb developed primarily because of manufacturing constraints associated with non-rectangular vessels (e.g., non-rectangular electronic display screens) and a desire to use space efficiently (e.g., a circular flip chart pad or whiteboard often times wastes wall space at corners).

A second unwritten rule of thumb is that, in most cases, only one or a small number (e.g., two) of electronic display screens and/or electronic whiteboards are located in each conference space. Historically this rule of thumb developed primarily because early projectors and electronic display screens and electronic whiteboards were simply too expensive to provide more than one in a space.

A third unwritten rule of thumb is that, even where there are two or more common large electronic display screens in a space, one is typically located at a central point of focus within the space such as, for instance, along a front wall of the conference space. Here, secondary screens may be presented at other locations within the conference space but most activity occurs at the centrally located screen.

A fourth unwritten rule of thumb is that, in many cases, content and its presentation has a linear or sequential order. For instance, during an informative presentation where one conferee acts as a presenter to present information to others within a space, the presenter typically scripts the entire presentation so that first content is followed by second, second by third, and so on until the presentation is complete.

A fifth unwritten rule of thumb is that standard laptop, tablet and other device interfaces have been developed that enable device users to link to electronic space vessels for sharing content. For instance, standard device output ports and connection cables for connecting to projectors, displays, etc., have been developed so that substantially all portable computing devices can be linked for sharing content. One advantage associated with standard connection cables is that a conferee can use her own portable device as an interface for driving common display screens within a conference space. Thus, for instance, a user may use on screen icons presented by Power Point or other software applications on a laptop or tablet device screen to control content on common space vessels.

These rules of thumb or standards have enabled software developers to assume specific characteristics and capabilities of conference spaces and develop software specifically geared toward content generation for standard conference spaces that include at least a centrally located, main, rectangular, digital content vessel (e.g., a large main electronic display screen), standard connection cables, and to assume that content will generally be presented in a sequentially ordered fashion.

One other advantage associated with the rectangular shape of common vessels is that the shape of the vessel effectively mirrors the shape of most display screens included with personal computing devices like desktop computers, laptop computers, tablet computing devices (e.g., an i-Pad), etc.). The common shape means that when content is developed for using a personal device display screen, the content is automatically properly formatted and generally dimensioned for common electronic display or projection vessels. For instance, Microsoft developed the Power Point software program which enables a user to generate slides (e.g., content) that can be presented during a session. Here, each slide has a rectilinear shape that is similar to the standard shape of the main vessel in most conference spaces. In addition, the Power Point program naturally supports a sequential progression through slides that are meant to be presented on a single main vessel within a space.

One other advantage associated with the common vessel and personal device display shapes is that a conferee can effectively experience session content prior to the occurrence of a session during a pre-session process anywhere by using the conferee's own personal device. For instance, a presenter may develop a Power Point presentation via her laptop computer and has the ability to run the presentation prior to a session to identify weaknesses in the presentation materials or sequential flow and to become familiar with the presentation materials during a practice or test session.

Still one other advantage associated with systems that are consistent with the unwritten rules of thumb above is that the tools used to control content during a pre-session practice activity may be essentially identical to the tools used during a subsequent session in the conference space. For instance, in the case of a Power Point presentation developed using a laptop computer, the presentation may be controlled during a pre-session dry run using laptop input devices (e.g., keyboard arrow buttons) or on screen icons in the same fashion that the presentation will be controlled subsequently after connection via a standard connection cable to a projector, an electronic display, etc.

Knowing that many sessions are presentation based where one conferee presents sequential content to other conferees at any given time, the developers of Power Point and other similar software packages have designed templates that are specifically designed to help a presenter generate a sequential set of slides for sharing. An exemplary template may include a series of blank sequential rectilinear slides that include fields for entering different types of content such as a main session title, sub-titles, lists, paragraphs, quotations, charts (e.g., Gantt, pie, bar, etc.), and so on. Here, the conferee works through a template developing content which is then stored in an instantiated instance of the template for subsequent access during a session. Hereinafter, unless indicated otherwise, an instantiated instance of a template will be referred to as a "session specification".

In addition to using conference spaces for leader or presenter based presentations, some spaces have been developed and equipped to support collaborative or generative group activities where multiple conferees may share and generate and even co-generate content. For instance, a MediaScape system designed, manufactured and sold by Steelcase Inc. of Grand Rapids Mich., includes two or more (e.g., four) large common display screens adjacent a conference table top or other conferee supporting structure and computing hardware that enables conferees to share content from their portable computing device desktops with each other in an egalitarian fashion. Here, the term "egalitarian" means that any conferee linked to the system can duplicate their desktop content on any of the common display screens at any time during a session regardless of who is currently presenting content on a target screen. Thus, for instance, where a system includes first, second and third screens and first, second and third conferees are currently sharing their desktops on the first, second and third screens, respectively, a fourth linked conferee could opt to share her desktop on any one or subset of the first, second or third screens without requiring permission or screen yielding by any of the other conferees. Other multi-screen or window content sharing systems have been developed within the industry generally.

U.S. Pat. No. 7,948,448 which issued on May 24, 2011 and which is titled "Portable Presentation System And Method For Use Therewith" which is owned by the present applicant, teaches another system that includes a plurality of electronic display screens mounted to carts for movement within and among conference spaces where content on a primary screen can be flipped to any of the other secondary screens for display and can be brought back to the primary screen for viewing or additional editing. Here, any of the cart mounted screens can be manually moved to any of several relative juxtapositions relative to the other cart mounted screens and relative to the conference space in general. Some ways of controlling the flipping and retrieval of content among the screens are contemplated.

U.S. patent application Ser. No. 14/500,155 which was filed on Sep. 29, 2014 and which is titled "Emissive Surfaces And Workspaces Method And Apparatus", which is owned by the present applicant, teaches several differently afforded conference spaces and different types of interfaces for use in those spaces. In some cases, a space includes several flat panel display screens mounted on or supported within different wall structures about the space. In other cases, a space includes completely emissive wall surfaces. This application also teaches various interfaces for controlling content on the emissive surfaces or screens including use of personal devices that facilitate directional sharing of content from a user's device display screen and other interfaces that are integrated into a table top or the like.

US patent application Ser. No. 14/159,589 which was filed on Jan. 21, 2014 and which is titled "Emissive Shapes And Control Systems" teaches other shaped vessels that include external emissive surfaces of different shapes. For instance, one affordance includes an emissive surface arrangement that has several different planar surfaces arranged to present different types of information. For example, surfaces that are arranged to be viewed by one person within a space may present relatively more private content than surfaces that are arranged to be viewed by other persons within the space (e.g., a second person spaced on an opposite side of a table top or work surface). This application also teaches virtual interfaces presented on emissive surfaces at different locations for controlling content on other emissive surfaces. Each of the above patent and applications is incorporated herein in its entirety by reference.

Clearly the types of display/emissive surface vessels, the number of vessels within a conference space and the arrangements of those vessels within space are proliferating rapidly as new technologies emerge and others mature which brings the costs associated therewith down. The vessel types, numbers and arrangements as well as user interface functionality are expected to increase at an even more rapid rate moving forward.

While different vessel arrangements and interface functionality hold promise, the ability to design and provide many different customized vessel arrangements and interfaces substantially complicates the task of optimally using those vessels. For instance, assume that any conference space may be customized and have any of 20 different electronic emissive vessel arrangements for sharing content and 20 different ways of interfacing with each vessel arrangement. For example, assume that a first conference space includes three large flat screen displays on a front wall and fourth and fifth displays mounted on left and right side walls while a second space includes the five display arrangement in the first space plus three additional flat displays on a rear wall and an emissive table top structure having a top surface on which vessels can be presented for providing digital content. In addition, assume that the first space is only set up for leader based presentations via mechanical connection to a video cable while the second space is configured to support egalitarian control of display content on any of the emissive wall surfaces via separate virtual interfaces provided on the emissive table top surface for each of the conferees within the space. Assume that a third conference space only includes a single projector and mechanical projection screen and that control must be via buttons on a laptop keypad. Many other conference spaces may have many other vessel and interface configurations.

In this example where each conference space is potentially differently afforded, an initial problem may be that a potential space user has no way to determine the vessel arrangement within a space short of traveling to the space and viewing the arrangement. In many cases a pre-session space visit cannot be made and in most other cases such a visit would be burdensome.

Another problem associated with spaces that may have any of several different emissive vessel arrangements is that, even if a potential space user is familiar with the vessel arrangement within a specific space, no known system exists to help the user develop content for the space. For instance, in the first space having the first vessel arrangement (e.g., five large screens on a front, left and right walls) described above, how can a user prepare a sequence of content to be presented via the five displays? What happens to content on secondary displays when content on a central main display is changed and can content on secondary displays be manually modified by a user irrespective of what happens on a main display? The potential space user would have many other questions and no answers.

Complicating matters further, what happens if a space user that is familiar with the vessel arrangement and interface capabilities in one space has to use a different space that includes a different vessel arrangement and interface capabilities? Similarly, what if a conferee prepares a presentation for a first space with a first vessel and interface set and thereafter has to reschedule and is forced to use a second space with a different arrangement set where the presentation for the first space does not "fit" into the second space because of the different arrangement set?

Another problem arises if a person has an immediate need to present content to others and has to use a space having affordances for which content to be presented was not pre-specified. For instance, assume that a group of five colleagues cooperate over several months on a specific project AA and have been developing project work product that takes several different digital forms. Also assume that three of the five colleagues are unexpectedly located at a first facility at the same time and want to have a quick impromptu 30 minute session to discuss new developments in the project and that the fourth and fifth colleagues intend to patch into the session to remotely participate. Here, the three collocated colleagues in the first facility go to an available emissive room (e.g., a conference space having full wall emissive surfaces) to share project work product. Upon entering the emissive room, despite all of the capabilities of the emissive surfaces in the space, the conferees would have no easy or intuitive way to populate the surfaces with project work product, to patch in the remote conferees, etc. because of the constrained 30 minute period, the collocated colleagues would likely just use the space in a relatively "dumbed-down" way to present a snap shot of the work product in one vessel on one wall with the remote colleagues patching in via a teleconference. Thus, while the emissive room could clearly provide an optimized experience if controlled to do so, space affordances are underutilized and the overall experience is not any better than what could have been provided using a conventional less afforded and less expensive space.

Thus, a need exists for a system that can be used to help potential space users identify vessel and interface arrangements as well as functionalities supported by sharing systems in different spaces and prepare content for use in different spaces that have different vessel and interface arrangements. In addition, it would be advantageous if such a system could enable a user to pre-view a session presentation in some meaningful way and could become comfortable with space affordances prior to arrival at the space. Furthermore, it would be advantageous if the aforementioned system could further fit any presentation to any space vessel arrangement.

BRIEF SUMMARY OF THE DISCLOSURE

New and interesting space vessel arrangements are proliferating at an ever increasing speed and the speed of proliferation will continue to increase as new technologies are adapted, as existing technologies mature, and as overall costs associated with different vessel arrangements drop. While many arrangements are interesting and could support many different activities, it has been recognized that there are no known systems that help a user identify vessel arrangements associated with specific spaces and no tools for intuitively and efficiently populating different vessel arrangements with content. Where potential space users cannot discover a vessel arrangement within a space or easily populate that vessel with content, the chances of such a system being widely adapted is minimal at best. Instead, unknown vessel arrangements where optimized functionality is difficult to implement will either be utilized in an abbreviated fashion (e.g., one main screen may be used as in the past while other screens are not) or may not be used at all.

Complicating matters even further, what if space affordances can be tailored to support several different activity types. For example, what if affordances in a first space can be controlled to present a leader based presentation or controlled to enable collaborative egalitarian control of displayed content? Here, during a leader based activity, a presenter may present a sequential set of content on a main display screen while, during an egalitarian type activity, any conferee in the space can present content on any emissive surface in the space. Many other types of activities may be optimally supported by limiting locations of specific content on screens or the sequence of content presented during the course of a session.

According to at least some embodiments of the present disclosure, software can be provided that controls content presentation on space vessels differently at different times to optimally support different activities. Even if a space user were familiar with affordances within a specific space, without actual use and training, the user would have no understanding of the rich capabilities associated with the space and software combination. In the same way that a person cannot understand the capabilities of a computer sitting on a desktop without actually turning the computer on, booting up software on the computer and playing with the software to discover capabilities, once vessels and other affordances within a space can be used differently to accomplish many different tasks or perform different activities, a potential user cannot understand affordance capabilities without actual use. Where different spaces have many different affordance mixes and are capable of optimally supporting many different activities, potential space users will likely be confused and may avoid space use as opposed to optimally using space and affordances.

In many cases, activities during a session may change as the session progresses. In these cases, space affordances including vessels should be controlled differently during different periods of a session to optimally support the different activities. For instance during a first thirty minute period of a session one conferee may be presenting information to other conferees and during a second thirty minute period of a session all conferees may participate in collaborative work product development by sharing and developing content in an egalitarian fashion. Here, session content presentation on emissive surfaces should be controlled differently to support the two different activities (e.g., presentation and egalitarian collaboration) during the different session sub-periods.

If a potential space user could understand a vessel arrangement prior to the time scheduled for a session and could access tools that help the user populate the vessel arrangement for particular activities, all vessel arrangements could be used in optimal ways to facilitate specific activities. To this end, at least some embodiments of the present disclosure include a database of templates where each template is associated with at least one conference space type. Each conference space includes a sub-set of vessel and interface affordances and may be controllable to facilitate one or more specific activities within the space. Here, in at least some cases, an exemplary template associated with a space includes, at a minimum, a vessel arrangement specification that indicates the number, types and arrangement of vessels within the space. For instance, a first template may specify that a first space includes five six foot by eight foot landscape oriented flat screen displays with three on a front wall and the fourth and fifth arranged on left and right side walls, respectively. In addition, the first template may also indicate that a user's personal interface (as opposed to a room interface) is required to control content on the five screen panels.

In some cases, the template may be presented in a textual format. In other cases template information may be graphically presented. For instance, in the case of the first template that specifies five flat screen vessels, the first template may include a graphical representation of the space associated with the template that shows the locations of the vessels within the space. In the alternative, the graphical representation may present a 3D model of the space allowing a user to rotate a point of view in the space and see relative juxtapositions of content in the space. Here, the 3D model may be presented as a view looking in (e.g., from outside the space) or as a view within the actual space (e.g., a view from a vantage point in the space looking at a portion of the space (e.g., front, front left, left, rear left, etc.).

In addition to number, type and arrangement of vessels within a space, in at least some cases, a template may also specify two or a plurality of different activities that can be optimally supported within an associated space type and different information types presented on or in the vessels in a specific arrangement during a session to optimize use of the space affordances for specific activities. For instance, where a vessel arrangement in a specific space can be used to facilitate either a leader based presentation session or a collaborative egalitarian session, a template for the space may direct or guide a space user to populate the space vessel set differently given the different intended activities. In some cases a single space and associated vessel set may be controllable to optimally support many (e.g., 5, 6, 30) different activity types.

In some cases a templates may specify different vessel uses at different times as a session progresses. For instance, a presentation type template may specify that at the beginning of a session, a central screen present an agenda for the presentation and all other screens present a title of the session or presentation and that, after a presentation commences, main presentation content be presented on each of three large common displays while the agenda is presented on all other smaller common displays within a vessel set. Near the end of the session, the template may cause a different mix of content to occur.

Thus, in some cases the system may enable a user to select a space/vessel arrangement type as well as one of a set of activities to be performed within the selected space type and, based on the space/activity combination selected, may request content input from the user needed to populate space vessels during a session. Once required content is provided, the system may automatically populate vessels in a session database for subsequent use during a session.

In at least some embodiments the system may enable a user to view a virtual presentation of a space and vessel set as well as locations of specific information types presented on different vessels in the set during the process of selecting a space type and activity combination. Here, for instance, a 3D virtual representation of the vessels and content locations may be provided on a computer screen or the like which allows a user to see vessel and content type locations.

After a user specifies content for a session and the system populates vessels with the content, the user may be able to step through a virtual representation of the session on a computer or the like thereby previewing how content on each vessel in a vessel set changes during the virtual session. In a 3D view, the user may be able to virtually face different directions in a virtual space type associated with a real space to assess effectiveness of the virtual session, to perceive content viewing angles from within a space, etc. If a user perceives an issue with content presentation, the user may be able to change the content presented in different vessels to address the perceived issue.

Once a session is specified and stored as a session specification, any person invited to a session may be able to access the pre-stored session specification and step through a preview of session content via the virtual representation. In at least some cases, a virtual representation of a session may be experienced via any suitable personal computing device.

In at least some cases each or at least a subset of vessels in a space vessel set may be divided into sub-vessels (also called vessels in this disclosure) and different content may be presented in each of the different sub-vessels. For instance, in some cases, a large flat panel display that stretches from floor to ceiling may include upper, intermediate and lower sections where the intermediate section includes a thirty inch horizontal swath through the display generally centered at eye height of a standing or sitting person, the upper section includes display space above the intermediate section and the lower section includes display space below the intermediate section. Hereinafter, unless indicated otherwise, the upper, intermediate and lower sections of a display will be referred to as cloud, fovial and ground vessels or spaces, respectively.

Where a display or screen or surface is dividable into different vessels or spaces, in at least some cases, a template may specify that different information be presented in different vessels of a display either persistently or dynamically so that the content changes over time. Thus, for instance, one template may specify that for a specific large screen in a specific space type where a presentation activity has been selected, a context based data feed be presented in a cloud section, main session content (e.g., a Power Point presentation) be presented in the foveal section and a calming scene (e.g., grass lightly blowing in the wind) be presented in the ground section. Here, the phrase "context based data feed" refers to real time data generated by a server based on content sensed (e.g., via audio analysis, video analysis, analysis of content on displays, etc.) within a conference space. For example, a simple context based data feed may present rolling Internet search results generated by a search engine that uses sensed content form a space to drive search queries.

As another instance, a wall sized flat panel display may be dividable into three, four, etc., different large horizontally spaced windows or vessels and a template may specify that different content types be presented in each of the different vessels based on a selected activity type. For example, in the case of a presentation type activity where a wall sized display or surface is divided into four vessels, a left vessel may present a next slide to be viewed in a presentation, a second from left vessel may present content currently being discussed by a presenter, a third from left vessel may present a most recent prior slide and the right vessel may present an agenda. In a different case where an egalitarian collaboration activity has been specified, the left vessel may present an agenda and the other three vessels may simply operate as receiving vessels for real time content shared by session attendees.

In at least some cases templates may allow a user to control space affordances other than vessels. For example, in addition to including a vessel set, a space may also include controllable lighting, controllable window shades, electronically tintable glass walls, audio capabilities, etc. In the case of lighting, in many cases, even where lighting can be controlled to optimize some activity, space users simply do not adjust lighting either because they are unaware of the advantages associated with different lighting effects or because they simply do not care to take the time to adjust lighting in an optimized fashion. Where lighting effects optimized for different space, vessel sets and activity combinations can be specified in templates, use of the template system can provide additional advantages associated with the optimized effects without requiring additional knowledge or performance of tasks by a space user. For instance, where a user specifies a presentation activity within a space, the template may specify that prior to a session, lights associated with the space should be brightly illuminated. Five minutes before a session commences, the lighting may be altered automatically to signal that the session is to commence shortly. As the session starts, lighting around a conference table may be automatically dimmed while light above the conference table remains bright. During the session, when collaboration is occurring the light above the table may remain bright but once a presentation by one conferee at the front of the space commences, light above the table may be dimmed to an intermediate level and the light at the front of the space may be brightened. All of these lighting effects and many more may be included in a template.

In the case of audio functionality, sounds and audio effects may be altered at different times prior to, during and after a session to optimize various effects related to different activity, space and vessel set combinations and those effects may be included in the templates. Many other affordance controls and effects may be specified via templates.

In at least some cases a system user may be able to either customize an instance of an existing system template or to generate a custom template for a specific session or to be stored as a new template when instantiating subsequent sessions. Here, for instance, in some cases, a system may enable a user to divide vessel surfaces into different sub-vessels and to then specify information or content types that are to be presented in the different vessels. The system may specify a set of pre-canned content types and may present a list of the pre-canned content types to a user for selection and association with each of the vessels within a space. For example, pre-canned content types may include a main content type, a next content type (e.g., a next slide in a presentation), a prior content type (e.g., a prior slide in a presentation), an agenda type, a goals list type, different scenic views (e.g., designed for rejuvenation), a context based data feed type, an egalitarian sharing type, a content queue type (e.g., for posting content that may or may not be viewed during a session), a desktop view type, an interface tools type, a remote user window type, etc. Here, for instance, while viewing a 3D virtual view of a space and vessels within the space, a user may associate one of the content types with a specific vessel thereby instructing the system to populate the specific vessel with the content type once content of that type is specified by the user.

In at least some cases it is contemplated that the system will be equipped to morph a session specification that has been specified for a specific session associated with a first space type into a session specification that will "fit" a second space type that has a vessel set or affordance set that is different than the set associated with the first space. For instance, where a first space includes five large flat panel displays and specific content has been specified in a stored session specification for each of the five displays, the system would be able to automatically map the specified content to three large flat panel displays that are included in a second relatively smaller space. Thus, for instance, the system may ascribe different priority levels to the content specified for each screen in a session specification which can be used to map most important content to vessels in a reduced vessel set. As another instance, content of a specific type and that is mapped to one vessel within a first space type and to another vessel at a different location in a second space type automatically upon change of a space for a session.

Similarly, where a user ends up using a space that includes vessels in addition to the set for which content is specified in a session specification, the system may be capable of automatically expanding the content to fill the larger vessel set fields. For example, where a session specification includes content for only five large flat panel displays and a session ends up be held in a space that includes ten large displays, content may be duplicated on various displays in a thoughtful and automated fashion without requiring any activity by a session conferee.

In at least some cases when a remote conferee accesses a session, the conferee may be presented with a virtual view of session content automatically. In some cases the remote view may be a 3D view of the session content in real time to help the remote conferee fully participate in the session or understand the interplay between content presented on different session vessels. In other cases the virtual view will include a pared down version of the session content to eliminate duplicative content. For instance, where a main Power Point presentation is duplicated in four of twelve foveal vessels within a conference space, the remote view may only present the Power Point presentation in a single vessel with other unique content presented in other vessels. As another instance, where next content (e.g., a next slide in a presentation) and prior content (e.g., a most recently presented slide in a presentation) are provided in two vessels within a conference space, the remote view may not provide that information as that information is truly of secondary importance when compared to a main content view. Many other distinctions between a remote view and actual content presentation within a space are contemplated.

In at least some cases it is contemplated that, in addition to being able to move different content to different vessels and being able to move different virtual vessels to different locations on emissive surfaces or vessels within a space, the devices that present the vessels themselves may be moveable to optimize relative juxtapositions of the vessels within a space and relative to persons within the space as a function of activities performed within the space. For instance, in at least some cases a large flat panel display may be mounted to a motorized cart for movement within a space. Unless indicated otherwise, one or more displays mounted to a cart will be referred to herein as a "totem". Here, each totem may be equipped with a wireless transceiver that can be used to determine the location and orientation of the totem within a space as well as to receive content to be presented on totem screens. For instance, totem location can be determined via triangulation of signal strengths from the totem transceiver as well known in the wireless location arts.

Where one or more totems are provided as described above, totem locations may be specified by templates to optimize screen locations based on activities within a space. For instance, where a single leader presentation is occurring within a space, totems may be parked adjacent space walls for simply replicating main content. Here, if instead of a single leader presentation, a dyadic (e.g., two people) collaboration activity is occurring, a template may specify that a first totem move to a location generally to the right and behind a first collaborator and that a second totem move to a location generally to the right and behind a second collaborator and that each totem present two horizontally adjacent vessels to which either the first or second collaborator can share his or her laptop desktop in an egalitarian fashion. As another instance, where a session includes a single leader presentation period followed by a small group breakout period, a template may specify that the totems automatically gather about first and second small groups to separate a space into two smaller spaces and provide useful emissive vessels once the breakout period commences.

In at least some cases different interface types may be provided for different space/vessel sets and different activities performed in different spaces. For instance, in the case of a single leader presentation activity, a template may only enable a single virtual control interface for a single session leader. As another instance, in the case of an egalitarian session between four persons, a template may enable a separate virtual control interface for each of the four persons within a space (e.g., on screens of personal devices, on portions of emissive table top surfaces adjacent each of the persons within the space, etc.). Where a session transitions from one activity to another, where virtual interfaces are used, the template can automatically transition from one interface type to another so that users do not have to perform any tasks for the transition to occur.

In other cases, instead of or in addition to providing totems, a space may be equipped with other moving affordances that support displays or emissive surfaces generally. For instance, in at least some cases, one or more walls within a space may be designed and controlled to automatically move to reconfigure a space and specifically vessel juxtapositions within the space to optimally facilitate specific activities. In other cases, a ceiling subassembly may be constructed and controlled to move to different positions selected to optimize vessel locations and space layout in general.

While space and vessel set unique templates may be provided for a large number (e.g., 1000) of different space/vessel set combinations, it has been recognized that large numbers of choices and options and features, even if they work well independently, often operate as a barrier to use. To this end, when people have too many choices and different product configurations, they often become confused and discombobulated by options and how to use different affordance combinations. For this reason, in at least some embodiments, it is contemplated that space/vessel set combinations may be limited to a small number where each combination is specifically designed to optimally support up to a specific number of users. For instance, in one case, combinations may include a small space combination including three large flat panel display screens mounted to a single wall, an intermediate space combination including five large flat panel displays mounted to three walls of a space and a large space combination including an entire emissive room (e.g., four substantially completely emissive walls) including an emissive table assembly. In this case, the small, intermediate and large combinations or spaces would optimally be used by small, intermediate and relatively large groups of users, respectively.

While many of the embodiments contemplated herein include wall structures that separate a space from a larger ambient space, in at least some embodiments there may be no walls or only one or two walls that help define a specific space and instead a space may simply include a sub-volume within a larger ambient volume. Here, totems or other vessel supporting structure may help to strike off or at least somewhat distinguish a specific space from a larger ambient space. Here, where totems and/or other structure is automatically controlled to move within a space, a defined conference space or sub-space may be altered over time as affordances are moved about within the space.

Some embodiments include a system for use with at least first and second different space types, each space type including an emissive surface set that includes a plurality of emissive surfaces, each emissive surface controllable to present content within the space, each emissive surface including at least one vessel, the system for preparing content for a session and comprising a database that includes a separate template for each space type, each template indicating vessels associated with the space type, relative juxtapositions of the vessels in the space and content types to be presented in each vessel for at least a first activity type, a processor programmed to perform the steps of (i) providing an interface screen that includes a separate space type representation for each space type, (ii) receiving a selection of one of the space types via the interface screen, (iii) identifying the template associated with the selected space type, (iv) identifying content types for each vessel specified by the identified template, (v) providing at least another interface screen for receiving content of each identified content type, (vi) storing the received content in a session specification for subsequent access during a session within a space of the selected space type wherein the session specification includes content for each vessel in the identified template associated with the selected template type.

In some cases each of the first and second spaces further includes additional controllable space affordances including at least a subset of lighting devices, audio devices, transparency controllable walls and interface devices and wherein each template further specifies parameter controls for each of the additional controllable space affordances. In some cases the processor is further programmed to perform the step of receiving a selection of an activity type to be facilitated and wherein at least a subset of the templates specify the parameter controls for additional controllable affordances based on activity type.

In some embodiments the processor is further programmed to receive an indication of a number of local conferees to attend a session and wherein at least a subset of the templates specify the parameter controls for additional controllable affordances based on the number of local attendees. In some cases the processor is further programmed to receive an indication of a number of remote conferees to attend a session and wherein at least a subset of the templates specify the parameter controls for additional controllable affordances based on the number of remote attendees.

In some cases the processor is further programmed to receive an indication of a number of local conferees to attend a session and wherein at least a subset of the templates specify the parameter controls for additional controllable affordances based on the number of local attendees. In some cases each template further specifies the locations of the vessels on each emissive surface. In some cases the processor is further programmed to receive at least one of selection of an activity type to be facilitated, a number of conferees to locally attend the session and information related to remote conferees and wherein at least a subset of the templates specify vessel locations on the emissive surfaces based on the at least one of the selection of an activity type to be facilitated, a number of conferees to locally attend the session and information related to remote conferees.

In some cases content in the vessels is also based at least in part on the at least one of the selection of an activity type to be facilitated, a number of conferees to locally attend the session and information related to remote conferees. In some cases at least one of the space types includes at least a first moveable affordance and wherein at least a first template type indicates a location for the at least a first moveable affordance. In some cases the step of providing an interface screen that includes a separate space type representation for each space type includes providing images that show the arrangement of vessels for each space type.

In some cases each image also indicates content types for at least a subset of the vessels. In some cases the step of providing at least another interface screen for receiving content of each identified content type includes a representation of the space vessel arrangement as well as content specification window for specifying content for one vessel at a time. In some cases at least a subset of the templates include different vessel arrangements for different times during a session. In some cases the processor is further programmed to present a preview interface that shows all of the content in the specified vessels. In some cases the vessel arrangement changes during a session and wherein the preview interface enables a user to move to different instances during a session and the processor presents the content for the selected instance. In some cases the preview interface presents the emissive surfaces in a 3D representation.

Some embodiments include a system for use with at least a first space type that includes a plurality of controllable space affordances including at least an emissive surface set that includes a plurality of emissive surfaces, each emissive surface controllable to present content within the space, each emissive surface including at least one vessel, the system for preparing content for a session and comprising a database that includes a plurality of templates for the first space type, each template indicating vessels associated with the space type, relative juxtapositions of the vessels in the space and content types to be presented in each vessel for a specific activity type, a processor programmed to perform the steps of (i) providing an interface screen that enables a user to select one of the plurality of activity types to be facilitated in a first space of the first space type, (ii) receiving a selection of one of the plurality of activity types, (iii) identifying the template associated with the selected activity type, (iv) identifying vessel locations and content types for each vessel specified by the identified template, (v) providing at least another interface screen for receiving content of each identified content type, (vi) storing the received content in a session specification for subsequent access during a session within a space of the selected space type wherein the session specification includes content for each vessel in the identified template associated with the selected activity type.

Still other embodiments include a system for use with at least a first space type that includes a plurality of controllable space affordances including at least an emissive surface set that includes a plurality of emissive surfaces, each emissive surface controllable to present content within the space, each emissive surface including at least one vessel, the system for preparing content for a session and comprising a database that includes a plurality of templates for the first space type, each template indicating vessels, relative juxtapositions of the vessels in space and content types to be presented in each vessel for a specific number of session conferees, a processor programmed to perform the steps of (i) providing an interface screen that enables a user to identify a number of conferees to attend a session, (ii) receiving an input indicating the number of conferees, (iii) identifying the template associated with the number of conferees, (iv) identifying vessel locations and content types for each vessel specified by the identified template, (v) providing at least another interface screen for receiving content of each identified content type, (vi) storing the received content in a session specification for subsequent access during a session within a space of the selected space type wherein the session specification includes content for each vessel in the identified template associated with the selected activity type. In some cases the number of conferees includes one of the number of local conferees, the number of remote conferees and the number of local and remote conferees.

Some embodiments include control interfaces for controlling content on multiple vessels in a space (see FIGS. 42-44). Some embodiments include a simplified control interface that shows only the most important content (see FIG. 45). Some cases include a control interface for on the fly customization of content in space vessels (e.g., can add a whiteboard, can add scenic view, can add context based data feed app, etc. (see FIGS. 46-47)). Some embodiments include totem concepts generally (see FIGS. 53-65) including mechanical design, ability to templatize positions based on activities, space, number of conferees local, number of conferees remote, locations of conferees in space, identities of conferees located in the space, time or progression of content in space, etc. Mechanical design including foveal and ground planes angled to provide content to person on broad side of the assembly.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 8 is a schematic diagram of a session specification database that stores session specifications developed using templates from the FIGS. 6A, 6B and 7 databases;

FIG. 16 is an image of a browser screen that may be presented as an interface during instantiation for selecting an activity type to be performed during a session for a FIG. 2 space type where content types for a presentation type activity are presented when a pointing icon hovers over a presentation activity type icon;

FIG. 60 is another exemplary space/activity template database that specifies totem locations and content types for a FIG. 56 space type;

FIG. 63 shows that in some cases even when totems are separated, a single image may be presented via adjacent totems with blank spaces there between;

DETAILED DESCRIPTION OF THE DISCLOSURE

Figure 1:
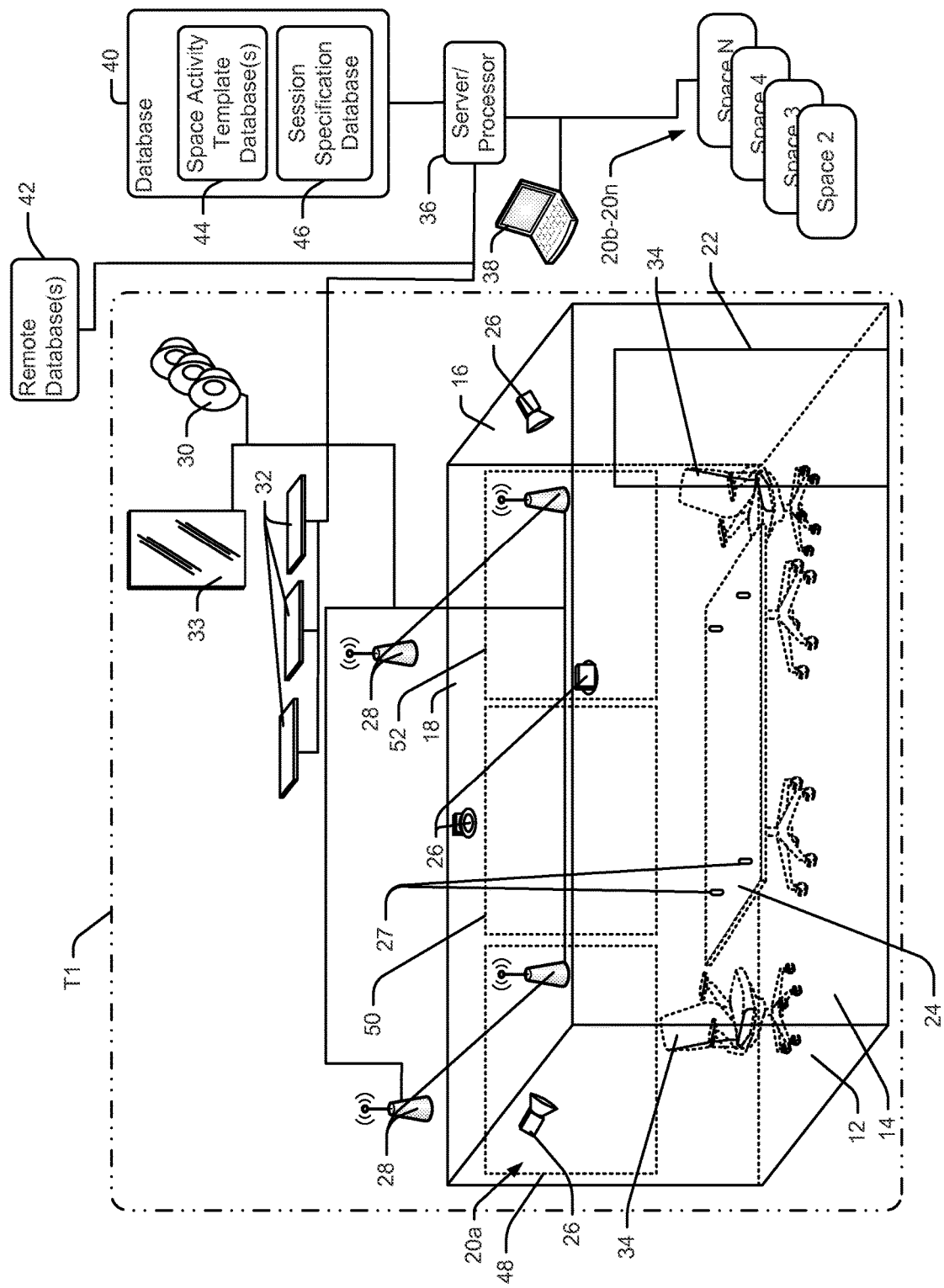
FIG. 1 is a schematic view of a conferencing system including, among other components, several conferencing spaces of different types where each space has a defined set of affordances that can be controlled via instantiated instances of space/activity templates to optimally facilitate any of several different session activities that is consistent with at least some aspects of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary conferencing system that includes, among other components and sub-systems, a plurality of conference spaces 20a through 20n that are managed and controlled by a server or processor 36 which is in turn linked to a plurality of databases 40 and 42 and one or more interface computers or other computing devices 38. A plurality of different types of programs and databases that are used or run by server 36 are stored in the databases 40 and 42 including but not limited to scheduling programs that manage schedules of the conference spaces 20a through 20n associated with the system, templates that specify various attributes of each of the conference spaces as well as different activity types that may be performed within the conference spaces and how affordances within the spaces are to be controlled based on different activity types, templates that facilitate and guide entry of different content types by a system user to instantiate instances of session specifications and session specifications that store session content for use during subsequent sessions. In addition, in at least some cases the databases may store content associated with different ongoing projects in separate project files which can be used to instantiate a session specification or at least part of a complete session specification in an automated fashion.

Server/processor 36 may be any type of computing device that is capable of performing the processes described herein. For instance, server/processor 36 may include a dedicated system server, a workstation, a personal computer, a laptop computer, a tablet type computing device or some other type of computing device. In addition, while server 36 may include a single computing device, in many cases it is contemplated that server 36 may include a number of linked servers or other computing devices, each performing different functions and processes or the set cooperating to perform different functions and processes as described in this specification. For instance, one server may handle space scheduling activities, a second server may handle processes related to developing or selecting session content, a third server may run programs to control session content during an on-going session, etc. Hereinafter, unless indicated otherwise, the phrase "system server" will be used generally to refer to server/processor 36 and may include any of the computing options described above.

Figure 2:
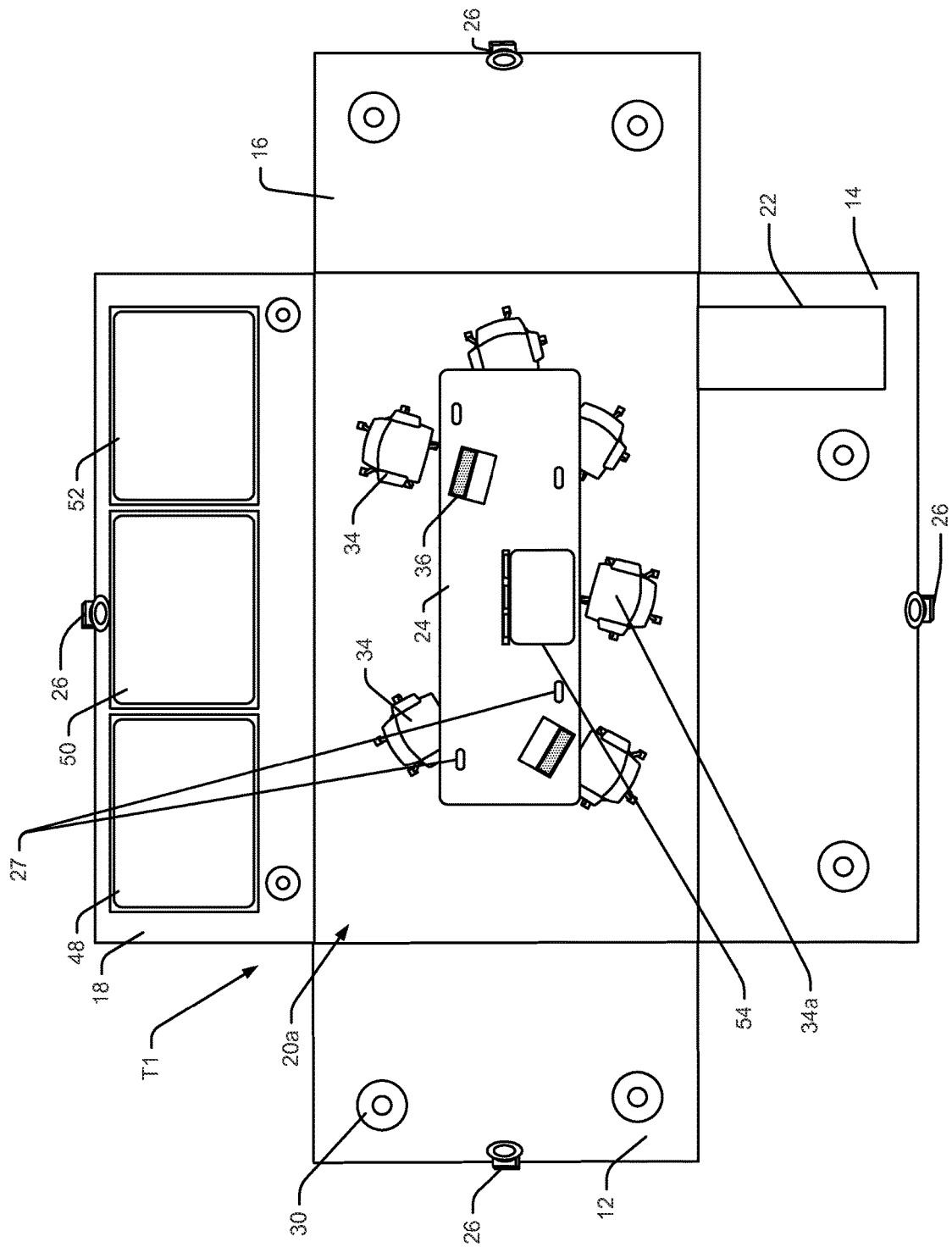
FIG. 2 is a top flattened view of one exemplary conferencing space type that may be supported by the system of FIG. 1.

Referring still to FIG. 1, each of the spaces 20a through 20n has a specific set of affordances that can be used during a conference session. In an exemplary system, each space will include one of first, second or third affordance sets, although, in other cases, it is contemplated that many more (e.g., 5, 10, 200) differently afforded space types may be included in an overall system. In at least some cases, the affordance sets may comprise different arrangements of emissive surfaces, displays or screens (e.g., projection or other) that can be used to present session content to conferees within an associated space or develop content during a session in real time. For instance, a first exemplary space 20a shown in FIGS. 1 and 2 is a first space type T1 that includes four walls 12, 14, 16 and 18 that define a rectilinear space where three large flat panel display screens 48, 50 and 52 are mounted side-by-side to a front wall 18 surface for use by conferees within space 20a. Hereinafter, unless indicated otherwise, displays, screens or other surface that can be used to generate digital images of content, interfaces or other images will be referred to herein as "emissive surfaces" and an entire emissive surface or any virtual window formed on an emissive surface will be referred to as a "vessel".

Referring still to FIGS. 1 and 2, in addition to the emissive surfaces and wall structures, space type T1 includes an entry/exit door 22, a conference table 24 surrounded by several task chairs collectively identified by numeral 34, ceiling mounted lighting devices 32, microphones 27 and speakers 30 for generating high definition sound within space 20a. Lighting devices 32 may have various controllable characteristics such as intensity, temperature (e.g., color), cycling effects (e.g., steady state intensity or pulsing on/off, etc.). Thus, each device 32 may be able to generate extremely intense and bright light or dim light and may be able to generate light having a small number of different colors (e.g., white and yellow) or a large number of colors (e.g., white, red, yellow, blue, green, pink, etc.). One light type that can generate many different colors and be controlled to provide many different lighting effects is the Phillips Hue LED bulb device which may be used in certain embodiments of the present disclosure.

Microphones 27 may be provided at many different locations within space 20a including within a table assembly, in a ceiling structure, in wall structures, etc. Speakers 30 linked to the system server 36 are controlled to serve various functions. For instance, in some cases background sound may be generated by speakers 30 at different times to create different effects for space users. For example, the speakers may generate a relaxing sound during a five minute period prior to commencement of a scheduled session to set a relaxed tone prior to commencement of the session. As another example, the speakers 30 may be used to amplify voices of conferees speaking within space 20a or to provide voices of remotely located conferees. As one other example, speakers 30 may be used to generate audio sounds associated with video clips or movies played on space vessels 48, 50, 52, etc.

Referring still to FIGS. 1 and 2, cameras 26 are mounted within at least some of the space types for obtaining images of associated spaces (e.g., 20a) before, during and subsequent to session activities within the spaces. Although not shown in all illustrations, unless indicated otherwise, it will be assumed that all of the space types in the system include one or more cameras within the space for collecting data. Images generated by the cameras may be used for various purposes such as to log activities within the spaces, identify locations of resources and/or conferees within the spaces, count number of conferees within spaces, assess juxtapositions of persons within spaces, etc.

While not shown, other sensor devices are contemplated within each space for generating data useful to discern different states, circumstances, conditions, activities, etc., with associated spaces. For instance, presence sensor devices, motion sensing devices, sound sensing devices, etc., may all be provided in any of the spaces T1 through T3 for gathering data about the space. Algorithms for analyzing camera and other sensor data and discerning useful circumstances or activities within an associated space therefrom are stored in database 40 for access by the system server 36.

Locations of conferees within a space may be used for various purposes such as, for instance, and depending on affordances within the space, presenting different vessels and interfaces at different locations, moving repositionable vessel supporting structures within a space to different locations, etc. For example, see in FIGS. 2 and 3 that a virtual interface 56 is shown provided via an emissive surface formed by a top member of table assembly 24. Here, it is assumed that interface 56 is provided proximate a particular seat or chair 34a occupied by a particular conferee (e.g., perhaps a presentation leader that needs a session interface to control content during the session) and that the particular conferee's location is based on images obtained using cameras 26.

Referring still to FIG. 1, space type T1 may include one or a subset of the door 22 and wall members 12, 14, 16 and 18 formed out of transparency adjustable glass wall assemblies 33. In at least some cases the transparency adjustable assemblies 33 may have transparencies that can be changed from substantially transparent to substantially opaque and may be controlled by system server 36. Transparency controllable glass assemblies are generally known and therefore will not be described here in detail. One exemplary controllable glass assembly is described in U.S. patent application Ser. No. 14/364,339 (hereinafter "the '339 application") which is titled "Window Having Active Transparency Control" which was filed on Dec. 12, 2012. Other controllable glass assemblies are described in the background section of the '339 application.

Access points 28 (see FIG. 1) are provided within or proximate space type T1 in the overall system and are linked to system server 36. The access points serve various purposes. First, in at least some embodiments the access points may be used to communicate with proximate portable computing devices (e.g., see laptop 35 in FIG. 2, a tablet type device, or any other type of portable device) to provide information hereto and to receive information there from. Thus, for instance, where an interface for controlling content on the vessels 48, 50 and 52 in space 20a is to be presented on one or more of the laptops in FIG. 2, the interface information or at least a trigger signal for providing the interface information for presenting a virtual interface via one or more of the displays associated with the laptops 35 may be transmitted to the laptop and control signals from the laptops may be received at the access points to be delivered to system server 36. Laptops and other devices in space 20a may also access corporate servers and content stored thereat, may access content via the internet and may access other networked content via the wireless access points 28.

As another instance, access points 28 may be used to triangulate the location of any of the portable user devices (e.g., 35 in FIG. 2) or transmitters or transceivers linked to other devices or affordances that can be moved within space 20a as well known in the art. For example, where an emissive surface is supported by a cart or the like (see FIGS. 53 and 58) for movement within a space 20a or a more general space, where the cart or display includes some type of wireless transmitter, a current location and even juxtaposition of the cart and display may be identified by obtaining signals transmitted from the transmitter within space 20a where strength of received signals can be used to triangulate transmitter and hence cart or display location.

As yet one other instance, where people working in a space 20a of type T1 wear or carry identification badges, lanyards, or other wearable devices that include an RF or other type of transmitter, access points 28 may receive identification signals from people in space 20a and use those signals to triangulate locations and/or juxtapositions of specific people within the system spaces.

In some cases, information collected from the access points 28 may be combined with information from cameras 26 within a space 20a and in other spaces 20b through 20n to track locations and juxtapositions of specific people and resources within the system spaces. For instance, the access points 28 may generate data that can be used to identify when a person not previously in space 20a has entered space 20a. Here, the access point location information may be relatively terse given metal parts in space affordances that tend to adversely affect accuracy of triangulation location algorithms so that a system server may only be able to distinguish which space among spaces 20a through 20n a specific person in located in as opposed to specific locations within spaces. The cameras 26 in each space (e.g. 20a) may track persons within the associated space and, when a new person is located within a space 20a, may associate that new person with the identity of the new person in the space identified using the access point information. Here, as the new person moves about within space 20a during a session, the location of that person in space 20a would be continually updated using the camera images and that person's location would be distinguished from the locations of other persons in space 20a. Thus, for instance, where a fifth person enters space 20a where four other people are already located and being tracked via camera images, the new person in the camera images would be identified as the fifth person.

Figure 4:
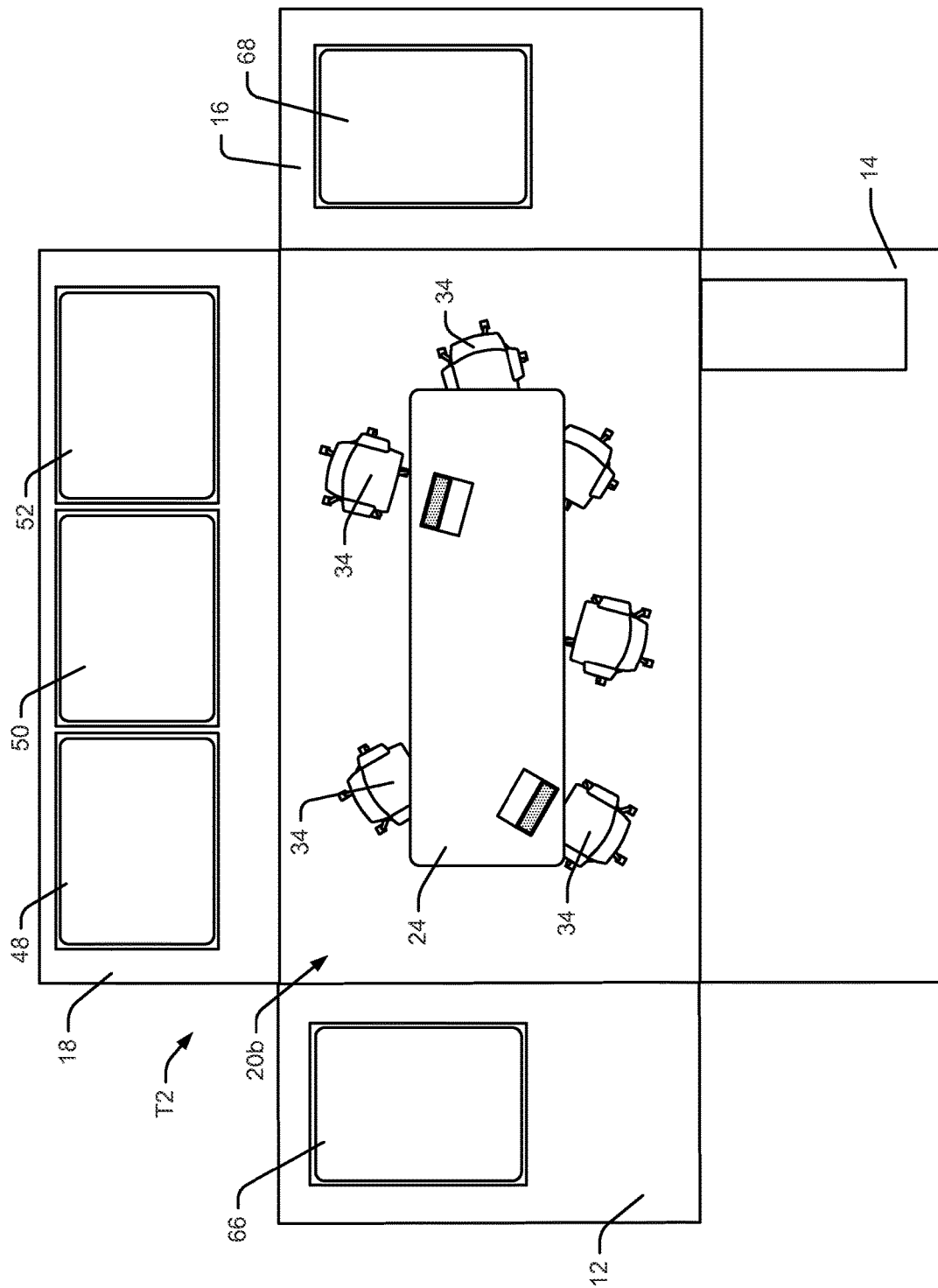
FIG. 4 is a top flattened view of a second exemplary conferencing space type that may be supported by the system of FIG. 1 and that includes five large emissive displays arranged on three space wall structures.
Figure 5:
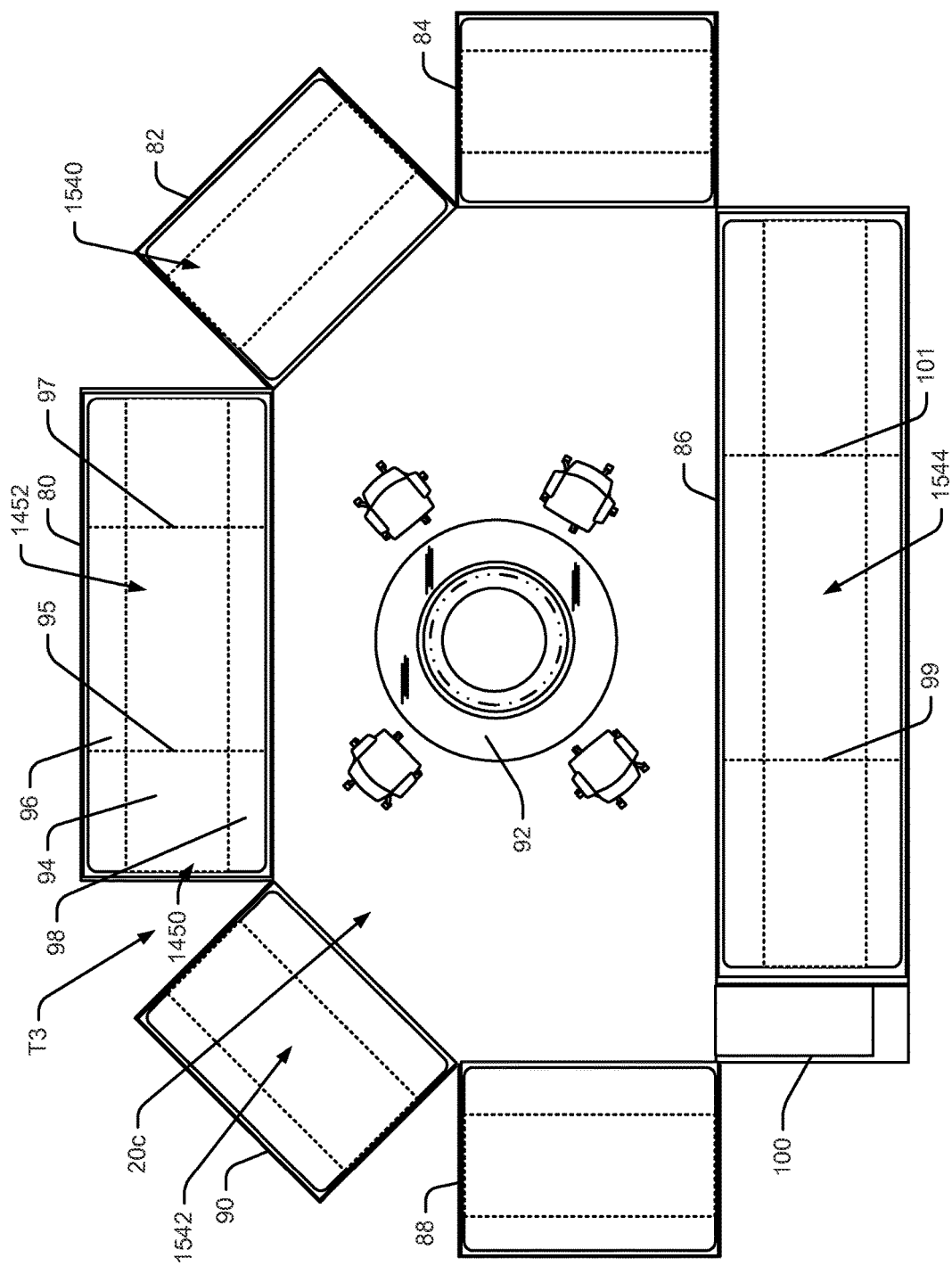
FIG. 5 is a top flattened view of a third exemplary conferencing space type that may be supported by the system of FIG. 1 and that includes full emissive wall assemblies on each of six walls of the space type.

Second and third space types T2 and T3, respectively, are shown in FIGS. 4 and 5 in simplified form where lighting, cameras, access points, speakers or other affordances are not shown. Nevertheless, it should be appreciated that each of space types T2 and T3 may and in most cases will include these affordances and perhaps others and that those affordances are not shown in FIGS. 4 and 5 in the interest of simplifying this explanation. Where spaces types T2 and T3 includes lighting, access point, speakers, cameras and other affordances, those affordances would be linked to the system server 38 shown in FIG. 1.

Second exemplary space type T2 in FIG. 4 includes four walls 12, 14, 16 and 18 that define exemplary second rectilinear conference space 20b where, in addition to three large flat panel emissive surfaces arranged side-by-side on the front wall 18, a fourth large emissive surface 66 is mounted to the left side wall 12 and a fifth large emissive surface 68 is mounted to the right side wall 16. Unless indicated otherwise herein, surfaces 48, 50 and 52 will be referred to herein as the left front surface, the center front surface and the right front surface, respectively, and the side emissive surfaces 66 and 68 will be referred to herein as the left wall and right wall emissive surfaces, respectively. A table 24 and chairs 34 are provided in space 20b.

Third exemplary space type T3 in FIG. 5 includes a plurality of wall size display screens or emissive surfaces which together, effectively cover a substantial portion of the internal surfaces of the walls that define exemplary conference space 20c. In this regard, the exemplary affordances that define space 20c include a front wall that includes a front emissive surface 80, a diagonal right wall that includes a right diagonal emissive surface 82, a right wall that includes a right wall emissive surface or screen 84, a rear wall that includes a rear emissive surface 86, a left wall that includes a left wall emissive surface or screen 88 and a diagonal left wall that includes a left diagonal emissive surface 90.

As shown, in the exemplary space type T3, the front and rear wall emissive surfaces are substantially parallel and spaced from each other and the left and right wall emissive surfaces are parallel and spaced from each other with the left diagonal surface 90 angled at substantially 45 degrees with the front emissive surface 80 and left wall surface 88 and the right diagonal surface 82 angled at substantially 45 degrees with and between each of the front surface 80 and the right surface 84.

Each of the emissive surfaces 80, 82, 84, 86, 88 and 90 extends, in the exemplary embodiment, from a floor height or slightly there above to substantially a ceiling height and along substantially the entire length of an associated wall, with the emissive surfaces facing the interior of space 20c. Each of the screens 82 through 90 may be virtually divided into upper, lower and intermediate portions that are referred to herein as cloud, foveal and ground vessels, respectively which are shown in FIG. 5 as being divided or separated by dotted or phantom lines. For example, in FIG. 5, the front emissive surface 80 is shown to have cloud, foveal and ground vessels represented by numerals 96, 94 and 98, respectively.

One or more of the emissive surfaces 82 through 90 may also be virtually divided laterally to create other distinct content presentation vessels. For instance, in FIG. 5, vertical dividing lines are shown at 95 and 97 that divide up the front emissive surface 80 into left, center and right sections. The combined cloud, foveal and ground divisions and left, center and right divisions at 95 and 97 cause the space of surface 80 to be divided into nine separate vessels including left cloud, left foveal, left ground, center cloud, center foveal, center ground, right cloud, right foveal and right ground. Content within the nine vessels may be separately controlled and/or controlled in a synchronized fashion as described hereafter. In addition, content within adjacent vessels may be controlled to provide a single image or scene that extends from one vessel to another covering all or portions of each of the two adjacent vessels.

Referring still to FIG. 5, vertical virtual dividing lines 99 and 101 are also shown on rear emissive surface 86. In some cases only a subset of the T3 space type surfaces may be divided vertically and laterally or vertically or laterally. Thus, as shown in FIG. 5, each of the relatively large front and rear emissive surfaces 80 and 86, respectively, are divided into nine vessels while the other four screens 82, 84, 88 and 90 is each virtually divided into cloud, foveal and ground vessels, respectively. While the vessels in FIG. 5 are shown as abutting each other, in some embodiments some or all of the virtual vessels may be separated by a border or virtual framing structure to help space users better distinguish adjacent fields from each other.

At different times, different content or extensions of the same content may be presented in the different surface vessels. For instance, at some times a large image or scene may extend over each of the cloud, foveal and ground vessels while at other times first, second and third different sets of content may be presented in the cloud, foveal and ground vessels. Thus, in FIG. 5, there are 30 different virtual vessels on the six emissive wall surfaces where each of the vessels may present similar content or each may present different content or a first subset may present the same (e.g., duplicate) first content, a second sub-set may present the same second (e.g., different than the first) content, etc. As another instance, main content may be presented in the center foveal vessel on wall 80 and a scenic view (e.g., a field of flowers moving slightly back and forth in a light breeze) may be presented in the remaining vessels as a continuous backdrop.

Referring still to FIG. 5, in addition to the wall type emissive surfaces, a circular emissive table structure 92 (hereinafter "table 92") is also provided within the T3 space type as well as four chairs 34. Table 92 includes additional surfaces that can be used to access content, to share content and, in at least some cases, to control content and content sharing activities. In this regard, an exemplary table akin to table 92 is shown in FIGS. 46 through 53 of U.S. patent application Ser. No. 14/159,589 (hereinafter "the '589 reference") which was filed on Jan. 21, 2014 and which is titled "Emissive Shapes and Control Systems" which is incorporated herein in its entirety by reference. The table 92 is represented by numeral 92 in FIG. 15 and includes a horizontal ring shaped top surface 430, an angled rearward frusto-conical surface 432 (referred to generally as a ridge surface) and an angled internal frusto-conical surface 434.

From different locations about the table 92, user's have different views of different table surface sections. For instance, when standing to one side of the table assembly 92, a user has a view of the horizontal section in front of the user as well as a portion of the ridge section and a portion of the valley section on which content can be displayed. In some cases a table user may be able to control content on the ridge and valley portions or fields of the table assembly that are in front of the specific user and in other cases some other user may control one or a subset of the vessels in front of another or multiple other persons gathered about the table assembly. For instance, a first user may share her views of at least a subset of the table vessels in front of her with other users about the table via duplication in vessels in front of the other users. In this regard, see the horizontal, ridge and valley vessels 430a, 432a and 434a (the vessel combination 418) in FIG. 15 as well as the "Other" vessel combination 422 shown in FIG. 15 that may be used by "another" user at a different location about table 92. The '589 reference also discloses several different interface tools that may be presented via the table display vessels shown in FIG. 15. Any one or more of the interface tools disclosed may be provided in one or more of the space affordance sets described hereafter.

In the FIG. 1 example, it is contemplated that each of the spaces 20a through 20n will be of one of the types T1, T2 and T3 shown in FIGS. 2, 4 and 5, respectively. According to one aspect of the present disclosure, it is contemplated that one or more templates may be provided in a database for each of the space types T1, T2 and T3, etc., where each template in at least some cases, at a minimum, specifies emissive surfaces and vessels and relative juxtapositions of those surfaces and vessels within an associated space as well as information related to types of content to be presented in the different vessels during a session within an associated space. In addition, in at least some embodiments, each template will also include an instantiation specification (hereinafter "an IS") designed to guide a space user through development of content for all or at least a subset of the emissive surfaces or surface vessels provided in an associated space.

While at least one template is specified for each of several different space types, in at least some embodiments, two or more templates may be specified for a single space type, a separate template for each of two or more different activities that may be performed within an associated space. In this regard, it has been recognized that multiple emissive surfaces and vessels enable content presentation to be tailored to a type of activity performed within a space to optimally support specific activity in ways that were not possible given one or two large screens within a space. It has also been recognized that, while a space user may generally recognize the power of optimally arranging content to support specific activities within a space, most users will not understand optimal arrangements for specific activities or, if they do understand an optimal content arrangement, may be intimidated by the number of emissive surface vessels present within a space and how best to populate and control content on those vessels in an optimized fashion. Best practices associated with content optimization for each space/activity combination can be captured within a space/activity type template to guide a user to provide content for an optimized session as well as to enable a user to control a session of a specific type after content has been specified.

Figure 6A:
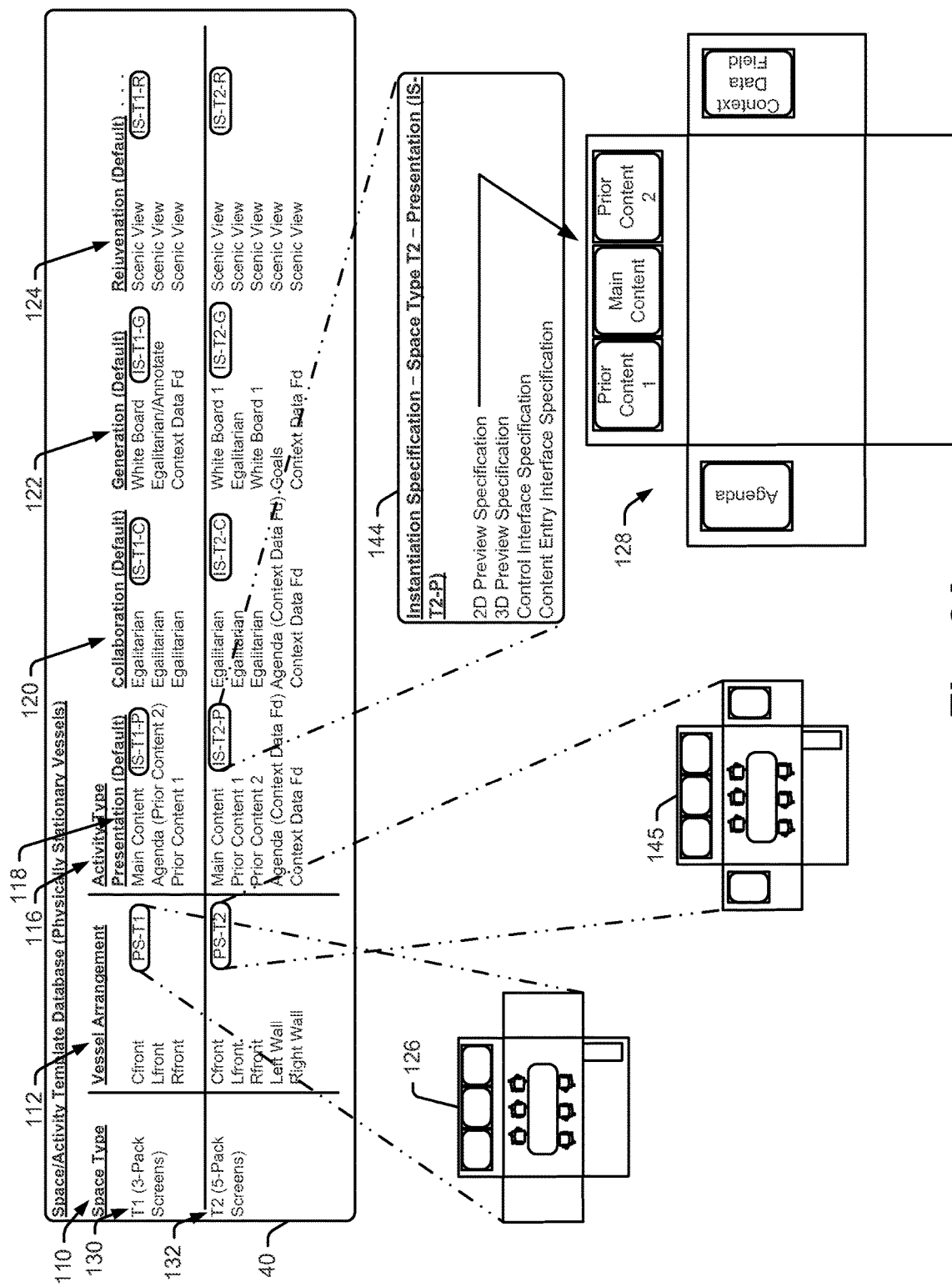
FIG. 6A is a schematic diagram of an exemplary space/activity template database that may be used by the FIG. 1 system server to help an instantiator develop content and effects for a specific type of session activity in one of the FIG. 2 or FIG. 4 space types.
Figure 6B:
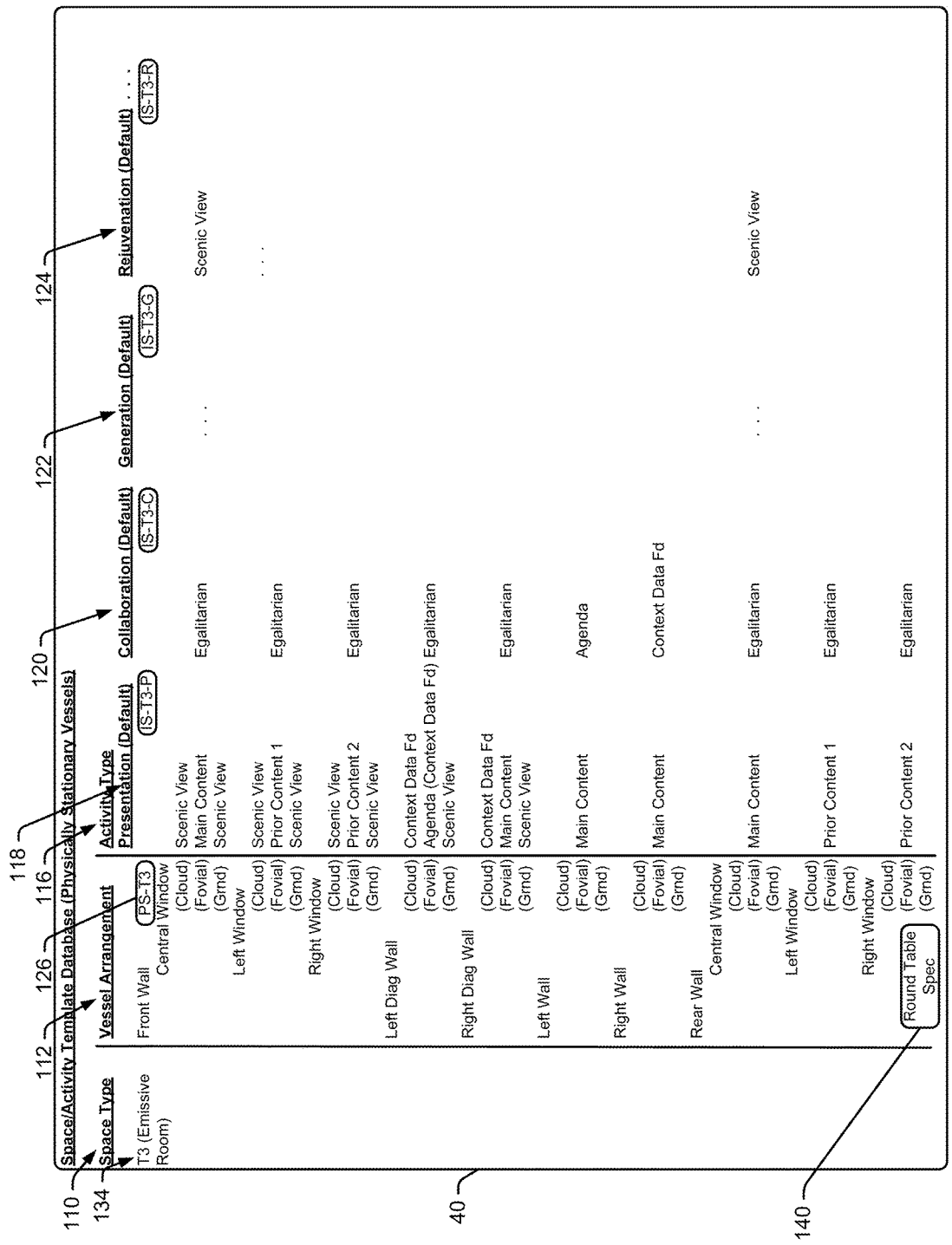
FIG. 6B is similar to FIG. 6A, albeit showing a template database useful for developing content and effects for a specific type of session activity in one of the FIG. 5 space types.

Referring now to FIGS. 6A and 6B, consistent with the above description, an exemplary space/activity template database 40 is illustrated that specifies a separate space/activity template for each of several space/activity combinations. Exemplary database 40 is shown in a simplified form in the interest of simplifying this explanation. Nevertheless, it should be understood that the database 40 would, in an implemented system, likely be far more complex. Exemplary database 40 includes a space type column 110, a vessel arrangement column 112 and an activity type column or section 116. The space type column 110 includes a list of the space types that are supported by the FIG. 1 conferencing system and, consistent with the present example, includes an entry for each of the three space types T1, T2 and T3, described above with respect to FIGS. 2, 4 and 5, respectively. Specifically, column 110 includes a T1 (3-Pack Screens) or first space type at 130 corresponding to the FIG. 2 space affordance set, a T2 (5-Pack Screens) or second space type at 132 corresponding to the FIG. 4 space affordance set, and a T3 (Emissive Room) or third space type 134 corresponding to the FIG. 5 space affordance set.

Referring still to FIGS. 6A and 6B, vessel arrangement column 112 includes a separate list of emissive surfaces and vessels for each of the space types listed in column 110. For space type T1 in column 110 at 130, column 112 includes a list of three emissive surface vessels including a center front vessel, a left front vessel and a right front vessel that correspond to vessels 50, 48 and 52, respectively, in FIG. 2. For space type T2 in column 110 at 132, column 112 includes a list of five emissive surface vessels including a center front vessel, a left front vessel, a right front vessel, a left wall vessel and a right wall vessel, that correspond to vessel s 50, 48 and 52, 66 and 68 respectively, in FIG. 4.

Referring to FIG. 6B, for space type T3 in column 110 at 134, column 112 includes a list of thirty emissive surface vessels including nine vessels associated with a front emissive wall/surface (see the nine filed shown on surface 80 in FIG. 5), three vessels each associated with left and right diagonal wall emissive surfaces and each of the left and right wall surfaces (see the three vessels each associated with walls 82, 84, 88 and 90 in FIG. 5), and nine vessels associated with a rear wall surface (see nine vessels on surface 86 in FIG. 5). Other vessel definitions are contemplated and may be supported in by the templates.

Figure 7:
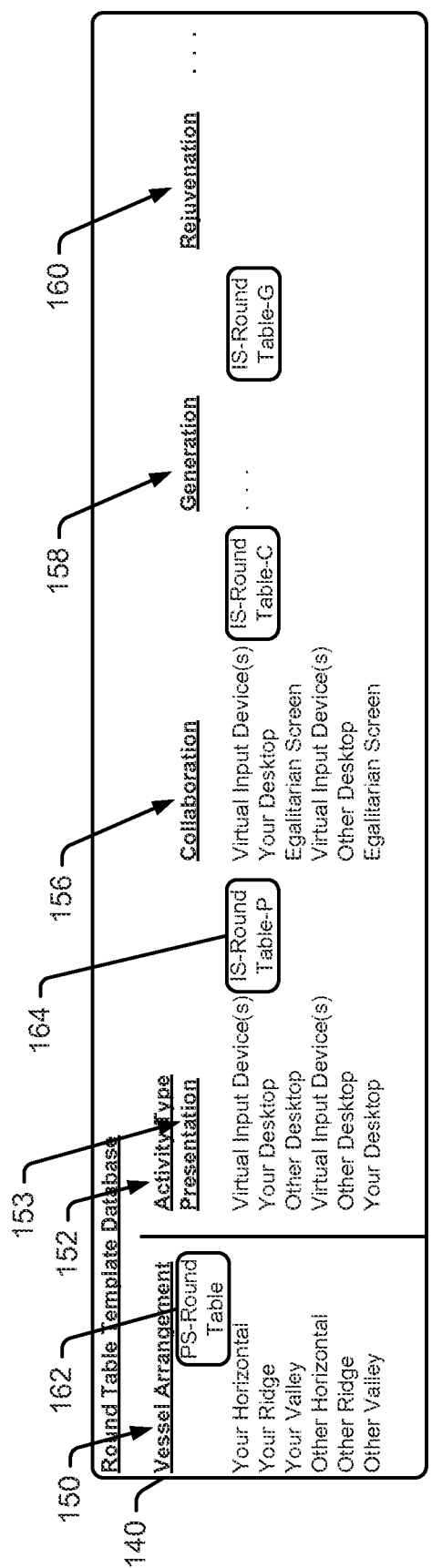
FIG. 7 is a round table template database that may be used by an instantiator to develop content and effects for a session of a specific type for the round emissive surface table assembly shown in FIG. 5.
Figure 15:
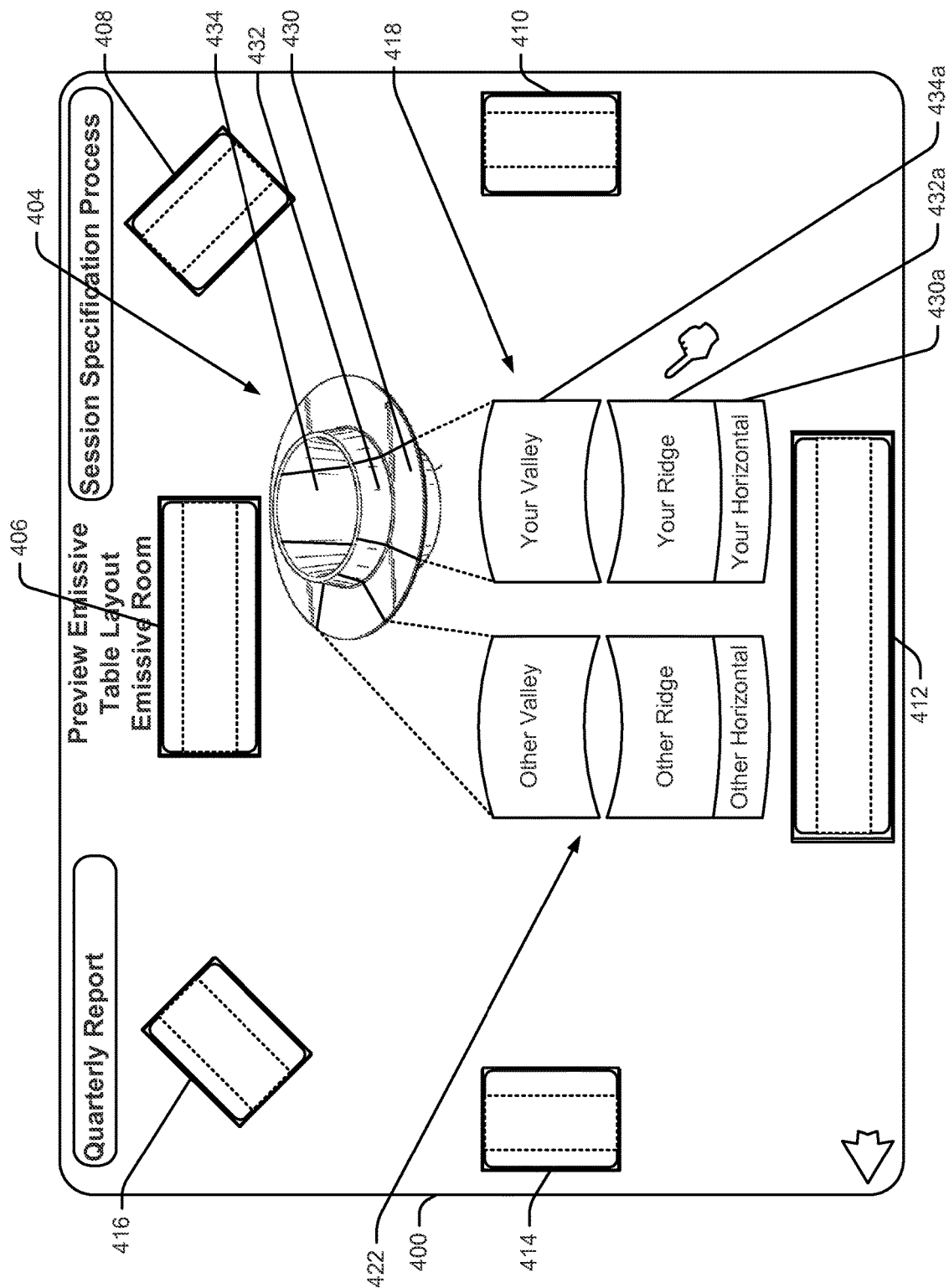
FIG. 15 is an image of a browser screen that may be presented as an interface during instantiation to preview features of an exemplary emissive table assembly that is included in the FIG. 5 space type.

In addition to including the list of thirty vessels, column 112 in FIG. 6B also includes a separate "Round Table Specification" at 140 which specifies the vessels associated with table assembly 92 shown in FIGS. 5 and 15. An exemplary round table specification 140 is shown in FIG. 7. Exemplary specification 140 has a format similar to the format of the template database shown in FIGS. 6A and 6B and, to that end, specification 140 includes a vessel arrangement column 150 and an activity type column or section 152. Vessel arrangement column 150 lists different emissive surface vessels on the table assembly 92. The exemplary listed vessels include a "Your Horizontal" vessel, a "Your Ridge" vessel, a "Your Valley" vessel, an "Other Horizontal" vessel, as "Other Ridge" vessel and as "Other Valley" vessel, that correspond to the vessels similarly labeled in FIG. 15.

It should be appreciated that in some cases a single vessel or screen designation may be used within a template database to refer to more than one vessel within an actual space. For instance, referring again to FIG. 15, with a round table assembly as represented at 92, a first conferee may assume a position directly in front of the vessel set 418 characterized using the "your" qualifier and a second conferee may assume a position directly in front of the vessel set 422 characterized using the "other" qualifier. In addition, a third conferee may assume a third position at some other location around the round table assembly 92 in front of a different set of horizontal, ridge and valley surface sections of the table assembly. In this case, during a presentation, a presentation template may specify that when the first conferee shares content with the second conferee via the ridge and valley surfaces associated with set 422, that the same content be presented and shared with any other conferees about the table assembly 92 including the third conferee via viewable ridge and valley vessels presented at locations easy to view the presented content given the location of the third conferee. Thus, here, the qualifier "other" in FIG. 7 would refer to all table assembly surfaces that face any conferee other than the first conferee so that the same content is presented to each of the "other" conferees in their own "other" set of vessels during the session. In this case, for instance, if there are second through fifth other conferees about table assembly 92, each would be presented with their own "other" set of horizontal, ridge and valley vessels as shown in FIG. 15 to view presented content.

Referring yet again to FIGS. 6A and 6B, in addition to listing vessels associated with a space type, column 112 includes a preview specification for each of the space types which provides at least one view of an associated space type that can be presented via an interface device to a system user. For instance, in FIG. 6A, PS-T1 is a preview specification associated with space type T1 (e.g., the 3-pack screen space), PS-T2 is a preview specification associated with space type T2 (e.g., the 5-pack screen space), and in FIG. 6B, PS-T3 is a preview specification associated with space type T3 (e.g., the emissive room). An exemplary specification PS-T1 is shown at 126 as a 2D plan view of an exemplary space of type T1, an exemplary specification PS-T2 is shown at 145, etc. In other cases, instead of or in addition to the 2D view, 3D views and views that allow a user to virtually move about within a virtual representation of a space are contemplated (e.g., see exemplary FIGS. 12, 18, etc., describe below). The preview specifications PS-Tn here are meant to provide a general overall view of the space affordances and in particular the arrangement of emissive surface vessels within a space of an associated space type.

Referring again to FIG. 7, the round table template database 140 also includes a preview specification 162 for the round table assembly 92 (see again FIG. 5). Here, specification 162 may include the table representation 92 and vessel representations at 418 and 422 in FIG. 15 to allow a user to see exemplary vessel layouts and get a good sense of how content will be presented and/or controlled during a session. In FIG. 15, a server may use two different preview specifications including the space specification from FIG. 6B and the table assembly specification in FIG. 7 to develop the single preview representation in FIG. 15, effectively presenting the table representation within a virtual space in relative juxtaposition with wall surfaces that define the space. In other cases it is contemplated that other table assemblies like a rectangular assembly, a flat top table assembly, etc., may be provided in some spaces and here there would be other table assembly databases that specify vessel layouts and arrangements for preview.

While each of the templates associated with space types T1 and T2 assumes a single vessel for each of the emissive surfaces in related spaces, in other cases it is contemplated that one or more of the surfaces in either one or both of the space types T1 and/or T2 may also be virtually divided into different vessels or that a single vessel may span two or more adjacent emissive surfaces (e.g., 48 and 50 in FIG. 2). Similarly, in some embodiments one or more of the emissive surfaces in space type T3 may also be virtually divided in some other fashion. For instance, in some cases a large front wall surface may only be laterally divided (e.g., left, right, center) and may not be vertically divided (e.g., cloud, foveal, ground). In other cases virtual windows on the front or other emissive wall surfaces may include spaced apart large virtual windows for sharing content. Many other virtual divisions of emissive surfaces are contemplated.

Referring still to FIGS. 6A and 6B, activity type section 116 includes a plurality of activity sub-columns 118, 120, 122, 124, etc. For instance, in FIGS. 6A and 6B exemplary activity type sub-columns include a Presentation activity type sub-column 118, a Collaboration activity type sub-column 120, a Generation activity type sub-column 122 and a Rejuvenation activity type sub-column 124. Other sub-columns (e.g., dyadic collaboration, dyadic evaluation, large group evaluation, etc.) are contemplated that correspond to other activity types supported by the overall system. Herein, a presentation activity type occurs when one person or a small group of persons are making a presentation to others within a space. In prior art systems, for instance, where one person presented a single screen Power Point presentation to an audience within a space, the activity would be considered a presentation. In the context of the present disclosure, a presentation is when one person (or a small group) is controlling and presenting content to a larger group of conferees.

During a collaboration activity, two or more conferees use a space to collaboratively share and control content associated with a session. Thus, for instance, where five conferees are in a conference space, each of the conferees may want the ability to share desktop content from their laptops or other portable devices with others via at least some of the common emissive surfaces or vessels in the space in an egalitarian fashion (e.g., where any conferee can place content on shared emissive surfaces at any time irrespective of who is currently sharing content on those surfaces and without permission from another conferee).

During a generation activity, two or more conferees may use affordances within a space to generate content during a session. Thus, for instance, where five conferees are in a space, at least some of the space vessels may present electronic whiteboard vessels for generating content while others include tools for annotating output of desktop images from personal laptops or the like, for capturing screen shots of content presented in one or more emissive surface vessels, etc., so that content can be developed and associated in a database with a session.

During a rejuvenation activity, one or more persons may use a conference space to refresh themselves via meditation, yoga or some other form of relaxation. For instance, during a rejuvenation activity, all wall mounted or integrated emissive surfaces may present a scenic view designed or developed specifically to help the persons within the space relax and rejuvenate. In addition, other space attributes may be adjusted to facilitate relaxation such as dimmed lighting, generation of an audio loop that encourages relaxation, control of temperature, humidity, blinds (e.g., to close the blinds during relaxation), opacity controlled glass walls, etc.

Referring still to FIGS. 6A and 6B, each activity column 118, 120, 122, etc., includes a content type for each of the vessels listed in the vessel arrangement column 112. For instance, for the space type T1 that includes the center front vessel, left front and right front vessels listed in column 112, presentation column 118 specifies "Main Content", "Agenda" and "Prior Content 1", respectively. Thus, referring again to FIG. 2, column 118 indicates that main presentation content is to be presented on center front screen 50, an agenda is to be presented persistently on the left front screen 48 and prior content is to be presented on right front screen 52. Here, prior content refers to the content most recently presented as main content in vessel 50 which has been replaced by current content in vessel 50. Thus, for instance, where a Power Point presentation includes a set of consecutive images and a tenth image in the set is currently presented on screen 50, the ninth image would be presented as prior content on screen 52. When a conferee progresses to the eleventh image on screen 50, the tenth image is presented as prior content on screen 52. Thus, in the T1-presentation combination (e.g., space/activity combination) shown in FIG. 6A, the exemplary template specifies specific content types for specific vessels or screens to help a system user organize, present and control content.

Referring still to FIG. 6A where space type T2 includes the center front vessel, left front and right front vessels, left wall vessel and right wall vessel listed in column 112, presentation column 118 specifies "Main Content", "Prior Content 1", "Prior Content 2", "Agenda" and "Context Data Feed", respectively. Thus, referring again to FIG. 4, column 118 indicates that main presentation content is to be presented on center front screen 50, a most recent prior content (e.g., Prior Content 1) is to be presented on left front screen 48, a next most recent prior content (e.g., Prior Content 2) is to be presented on right front screen 52, an agenda is to be presented on the left wall screen 66 and a context data feed is to be presented on the right wall screen 68. Here, the phrase "context data feed" is used to refer to an automated content feed that is based on the context of a session occurring within the space 20*b*. For instance, if a session in a space is related to European politics in the 1970s, a system server may recognize the session context from main content being presented (e.g. via words and phrases in presented content or developed within one or more of the vessels in a space), may use the context to formulate internet or other database (e.g., an enterprise document management system)

searching queries and may present filtered and formatted search results for session conferees to contemplate. In other cases, a system server may receive sensed information (e.g., audio via microphones 27, video via cameras 26, etc.) from within space 20b and may use that sensed information (e.g., words and phrases spoken) to formulate search queries, collect results and present results as a dynamic content feed.

In at least some cases a context data feed may simply be viewable (e.g., images, PDF type formatted content, etc.). In other cases, a context data feed may include selectable content such as hyperlinks associated with key words or phrases, internet or other linkable addresses, images hyperlinked to richer or more detailed content, etc.

Referring again to FIG. 6B, presentation column 118 includes a content type for each of the thirty vessels shown in FIG. 5. For instance for the cloud, foveal and ground vessels of the central portion of the front wall surface 80 in FIG. 5, column 118 specifies a scenic view, main content and a scenic view, respectively. Here, the phrase "Scenic View" is used to refer to, for instance, a video image of a scene in nature, a city scene, a bustling street, etc., that, in at least some cases, is meant to elicit an emotional response from persons viewing the scene. For example, one scene may include a view of a field of sun flowers swaying back and forth under the force of a light breeze within the field. Another view may include a forest scene. Still one other view may include a down town Parisian street scene showing various activities.

Referring still to FIG. 6B, in some cases there may be a default view for vessels that are not specified within an activity column. For instance in column 118 see that for some of the vessels specified in column 112, column 118 does not include a content type specification. For instance, no content specification is provided for the left wall cloud and left wall ground vessels in FIG. 6B. In these cases, a default content may be presented such as, for instance, a scenic view or a context data feed. In column 120, where content types are only specified for foveal vessels, scenic or other default content may be presented in the cloud and ground vessels.

Referring again to FIGS. 6A and 6B, in some cases, while vessel content may be specified in section 116, where a user chooses not to provide content of the specified type, the content presented may also default to some global default content type like a scenic view, a context data feed, etc. In other cases, a template may specify different default content types for different ones of the emissive vessels. For instance, see in FIG. 6A that for the left front vessel associated with space type T1, column 118 indicates "Agenda (Prior Content 2)". This specification is intended to indicate that if an agenda is provided by a user, the agenda is presented via the left front screen during a session and if an agenda is not provided by a user, "prior content 2" is the default and is provided via the left front screen during the session. Similarly, for space type T2, a default content (e.g., "Context Data Feed") is provided for the left wall screen if an agenda is not provided.

Referring again to FIG. 7, screen the round table template database 140, like the FIGS. 6A and 6B database, includes an activity section 152 including a separate activity columns 153, 156, 158, 160, etc., for each of the different types of activities supported by the system. Each activity column includes content types for the vessels indicated in column 150. "Virtual Input Devices" in column 153 means that virtual control tools like a virtual keyboard, a virtual mouse pad and other virtual control devices are presented within an associated vessel (e.g. "Your Horizontal"). "Your Desktop" means that an associated conferee's desktop image is presented in an associated vessel (e.g., "Your Ridge") and "Other Desktop" means that another conferee's desktop image is presented in an associated vessel (e.g., "Your Valley").

In addition, each list of content in activity section 152 includes an instantiation specification for the round table assembly and an associated activity. For instance, label 164 indicates an instantiation specification for the round table assembly for a presentation activity which is different than the instantiation specification for each of the other supported activities (e.g., collaboration, generation, rejuvenation, etc.).

Referring still to FIG. 6A, for the collaboration activity column 120 and space type T1 (e.g., a T1/collaboration combination), egalitarian content is specified for each vessel in column 112. Here, the term "egalitarian" means that no content is initially specified for the vessel and instead that, during a session, the vessel is provided as an open or empty vessel for receiving content from any personal device associated with an ongoing session. Thus, for instance, a conferee may have her laptop computer in a space 20a during a session and may cause the laptop to transmit a real time image of the laptop desktop image to an egalitarian vessel causing the content to be replicated on the target vessel. In an egalitarian case, any conferee associated with a session can take control of a vessel by replicating desktop content from her device at any time without requiring authorization from any other conferee. U.S. patent application Ser. No. 14/500,155 which was filed on Sep. 29, 2014 and which is titled "Emissive Surfaces and Workspaces Method and Apparatus" describes interface configurations and systems that support egalitarian control and is incorporated herein in its entirety by reference. As described in more detail below, when the ability to control content on several screens or in several vessels within a space is available, each or at least a subset of template specifications may also include a control interface specification (see again 144 in FIG. 6A) for providing control tools.

While a few content types are described above in the context of FIGS. 6A, 6B and 7, it should be appreciated that many other content types for populating emissive surface vessels are contemplated. To this end, see FIG. 19 that shows a sampling 519 of contemplated content types. The main content, prior content 1 and 2, agenda, egalitarian and scenic 1, 2 and 3 content types should be understood from the description above. The "Next Content" type includes a next image or the like in a sequence of content images such as, for instance, a next image in a Power Point presentation. Thus, where a tenth image in a presentation is shown in a main content filed, the eleventh image in the presentation would be presented in a next content vessel.

The "Goals" content is similar to the agenda content type except that, instead of presenting a session agenda, a list of user specified goals are presented. Here, the goals may be predefined by a conferee prior to a session or they may be developed during an initial or early stage or sub-period of a session and, to that end, the goals content may have some type of input interface associated therewith which is automatically supported by a system server.

The "Status" content type corresponds to status information related to a session and may include information posted prior to commencement of a session, during a session and as the session is coming to an end. For instance, during a period ten minutes prior to a session, status information may include a list of conferees scheduled to attend the session, the time the session is to commence, session duration, a title for the session, an agenda, goals, etc. As another instance, where a system server has access to location information related conferees that are scheduled to attend the session from an employee tracking system, the session information may include information related to locations or estimated arrival times of session conferees, information related to which conferees are located within a conference space, etc. During a session, the status information may be changed to reflect remaining time in the session, names of remote conferees attending the session via a network link, and many other types of information selected to give session attendees a sense of the session progress.

The "Dynamic Content" type of content is similar to egalitarian content except that, instead of allowing any conferee to replicate personal device content in a vessel, the dynamic content type may only allow a single conferee or some designated subset of conferees (e.g., two of ten) to replicate personal device content within a vessel. Thus, for instance, during a presentation by a first conferee where a Power Point type presentation is being shown in a main content field, the first conferee may want the ability to share other content randomly and on the fly within another vessel. A dynamic content vessel allows the first conferee to share dynamic content.

The "Whiteboard" type of content simply presents a virtual whiteboard and typical whiteboard virtual drawing tools within an associated vessel. Thus, for instance, in some cases a template may specify that the right front screen 52 in FIG. 4 be a virtual whiteboard for drawing content in that vessel if desired while other content is presented in the other space vessels. In some cases a template may provide more than one distinct whiteboard vessel or a template may specify that first and second whiteboard vessels within a single space replicate an image as the image is developed on either one or both of the whiteboard vessels.

The "Live Video Feed" content type refers to a live video for telepresence purposes or the like and may present a live video of one or more remotely located conferees. Here, for instance, if one conferee patches into a session to participate in session activities, a video feed from a camera at the conferee's site may drive a live feed vessel. In cases where more than one remote conferee video feed is available, a system server may be programmed to divide a vessel associated with a live feed into two or more sub-vessels, one for each of the conferee feeds. In other cases where there are two or more vessels associated with a live video feed content type, the server may be programmed to automatically present a separate video feed on each of the associated vessels until each vessel includes at least one video feed. In still other cases a server may, when there are more live feeds than vessels available for that type of content, perform some process to select a subset of the feeds to be presented at any specific time. In yet other cases, a template may specify that a live video feed and a different default content type for a single vessel. Here, where a remote conferee video feed is available, the video feed may be presented in the single vessel. At other times, if a remote video feed is not available, the different default content type (e.g., a context data feed) may be presented in the single vessel.

The "Web Site Feed" content type is imply a browser page that presents a specific web site persistently until a conferee uses tools within an associated vessel to change the presented browser page. For instance, in some cases a search engine browser page may be presented via a vessel associated with a web site feed to enable conferees to perform a customized internet search during a session.

"Main Content 2" content type can be associated with a content vessel when there is a second main content type that should be presented along with a first main content type. For instance, assume that instead of presenting a single sequence of images in a first main content vessel during a session, a conferee wants to present two different synchronized sequences of images, a first in a first vessel and a second in a second vessel. Here, where a user progresses from one image to a next consecutive image in the first vessel, the server may be programmed to progress from an image in a second vessel to a next consecutive image, and so on. "Main Content 3" content type is similar to the second main content type, albeit where main content 3 is associated with a different sequence of images or content.

The "Free To Join" content type corresponds to a list of enterprise employees or other persons that, based on their current schedules, real time location information and perhaps other sensed information, are not busy during at least specific times during an ongoing session. In this regard, for instance, a location tracking system linked to a system server may track locations of all enterprise employees while a scheduling system tracks employee schedules. Here, a server may enforce rules such as, when an employee is not scheduled or with another employee during a specific period and also is located proximate an available (e.g., not scheduled and not currently used) telepresence system that could be used to remotely patch in to an ongoing session during the period, the employee is categorized as free to join the session. The server may generate a list of employees free to join a session and serve that list up as the "Free To Join" content via one of the space vessels. In this case, each employee on the served up list may be represented by a hyperlink or the like so that if that person is selected from the list, a system server automatically attempts to contact the selected person and establish a remote connection of some type. For instance, where a an available telepresence system is in the general vicinity of the selected employee, a server may encourage the selected employee to go to the available telepresence system and patch in to the session.

The "Available To Join" content type is similar to the "Free To Join" content type, except that a system server may require enterprise employees to affirmatively indicate availability in order to be included in the content list offering. For instance, a specific employee with unscheduled time may make herself available for sessions generally or for sessions with specific other employees (e.g., a boss, a C level employee, a direct report, etc.) by indicating so within her schedule or via some other software tool. Here, again, the list of employees presented via the "Available To Join" content type may include hyperlinks for establishing remote connections to one or more employees during an ongoing session.

The "News" content type indicates a simple news feed that causes a system server to present news to conferees within a space. For instance, a CNN or other news station may be presented to provide a real time news feed. In some cases a news feed may be automatically customized to present news based on who is located within a space 20*a*. For instance, in cases where a system server tracks the identities of specific persons within a space 20*a*, the news may be tailored to the identity of one or all of the people located within a space.

The "Time Remaining" content type simply indicates the time remaining during an ongoing session in at least some embodiments. For instance, if there are 15 minutes left during a session, the time remaining content may indicate fifteen minutes. Here, in some cases time remaining content may also specify other information that can distinguish time remaining in different ways. For instance, one time remaining content specification may change a vessel color or highlighting to indicate different remaining times. For example, a background vessel color may change from black to red when there are 10 minutes left in a session. The time remaining content specification may also include other functional features such as, for instance, specification that causes a system server to offer an extended time period to session conferees in a space when the space is not scheduled for use during a period immediately after an ongoing session. Thus, for instance, the time remaining content specification may present a message such as "Would you like to extend your session for another 15 minutes? The space you are in is available.", followed by a "Yes" icon or the like that could be selected to extend the session.

In other cases, the time remaining content specification may specify other guiding content that is presented at different times during an ongoing session. For instance, where session content changes during transitions from one activity type to another, time remaining content may indicate a next activity type and time remaining until an expected transition occurs. Thus, for instance, where a one hour session is scheduled to transition from a presentation activity to a collaboration activity after a first thirty minute subperiod, the time remaining content specification may cause the system server to indicate that the collaboration session will commence five minutes before the final thirty minute period.

The "Content On Deck Queue" content type refers to a content queue that shows a list of content that has been associated with a session by conferees. For instance, the content on deck queue may include a list of ten word processor documents, a list of ten Power Point presentations, a list of five image and a list of five video clips, any of which can be selected to move the associated content into a dynamic content vessel for viewing. Here, it is contemplated that one or in some cases a subset or any conferee may be able to post content to the queue for sharing. For instance, see U.S. patent application Ser. No. 14/640,186 which was filed on Mar. 6, 2015 and which is titled "Method and System for Facilitating Collaboration Sessions" which describes a content queue in several embodiments that can be posted to by any of several conferees to share content during a session. The '186 patent application is incorporated herein in its entirety by reference.

The "Participants" content type simply presents information related to session participants and may include, for instance, names, titles, pictures, brief abstracts describing experiences, interests, most recent projects, etc. In other cases participant information may include a cycling set of images where each image includes content related to a specific one of the session conferees.

"Presenter Information" content type includes information about a content presenter. Here, in the case of a presentation, the presenter information type may include a stagnant image of identifying and other information related to the presenter. In other cases the presenter content may cycle through different content associated with the presenter such as a set of project summaries associated with the presenter, resume information, etc. Where presenters change during a presentation, the content presented in a presenter information vessel may change therewith. In some cases where a system has sensors that generate information useable to detect which of several different conferees is currently presenting or sharing content, the presenter information may be changed automatically to present content or information for whichever conferee is currently presenting content via some other vessel or vessels.

The "Participant Locations" content type may indicate the current locations of session conferees (e.g., Los Angeles, Paris, Munich, Chicago, etc.). In addition to indicating locations, the participant locations content may also indicate a time of day in each location, outside weather conditions in each location, outdoor light conditions (e.g., sunny, overcast, dark (e.g., night time)) and/or may include a live outdoor video feed for each of the locations. This location information is intended to help session conferees appreciate weather and other environmental conditions in locations of remote conferees which it is believed could increased levels of empathy for distributed project team members.

"Your desktop" content type includes content that comprises a desktop image akin to the desktop image presented on a laptop or tablet type computing device. Here, content on a desktop image may be controllable in a fashion similar to the way in which a user controls content on her laptop desktop screen. For instance, a user may be able to run any of several different application programs to generate content in a desktop type vessel. In addition, virtual content and session controls may be provided on in a desktop vessel for controlling content in other space vessels.

"Virtual Input Device" content type includes an interface for controlling a session. For instance, a virtual input device may include, among other things, forward and rearward arrows useable to move forward and rearward within a sequence of images presented on a main content vessel. As another instance, more complex content control screens may be presented for controlling content within a plurality of space surface vessels.

The "Blank" content type corresponds to a blank vessel. Here, a blank vessel may simply be populated with a default background scene such as a scenic view in some embodiments. In other embodiments, a blank content type may cause the outline or framing of a vessel to be presented without any content in the vessel, at least initially. Here, in some cases where a blank vessel is presented, a conferee may be able to populate the blank vessel with any content type or at least one of a subset of content types that the conferee desires. For instance, where a conferee selects a blank vessel during a session, a system server may present the conferee with an interface that presents a list of all or a subset of content types supported by the system for the conferee to select from to populate the selected blank vessel. To this end, see FIG. 27 that shows an exemplary customizing interface including a content type list at 732 that is described in more detail below. An interface akin to the FIG. 27 interface may be presented during a session specifying process prior to commencement of a session or during an ongoing session so that a specific content type may be indicated for any blank vessel at any time prior to or during a session.

Figure 19:
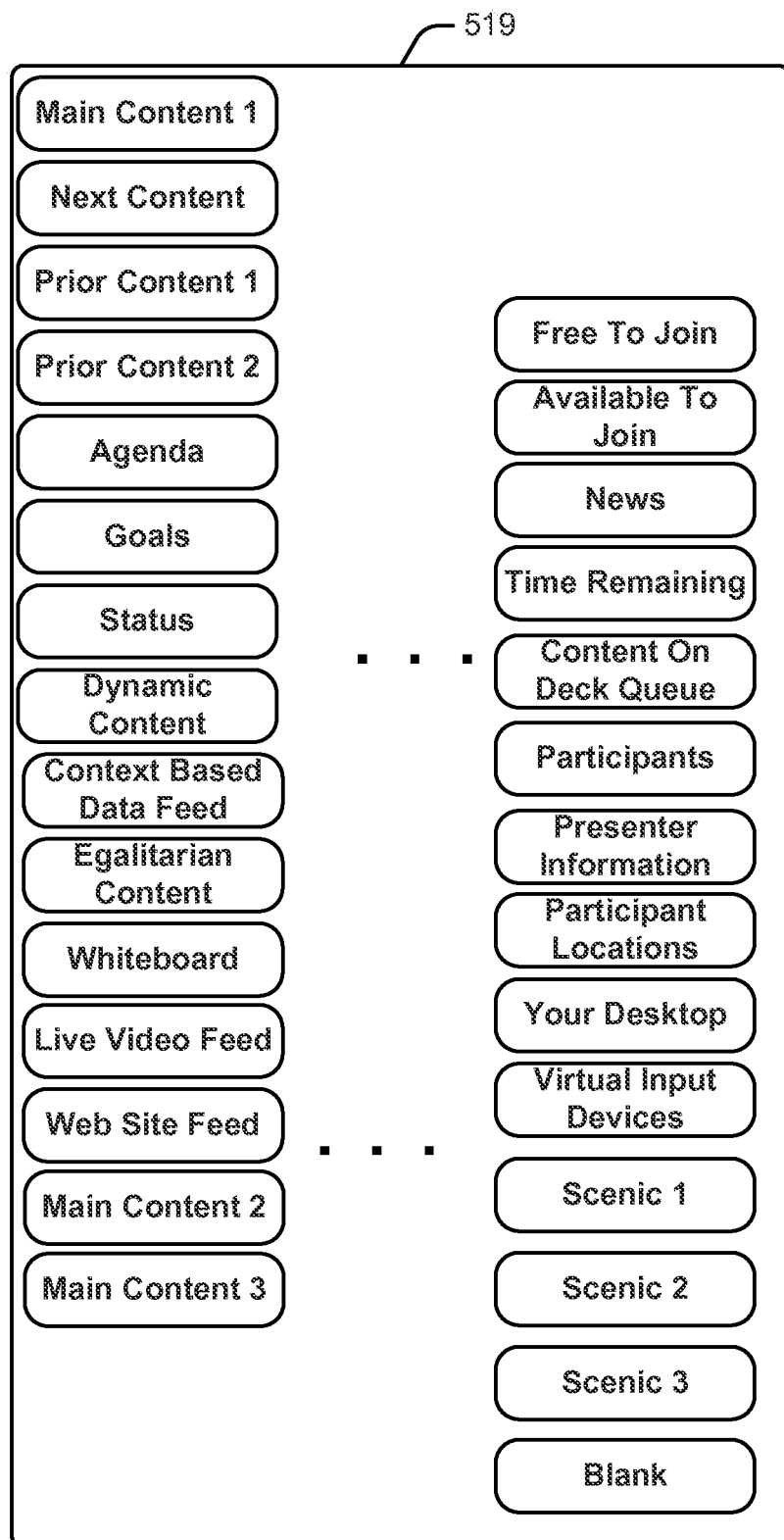
FIG. 19 is a simple list of exemplary content types that may be supported by the FIG. 1 system.

Many other content types are contemplated and the FIG. 19 list is not exhaustive.

In addition to specifying vessel content types, each activity type row (e.g., 118, 120, 122, etc.) also includes a separate instantiation specification for each of the space types in column 112. For instance, see that a first space type instantiation specification for a presentation activity IS-T1-P is presented in column 118, a second space type instantiation specification for a presentation activity IS-T2-P is presented in column 118, etc. An exemplary instantiation specification IS-T2-P is shown at 144 in FIG. 6A and includes 2D and 3D preview specifications as well as a content entry interface software program or application. The 2D preview specification is similar to the preview specifications described above (e.g., PS-T1), albeit where the 2D preview specification will include additional information specifying the types of content to be presented in each of the emissive vessels. For instance, see in FIG. 6A that a 2D representation 128 of the T2 space is shown that indicates content types presented on space screens for a presentation type activity. Representation 128 may be presented to a system user when determining an activity to select during a content development process.

The 3D preview specification similarly includes additional information specifying content types for each emissive vessel associated with a space type. For instance, see FIG. 18 that shows an exemplary 3D image for a T3 emissive room space. The FIG. 18 embodiment image or representation includes a representation 504 of all of the emissive surfaces within a space and distinguishes the separate surface vessels as shown. The representation 504 also indicates content types for an associated activity type (e.g., Scenic View, Agenda, Main Content, etc.). Because the emissive walls in the exemplary emissive space 20c (see again FIG. 5) surround the space 20c, at least a wall behind a current point of view in representation 504 is not viewable in the 3D view and is instead shown in a thin top profile as at 516. A set of navigation tools is provided at 286 which includes a set of arrow icons, each of which can be selected to change the trajectory of the 3D view presented. An on screen selection icon 240 can be moved about image 504 to select different arrow icons to change view trajectory. Referring also to FIG. 5, virtual walls 506, 508, 510, 512, 514 and 516 correspond to walls 88, 90, 80, 82, 84 and 86, respectively, and the vessels shown in FIG. 18 correspond to the vessel shown in FIG. 5.

Referring again to FIG. 6A, the content entry interface application at the end of instantiation specification 144 includes a software application that is useable to enter content into an instance of an associated template to instantiate a session (e.g., fill in content for a specific session presentation, collaboration, etc.). For instance, where a T1/presentation combination has been selected, the software would cause a server to obtain two types of information from an instantiating conferee including main content and an agenda per the FIG. 6A requirements associated with space type T1 and column 116. For other space/activity combinations, the server would obtain other information sets required to instantiate associated sessions.

Referring yet again to FIG. 6A, the term "template" is generally used to refer to a subset of the information in the database 40 including a space type and content associated with specific vessels associated with the specific space type for a particular activity. For instance, in FIG. 6A an exemplary template for the T1/presentation combination includes the content list (e.g., "Main Content", "Agenda" and "Prior Content 1") in column 118 for the T1 vessels listed in column 112. As another instance, an exemplary template for the T2/generation combination includes the content list (e.g., "White Board 1", Egalitarian", "Whiteboard 1", "Goals" and "Context Data Feed") in column 122 for the T2 vessels listed in column 112. Thus, each content list in any of the activity type columns in FIG. 6A corresponds to a different space/activity template type in at least some embodiments. Similarly, each content list in any of the activity type columns in FIG. 6B corresponds to a different space/activity template type in at least some embodiments. Hereinafter, unless indicated otherwise, specific templates will be referred to herein by their space type and activity type. For instance, the template corresponding to the content type list in column 118 for the T1 space will be referred to as "the T1/presentation template, the template corresponding to the content type list in column 122 for the T2 space will be referred to as "the T2/generation template", etc.

Referring again to FIG. 1, once session content has been instantiated to be used during a session, the instantiated session is stored as a session content specification in database 46. Referring also to FIG. 8, a simplified exemplary session content specification database 46 is shown in table format and includes a session column 180, a space/activity template column 182, a content specification column 184 and an owner column 186. Session column 180 lists all instantiated sessions or session specifications. Exemplary session specifications in FIG. 8 are labeled S1, S2, S3 through SZZ.

Space/activity template column 182 lists a space type and activity type template for each of the session specifications listed in column 180. For instance, for session S1, the space type is T1 and the activity is a presentation activity and therefore the T1/presentation template is specified, for session S3, the space type is T2 and the activity is a content generation activity and therefore a T2/generation template is specified, etc.

Content specification column 184 includes a content set to be presented during each of the sessions listed in column 180. For instance, for session S1, the content set in column 184 includes MC-1 (Main content 1) and Agenda-1. Referring again to FIG. 6A, only main content and an agenda are required to populate all of the vessels associated with a presentation in a type T1 space as the prior content 1 is simply most recent main content that has been replaced in a main content vessel. As another instance, for session S3, the content set in column 184 includes a set of goals required to populate vessels in a type T2 space during a generation type activity. Referring again to FIG. 6A, none of the "white board 1", "egalitarian control", "white board 1" (e.g. a duplicate of the content in the first instance of whiteboard 1) and "content data feed" content types in column 122 associated with the T2 space needs to be specified pre-session and only the goals content type is required.

Owner column 186 lists a separate conferee for each of the sessions in column 180 where the listed conferee is typically the conferee that specified the content and other information related to an associated session content specification. For instance, a conferee Mary White owns session S1, John Green owns session S2, etc.

Prior to a session occurring, a conferee uses interface tools to specify a space type, an activity type and then session content required to instantiate a session given the space/activity combination specified by the conferee. When a session commences in a space, content for the session is accessed from database 46 and is used to drive different emissive vessels during the session.

Figure 9:
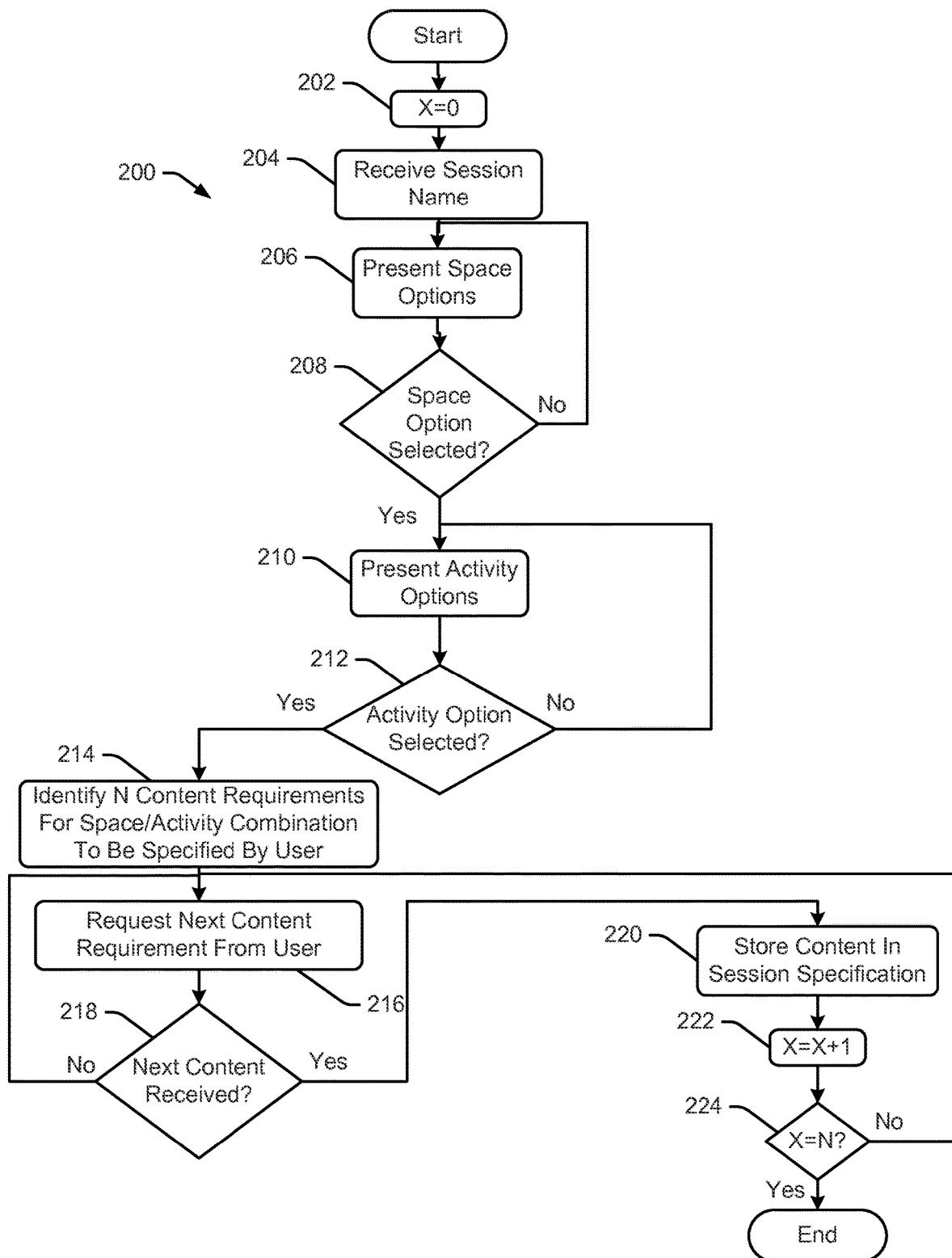
FIG. 9 is a flowchart illustrating a process that may be performed by the system server of FIG. 1 to guide a session instantiator to select a space type, an activity type to be facilitated in the selected space type and to develop content required to instantiate a session specification to drive a session for the specified space type/activity combination.

Referring now to FIG. 9, a flow chart illustrating an exemplary process 200 for specifying session content for a space/activity combination is illustrated. For the purposes of this disclosure, a conferee that defines and stores a session will be referred to as an instantiator and conferees invited to participate in a session or that actually participate in the session other than the instantiator will be referred to generally as "other" conferees. Here, what an instantiator defines or specifies during the FIG. 9 process is a function of choices made about space type and activity type for the session being specified. Thus, for instance, where a conferee selects a space/activity combination with many vessels that require many different types of user defined content, the instantiation task will be relatively more complicated and require more content development than where a conferee selects a space/activity combination that includes fewer vessels and/ or fewer content types that require pre-specification. Even where a conferee selects a space type with many vessels, if the activity selected requires little pre-defined content, the instantiation process may be relatively fast and simple. For example, see again the collaboration column 120 in FIG. 6B that is associated with the emissive room space type T3 where, despite a space with thirty different emissive vessels, only an agenda needs to be pre-specified by an instantiator.

Referring still to FIG. 9, at block 202, a counter X is set or reset equal to 0. Referring also to FIG. 1, an instantiator uses a computing device 38 to link to server 36 and access a content entry interface specification (see again interface specification at bottom of 144 in FIG. 6A). Here, the interface specification may be accessed via an internet or intranet browser that includes common virtual on screen tools for entering information. Hereinafter, unless indicated otherwise, browser pages will be referred to simply as "screens" or "browser screens".

Figure 10:
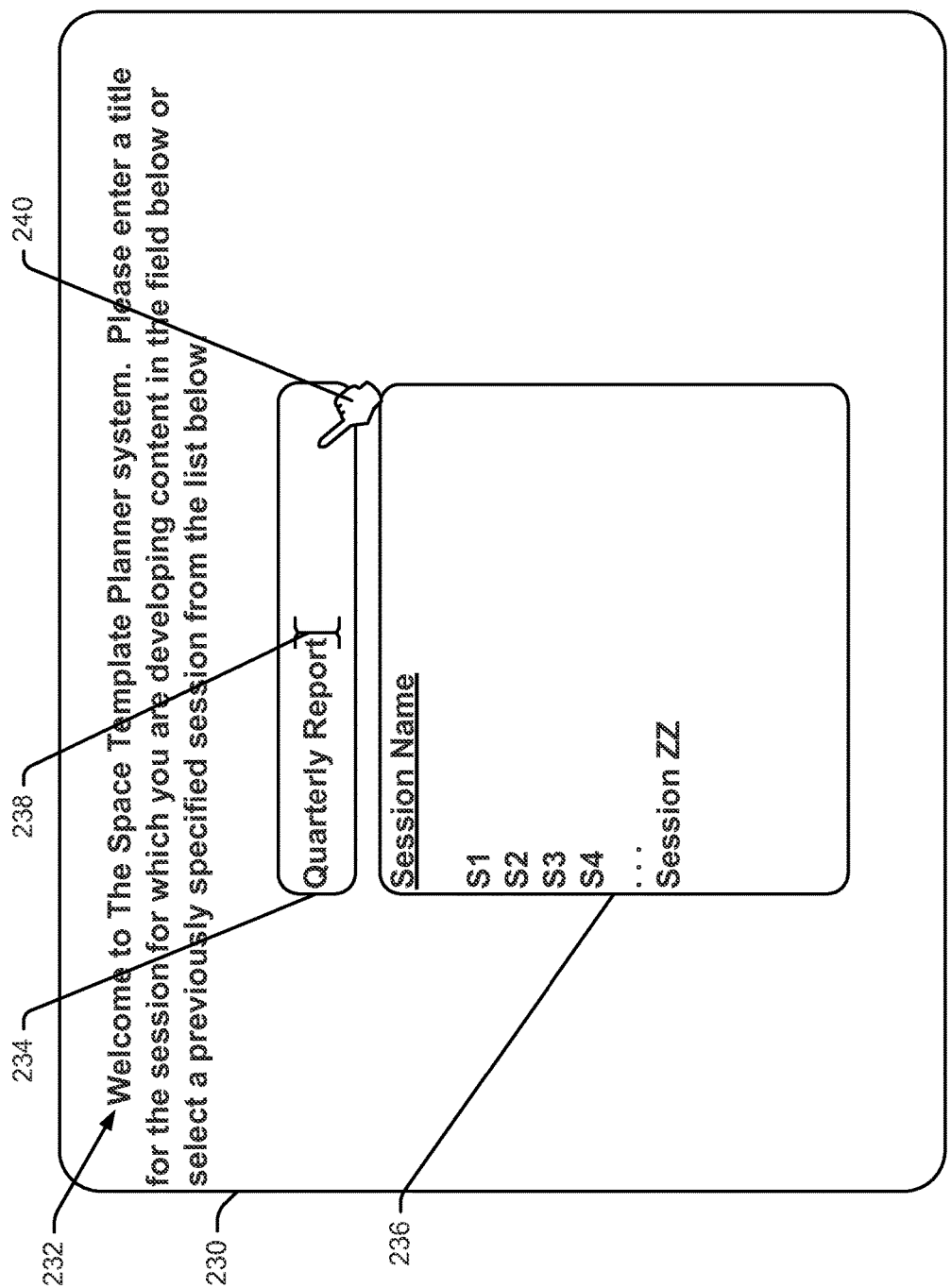
FIG. 10 is an image of a browser screen that may be presented as an interface during a session instantiation process.

Referring still to FIG. 9, at block 204, a system server requests a session name. To this end, see also FIG. 10 where an exemplary browser screen 232 for requesting a session name is shown. Exemplary screen 230 includes instructions at 232, a name field 234 and a list of previously instantiated session specifications 236 corresponding to existing specifications stored in database 46 (see FIG. 8). Among other things, instructions 232 guide the conferee to either provide a name in field 234 for a new session to be instantiated or to select the name of an existing session from list 236. A cursor 238 is provided in field 234 for entering text. At block 204, once a session name has been entered in field 234, control passes to block 206.

At block 206, server 36 presents space type options to the instantiator via a browser screen. See FIG. 11 where an exemplary browser screen 250 for receiving a space type selection is presented. Screen 250 includes instructions at 252, a session identifier field 254, a process field 256, graphical representations of optional space types 258, 260 and 262 and preview icons 264, 266, 268, 282, 290 and 298 for 3D and top (e.g., 2D) views of the space options. In addition, screen 250 includes forward and reverse arrow icons 270 and 272 for moving to next and prior browser screens when desired. Where there is no next screen in a sequence of browser screens, the forward arrow 272 may be shown in phantom.

Figure 11:
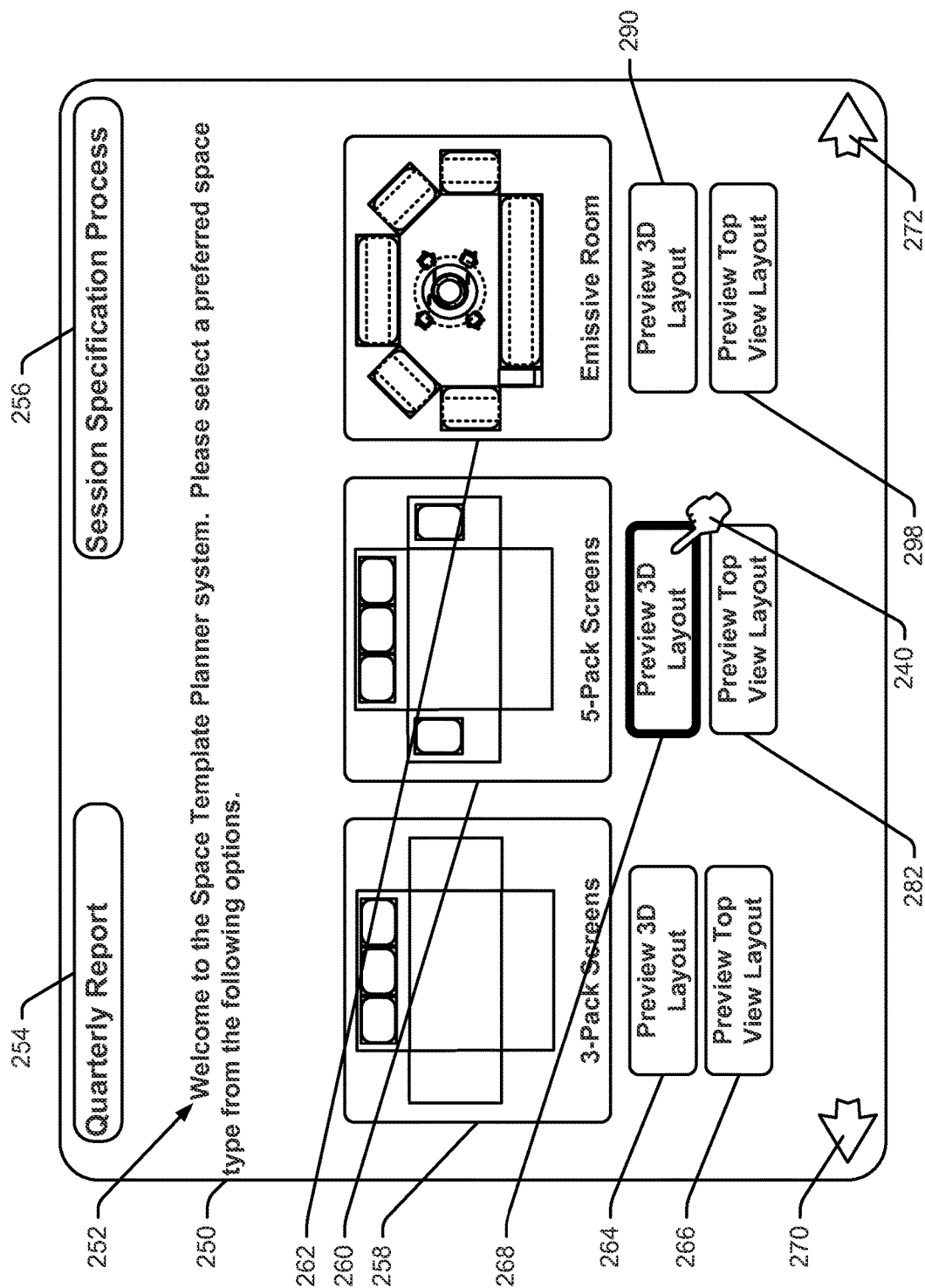
FIG. 11 is an image of a browser screen that may be presented as an interface during instantiation to select one of a small set of space types supported by the FIG. 1 system.

Referring still to FIG. 11, name field 254 persistently presents the name of the session to help orient the conferee regarding the general subject matter of the session being specified and process field 256 indicates the current process being performed, in the exemplary case, a session specification process. Instructions 252 guide the conferee to select one of the space types represented at 258, 260 and 262. The space types are graphically represented with small images of the space layouts that, in the example, indicate space shape, display screen or surface orientations, etc. Each of representations 258, 260 or 262 may be selected to select an associated space type. The preview icons 264, 266, 268, 282, 290 and 298 may be selected to access preview images of the space types graphically represented there above. Pointing icon 240 is shown hovering over preview icon 268 which, as shown, causes the icon 268 to be visually distinguished (e.g., highlighted, colored a different color, etc.). Once icon 268 is highlighted, a mouse click selects the 3D option and a system server presents a 3D view of the 5-screen pack T2 layout as shown in FIG. 12.

Figure 12:
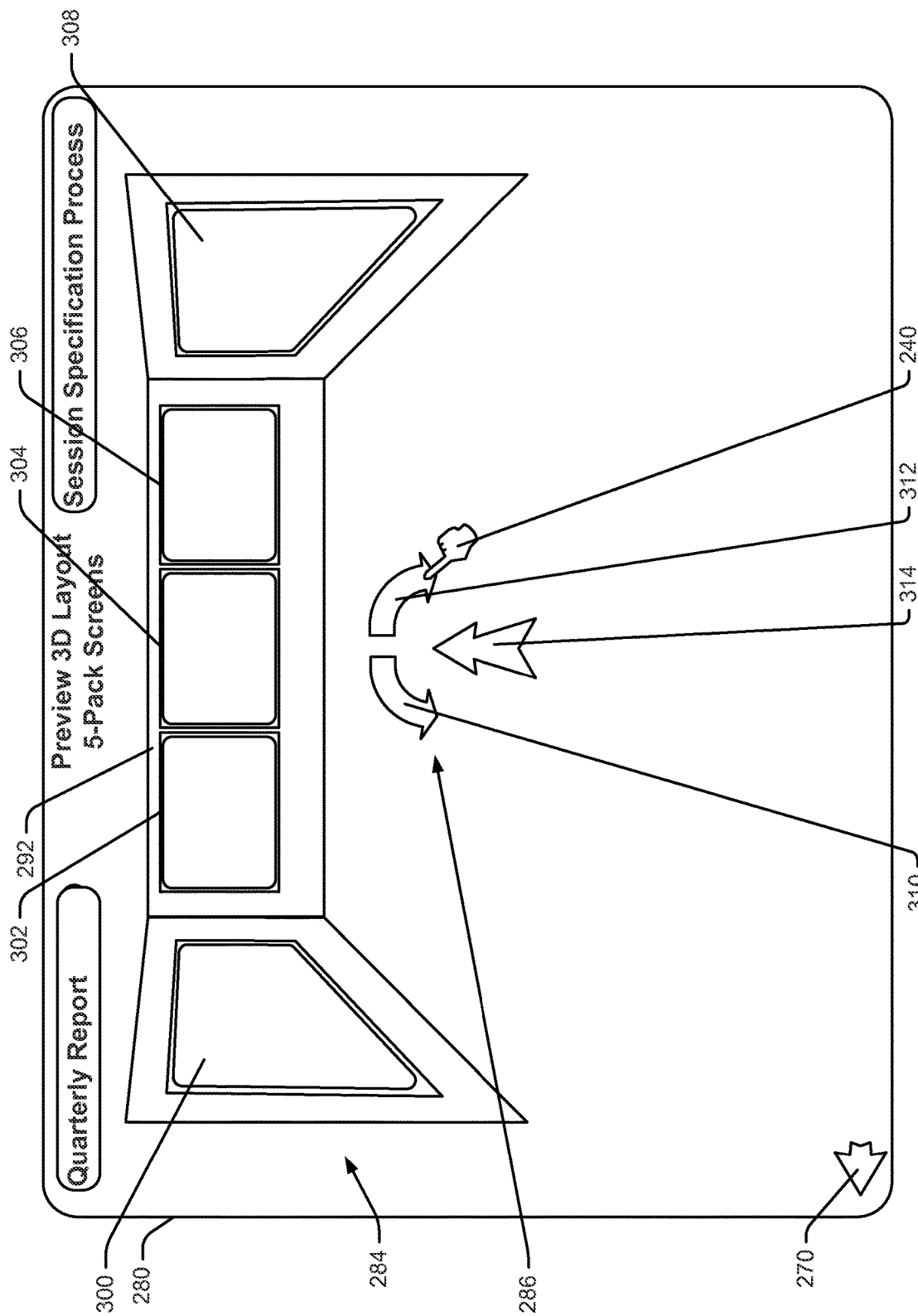
FIG. 12 is an image of a browser screen that may be presented as an interface during instantiation to preview a 3D representation of one of the FIG. 4 space type.

Referring to FIG. 12, the 3D T2 preview 280 includes a representation 284 of space defining walls and associated display screens 300, 302, 304, 306 and 308. Representation 284 initially shows a view of a T2 space type along a trajectory centered on a representation 304 of the central display (see 50 in FIG. 4) in a T2 type space. In this orientation, the left front and right front displays (e.g., 48 and 52 in FIG. 4) are shown to the left and right of the central display at 302 and 306 and the left wall and right wall displays 66 and 68 in FIG. 4 are shown on angled walls at 300 and 308 to be consistent with the 3D view from the initial perspective of representation 284. A control icon set 286 is included which allows a user to change the point of view and hence trajectory of the 3D view. To this end, navigation tool set 286 includes a rotate left arrow 310, a rotate right arrow 312 and a move forward (and reverse at times) arrow 314 that are selectable via pointing icon 240. Selection of rotate left arrow 310 causes the view within the virtual space to rotate left (e.g., 10 degrees per selection) so that the view of the left wall display representation 300 is more head on. After viewing the 3D image, back arrow icon 270 can be selected to re-present browser screen 250 from FIG. 11.

Figure 13:
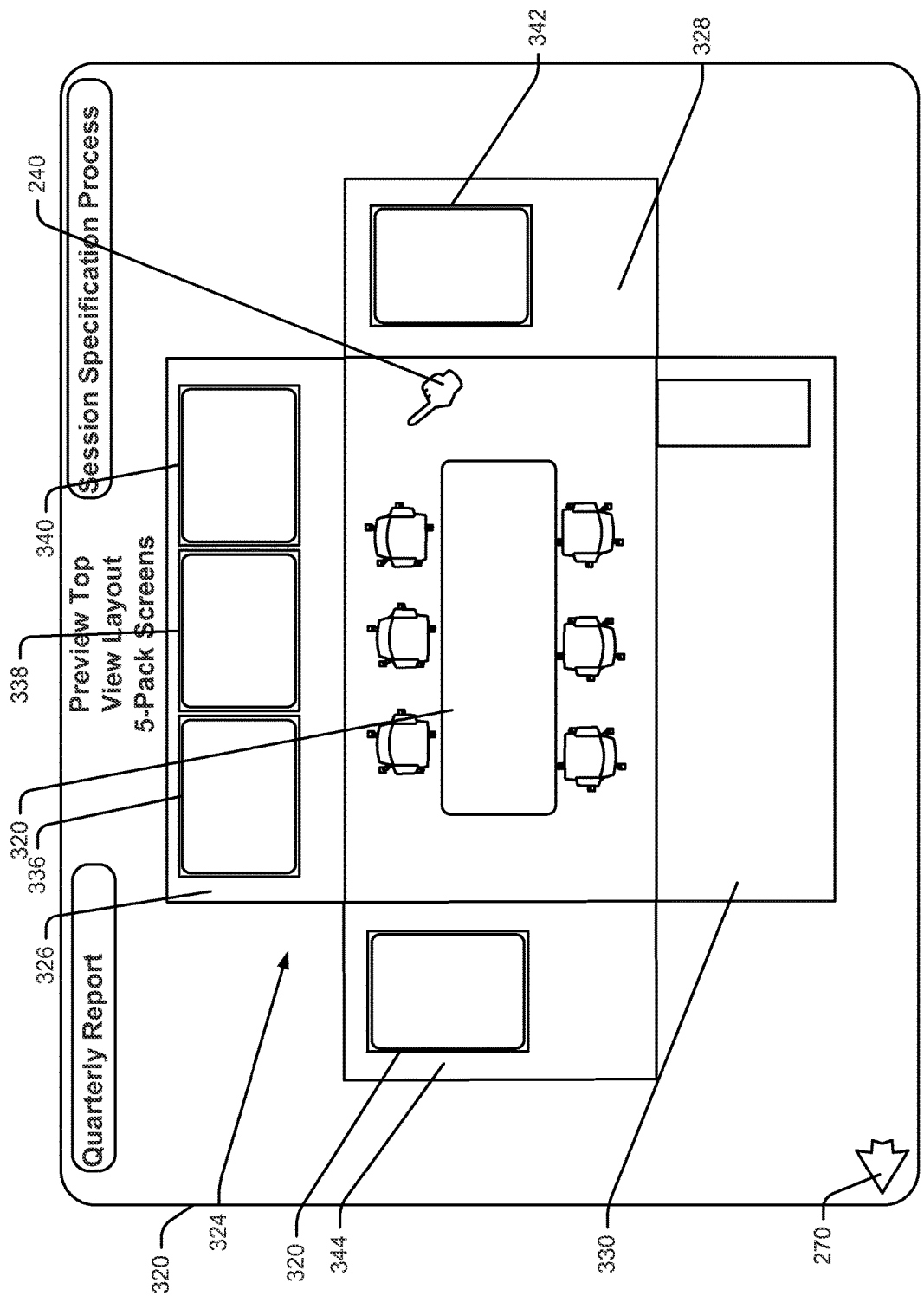
FIG. 13 is an image of a browser screen that may be presented as an interface during instantiation to preview a 2D top view of one of the FIG. 4 space types.

Referring to FIG. 13, an exemplary top T2 space type preview 320 includes a representation 324 of space defining walls 326, 328, 330 and 344 and associated displays 320, 336, 338, 340 and 342 in a flat representation that should give a conferee a sense of the relative juxtapositions of the displays relative to the overall space when the 2D preview top view layout icon 282 in FIG. 11 is selected. Here, representations 320, 336, 338, 340 and 342 correspond to vessels 66, 48, 50, 52 and 68 in FIG. 4.

Figure 14:
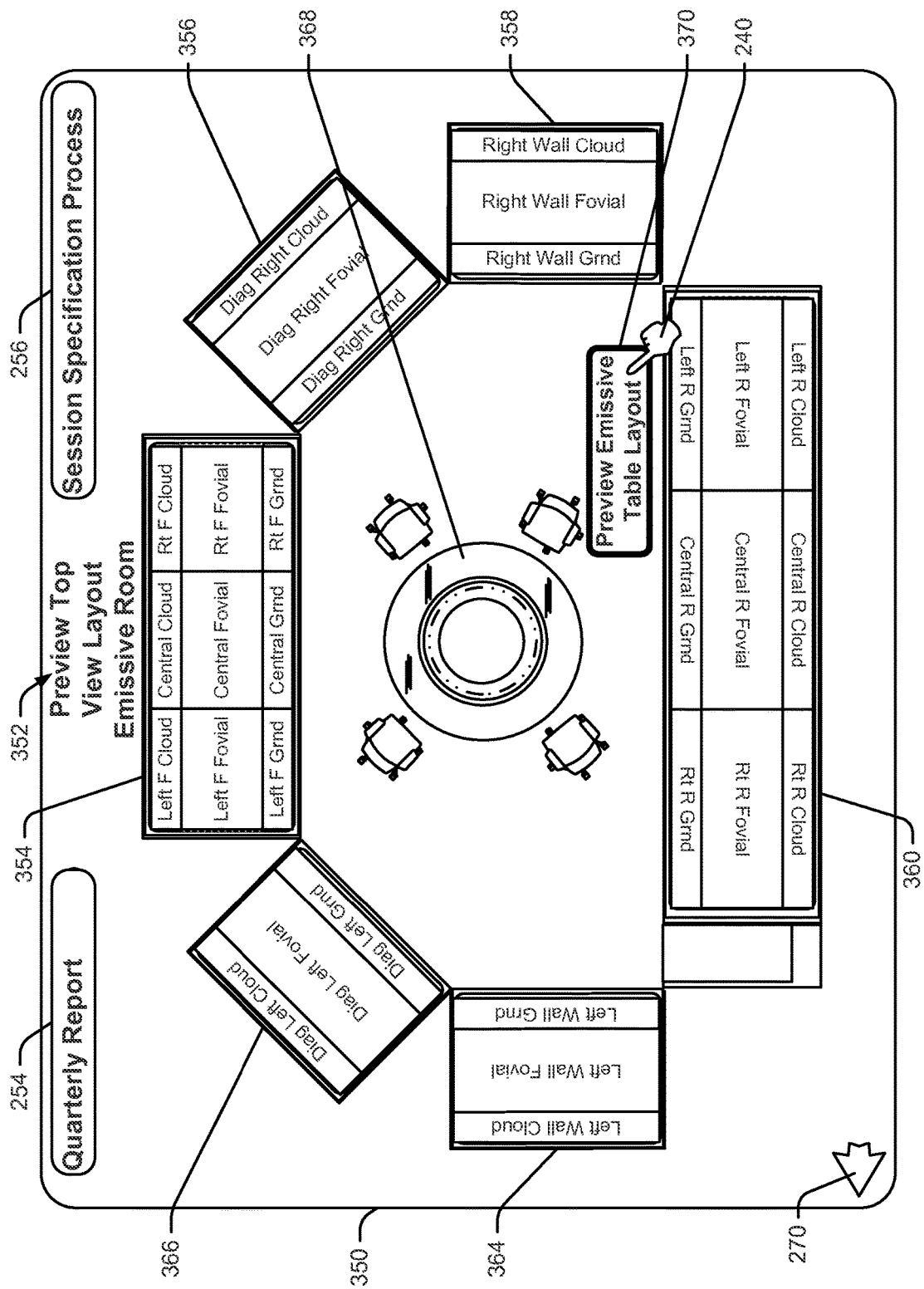
FIG. 14 is an image of a browser screen that may be presented as an interface during instantiation to preview a 2D top view of one of the emissive room spaces as shown in FIG. 5.

Referring to FIG. 14, an exemplary top T3 space type preview 350 includes a representation 351 of emissive space defining walls at 354, 356, 358, 360, 364 and 366 arranged to reflect relative juxtaposition of those surfaces in real life in a T3 type space as shown in FIG. 5. Each emissive wall representation also includes phantom lines and text to indicate how the surface is divided into different addressable vessels. Thus, for instance, consistent with the description above, the front wall surface or vessel representation 354 includes nine different vessels including left cloud, left foveal, left ground, central cloud, central foveal, central ground, right cloud, right foveal and right ground. By indicating the predefined vessels for space type T3, a sense of the richness of the T3 space is indicated to an instantiator. In the FIG. 14 representation, the round table is represented at 368 and a preview emissive table layout icon is provided at 370 which may be selected via icon 240 to access a table surface layout.

An exemplary round table preview browser screen 400 is shown in FIG. 15. Screen 400 includes a perspective view representation of a round table assembly at 92 and an exploded representation of the emissive walls that surround the table within a T3 type space at 406, 408, 410, 412, 414 and 416, to show the relative juxtaposition of the emissive walls to the table assembly within the T3 type space. In addition, emissive table surface subsets for the instantiator and for one "other" conferee attending the conference are shown at 418 and 422, respectively. With the exemplary round table arrangement, three separate emissive surface sections can be viewed from any location about the table by a conferee including a horizontal section 430, a ridge section 432 and a valley section 434. The horizontal, ridge and valley sections for the instantiator are represented at 418 as vessels 430*a*, 432*a* and 434*a*. Similar horizontal, ridge and valley vessels for another conferee are represented at 422. As described above, where more than one other conferee is located about the round table arrangement, more than one set of other vessels may be presented by a system server.

Figure 16:
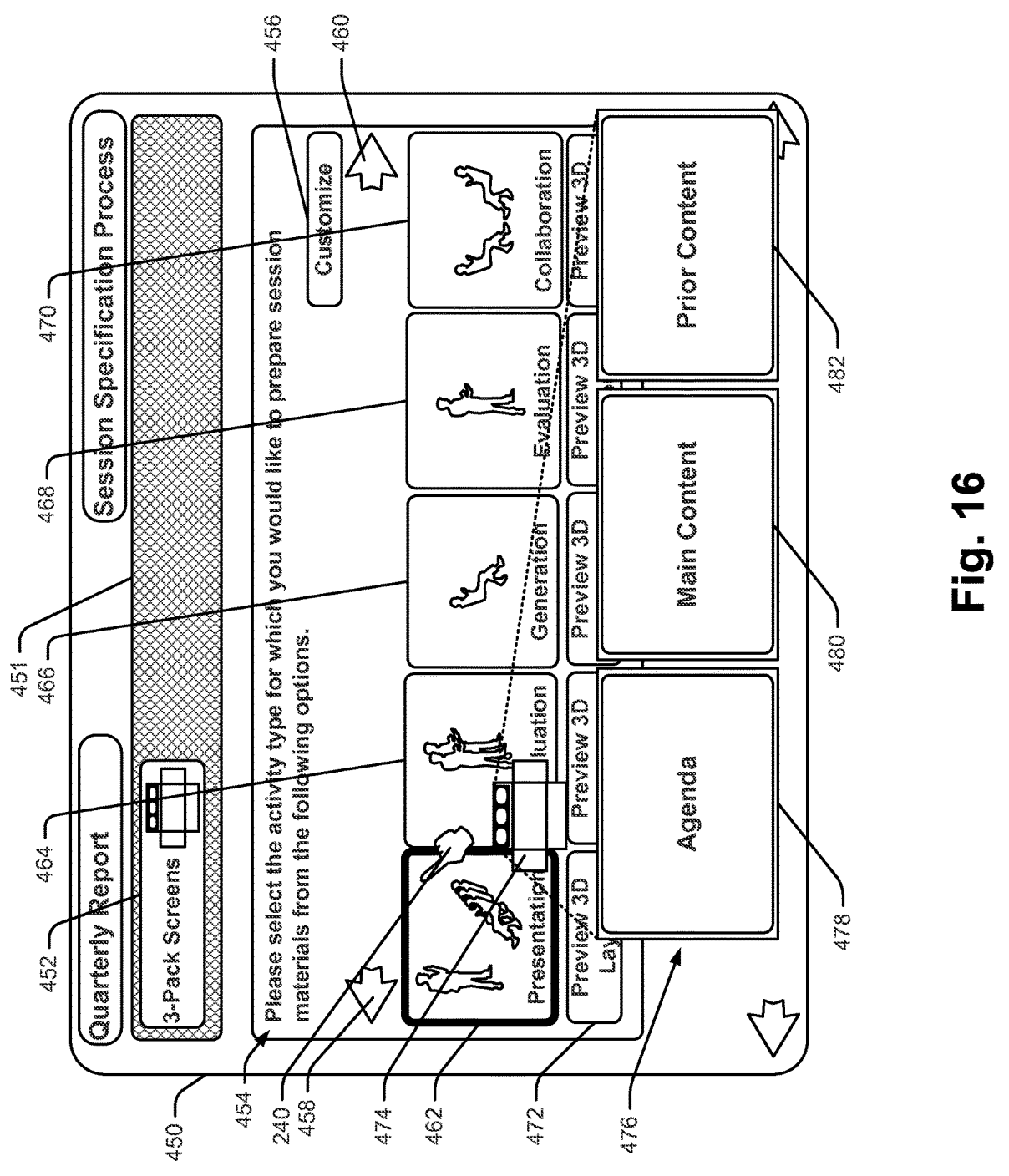

Referring once again to FIGS. 9 and 11, At this point it will be assumed that the instantiator has selected the 3 pack screen T1 type space via selection of representation 258 at block 208 and control passes to block 210 where the system server presents activity options to the system user. Referring also to FIG. 16, a exemplary browser screen 450 for presenting activity options includes a prior selection field 451, instructions 454, graphical activity choice representations 462, 464, 466, 468 and 470, preview icons 472, etc., a customize icon 456 and scrolling arrow icons 458 and 460, respectively. The prior selection field 451 indicates prior selections made during the specifying session to help orient the instantiator. In the illustrated example, a 3 pack screen icon 452 is provided in filed 451 to indicate that the conferee previously selected the T1 space type. Instructions 454 guide the instantiator to make an activity type selection using the choice representations.

Referring still to FIG. 16, the exemplary activity choice representations shown include a presentation representation 462, a co-evaluation representation 464, a generation representation 466, an evaluation representation 468 and a collaboration representation 470. Where other activity types are supported by the system, those other choices may be accessed via lateral scrolling using arrows 458 and 460.

In at least some embodiments, when an instantiator places pointing icon 240 over one of the choice representations in FIG. 16, a 2D representation of emissive vessels associated with the selected space type is presented as at 476 where content types associated with emissive vessels for the activity indicated are textually shown in the emissive vessel representations. Thus, for instance, see in FIG. 16 that when icon 240 hovers over presentation representation 462, in addition to highlighting or otherwise visually distinguishing the representation 462, vessel and content for the space type T1 and presentation activity combination are presented at 476 including agenda, main content and prior content associated with left front, central and right front display representations 478, 480 and 482, respectively. The content and display pairings shown in FIG. 16 are consistent with the T1 presentation combination specified in the template database shown in FIG. 6A (see the T1/presentation template at the T1 row and column 118).

Figure 17:
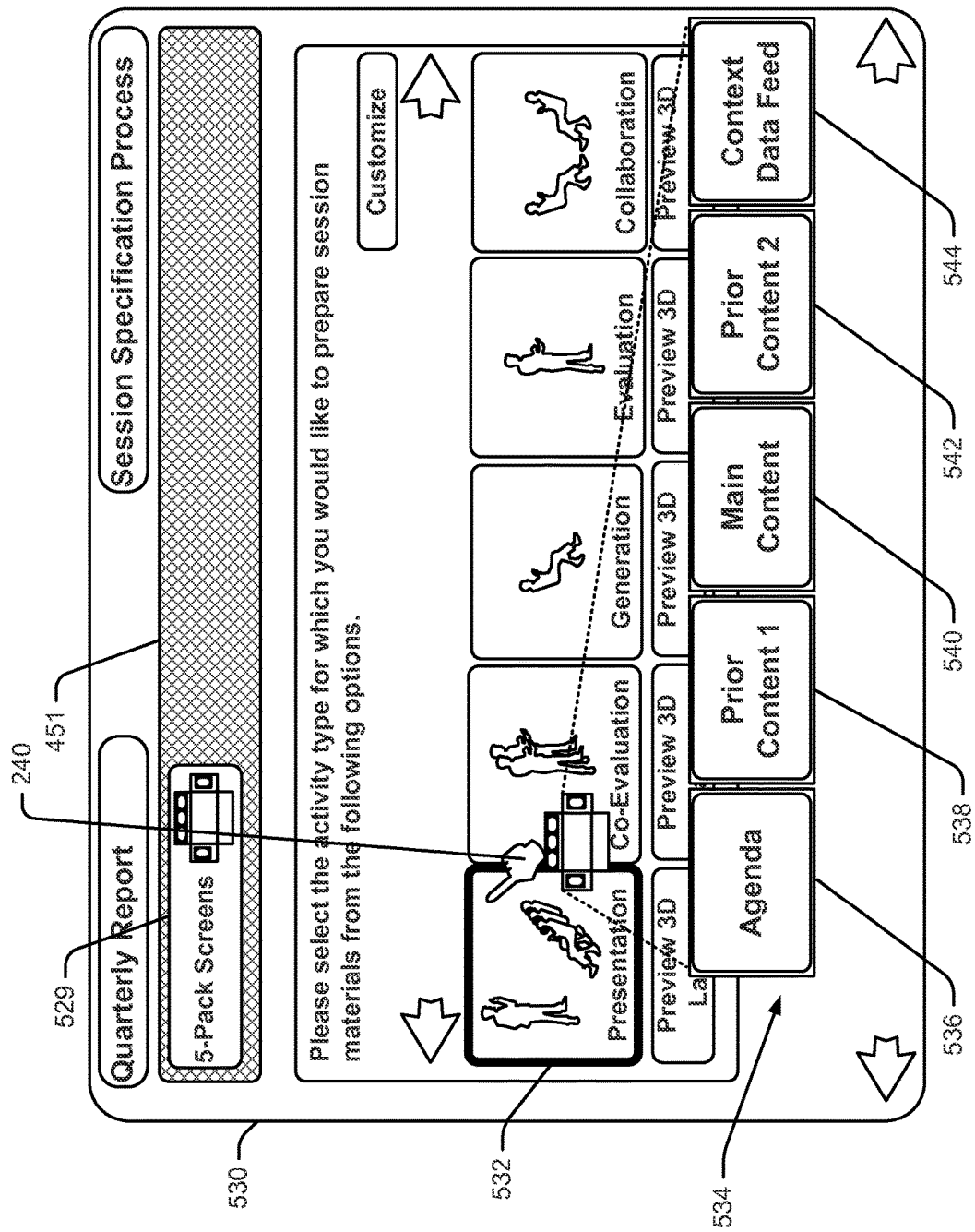
FIG. 17 is an image of a browser screen that may be presented as an interface during instantiation that is similar to FIG. 16, albeit for one of the FIG. 4 space types where content types for a presentation type activity are presented when a pointing icon hovers over a presentation activity type icon.

Another exemplary activity selection browser screen where an instantiator has previously selected the T2 type space (e.g., the 5 pack screen space) is illustrated in FIG. 17. Here, the previous selection field 451 indicates the 5 pack screen space type at 529. Here, when icon 240 hovers over the presentation representation 532, in addition to highlighting or visually distinguishing icon 532, a space vessel representation is provided at 534 which shows the five T2 space vessels and associated template specified content types at 536, 538, 540, 542 and 544 so that the instantiator can develop a sense of how the five screen presentation template automatically arranges content.

In either of FIG. 16 or 17, if the instantiator were to move icon 240 over a different activity selection representation, the space vessel representations would indicate a different set of content for the space vessels that is consistent with the FIG. 6A template database.

Figure 18:
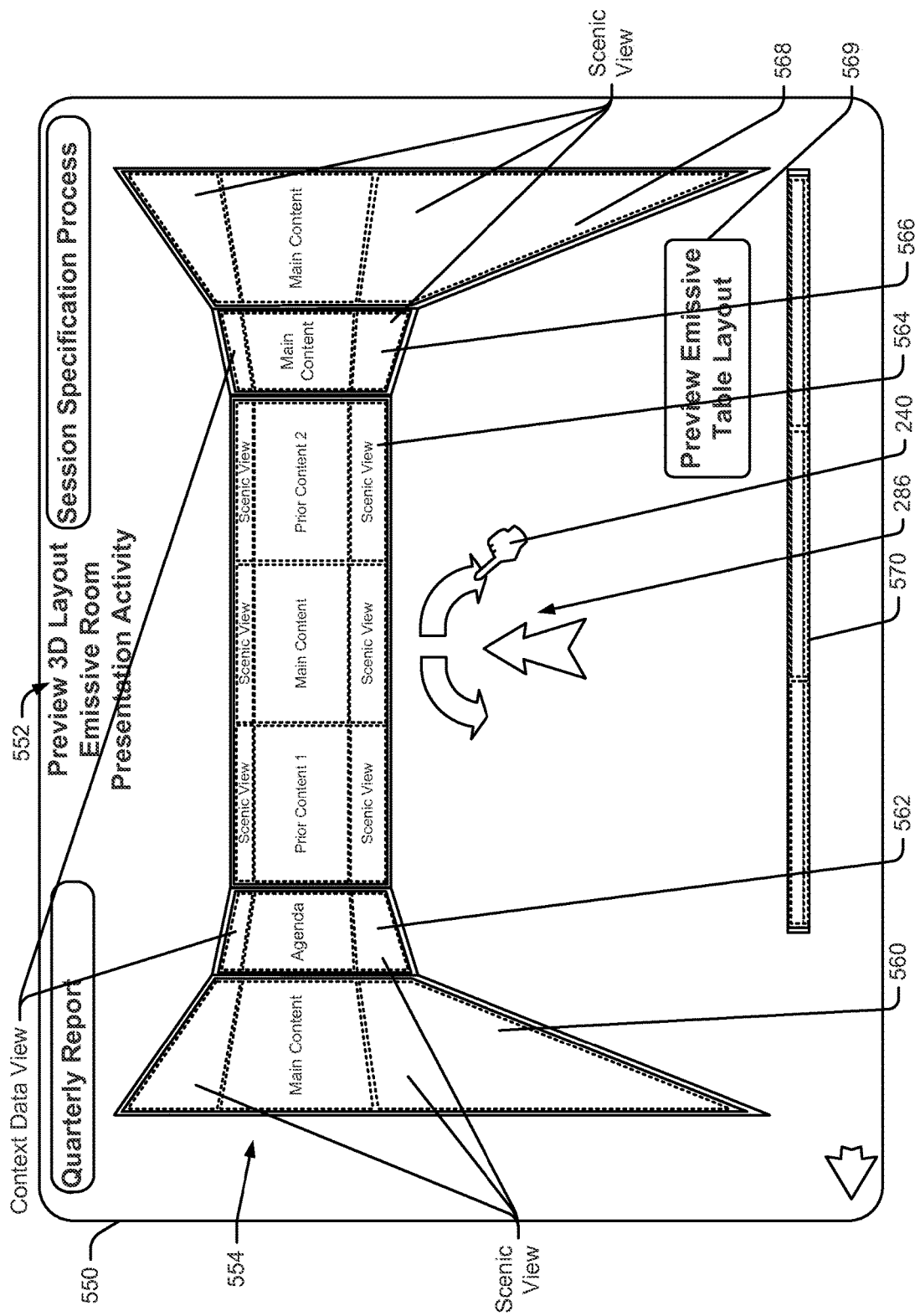
FIG. 18 is an image of a browser screen that may be presented as an interface during instantiation for previewing a 3D representation of an exemplary emissive room space as shown in FIG. 5 for a presentation activity type where separate fields in the representation indicate different content presenting vessels within the space and content types for each vessel are indicated.

Referring again to FIG. 16, any one of the 3D preview icons 472 may be selected to access a 3D view of emissive vessels for an associated space type selected and content types associated with each of the emissive vessels in the space type. FIG. 18 shows a 3D preview browser screen 550 for a T3 space type emissive room including a space and content type representation at 554 showing all emissive vessels in a T3 space type and indicating content types in each vessel for an exemplary presentation activity as indicated at 552. Here, again, a navigation tool set 286 may be controlled via pointing icon 240 to change the trajectory of the presented view. Screen 550 also includes a Preview Emissive Table Layout icon 569 that is selectable to view a representation of the emissive table located within a T3 space type and template specified content types to be presented in each of the table vessels. In this regard see again FIG. 15 where vessel subsets for an instantiator and one "other" conferee are presented at 418 and 422. In the case of icon 569, content types would be presented in the vessels in each subset 418 and 422 to indicate content types for a presentation activity in the present example.

Referring again to FIGS. 9 and 16, after a conferee selects one of the activity choice representations (e.g., 462, 464, etc.) to select an activity type at block 212, control passes to block 214. At block 214, a system server identifies a number N of content types required for the space/activity combination selected. For example, see again the template specification in FIG. 6A corresponding to the T1 (e.g., 3 pack screens) row and presentation column 118 where session content includes main content, an agenda and prior content 1. Again, prior content is simply previously presented main content and therefore, once main content is specified, prior content can be populated. Thus, in this example, only main content and an agenda need to be specified and therefore N would be 2. As another example, a different space/activity combination may require three simultaneous sequences of different main content (e.g., main content 1, main content 2 and main content 3) as well as an agenda and goals for a total of five separate content type requirements and, in that case, N would be 5. Many other N values are contemplated.

Figure 20:
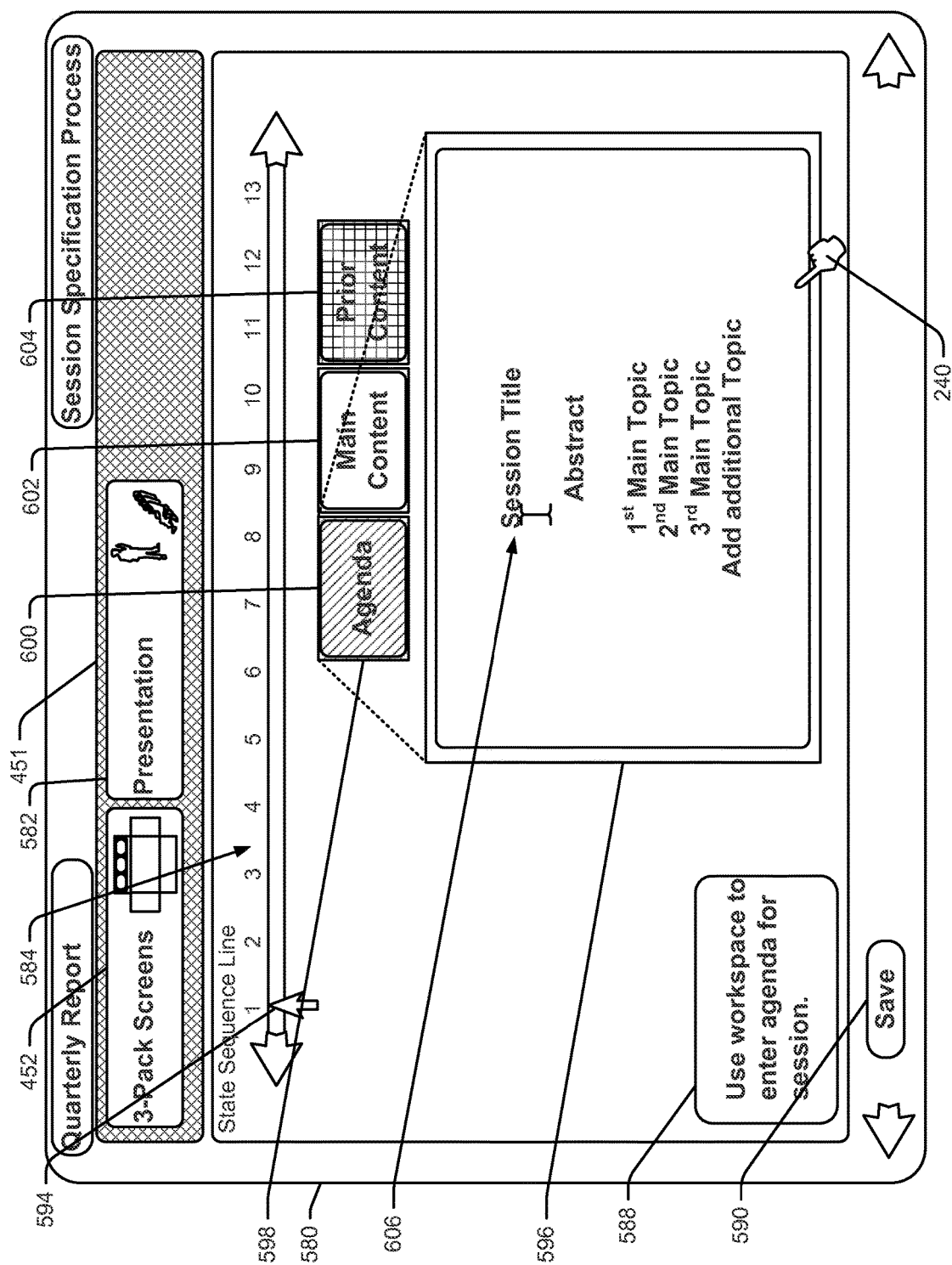
FIG. 20 is an image of a browser screen that may be presented as an interface during instantiation for developing content for a FIG. 2 type space and a presentation type activity.

Continuing, at block 214 in FIG. 9, a system server provides an interface with features designed to guide the instantiator through the process of providing the N content requirements. Referring also to FIG. 20, exemplary interface 580 for obtaining required session content includes prior selection field 451, a state sequence line 584, an emissive surface orientation representation 598, a content development or specifying window 596, an instruction box 588 and a save icon 590. Prior selection field 451 includes a space type indicator 452 and an activity type indicator 582 indicating a T1 space type and a presentation activity type, respectively, that were previously selected in the illustrated example. Again, the information in field 451 helps orient the instantiator during session specification.

Orientation representation 598 includes a representation of the emissive surface displays or vessels that are provided within the space specified in field 452. The representation 598 is meant to indicate to the instantiator the relative juxtapositions of the emissive vessels within an associated space type as well as relative juxtapositions of the emissive vessels with respect to each other. In FIG. 20, representation 598 includes three vessel representations 600, 602 and 604 aligned side by side in a horizontal arrangement to reflect the arrangement of vessels 48, 50 and 52 in the T1 type space shown in FIGS. 1 and 2, respectively.

Content specifying window 596 includes a rectangular field that corresponds to one of the vessel representations 600, 602 or 604 at a time and is visually or spatially associated with the instantaneously associated representation in some fashion. For instance, in FIG. 20 a single cross hatch of representation 600 may indicate a green color where the color green is used to indicate the representation associated with window 596. As another instance, phantom lines are shown in FIG. 20 that link representation 600 to window 596 to indicate an instantaneous association. An instantiator can select any of the vessel representations 600, 602 or 604 via pointing icon 240 to associate a different one of the representations with window 596.

State sequence line 584 includes a number line where the increasing numbers correspond to sequential content states associated with a session. For instance, in the case of main content that includes a sequence of images to be presented to other conferees, a first image may be associated with the number "1" in the sequence line 584, a second image may be associated with the number "2" in the sequence line, a tenth image may be associated with the number "10" in the sequence line, etc. In at least some cases, content presented in some space vessels may be persistent and therefore may not change as a session progresses through the sequence line 584 states. For instance, where an agenda is presented in a specific vessel, the agenda may be persistently presented in that vessel while main content progresses through a set of images during a session. In other cases content in various vessels may progress in parallel. For instance, where first and second main content sequences are to be presented in first and second different vessels, content in both vessels may change as the sequence line state progresses (e.g., moves from state 4 to state 5, from state 5 to state 6, etc.).

A state selection arrow icon 594 is provided on line 584 which can be moved via pointing icon 240 to different states along line 584. Content within vessel representation 598 and window 596 is always updated to reflect the content associated with the state selected via icon 594. Thus, for instance, in FIG. 20 content associated with the first state associated with number "1" is presented. If icon 594 is moved to state "12", content associated with state 12 is presented in representation 598 and window 596.

Referring yet again to FIG. 20 where screen 580 corresponds to a 3 pack screen presentation combination, vessel representation 598 includes three representations 600, 602 and 604 corresponding to the three displays 48, 50 and 52 in a T1 type space (see again FIG. 2) and, consistent with the template database in FIG. 6A, agenda, main content and prior content information types are indicated in representations 600, 602 and 604, respectively. Upon initially accessing screen 580, the system server presents the content development window 596 for developing content associated with the first of the N content type requirements. In FIG. 20, window 596 is associated with agenda content for representation 600 and is associated therewith graphically (e.g., via phantom lines or in some other fashion). Window 606 includes guiding information at 606 for guiding the instantiator to add content of the associated type. Thus, for example, information in FIG. 20 guides the user to enter agenda defining information corresponding to vessel representation 600. The instantiator simply types in agenda information to replace the instructions provided at 606.

Referring still to FIG. 20, in at least some embodiments representations 600, 602 and 604 in the vessel representation 598 may be color coded to reflect current status of content for the vessel associated with the representation. For instance, herein, representations for which content has not yet been specified are indicated as clear in FIGS. 20 through 23 (see 602 in FIGS. 20; 600 and 604 in FIG. 22, etc.), content that is currently being specified is indicated by a single cross hatching (see 600 in FIG. 20) and content that does not have to be specified for some reason (e.g., prior content is derived from main content) is indicated by vertical and horizontal cross hatching. The different hatching may represent different colors (e.g., cross hatch diagonal green, vertical and horizontal cross hatching red, etc.). In FIG. 20, because content is being developed for display representation 600, representation 600 is cross hatched, main content in representation 602 is clear indicating that that content still needs to be developed and the prior content in representation 604 is eventually derived from the main content and therefore is double hatched to indicate no need to specify.

Referring again to FIGS. 9 and 20, once the agenda is specified via window 596 once (e.g., the agenda persists through the sequence of session states associated with line 584) at block 218, control passes to block 220 where the specified content is stored in the session specification (see again FIG. 8). In the FIG. 20 example, completion of agenda content may be identified after an instantiator has specified at least some agenda content and has selected the main content vessel representation 602. At block 222 the system server increments the X value and at block 224 value X is compared to value N (e.g., to the number of content type requirements for specifying the session being instantiated). If X is equal to N, the FIG. 9 process ends as all information to instantiate the session has been specified. If X is less than N, control passes back up to block 216 where the system server requests the next content requirement for the session being instantiated.

Figure 21:
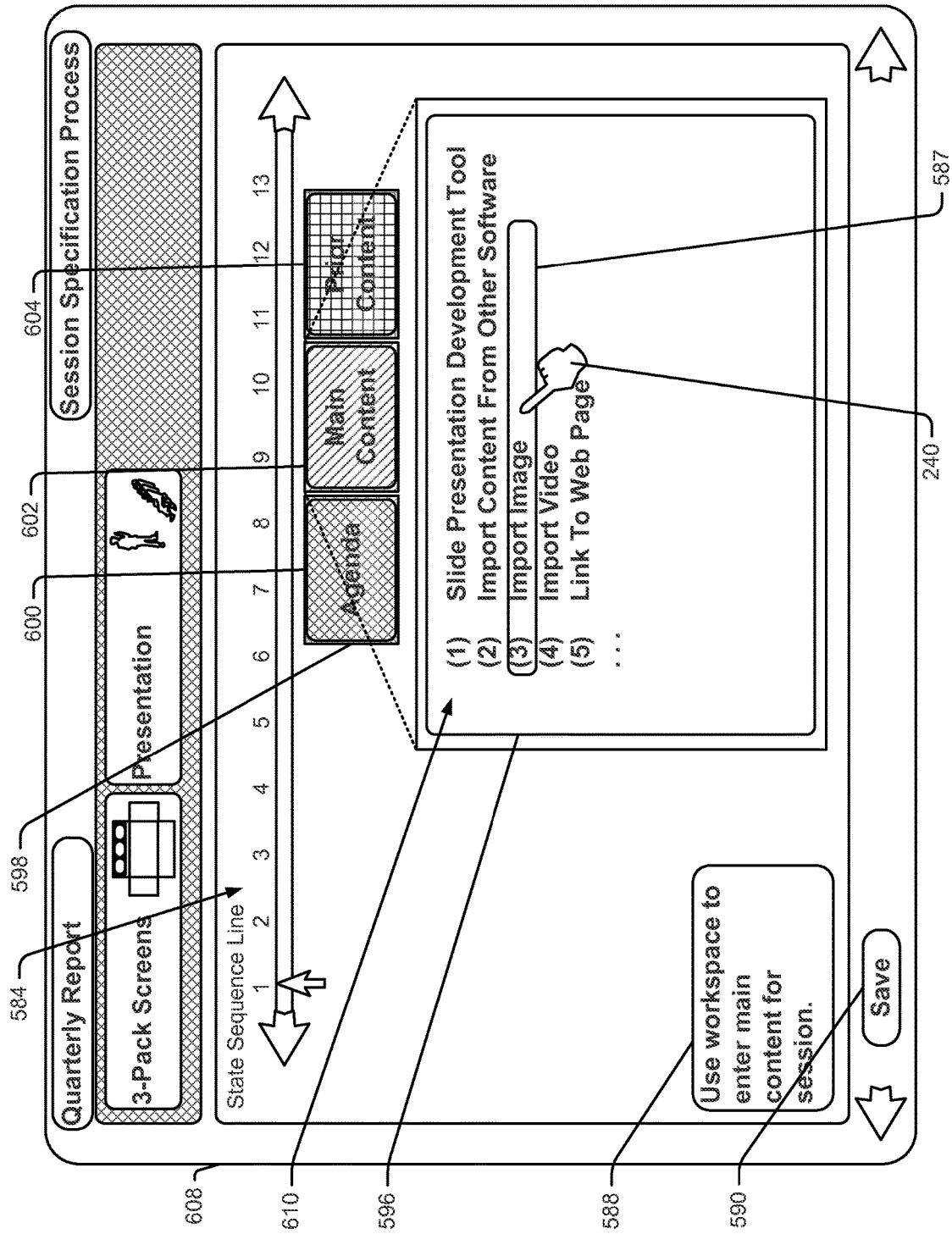
FIG. 21 is an image of a browser screen that may be presented as an interface during instantiation that is similar to FIG. 20, albeit showing different content specifying tools.

In FIG. 20, it is contemplated that the instantiator may want to develop main content prior to developing an agenda. To this end, the conferee may use icon 240 to select representation 602 and access a window 596 as shown in FIG. 21 that includes information 610 useful for specifying main content for the display associated with representation 602. Thus, which of the N required content subsets is specified first by the instantiator is up to the conferee and the FIG. 9 process occurs as indicated in FIG. 9 until all N content requirements have been fulfilled in some fashion.

As illustrated, FIG. 21 includes a double diagonal cross hatching of representation 600 which indicates that content for representation 600 and specifically an agenda in the present example has already been specified. Thus, four states may be specified for a vessel representation via color coding or other visually distinguishing indication including (1) no need to specify content (e.g., red), (2) required content being specified (e.g., green), (3) required content not yet specified (e.g., yellow) and (4) required content already specified (e.g., light blue). Here, while specified, an instantiator may still select representation 600 to reaccess the agenda and make modifications if desired.

Information presented at 610 in FIG. 21 includes a list of content sources selectable by the instantiator to develop or access existing content to be used as the main content to be presented via the vessel associated with vessel representation 602. As shown, the instantiator may use icon 240 to move a selection box 587 to any of the content options listed at 610 and to select an option. For instance, the option list at 610 includes (1) a slide presentation development option, (2) an import content from other software option, (3) an import image option, (4) an import video option and (5) a link to web page option. When the slide presentation option is selected, tools akin to Power Point development tools may be presented for developing a sequence of slides to be presented. Here, in at least some cases each slide developed would be slotted into a different one of the states in sequence line 584. For instance, if ten slides were developed, the first through ten slides would be associated with states "1" through "10" on line 584. Where a different option such as the (4) import video option is selected while icon 594 is selecting state "11", any video imported into the session content would be linked to state 11 and therefore presented when state 11 occurs. Similarly, where option (5) link to web page is associated with state "12", a web page selected via the option would be presented as main content on the screen associated with representation 602 when state 12 occurs.

In the FIGS. 20 and 21 example, once agenda content and main content have been completely specified, the instantiator can select the save icon 590 to save the instantiated session in the FIG. 8 database for subsequent use during a session.

Figure 22:
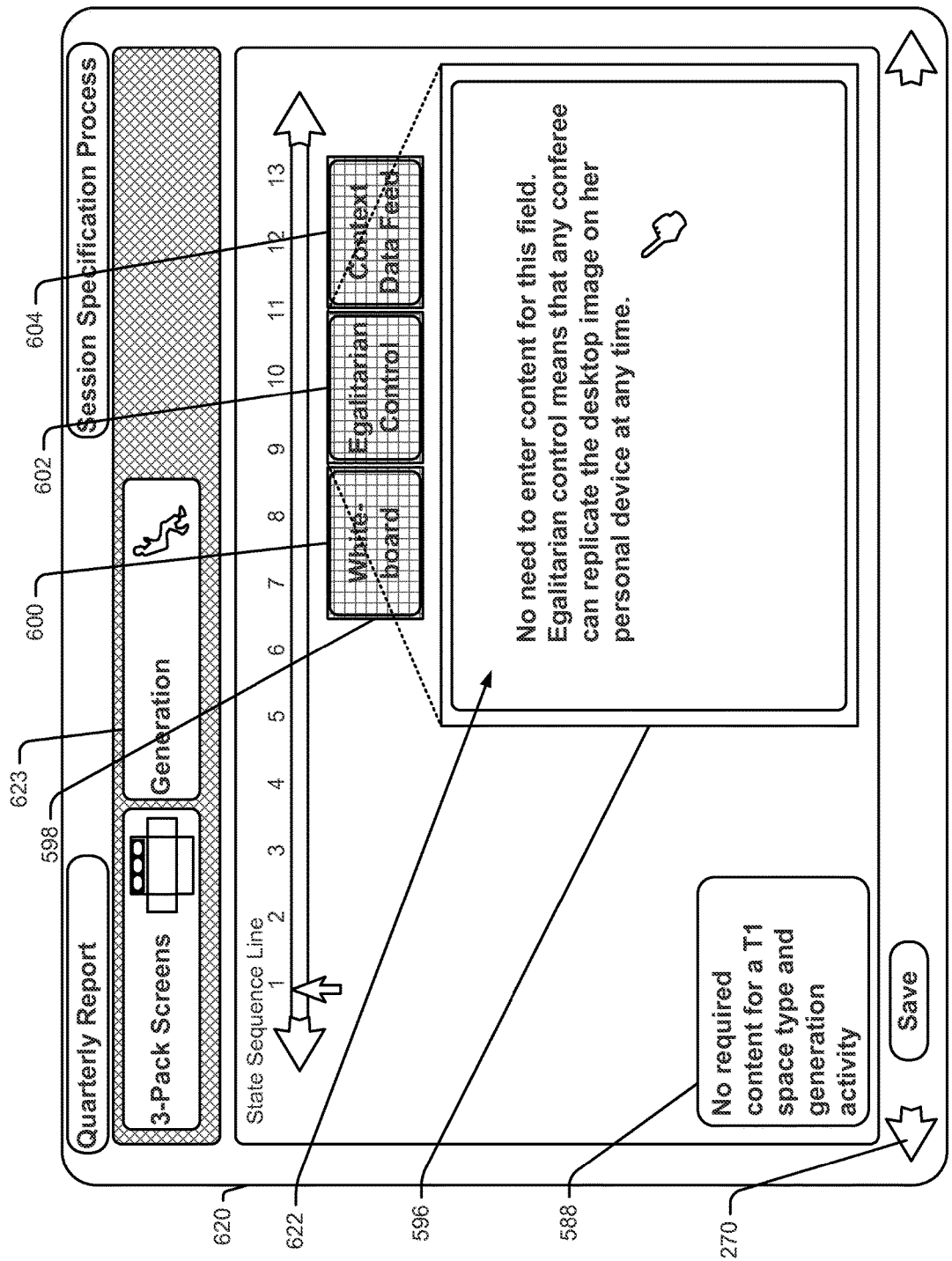
FIG. 22 is an image of a browser screen that may be presented as an interface during instantiation when a FIG. 2 type space and a generation activity have been selected.

FIG. 22 shows a browser screen 620 similar to the screens shown in FIGS. 20 and 21, albeit for specifying content for a T1/generation (see 623 in FIG. 22) combination (as opposed to a presentation activity). The content types specified in vessel representations 600, 602 and 604 are different in FIG. 22 than in FIG. 20. More specifically, in FIG. 22, content types for vessel representations 600, 602 and 604 include a whiteboard, egalitarian control and a context data feed, respectively. As indicated by the vertical and horizontal double cross hatching in each of representations 600, 602 and 604, there is no ability to specify session content for any of the whiteboard, egalitarian or data feed vessels. To this end, the whiteboard feature simply causes a virtual electronic whiteboard to be presented on an associated emissive vessel for developing content during a session. The egalitarian feature simply allows conferees in a session to share desktop images from portable personal computing devices in real time and therefore there is no need to pre-develop content. The data feed feature simply generates an automated data feed based on content developed during a session or based on context discerned from sensed activities (e.g., voiced words or phrases, etc.) within a space during a session. Here, when one of the representations 600, 602 or 604 is selected, instead of providing guidance for entering required content, an explanation 622 of how the display associated with the selected representation may be provided in window 596. If the instantiator is dissatisfied with the content specifying options in FIG. 22 or at any other time for that matter, the conferee can select the back arrow 270 to move back to the activity selection screen to select a different activity that has a different mix of content specifying options.

Figure 23:
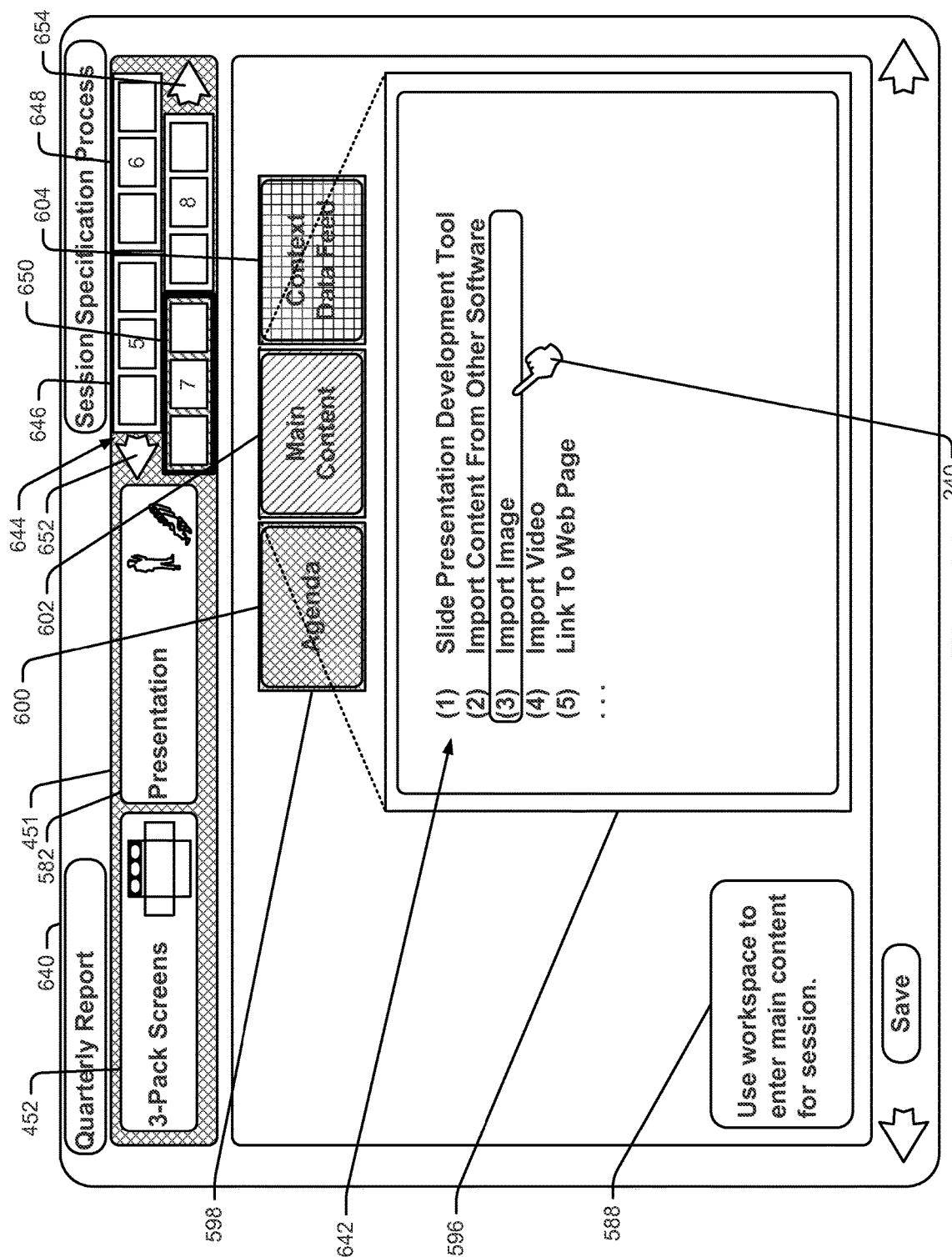
FIG. 23 is an image of a browser screen that may be presented as an interface during instantiation that includes control tools that are different than the FIG. 21 control tools for moving forward and rearward in developed content.

In at least some embodiments it is contemplated that a different state representation may be provided for indicating which state in a sequence of states is currently represented on a browser screen during an instantiation process. For instance, see FIG. 23 that shows a browser screen 640 similar to the FIG. 21 screen 608, albeit including a different state representation at 644. Instead of presenting a state sequence line 584 as in FIG. 21, the state representation 644 includes a set of vessel subsets 646, 648, 650, etc., where each vessel subset corresponds to content for space vessels at a specific location along the sequence of session content. For instance, vessel content for all space vessels is presented at 646 for a fifth content state, vessel content for all space vessels for a sixth state is located at 648, and so on. Although not shown, each of the vessels in subset 646 may include a thumbnail image of the content associated therewith to help orient the instantiator during session specification. Scrolling arrows 652 and 654 may be used to scroll through other states in the sequence of content. In FIG. 23, the seventh state subset 650 is shown highlighted or otherwise visually distinguished to indicate to the instantiator that subset 650 is currently selected and content associated with the seventh state is presented in representation 598 and window 596.

Figure 24:
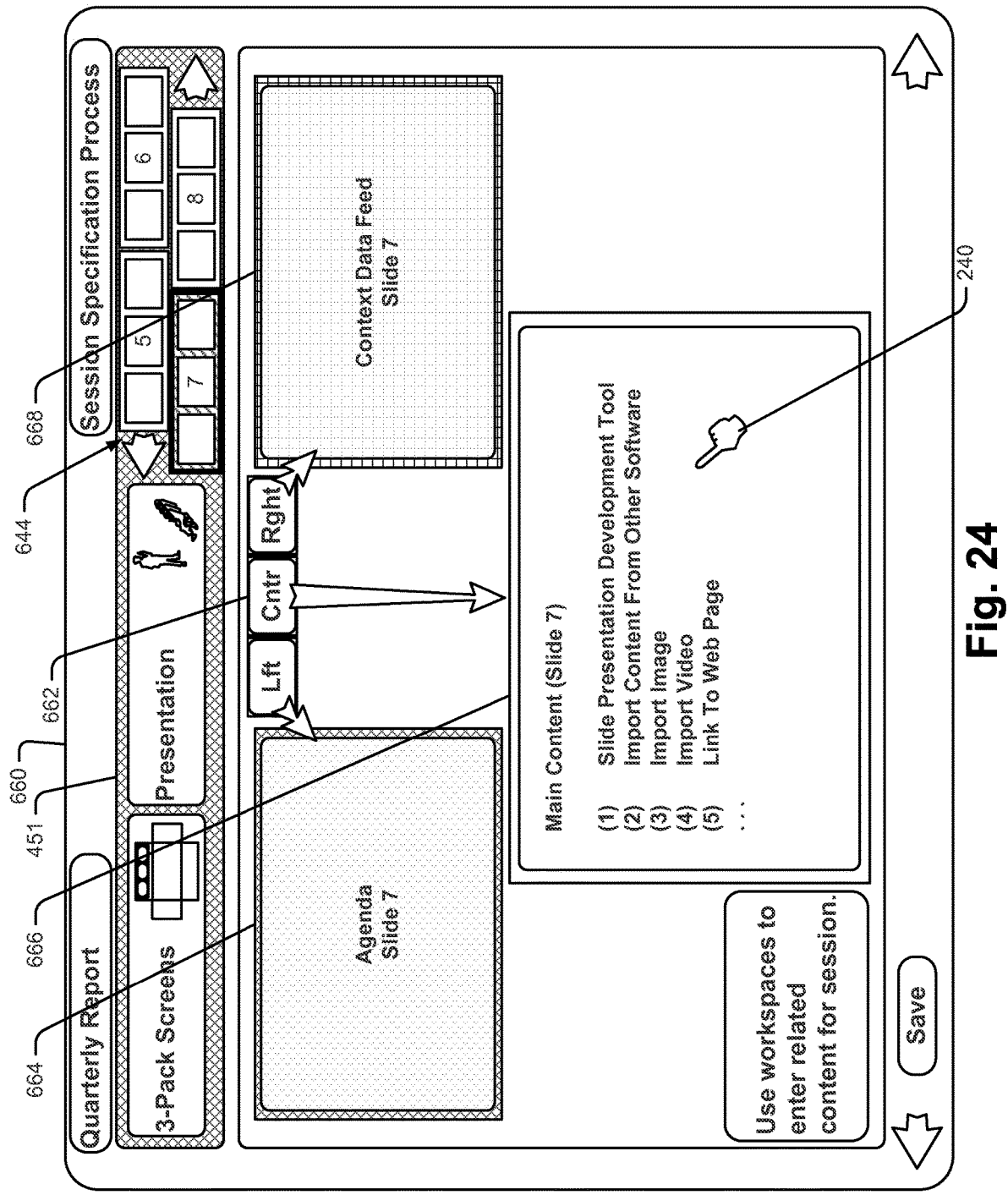
FIG. 24 is an image of a browser screen that may be presented as an interface during instantiation that shows yet another set of content specifying tools that may be presented to help an instantiator develop session content.

In at least some embodiments an instantiator will want to be able to view content specified for all space vessels simultaneously while developing of specifying session content. For this reason, yet other browser screens are contemplated that present specified content and other information in other formats. For instance, see FIG. 24 where another content specifying browser screen 660 for a T1/presentation combination is shown. Screen 660 includes the prior selection field 451 and the state representation 644 described above, a vessel arrangement representation 662 and relatively large windows for presenting currently specified content or content specifying tools for each of the vessels in representation 662 at 664, 666 and 668. Here, the instantiator can select any one of the windows to change content specified therefore. In FIG. 24, windows 664 and 668 are shown hatched to indicate previously specified content for 664 and that content cannot be specified for 668 to help orient the instantiator.

Figure 25:
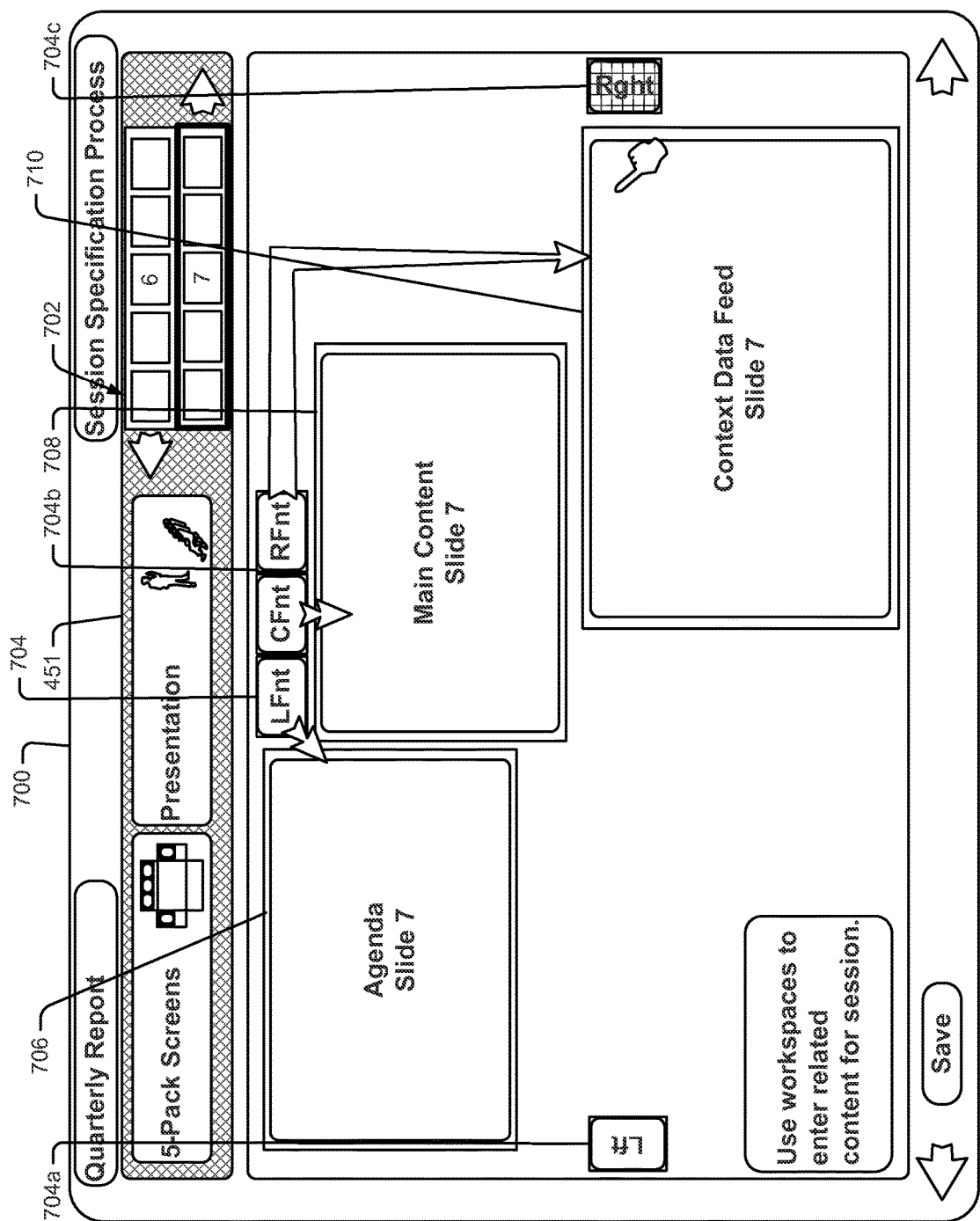
FIG. 25 is an image of a browser screen that may be presented as an interface during instantiation that shows content developing tools for a FIG. 4 type space and that is similar to the FIG. 24 view.

FIG. 25 shows a browser screen 700 akin to the FIG. 24 screen, albeit for a T2/presentation combination (e.g. 5 pack screens and presentation). As illustrated, the vessel representation 704 includes three different iconic representations 704a, 704b and 704c corresponding to a left wall vessel, central wall vessels and a right wall vessel, respectively, showing the relative juxtapositions of the T2 vessel combination within an exemplary T2 space (see again FIG. 4). In FIG. 25, relatively large windows 706, 708 and 710 are presented for each of the vessels in representation 704b and no larger windows are presented for representations 704a and 704c. window 710 is larger than either of windows 706 and 708 to indicate that window 710 has been selected for viewing of content development. If either of windows 706 or 708 were selected, that window would be enlarged and window 704 reduced in size to indicate an instantaneous directed attention to the selected window. Either of representations 704a and 704b may be selected to open up an editing or viewing window therefore akin to the windows 706, 708 and 710. Screen 700 also includes a modified state representation at 702 to show thumbnails of content on all five space fields in different states.

Figure 26:
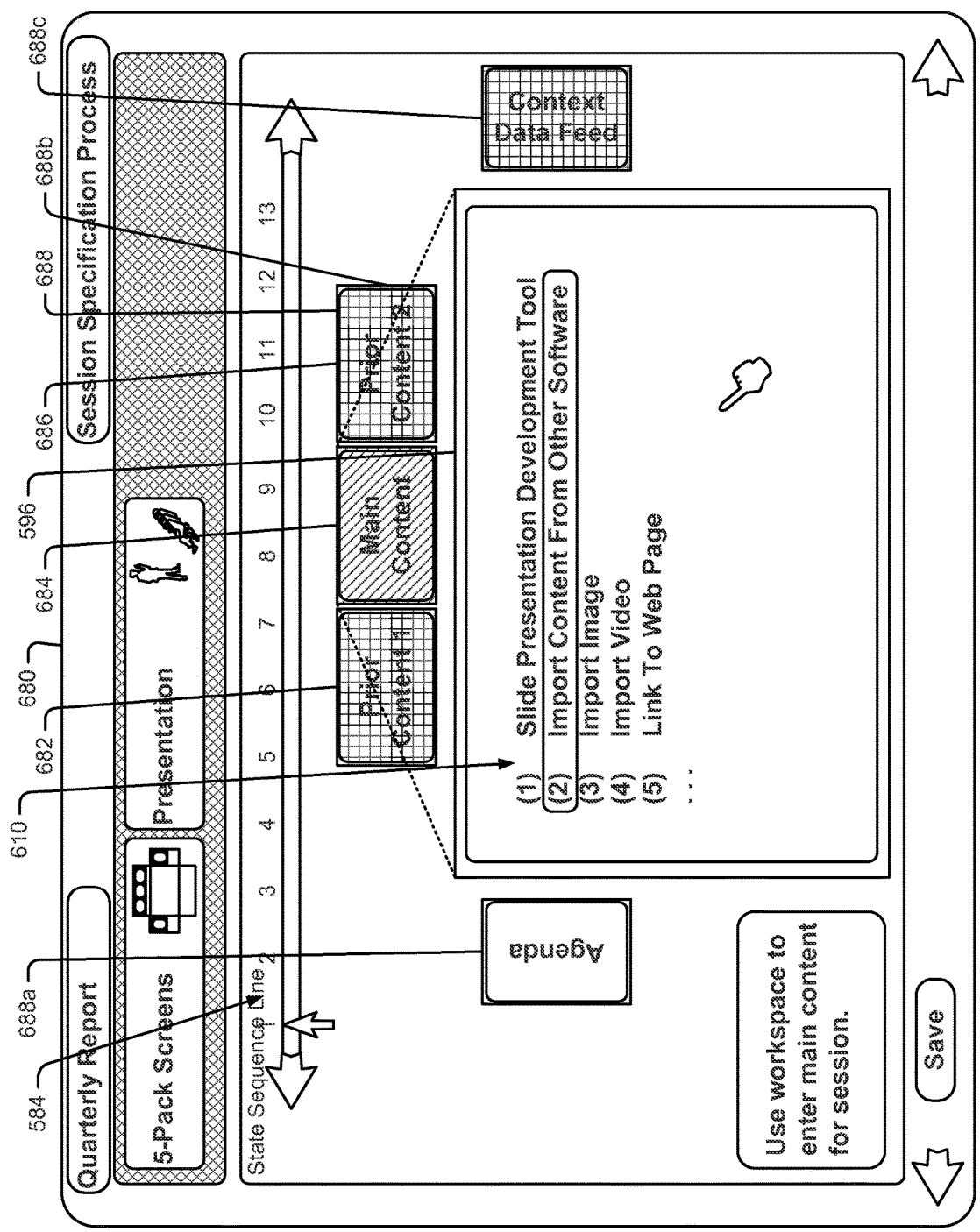
FIG. 26 is an image of a browser screen that may be presented as an interface during instantiation that shows another tool set for developing content for a FIG. 4 space and a presentation activity.

FIG. 26 shows an exemplary browser screen 680 for specifying content for a T2 (e.g., 5 pack screen arrangement) presentation combination which is similar to the T1 presentation combination screen shown in FIG. 21. The main difference between the FIGS. 21 and 26 screens is that screen 680 in FIG. 26 includes a vessel representation 688 that includes left, central and right wall vessel representations 688a, 688b and 688c, respectively, instead of just the central wall vessels representation. Central wall vessel representation 688b includes left, center and right vessel representations 682, 684 and 686, respectively. The content types indicated in the vessel representations reflect the differences in the template database between T1 and T2 space types. Thus, the content types specified for representations 688a, 682, 684, 686 and 688c include agenda, prior content 1, main content, prior content 2 and a context data feed, respectively.

The systems described above guide an instantiator to select a space type and select an activity type for a specific session and then guide the instantiator to specify (e.g., generate or select from other databases) content that is required by a template (see FIGS. 6A and 6B) associated with the selected space/activity combination. Here, session customization occurs through specification of session specific content of the types required by a specific space/activity template.

In other cases it is contemplated that there may be no space/activity template that arranges content on emissive surfaces within a space in a way that an instantiator prefers. For instance, during a presentation activity, a conferee in a five screen T2 space may want main content presented and duplicated in each of the five emissive vessels in the space even though no space/activity template supports that content arrangement. As another instance, a conferee may want main content on a left wall vessel in a T2 space and context data feeds on all of the other four emissive vessels within the space despite there being no template to support that arrangement.

Figure 27:
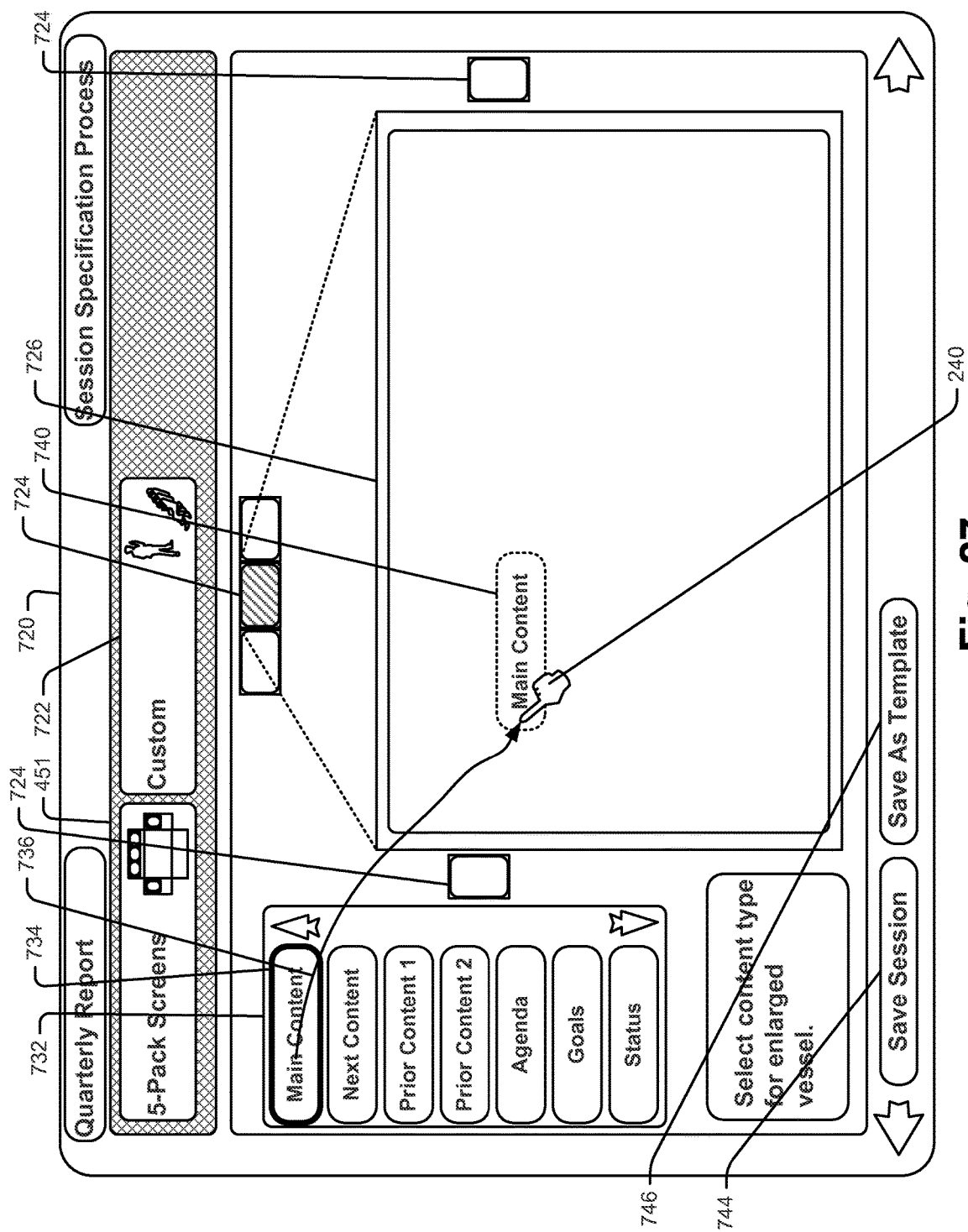
FIG. 27 is an image of a browser screen that may be presented as an interface during instantiation that shows tools useable to customize locations of content types in different space vessels during session specification.

To allow conferees to develop session content in ways that deviate from content presentation supported by specific system templates, several customization features are contemplated. Referring again to FIG. 17, after a space type has been selected as indicated at 529 and a user is presented with the activity selection interface 530, customization icon 456 may be selected to access a customization sub-process. An exemplary customization interface 720 for a five screen T2 space is shown in FIG. 27. Interface 720 includes a prior selections field 451 which indicates space type (e.g., five screen T2) and that the customization feature has been selected at 722. Interface 720 also includes a vessel representation 724, a specifying window 726, a content options window 732, a "Save Session" icon 744 and a "Save As Template" icon 746. The orientation representation 724 is provided to indicate the relative juxtapositions of the emissive vessels within the T2 space. Specifying window 726 is provided for specifying content types and also content if the instantiator decides to do so for a specific session.

Referring still to FIG. 27, options window 732 includes a list of content type options in virtual icon form that may be selected to specify content type for a vessel that is currently associated with specifying window 726. For instance, exemplary icons in window 732 include a "Main Content" icon, a "Next Content" icon, a "Prior Content 1" icon, an "Agenda" icon, etc. Scroll arrows are provided for scrolling to other content type options where more options are available. To specify a content type for the display associated with window 726, the instantiator can simply use pointing icon 240 to select one of the content icons from window 732 and can drag that icon to and drop that icon within window 726. For instance, see the dragging action 736 in FIG. 27 where icon 734 is highlighted or otherwise visually distinguished in list 732 to indicate selection and a phantom main content icon 740 is shown being moved via pointing icon 240. Once icon 740 is released, main content type content will be associated with window 726 and hence with one of the T2 space vessels. Next, the instantiator can select a different one of the displays represented at 724, 728, 730 and can use options from window 732 to specify another vessel specific content type. In other cases content types may be dragged to individual vessel representations within representation 724 and dropped thereon to associated different content types with different space vessels.

Once content types have been specified for at least a subset of the displays associated with representations 724, 728 and 730, the instantiator has several options. First, the conferee may choose to provide content required for each of the T2 space vessels in a manner similar to that described above by selecting at least a subset of the vessels associated with representations 724, 728 and 730 and then specifying content for each based on the content type previously associated with the vessel. Here, the system server would guide the instantiator through content specification for each vessel requiring that content be specified.

After content required for the session has been specified, the conferee may select icon 744 to save or store the instantiated session. Second, the conferee may select icon 746 to save the specified content type arrangement as a new template for subsequent use by the instantiator or other conferees. In some cases it is contemplated that a conferee may store a specified template after content has been specified for a specific session. Here, when icon 746 is selected, a system server would simply associate specific content types specified by the conferee with specific space vessels without the specific session content.

While not shown, interfaces similar to interface 720 shown in FIG. 27 would be supported by the system for each of the T1 and T3 spaces so that a conferee could customize content types for each display or field associated therewith.

In at least some cases the template customization process may be completely separate from the content specifying process. Here, if a new or unsupported content arrangement is preferred, an instantiator would first access a template specifying interface and then, after the content type arrangement has been specified and stored as a template, the conferee would access content specifying interfaces, select the new template and provide content required to instantiate an instance of the new template as a session.

Figure 28:
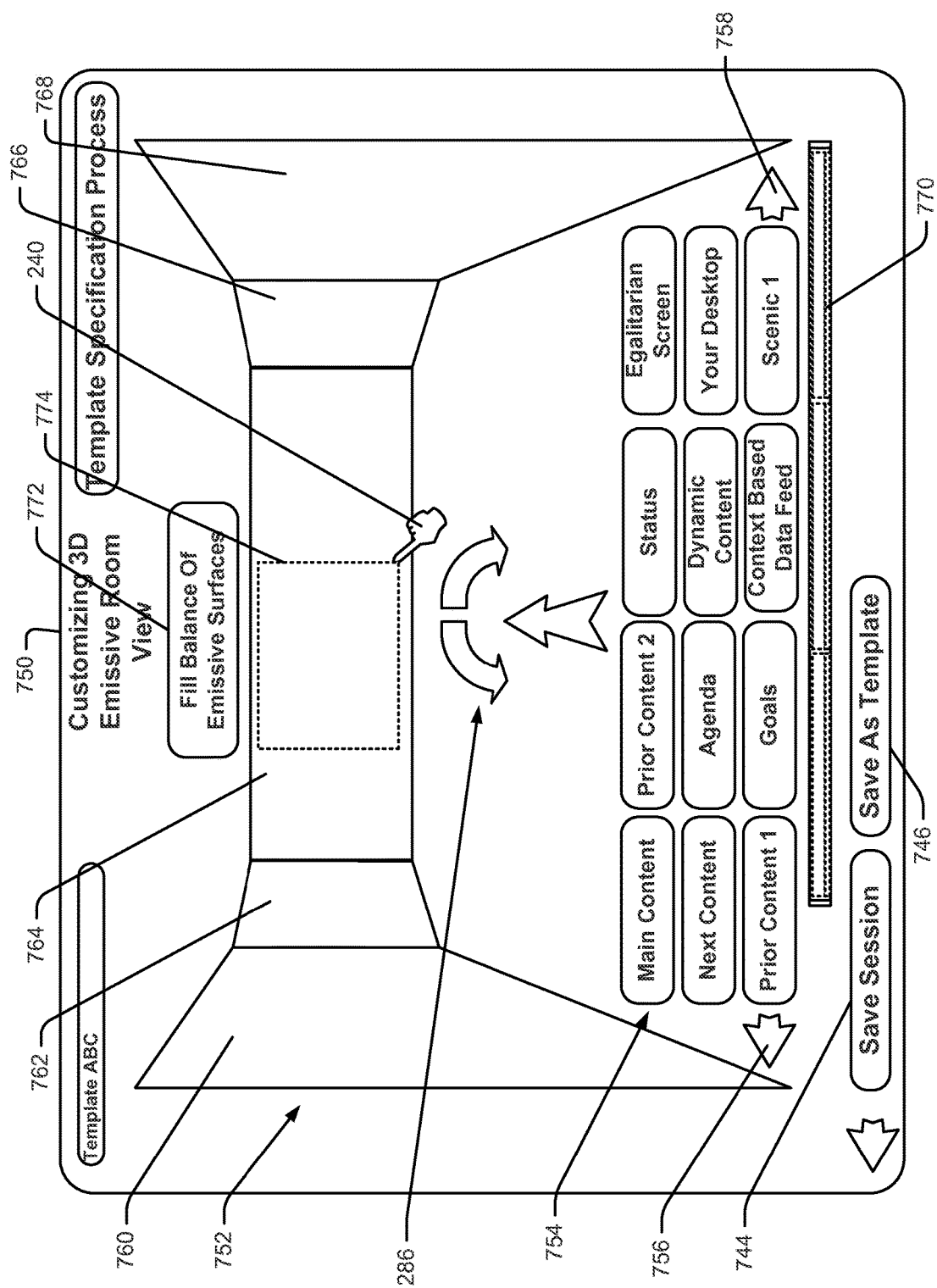
FIG. 28 is an image of a browser screen that may be presented as an interface during instantiation that shows a 3D view of a FIG. 5 type emissive room and includes customization tools so that an instantiator can specify customized vessels and content for those vessels to be presented during a subsequent session.

Referring to FIG. 28 an exemplary 3D T3 space template specifying interface 750 is illustrated. Interface 750 includes a vessel representation 752, a set of navigation tools 286, a list of content options and a "Fill Balance Of Emissive Surfaces" field or representation 772. Vessel representation 752 is a 3D representation that includes graphics showing emissive surfaces/vessels within a T3 space type. The surfaces shown include a left wall surface 760, a left diagonal surface 762, a front wall surface 764, a right diagonal surface 766, a right wall surface 768 and a rear wall surface 770 (shown in top plan view because of the illustrated point of view in FIG. 28).

It has been recognized that in the case of large emissive surfaces like a wall covering surface, an instantiator may prefer to define a set of customized vessels as opposed to using the vessel sets pre-specified in the system templates. Thus, for instance, instead of using the nine front wall vessels defined by the template set above for a T3 type space (see again vessels for front wall 80 shown in FIG. 5), a conferee may prefer one large main vessel centrally located on the front wall that extends into several of the pre-specified vessels. To this end, see the vessel 774 shown in phantom in FIG. 28. In at least some cases the customization features will enable a conferee to specify customized divisions of emissive space surfaces into customized vessels.

Referring still to FIG. 28, in at least some embodiments, the vessel representation 752 may also operate as a vessel defining tool. To this end, pointing icon 240 may be moved to a location on one of the emissive surface representations (e.g., 764) and controlled to select a vessel on the representation. Here, vessel selection may including selecting a point on the representation and dragging diagonally to another point to define a rectangular space 774. Once released, the space is defined. Here, vessel size and location may be changed using a set of conventional graphics drawing tools. While only one customized vessel 744 is shown in FIG. 28, it is contemplated that a conferee could define many other customized vessels at different locations.

Figure 29:
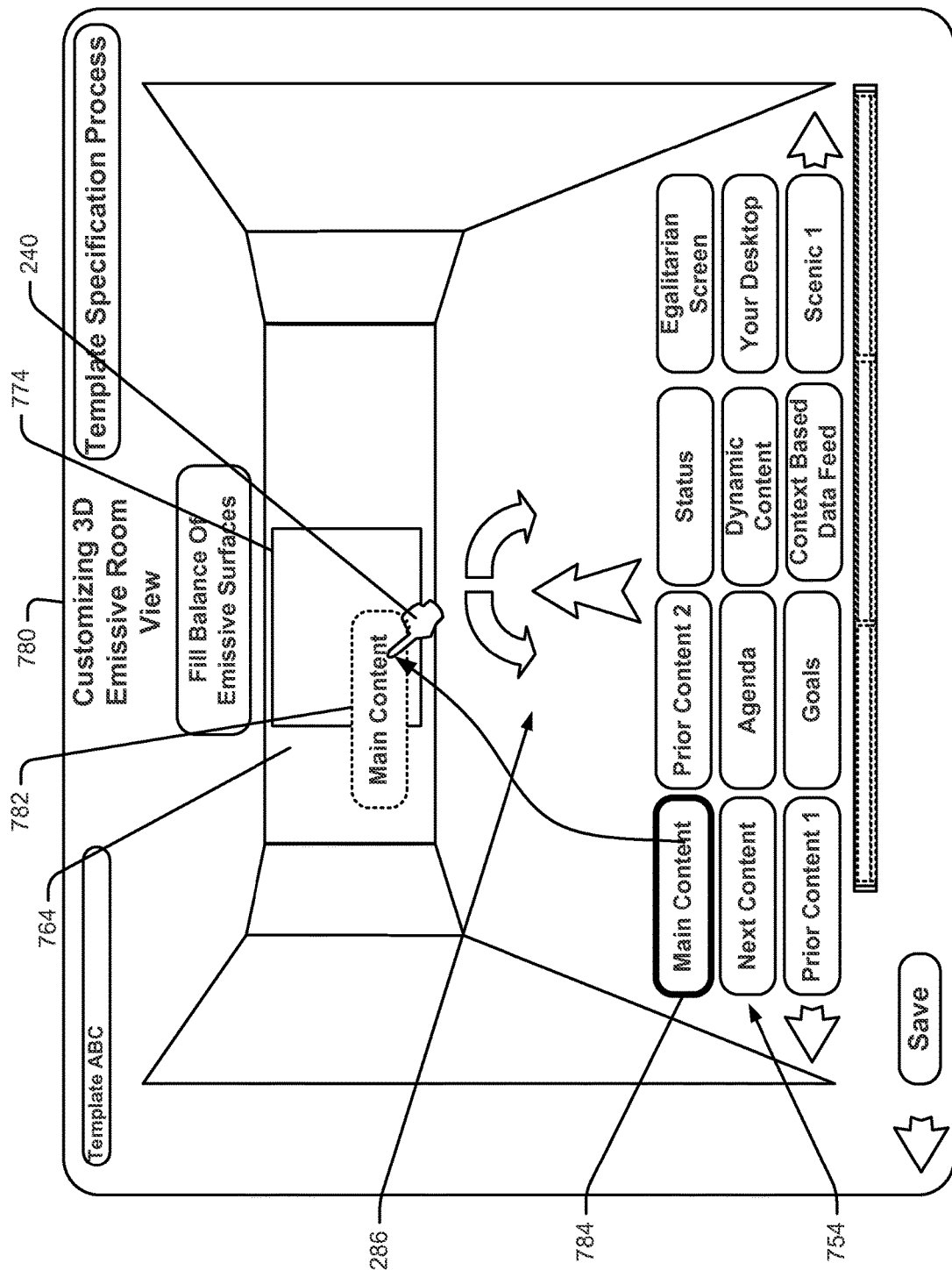
FIG. 29 is an image of a browser screen that may be presented as an interface that is similar to FIG. 28, albeit at a different point in the vessel/content specifying process.
Figure 30:
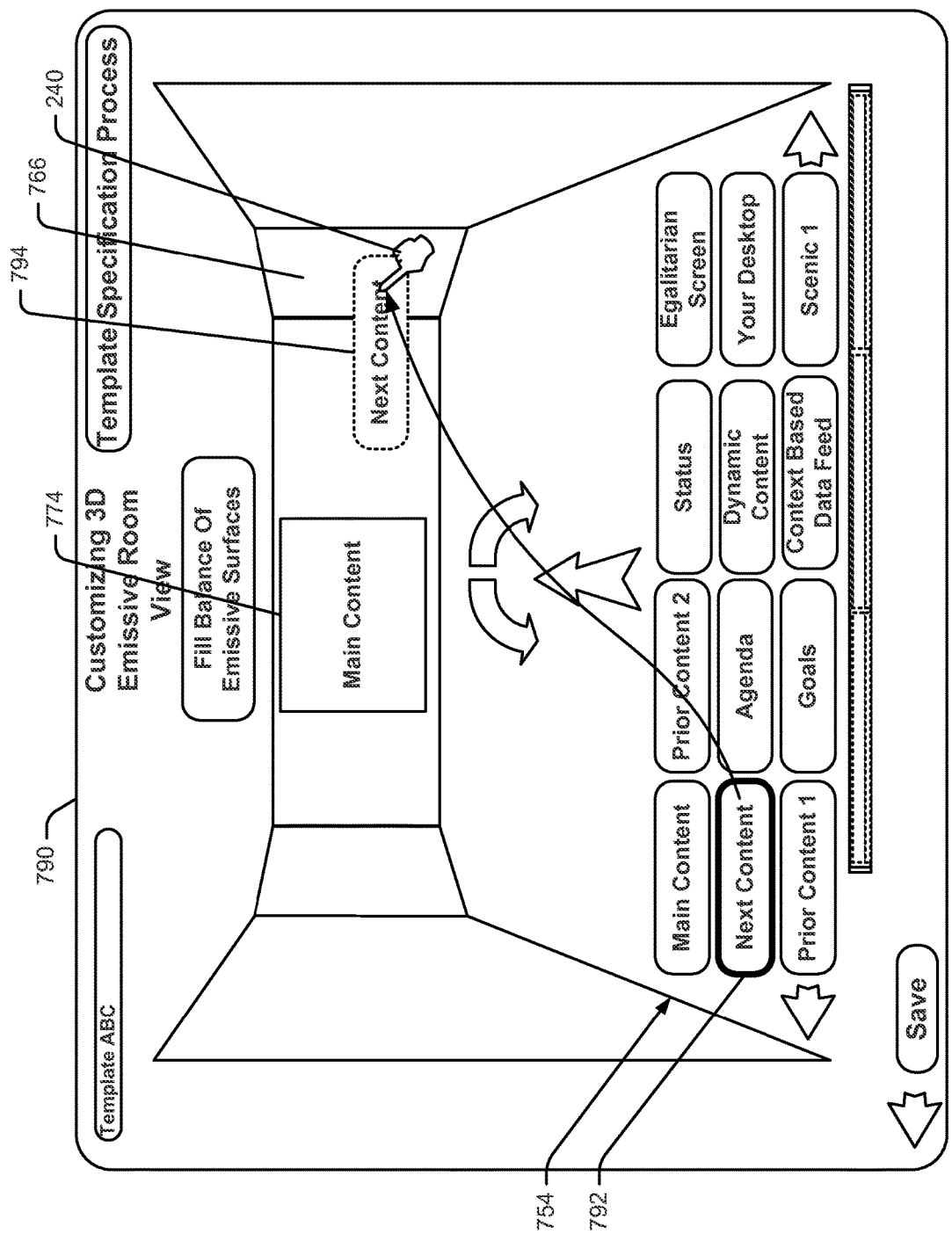
FIG. 30 is an image of a browser screen that may be presented as an interface that is similar to FIG. 28, albeit at a different point in the vessel/content specifying process.

Once a customized vessel has been specified, a content type may be associated with the vessel. To this end, see the FIG. 29 interface 780 where a main content icon is highlighted to indicate selection at 784 and is dragged as indicated by phantom icon 782 to the newly defined vessel 744. Once icon 782 is released in vessel 744, a "Main Content" text indicator may be presented in vessel 744 as shown in FIG. 30 to indicate that main content has been associated with vessel 744.

In at least some cases when a content type is moved to an emissive surface vessel representation that has not been divided into different sub-vessels, the content type may be associated with the entire target vessel. In this regard, see FIG. 30 where a screen 790 shows a Next Content icon highlighted to indicate selection and phantom icon 794 indicates a dragging action to the diagonal wall surface vessel representation 766. Once dropped on representation 766, the next content type content is associated with the entire wall that is associated with surface 766. See FIG. 31 where a screen 800 shows next content textually indicated on wall 766 to indicate association. Here, the content associated with an entire emissive surface may be formatted to best fit that surface. For instance, if the diagonal wall is vertically rectangular and the next content is horizontally rectangular, the size of the horizontal next content may be controlled so that its width mirrors the width of the diagonal wall. Other automated formatting processes are contemplated.

Figure 31:
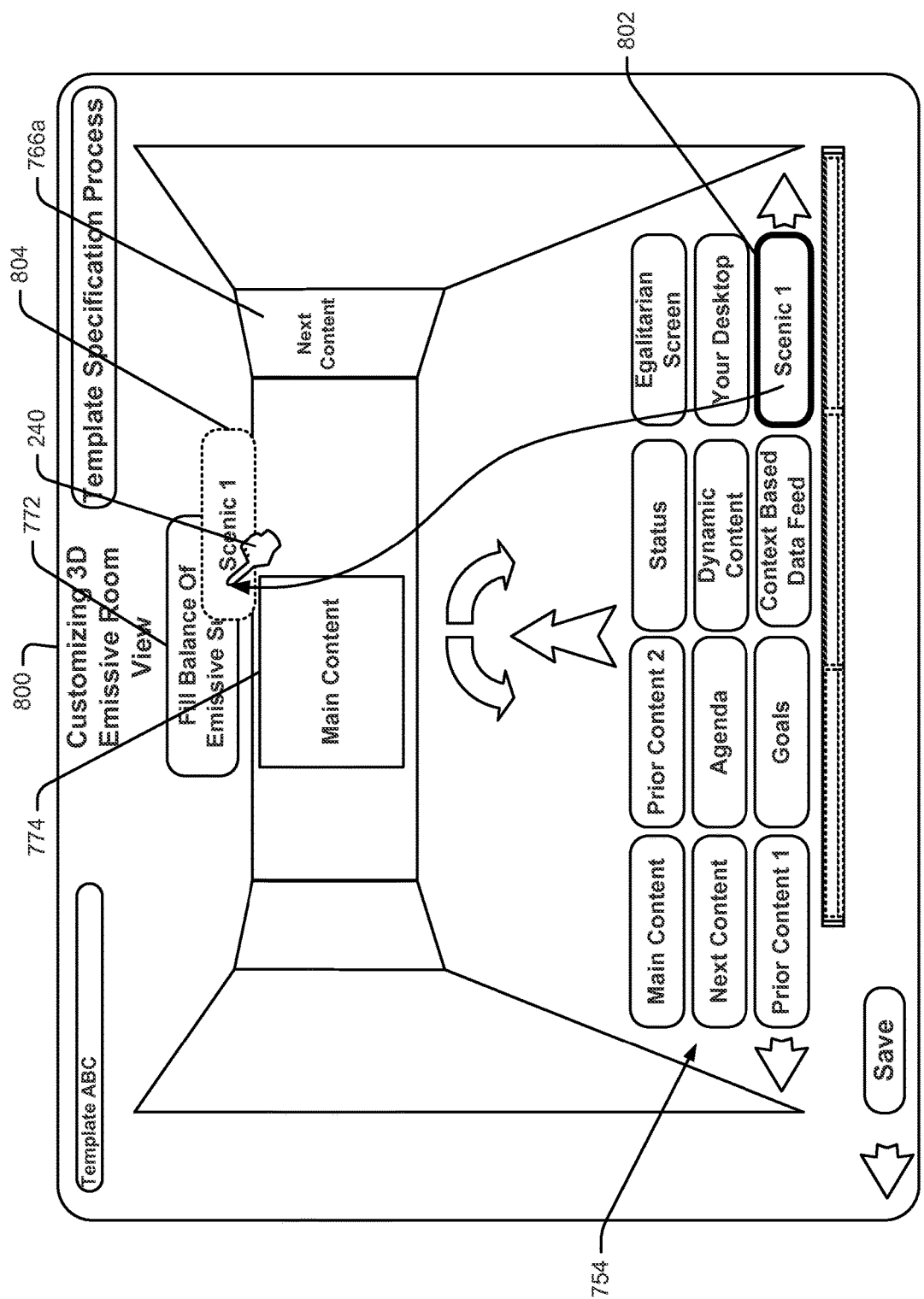
FIG. 31 is an image of a browser screen that may be presented as an interface that is similar to FIG. 28, albeit at a different point in the vessel/content specifying process.
Figure 32:
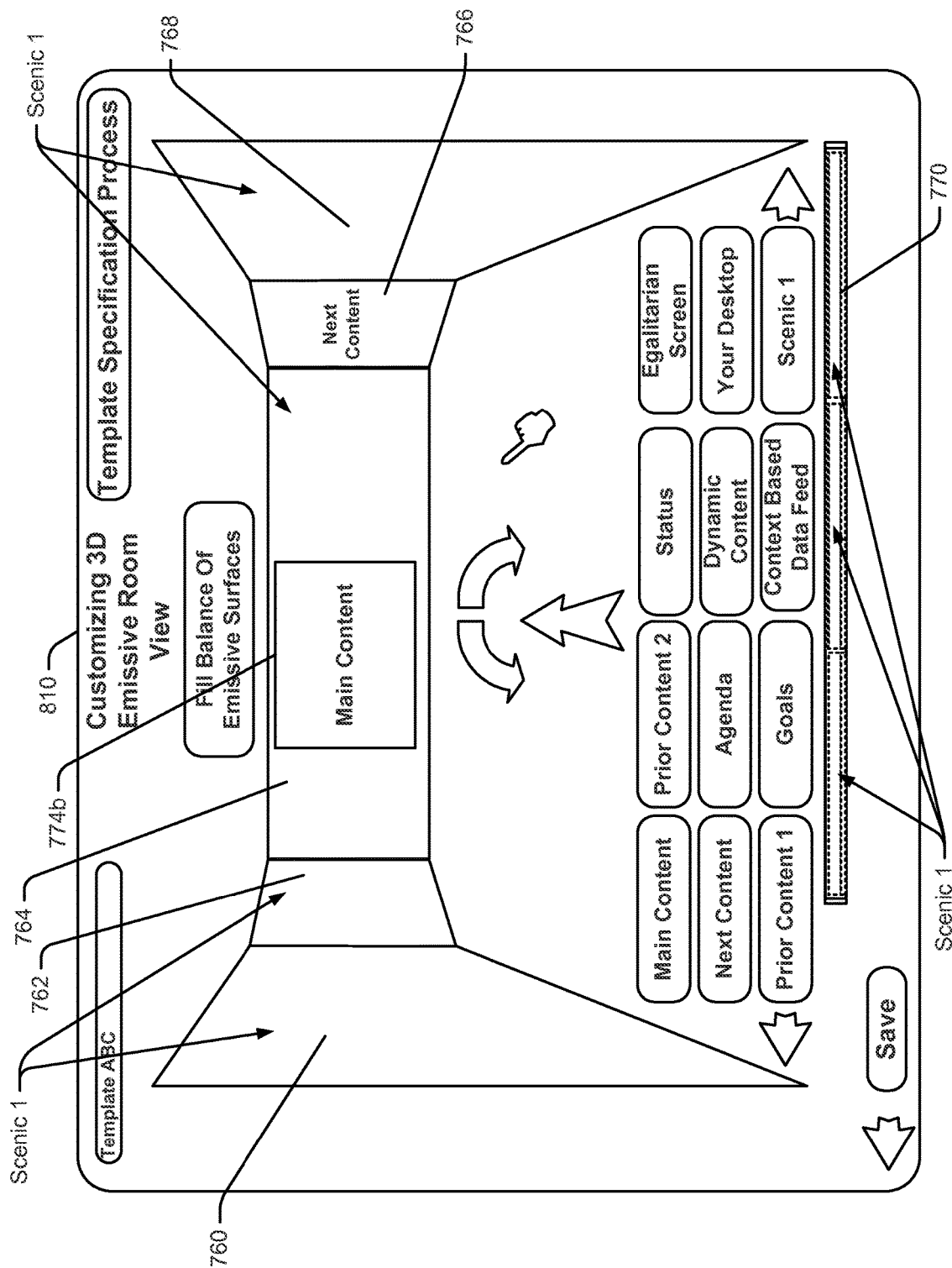
FIG. 32 is an image of a browser screen that may be presented as an interface that is similar to FIG. 28, albeit at a different point in the vessel/content specifying process.

Referring to FIG. 31, representation 772 represents all emissive vessels within a vessel representation that do not already have a content type associated therewith. For instance, in FIG. 32 content types are only associated with vessel 774 and wall representation 766 and no other content types are associated with any other emissive surface vessels. To associate a specific content type with all of the emissive surface vessels that have not already been associated with a content type, the instantiator can simply select a content type from list 754 and drag that type to representation 772. For instance, see in FIG. 31 that a Scenic 1 icon 802 is highlighted to indicate selection and phantom icon 804 shows a dragging action to representation 772. Once icon 804 is dropped in representation 772, the scenic 1 content type is associated with all of the emissive surface space other than the fields previously associated with other content types. In this regard, FIG. 32 shows Scenic view 1 content associated with all emissive surfaces other than field 774 and diagonal wall 766.

It has been recognized that in at least some cases an instantiator may want different content types to be presented via one or more emissive vessels at different times as a session progresses. Here, content type changes may be tied to specific times during a session period or to the progression of content during the session. For instance, referring again to FIG. 4, during the first five minutes of a session, a conferee may want a session agenda presented on left front wall vessel 48. After the first five minutes and prior to the last 5 minutes scheduled for a session, the conferee may want a context data feed presented on vessel 48 and during the last five minutes of the session the conferee may want the agenda again presented on vessel 48. Here, content changes are controlled by a clock associated with a system server.

Instead of linking content changes to time, content changes may be linked to the progression of content presentation during a session. For instance, referring yet again to FIG. 4, a conferee may want a session agenda to be presented via vessel 48 during the first three of fifty sequential main content images. Once the fourth of the sequence of main content images is presented, the conferee may want a context data feed to be presented via vessel 48 and during the last three images in the sequence the conferee may want the agent re-presented on vessel 48.

Figure 33:
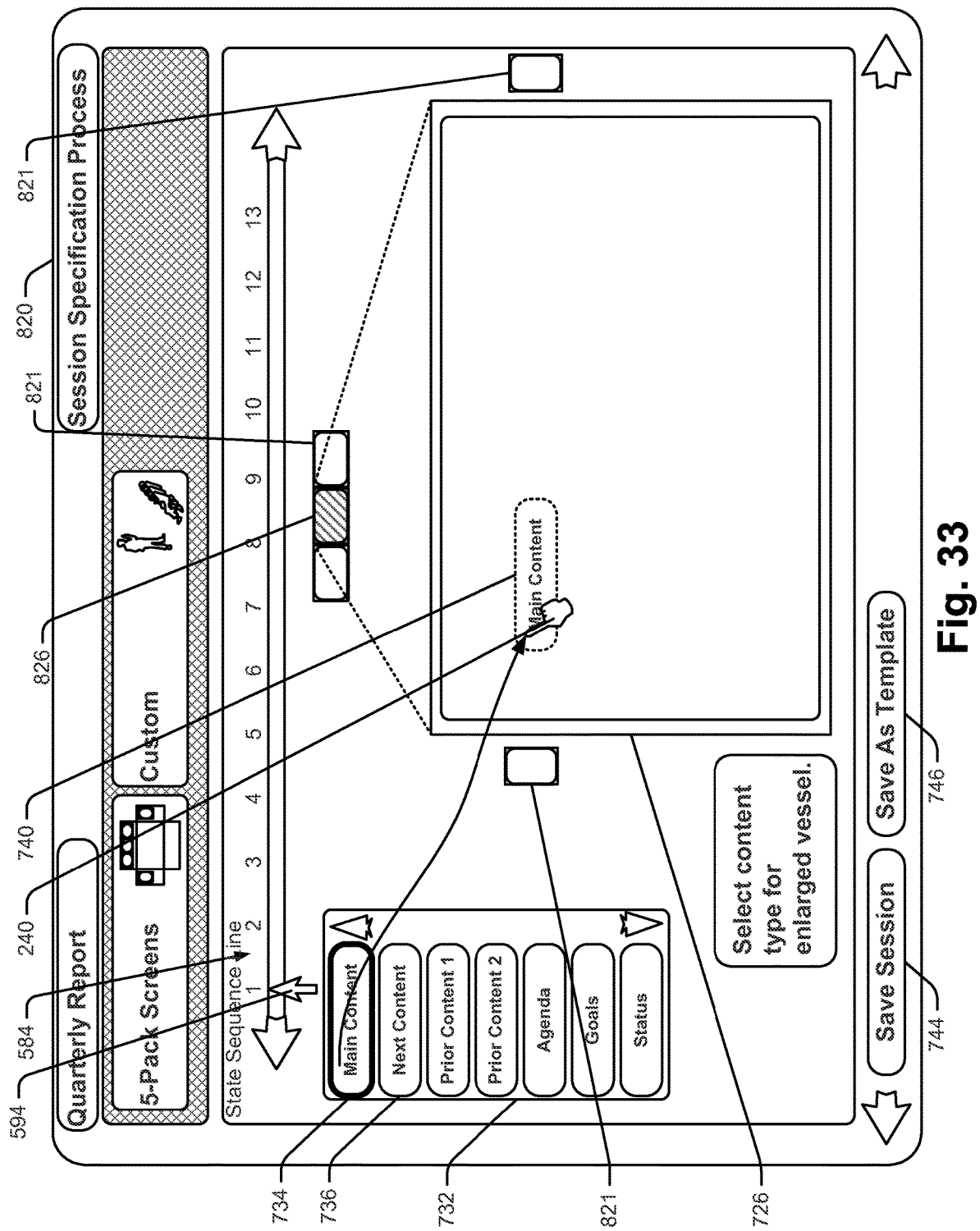
FIG. 33 is similar to FIG. 27, albeit showing that different customized content types can be specified for different space vessels for different times during a session.

Referring to FIG. 33, an interface 820 for associating different content types with space vessels at different points along the progression of session content is illustrated. In FIG. 33, a state sequence line 584 is provided that includes numbers corresponding to different session states and a state selection icon 594 that can be moved about along the sequence line to select different session states. Interface 820 also includes a vessel representation 821 including separate representations for each vessel in a five screen T2 type space, a content specifying window 726, a content type options window 732 and save session and save as template icons 744 and 746, respectively. Here, an instantiator selects a state from line 584 using pointer 594, selects one of the display representations (e.g., 826) from the orientation representation 821 and then associates a content type from window 732 with window 726. Again, associating a content type with window 726 includes selecting a content icon from window 732 (see highlighted icon 734) and dragging that icon as shown in phantom at 740 into window 726 and releasing the phantom icon in window 726. Other vessel representations I representation 821 are next selected and content types for each of those display representations for the specific state are specified.

In at least some embodiments it is contemplated that when a content type is specified for a specific vessel and a specific state in the sequence associated with line 584, the content type for the display will be automatically duplicated for following states until a content type change for one of the subsequent states is specified. Thus, for instance, in FIG. 33, once main content is associated with state "1" and vessel representation 826, unless some other content type is specified or has previously been specified for one of the subsequent state (e.g., states "2", "3" etc.), main content will be associated with the subsequent states for vessel representation 826.

Figure 34:
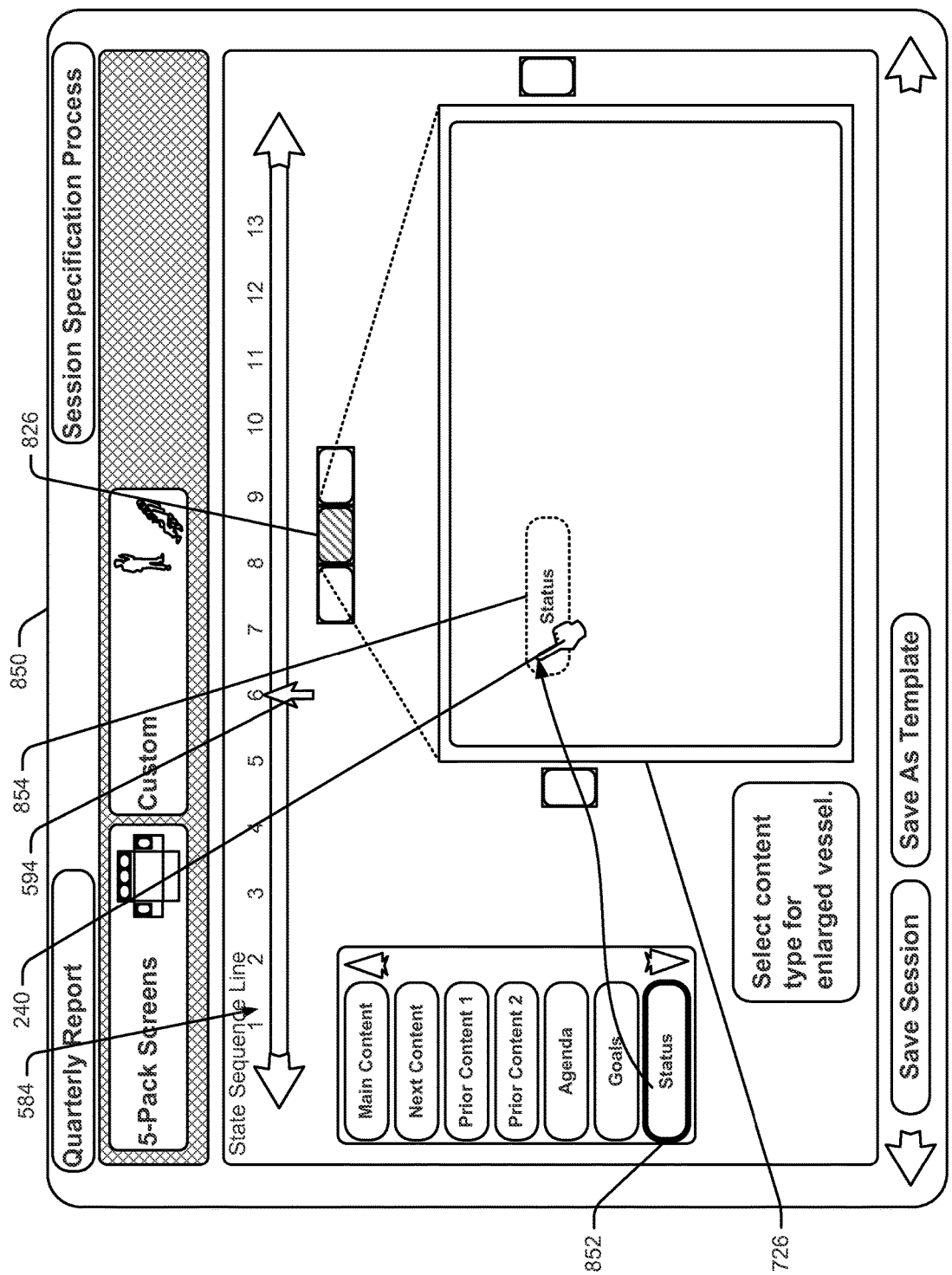
FIG. 34 is similar to FIG. 33, albeit showing a different time of specifying content types for specific space vessels.
Figure 35:
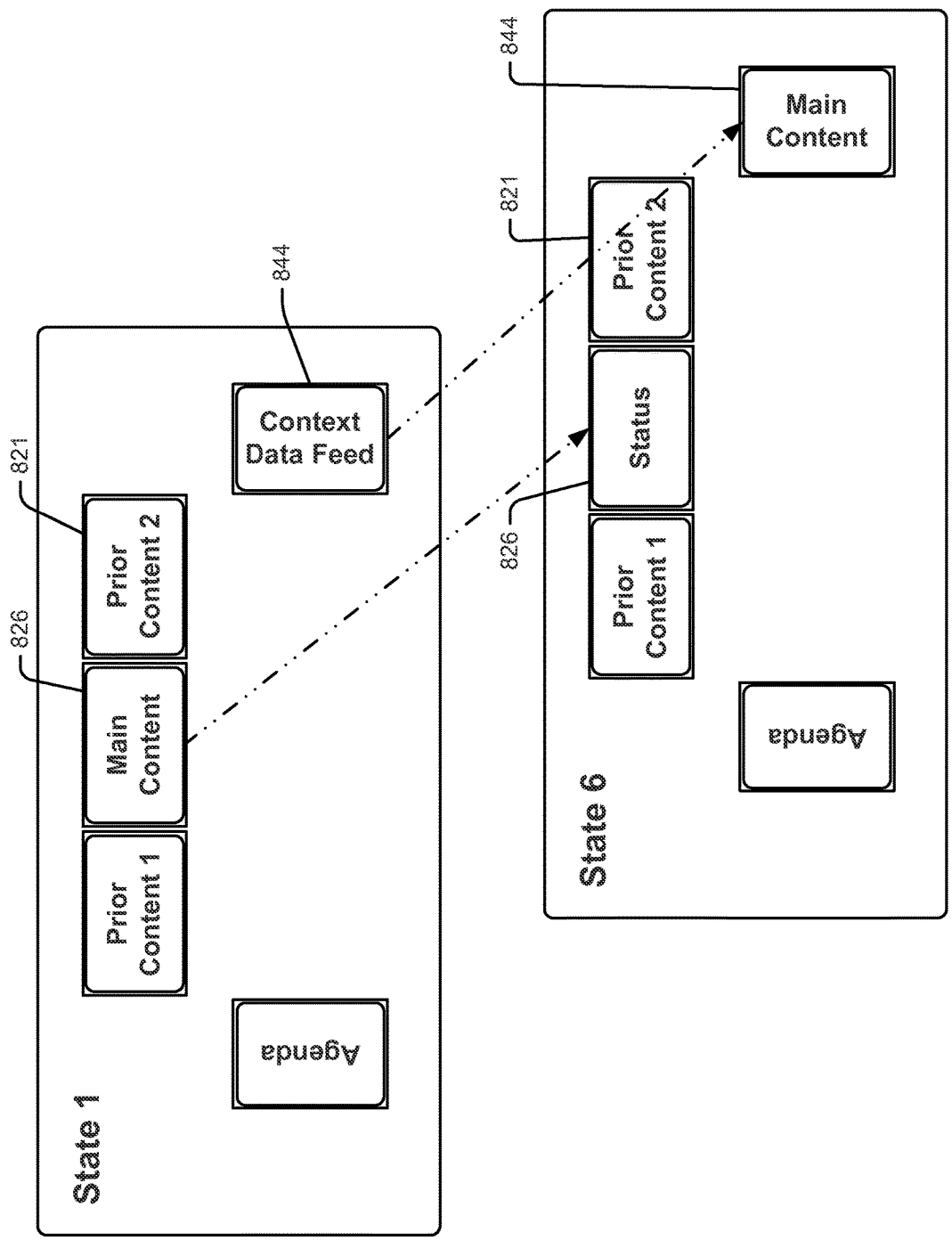
FIG. 35 is a schematic diagram showing different content types presented in different space vessels for a FIG. 4 space type at different points during a session.

Referring to FIG. 34, an interface 850 that is similar to the FIG. 33 interface is shown, albeit where a sixth state as opposed to the first state is selected via icon 594. As in FIG. 33, display representation 826 is selected so that window 726 corresponds to display representation 826. As shown, a status content icon 852 is highlighted to indicate selection and phantom icon 854 is shown after being dragged into window 726 to associate status content with vessel representation 826. Thus, different content types, main content and status content, are associated with vessel representation 826 and an associated space vessel in the first and sixth states. FIG. 35 illustrates the state 1 to state 6 transition. To this end, see that during state 1, main content and a context data feed are associated with vessel representations 826 and 844 while, during state 6, status content and main content are associated with vessel representations 826 and 844.

Figure 36:
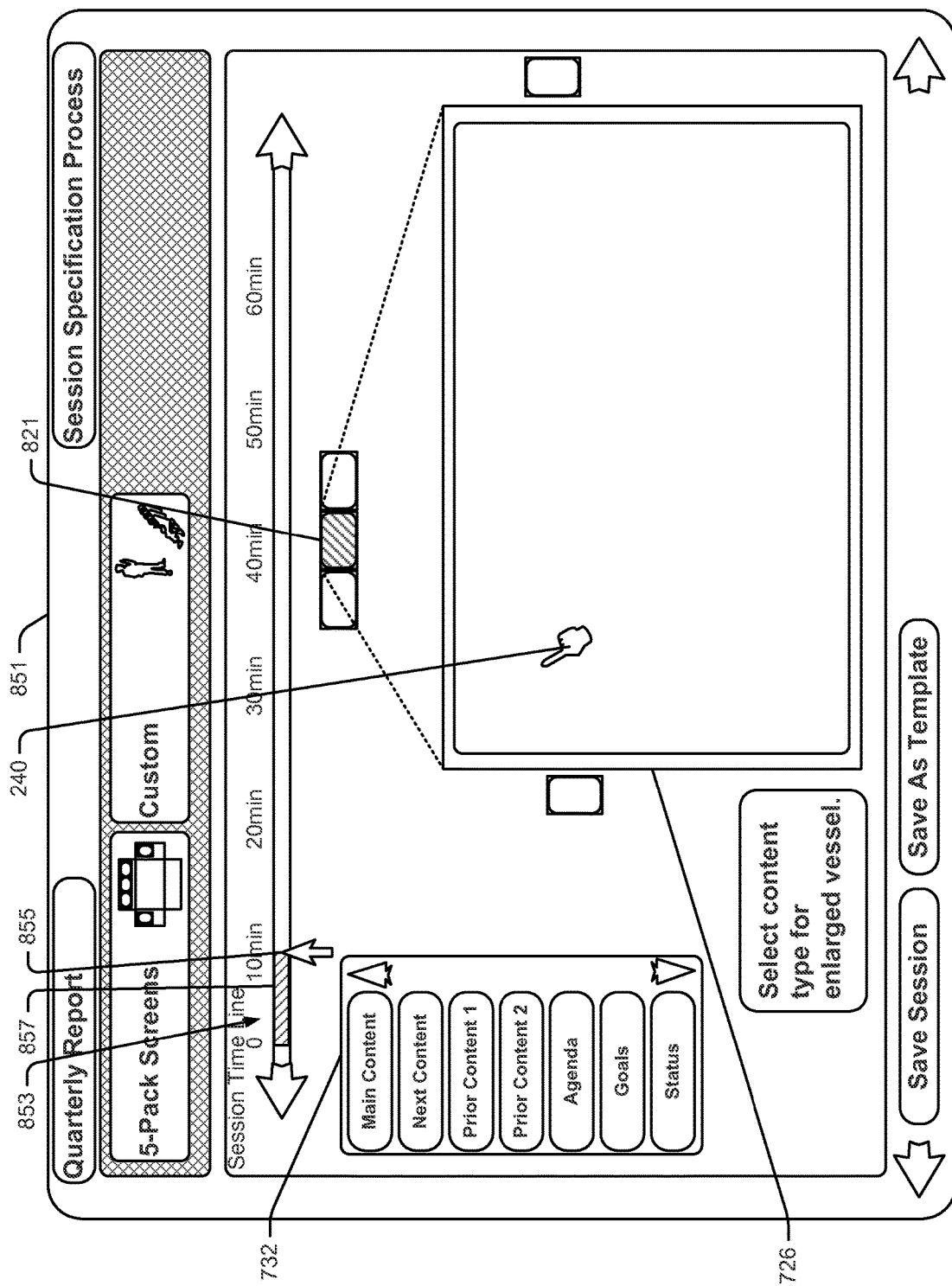
FIG. 36 is similar to FIG. 34, albeit showing that content types to be presented in space vessels during a session may be customized to change as a function of time as opposed to the point in progression of session content during an ongoing session.

Referring to FIG. 36, an interface 851 for associating different content types with space vessels at different times (as opposed to at different points in session content presentation) during a session period is illustrated. In the illustrated example it is assumed that a session is scheduled to take 60 minutes. Although not shown, the session specifying tools may enable an instantiator to specify a session duration or period. In FIG. 36, a session time line 853 is provided that includes sub-periods that divides the session period into smaller durations and a time selection icon 855 that can be moved about along the time line to select different session sub-periods. Interface 851 also includes a vessel representation 821, a content specifying window 726, a content type options window 732 and save session and other features that are akin to similarly labelled featured in FIG. 33. Here, an instantiator selects a time sub-period from line 853 using pointer 855. In some cases a sub-period selection window 857 may be moveable on the time line 853 where the sub-window has some default period (e.g., 10 minutes) associated therewith. Once the selection window 857 is placed, the duration thereof may be altered by selecting a left or right edge of the window 857 and dragging inward or outward to adjust duration. After selecting a sub-period on line 853, the instantiator selects one of the display representations from the vessel representation 821 and then associates a content type from window 732 with window 726. Other sub-periods, vessel representations and content types may be selected to associate different content types with different space vessels at different times.

While the interfaces of FIGS. 33 and 36 and associated processes are described above independently, it should be appreciated that at least some systems may allow an instantiator to specify both time and content progression changes to content types on different space vessel screens to meet user preferences. Thus, for instance, referring yet again to FIG. 4, during the first five minutes of a scheduled session period a conferee may want a session agenda presented on left front wall vessel 48 after which a context data feed is presented until the last five main content images are presented at which point the agenda content should again be presented. Here, the first content type transition is time based while the second is content progression based.

Figure 40:
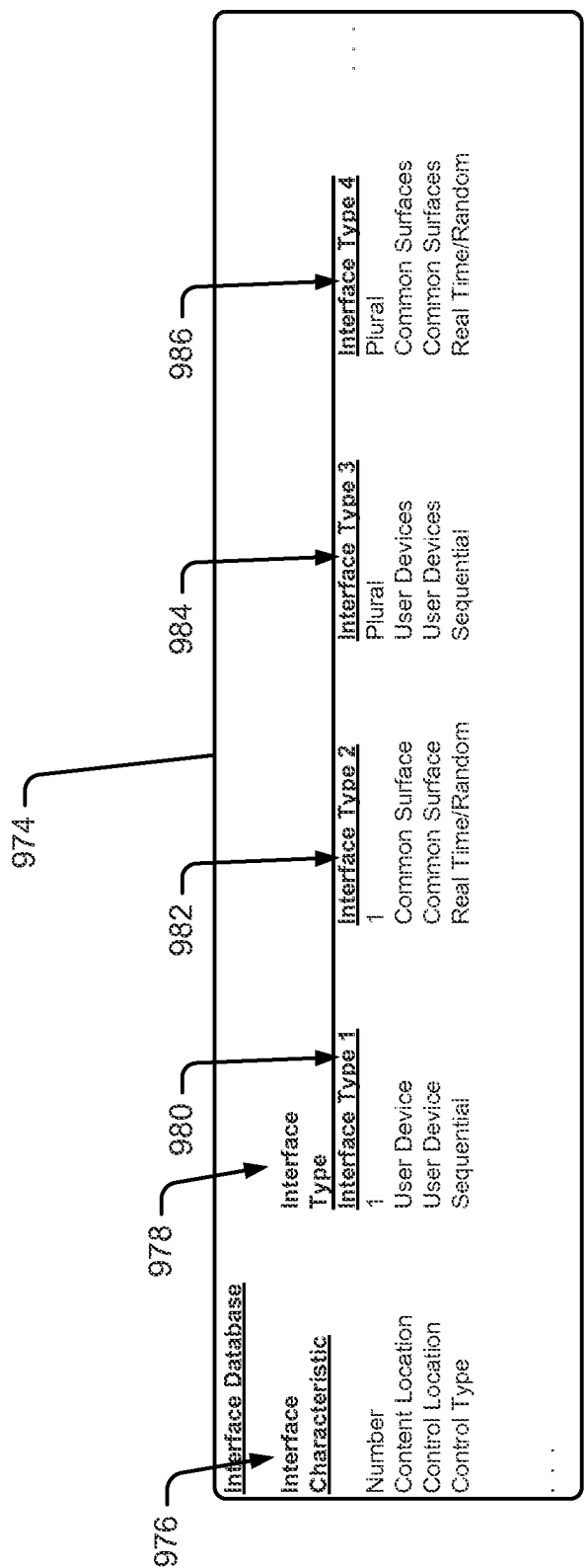
FIG. 40 is a schematic of an interface database that specifies different interface types that are supported by an exemplary system.
Figure 50:
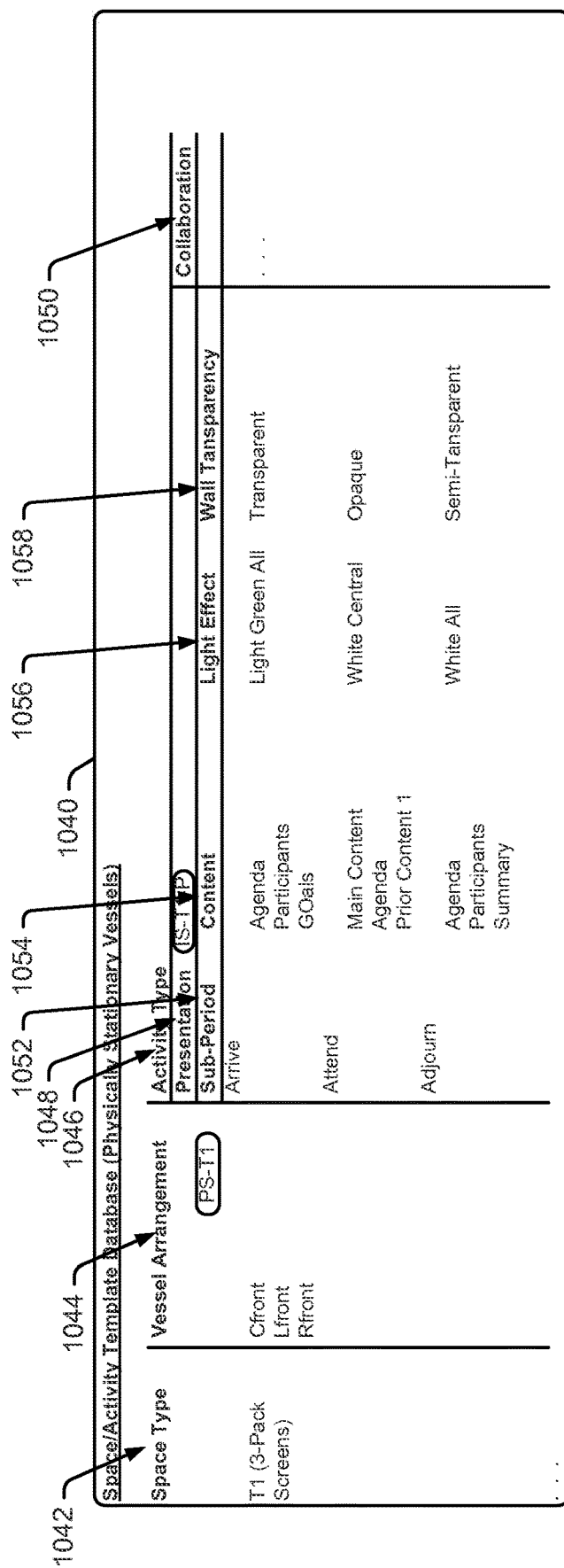
FIG. 50 is a schematic of a space/activity template database that also includes templatized lighting and wall specification for controlling space lighting and wall transparency differently based on space/activity combinations selected by an instantiator.

In at least some cases space/activity templates may be predefined to include content type changes during progression of a session. For instance, one template may specify that different content types be presented on space vessels during an arrival period prior to the time a session is scheduled to commence, during the beginning of a session period and proximate the end of a scheduled session period. Hereinafter, unless indicated otherwise, the periods prior to a session, during the beginning of the session and near the end of the session will be referred to as "arrive", "attend" and "adjourn" periods. Referring ahead to FIG. 50, an exemplary space/activity template database 1040 that includes templates that specify content types that change during a session activity is illustrated. Database 1040 is similar to the FIGS. 6A and 6B database described above and includes a space type column 1042, a vessel arrangement column 1044 and an activity type column or section 1046. The space type column 1042 includes a list of space types supported by the system. While only space type T1 is shown in FIG. 40, other space types T2 and T3 as described above would also be included in database 1040.

Column 1044 lists the set of emissive surface vessels that are associated with each space type in column 1042. In the present example, the vessels associated with space type T1 include the center front, left front and right front displays as shown at 48, 50 and 52, respectively, in FIGS. 1 and 2. Activity section 1046 includes a separate subsection for each of the activities supported by the system. In FIG. 50 only two subsections are shown, one 1048 corresponding to a presentation activity and a second 1050 corresponding to a collaboration activity. Only section 1048 is shown with some detail but similar detail would be specified for each of the other activity sections (e.g., 1050, etc.).

Presentation subsection 1048 include several different columns including, among others, a sub-period column 1052 and a content column 1054. Sub-period column 1046 lists the arrive, attend and adjourn sub-periods. Content column 1054 indicates content types for each space vessel/sub-period combination defined by columns 1044 and 1046. In the FIG. 50 example, there are nine separate vessel/sub-period combinations include center front arrive, left front arrive, right front arrive, center front attend, left front attend, right front attend, center front adjourn, left front adjourn and right front adjourn, for which column 1054 specifies content types agenda, participants, goals, main content, agenda, prior content 1, agenda, participants and summary, respectively. Appreciate that the content types presented on the center front vessel (see 50 in FIG. 2) change from an agenda during the arrive period to main content during the attend period and finally back to the agenda during the adjourn period. Similarly content types on the left front and right front vessels also change during session sub-period transitions.

While the FIG. 50 example shows content changing during sub-period transitions on all space vessels, in some cases one or more templates will specify content type changes for different space vessels at different times. For instance, referring again to FIG. 4, in some cases a template may specify a persistent content type on left wall vessel 66 during an entire session while changing content type on other vessels (e.g., 48, 50, 52) at different times during an ongoing session.

There are two general types of systems described above for specifying session content including template based systems and customizable systems. A hybrid system is also contemplated where an instantiator may start with a template associated with a space/activity combination and may alter some part of that template specification to support or allow instantiator preferences. For instance, an instantiator may select a T2/presentation combination and may be presented with interfaces designed to obtain content from the instantiator to populate template specified vessels with specific types of content. Customize icons akin to icon 456 in FIG. 17 may be provided on all interfaces so that the instantiator can modify content types in specific vessels at different times or during different session states. Thus, advantages associated with templates can be combined in a hybrid system with customizing tools to support any instantiator preferences.

It has also been recognized that, in addition to wanting to specify different content types in different vessels at different times or points of content presentation during a session, an instantiator may also want vessel changes during progression of a session in a customized fashion. To this end, see again FIGS. 28 and 29 that show how an instantiator may specify a customized field at 774. In at least some embodiments it is contemplated that a time line or a state sequence line akin to line 584 in FIG. 33 may be presented via an interface like the FIG. 29 interface so that an instantiator can define customized fields that change during session progression. Thus, for instance, field 774 may be presented during state 7 in a session sequence but may be eliminated, moved, or otherwise (e.g., size, shape, etc.) altered during a state 8 in the sequence.

Figure 37:
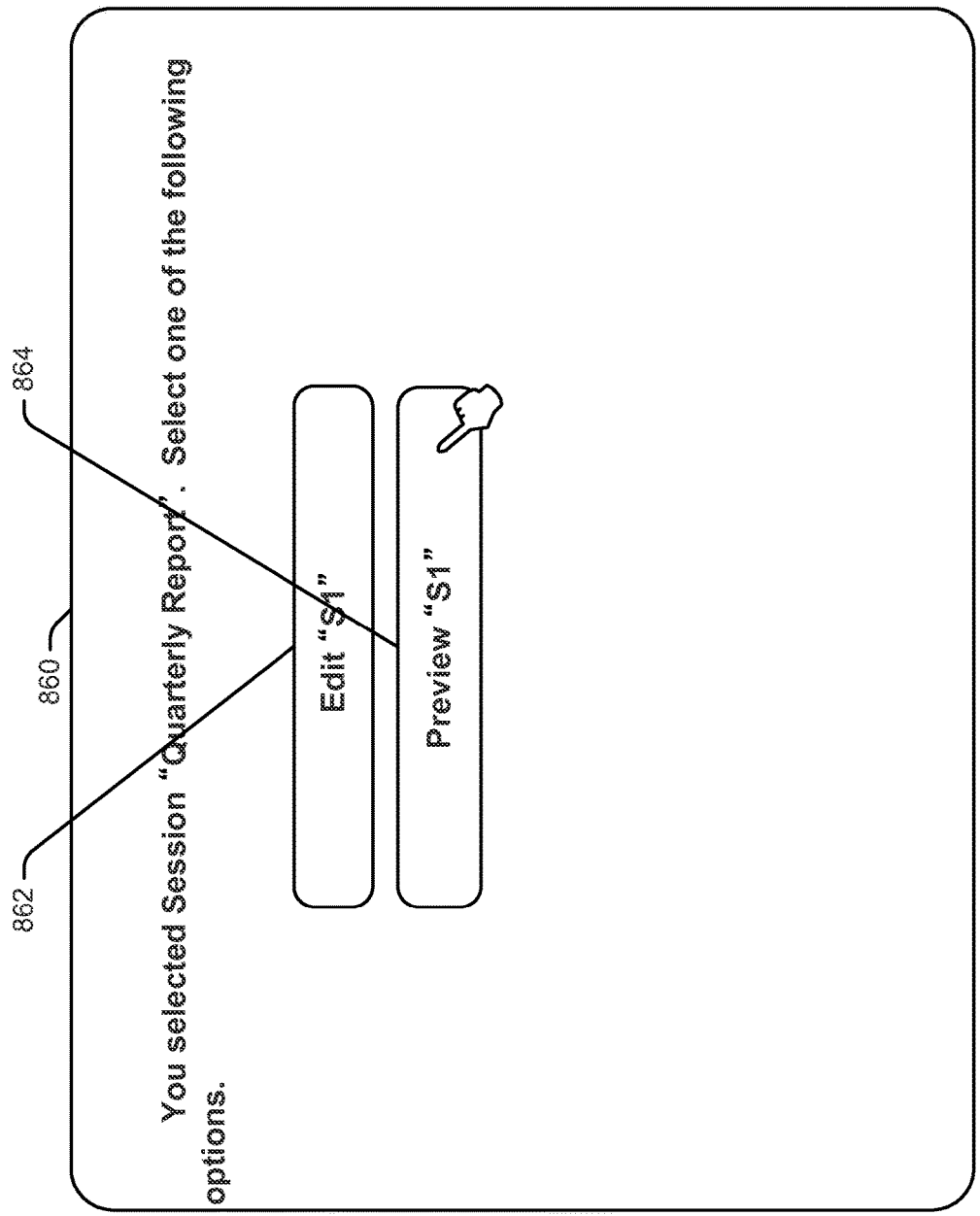
FIG. 37 is an image of a browser screen that may be presented as an interface that is consistent with at least some aspects of the present disclosure.

After a space type, activity type and session content have been at least partially specified and stored in database 46 (see again FIG. 8), an instantiator may want to view the session content to experience the content progression, practice a presentation or other activity prior to the time scheduled for a session, or for some other purpose. It is contemplated that the present system will facilitate virtual viewing of session content. To this end, referring again to FIG. 10, when a conferee selects an existing instantiated session at 236, a system server may present interface 860 shown in FIG. 37 giving the conferee the option to either edit the existing session 862 or to preview the existing session 864. If icon 862 is selected, content type and content specifying interfaces like those described above would be presented for the conferee to alter content specified for the session. When icon 864 is selected, a preview interface is opened so that the conferee can view all of the session content in a virtual representation that mirrors how the content will be presented during an actual session.

Figure 38:
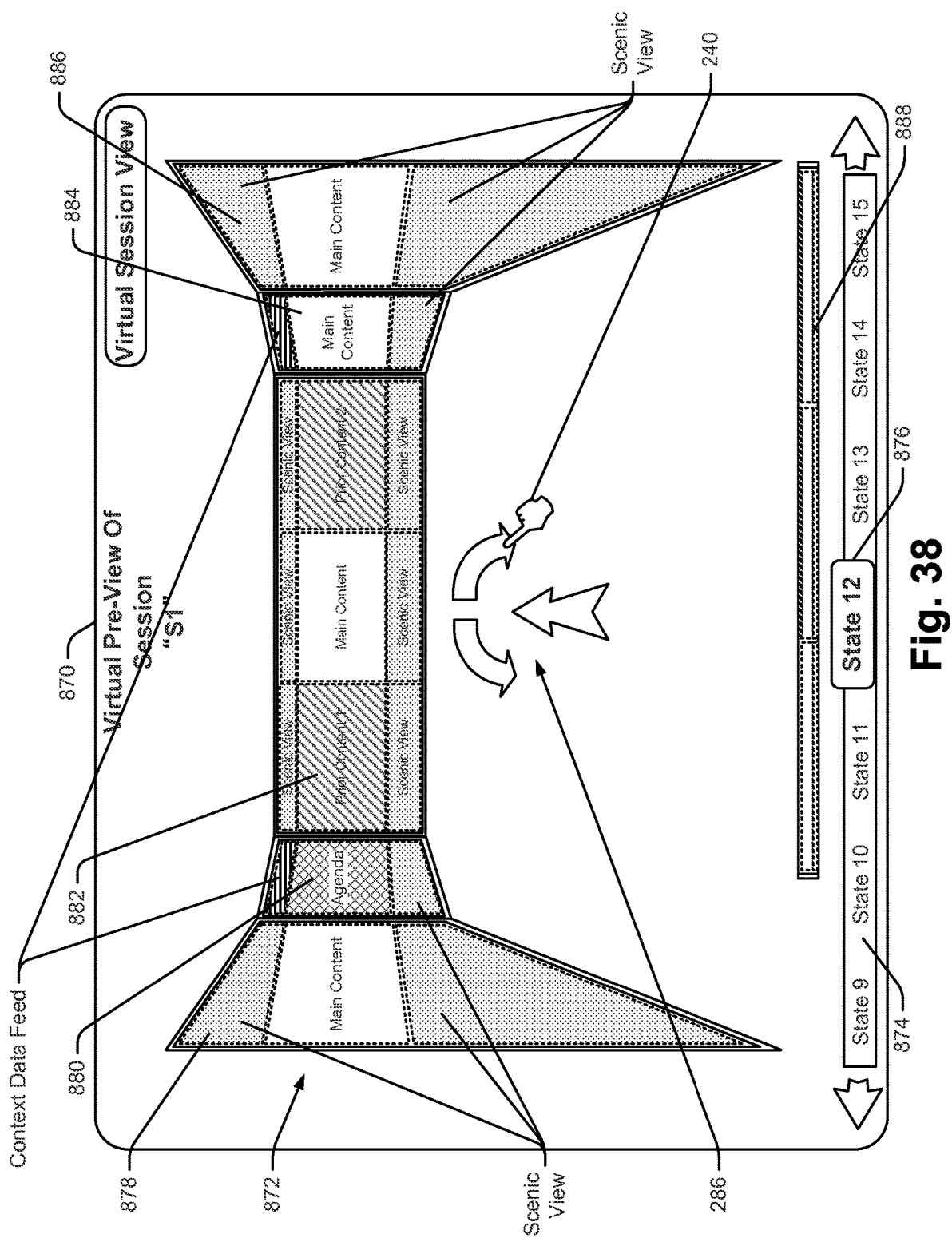
FIG. 38 is an image of a browser screen that may be presented as an interface during preview of a fully or partially specified session to see a 3D view of the FIG. 5 emissive room space where all session content is presented in fields associated with real space vessels.

Referring now to FIG. 38, an exemplary session preview interface 870 is shown that orients a conferee within a virtual representation of an exemplary emissive room T3 type space by presenting an emissive vessel representation 872. Representation 872 includes virtual emissive surfaces 878, 880, 882, 884, 886 and 888 that are juxtaposed with respect to each other to mirror the positions of T3 space emissive surfaces 88, 90, 90, 82, 84 and 86, respectively, shown in FIG. 5. Again there is a navigation tool set 286 useable to change the point of view of the conferee within the virtual space so that the conferee can move toward specific fields to enlarge presented content, can rotate within the virtual space to face different emissive surfaces, etc. Where different vessels are provided on an emissive surface, the vessels are distinguished by the different types of content presented in adjacent vessels. A state sequence line 874 is presented along a lower edge of the pre-view interface that includes a list of session states and a state selection box 876 placed about an instantaneous selected state to indicate which state content is being presented via the representation 872 above.

Pointing icon 240 is useable to select any of the tools 286 or to interact with the state sequence line 874. As different states are selected, the content presented in the vessels in representation 872 is changed to show how that content will change during a subsequent actual session. Thus, for instance, the content types indicated in FIG. 38 show real session content for state 12 as selected at 876. If the conferee selects state 14, the content presented in representation 872 would change to reflect the state 14 content, and so on. Here, content changes may include progressing along content of a specific type (e.g., a Power Point type presentation in a main content field), changing content type (e.g., transition from a context data feed to a session agenda), changing presentation fields (e.g., removing a field like field 774 in FIG. 29, changing field location, changing field dimensions or other attributes, etc.), or any combination of the above for each of the fields presented in representation 872.

In addition to specifying space/activity combination content types and facilitating entry of that information, in at least some embodiments it is contemplated that a system may also support several different types of interfaces and that a template may include information specifying specific types of interfaces for specific space/activity combinations. For example, where a first conferee is presenting to other conferees during a presentation activity, an optimal interface may include virtual controls on a personal laptop computer used by the first conferee (e.g., the first conferee's portable device). Here, because the activity is controlled by a single conferee, there is no need to provide interfaces for other conferees. In addition, by not providing interfaces for the other conferees, the other conferee's are not confused into thinking they have control over session content.

In contrast, where at least a subset of emissive surface vessels within a space are provided for egalitarian control where any conferee can replicate her laptop desktop image in any one or a subset of the vessels, an optimal interface setup would require controls for each of the conferees that can share their desktops and for selecting any one or a subset of the egalitarian vessels. Many other factors may influence interface types.

In at least some embodiments it is contemplated that interface types will be characterized by four different attributes including number, content location, control location and control type. Number refers to the number of interfaces that are provided within a space. For instance, again, in the case of a single conferee presentation, only one interface should be specified while in the case of an egalitarian sharing activity, a separate interface may be provided for each of the conferees that attends the session (e.g., five conferees, five separate control interfaces).

Content location refers to where a conferee's private view of content that may be developed or shared should be located. One location for a conferee's private view is on the display screen of a portable computing device (e.g., laptop, tablet, etc.) used by the conferee. Thus, as described above, a desktop image presented on a laptop display may comprise the conferee's private view. Another option for the location of a conferee's private view may be in an interface vessel that is provided on a portion of a common emissive surface within a conference space. For instance, in at least some cases it is contemplated an interface required by a conferee during a session will be provided automatically in a vessel proximate the conferee on an emissive table top surface. For example, see FIG. 2 and FIG. 3 that show an exemplary virtual conferee interface 54 for a conferee that occupies chair 34a. Here, in at least some cases it is assumed that cameras 26 or other sensor devices associated with space 20a may be able to identify locations of conferees within space 20a and may also be able to determine conferee identities within the space 20a. Here, where a conferee requires an interface, a system server would present the interface 54 in a virtual vessel at the conferee's location.

Figure 3:
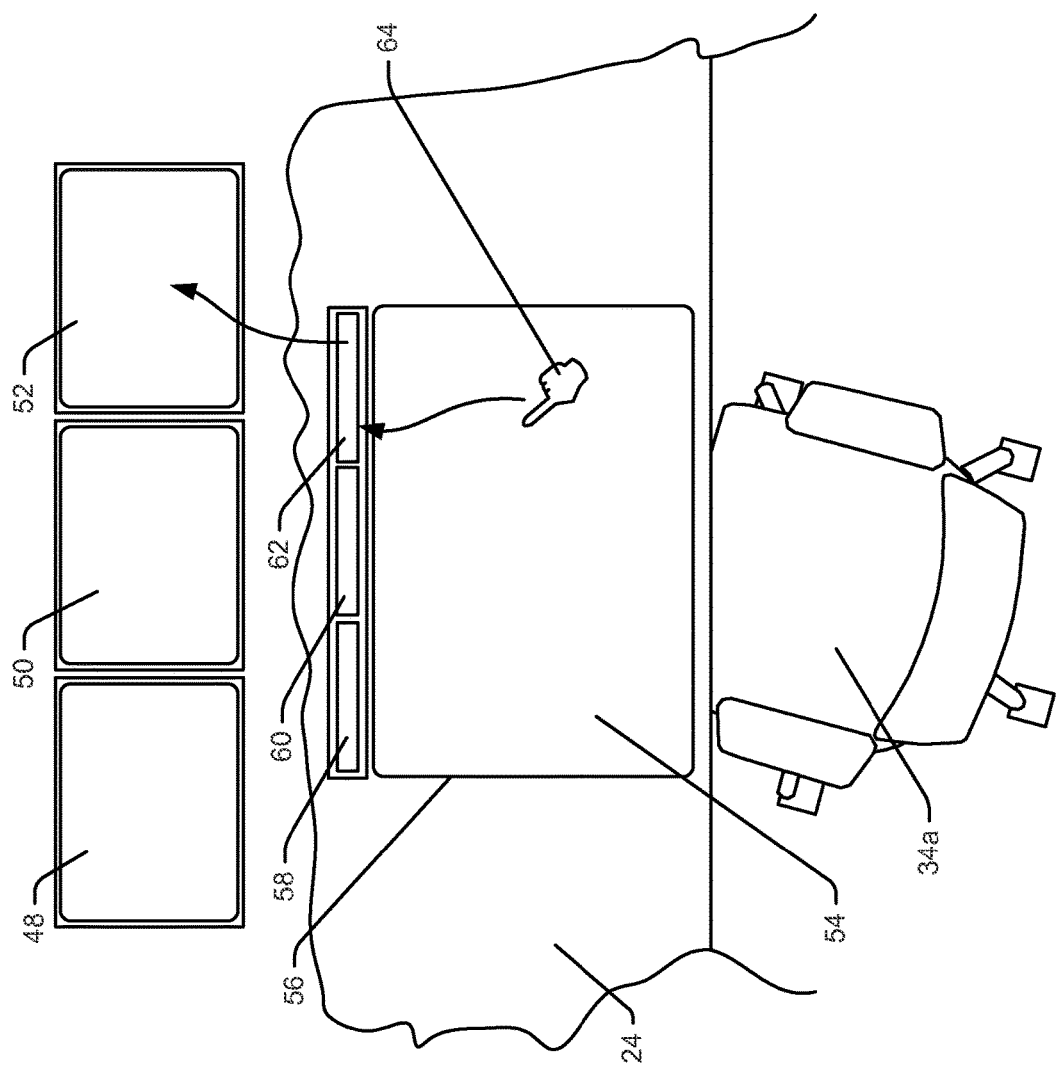
FIG. 3 is a partial view of a section of the emissive table shown in FIG. 2 and the three display screens shown in FIG. 2 with an exemplary virtual interface presented on a top surface of the emissive table assembly.

Referring to FIG. 3, exemplary interface 54 includes a content field 56 and exemplary control fields 58, 60 and 62 which correspond to space vessels 48, 50 and 552, respectively. In at least some cases a conferee may be able to operate many different software applications in space 56 thereby changing the content in space 56. During egalitarian control of content on displays 48, 50 and 52, the conferee may be able to share content by dragging her finger from space 56 to one of the fields 48, 50 or 52 signalling to a sessions server to replicate the content in space 56 on the display associated with the target field 58, 60 or 62. Other content fields for conferees may be provided on other emissive surfaces proximate the conferee such as, for instance, emissive surface fields provided by the exemplary round table assembly represented at 92 in FIG. 15, on one of the vertical emissive walls or screens, etc.

Control location, like content location, refers to where controls for sharing or developing content are located and the options, like content location, include on a user's personal portable device or on a common emissive surface within a conference space. Again, see FIG. 3 where control fields 58, 60 and 62 are provided in an interface vessel provided on the top surface of a table assembly. In some cases control location may be different than content location (e.g., controls may be in a common emissive vessel while content is on a display screen of a personal portable device and in other cases the content and controls may be provided on the same surface or via the same device.

Control type refers to the degree of content control exercised by a conferee during a session. In some cases it may be that a conferee only wants sequential control of all session content to simplify the task of content control. In other cases a conferee may want to be able to control content in a more free flowing manner so that the conferee need not stick to a script when presenting content. For instance, where a session includes first, second and third main content streams that are sequentially aligned, a conferee may simply want controls that allow the conferee to step forward and backward within the three streams in a lock step fashion. In other cases the conferee may want the ability to control each or the first, second and third main content streams independently during a session. Thus, there are at least two control types including sequential and real time/random.

Figure 42:
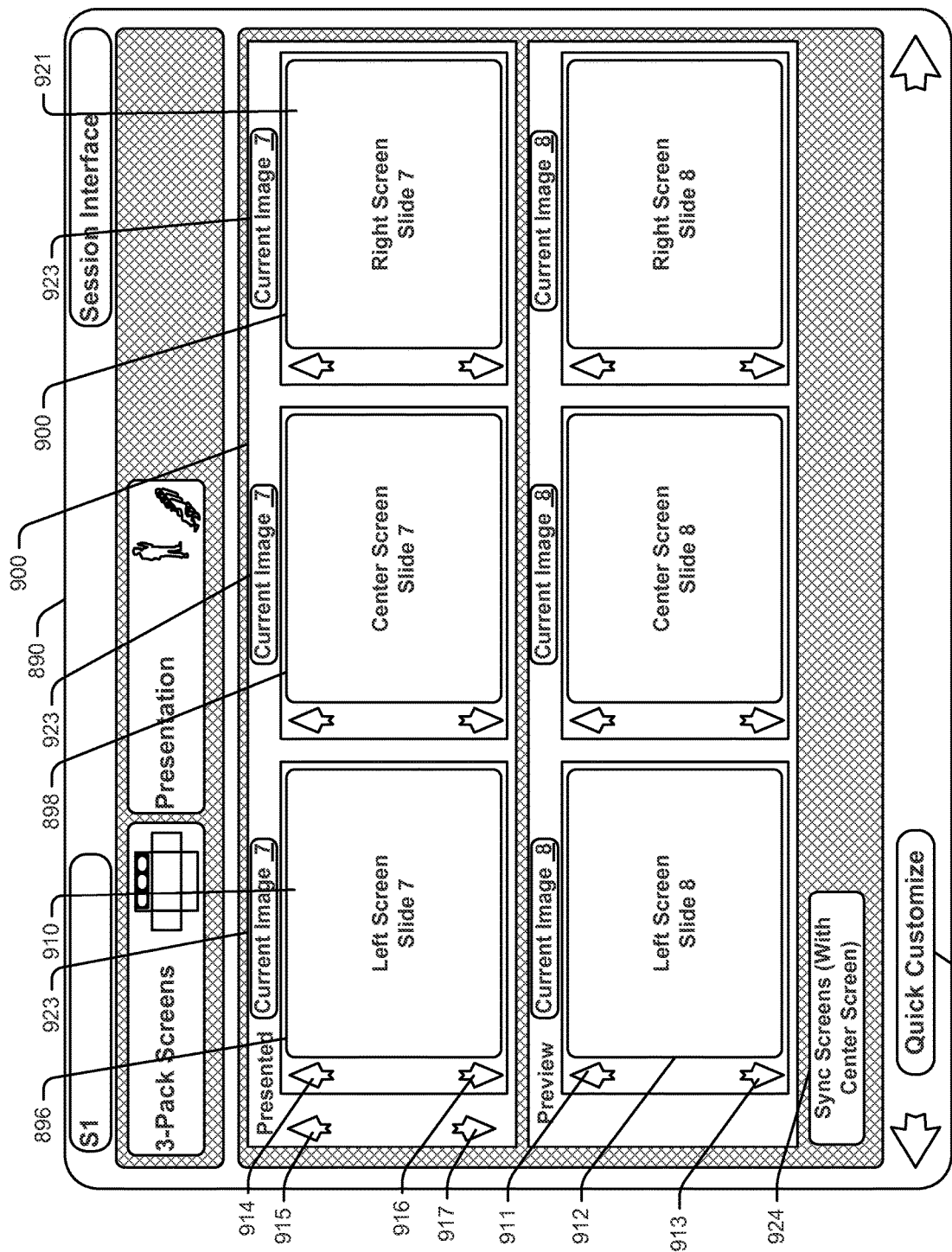
FIG. 42 is an image of a browser screen that may be presented as an exemplary interface for controlling a session in a FIG. 2 type space.

Referring to FIG. 42, an exemplary real time/random control interface 890 for a T1/presentation combination includes a separate control 896, 898 and 900 for each of the left, center and right screens 48, 50 and 52 shown in FIG. 2 as well as several other additional useful features. Controls 896, 898 and 900 are each similar and operate in a similar fashion and therefore only control 896 will be described here in any detail in the interest of simplifying this explanation. Exemplary control 896 includes a field 910 that shows content currently displayed in the left vessel 48 in FIG. 2 as well as a preview field 912 that can be used to access other content slated to be or previously presented via vessel 48. Scrolling arrows 914 and 916 are provided that can be used to scroll backward and forward within the sequence of content associated with vessel 48 to change the content on the vessel 48 independent of content displayed on the other vessels 50 and 52. Scrolling arrows are also provided for preview field 912 at 911 and 913 for scrolling through content slated to be or previously presented via vessel 48 so that a conferee can view content if desired prior to presenting that content on vessel 48. In addition to the tools described above, scrolling arrows 915 and 917 are also provided for the combination of field 910 and similar currently presented fields 919 and 921 associated with tools 898 and 900, respectively, so that a conferee can change content on associated displays 48, 50 and 52 simultaneously. Each tool 896, 898 and 900 also includes a current image presented indicator (e.g., 923) indicating which in the series of content images is represented in an associated field 910, 919 and 921. Thus, using indicators 923, a conferee can asses if the currently presented content is synchronized or not.

Referring still to FIG. 42, a "Sync Screens" icon 924 is provided which can be selected to synchronize all presented content with whatever content is presented on one of the space vessels. In the present example, the system is programmed to synchronize all content with the content presented on the central front wall vessel 50 (see again FIG. 2) when icon 924 is selected.

Figure 43:
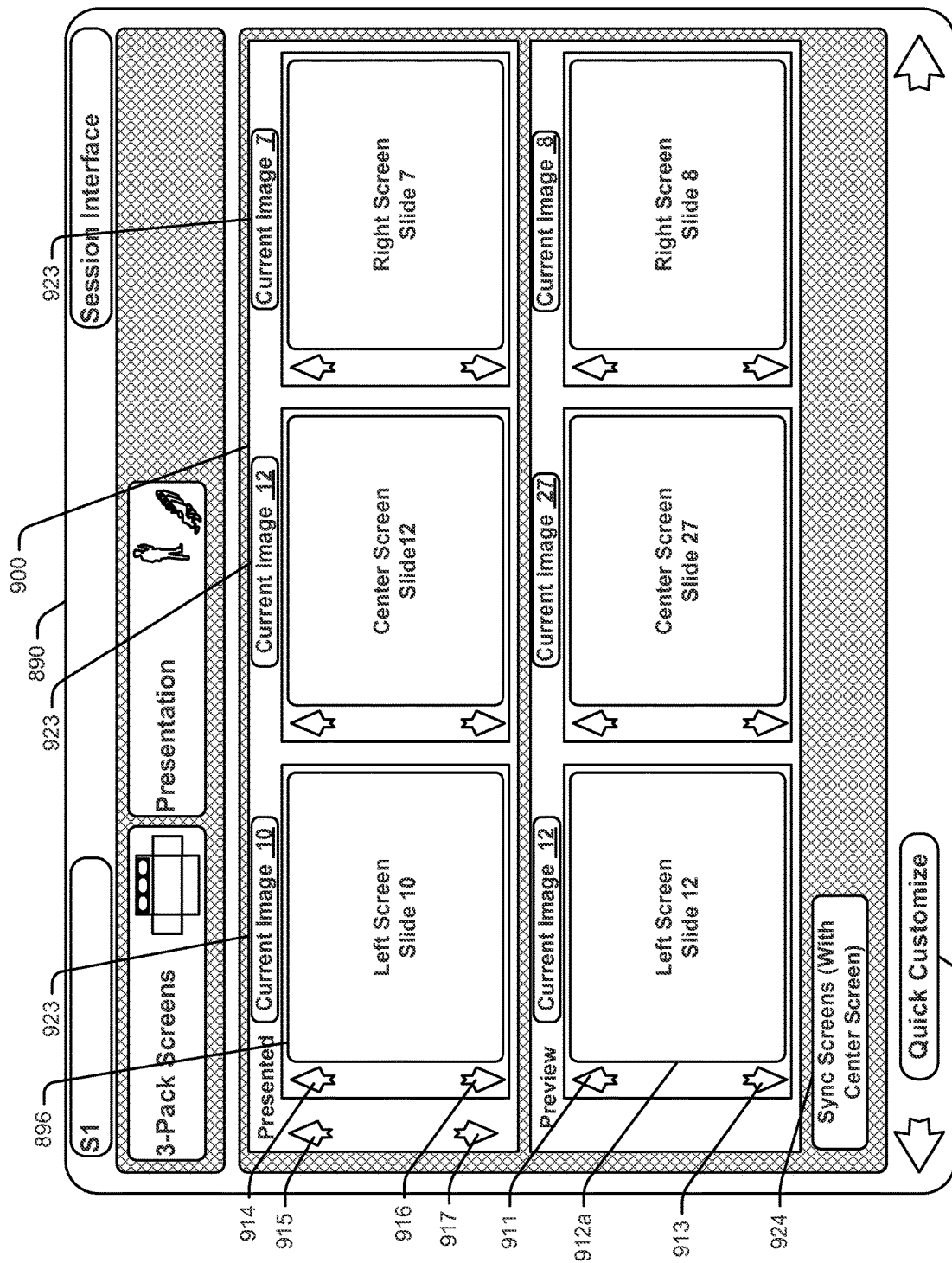
FIG. 43 is similar to FIG. 42, albeit showing the interface at a different point in session control.

Referring still to FIG. 42, indicators 923 indicate that the images on vessels 48, 50 and 52 are synchronized as each is associated with content state 7. See the FIG. 43 interface screen 890 where indicators 923 indicate that the presented content is not synchronized. In FIG. 43, to resynchronize the content on the three vessels 48, 50 and 52, a conferee would select icon 924. Thus, with the real time/random interface of FIG. 42, a conferee can advance content on multiple vessels synchronously or separately, has an indicator to indicate if the content is or is not synchronized and has the ability to resynchronize the content at any time.

While not shown, real time/random control interfaces are contemplated for each of the T2 and T3 space types as well. The T2 interface may be similar to the T1 interface, albeit having two other tools akin to tool 896 described above with respect to FIG. 42. Because of space constraints on a personal device display, the other two tools akin to 896 may be presented in a compressed form until needed. Here, the it has been recognized that often times left and right wall vessels (see 66 and 68 in FIG. 4) are used to present relatively less important information than the information presented on center wall displays 48, 50 and 52. For this reason, a default would likely be to at least initially present tools for vessels 66 and 68 in compressed format. The T3 interface, like the T2 interface, would include some tools akin to the FIG. 42 tools, and others in compressed format that could be expanded when needed.

Figure 44:
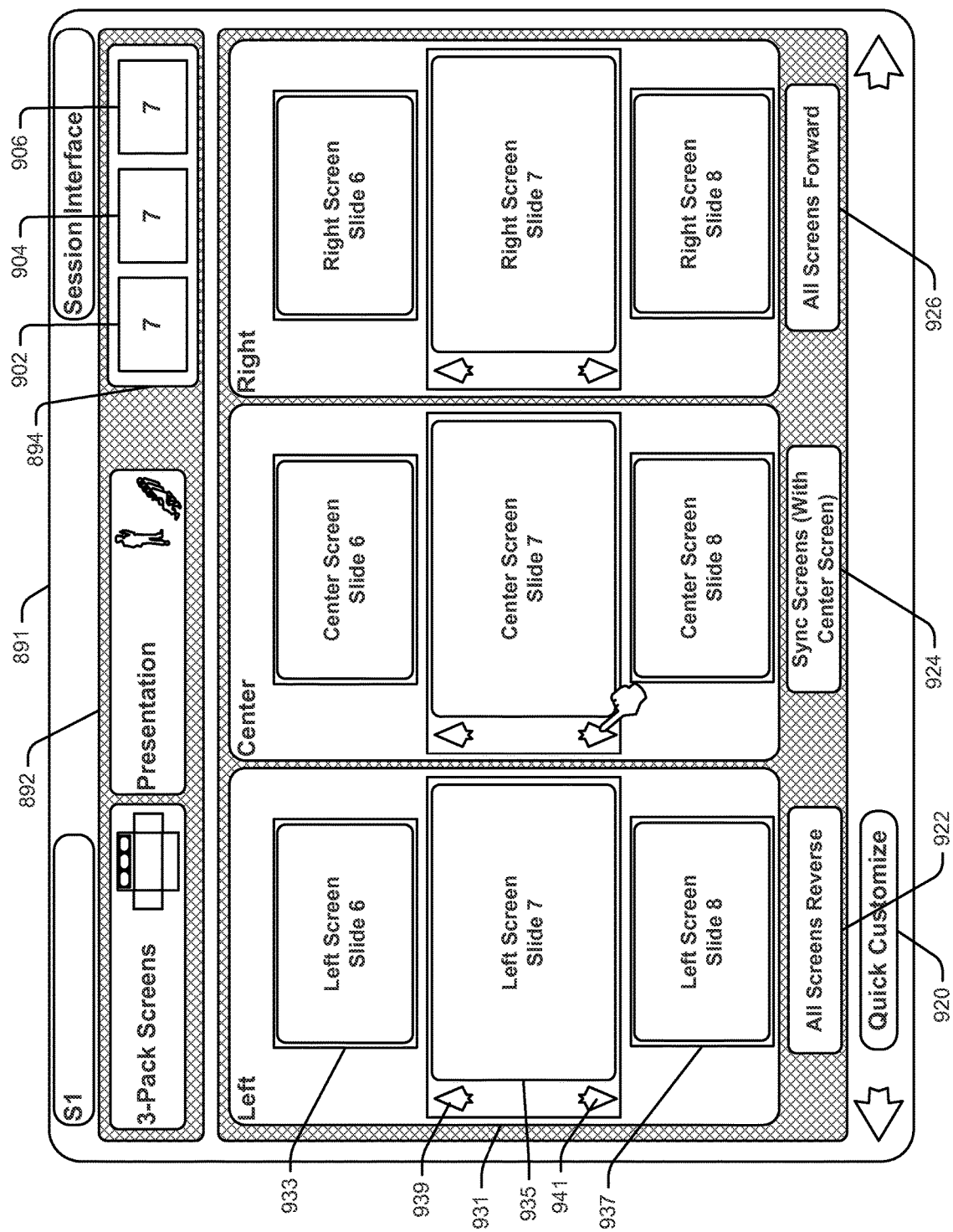
FIG. 44 is similar to FIG. 42, albeit showing an interface with a different set of control tools.

Referring to FIG. 44, an exemplary sequential control interface 891 for a T1 presentation combination is illustrated. Interface 891 fields 933, 935 and 937 corresponding to vessel 48 in FIG. 2 that show a prior image, a currently displayed image and a preview screen for a next image, respectively, in the content stream associated with vessel 48. Similar fields are provided for each of displays 50 and 52. A single scrolling arrow set 939/941 is provided for all nine image fields which, when selected, causes content in the fields to scroll up or down depending on which arrow is selected, in a synchronized fashion. Thus, when using the sequential interface type, content on all T1 type vessels 48, 50 and 52 changes sequentially.

While there are advantages to providing virtual views that show content presented in space that mirror reality, in many cases the content presented in a space that includes many emissive surfaces and vessels will be divisible into different categories depending on importance. For instance, while status of conferees yet to arrive for a session that has already started is interesting, main content for the session is relatively more important in most cases. As another instance, while an agenda is important, an agenda typically includes stagnant content as opposed to content that changes during session progression as does main content.

Figure 45:
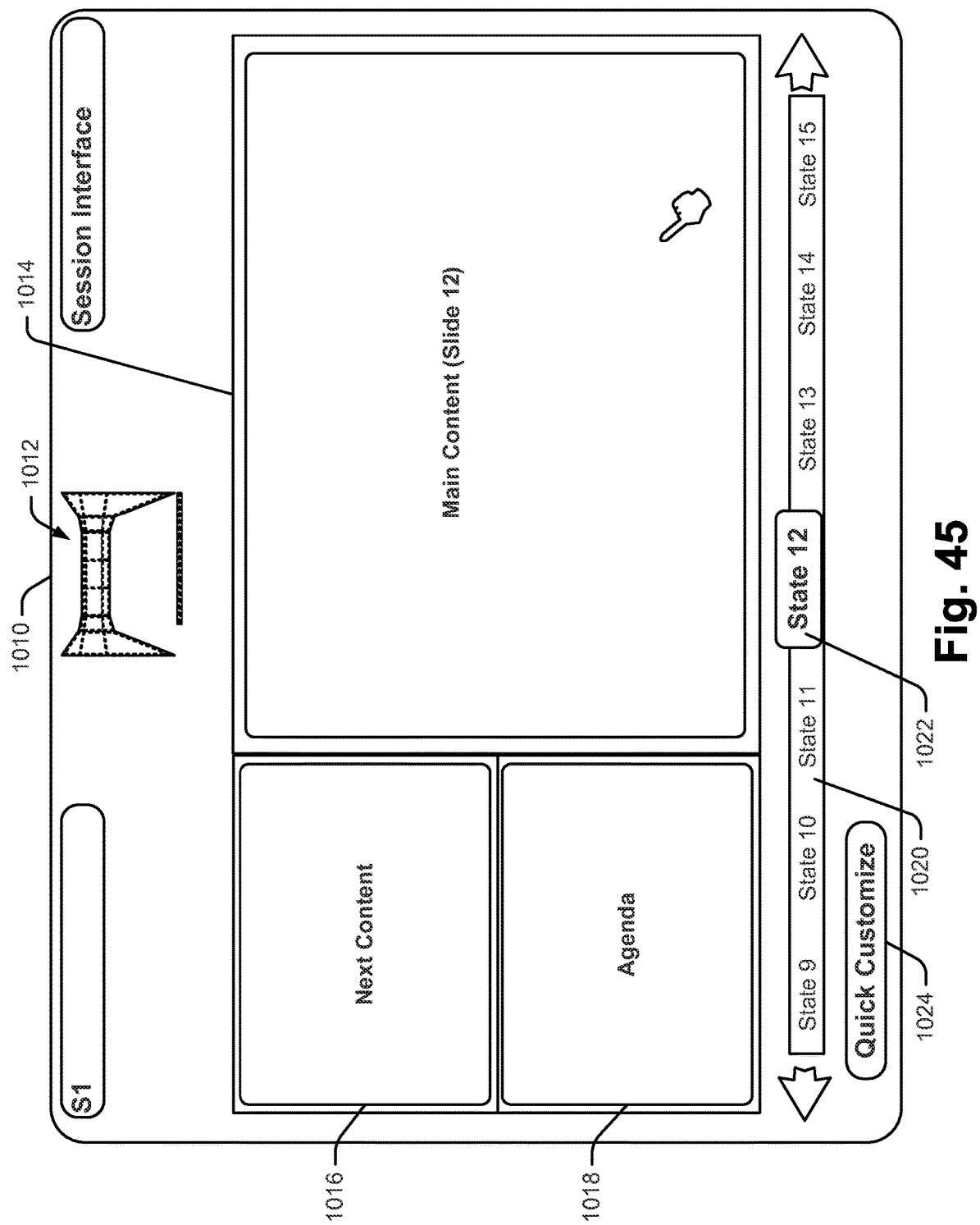
FIG. 45 is an image of a browser screen that may be presented as yet one other type of interface that includes fields that only shows a subset of session content presented within a conference space that offers a simplified understanding of the full set of content presented.

Because interfaces often need to be presented on relatively small displays (e.g., a display associated with a personal portable device), in at least some cases, instead of showing all vessels or a subset (e.g., 9 front wall surface fields of FIG. 5) of relatively juxtaposed vessels and their content, an interface may be provide which only presents most important content in a smaller subset of relatively larger interface fields. For instance, see FIG. 45 that shows an exemplary interface 1010 for a T3 type space (e.g., an emissive room as in FIG. 5). Again, the exemplary emissive room has 30 different pre-defined vessels while interface 1010 only includes three fields 1014, 1016 and 1018 for viewing presented content. Content presented in the fields includes main content, next content and an agenda. In addition to the viewing fields, interface 1010 also includes a virtual view selection icon 1012 and a state sequence line representation 1020 with a selection box 1022 that can be moved about to change the state of content viewed in fields 1014, 1016 and 1018 as well as within actual fields in an associated T3 type conference space. In FIG. 45, a conferee uses line 1020 to advance or move backward within the session content, viewing the most dynamic or important content in the limited number of viewing windows. Vessel representation icon 1012 can be selected to access a virtual view of the full set of content presented in the associated space in relative juxtapositions. For instance, when icon 1012 is selected, a view similar to the FIG. 38 view may be presented as an interface.

Referring still to FIG. 45, in at least some embodiments, a standard interface akin to interface 1010 may be presented for controlling sessions irrespective of which space type (e.g., T1, T2, T3 or other) is associated with a session. To this end, it should be appreciated that interface 1010 would be perfectly suitable for controlling content in a T1 type space, a T2 type space, etc., the only difference being that the virtual view selection icon 1012 should be modified to reflect the associated space type. By providing one or a small set of standardized control interfaces that have similar characteristics regardless of the number of vessels associated with a space type and/or the arrangement of vessels within a space, user acceptance of the overall system and comfort with the interface will be greatly improved.

Despite planning, often times session activities will take an unforeseen direction mid-stream. For this reason, in at least some embodiments, a system will enable a conferee to alter content types in one, a subset or all of the emissive fields located within a conference space essentially in real time as a session progresses. For instance, referring again to FIG. 2, while session content may be completely scripted for vessels 48, 50 and 52, half way through a scheduled session, a presenting conferee may decide that she wants to open up vessel 52 to egalitarian control so that any conferee attending can share content via vessel 52. As another instance, referring again to FIG. 5, a presenting conferee using a T3 type space (e.g., emissive room) may decide that she wants to share only her desktop image via the central wall central foveal vessel half way through a session.

Figure 46:
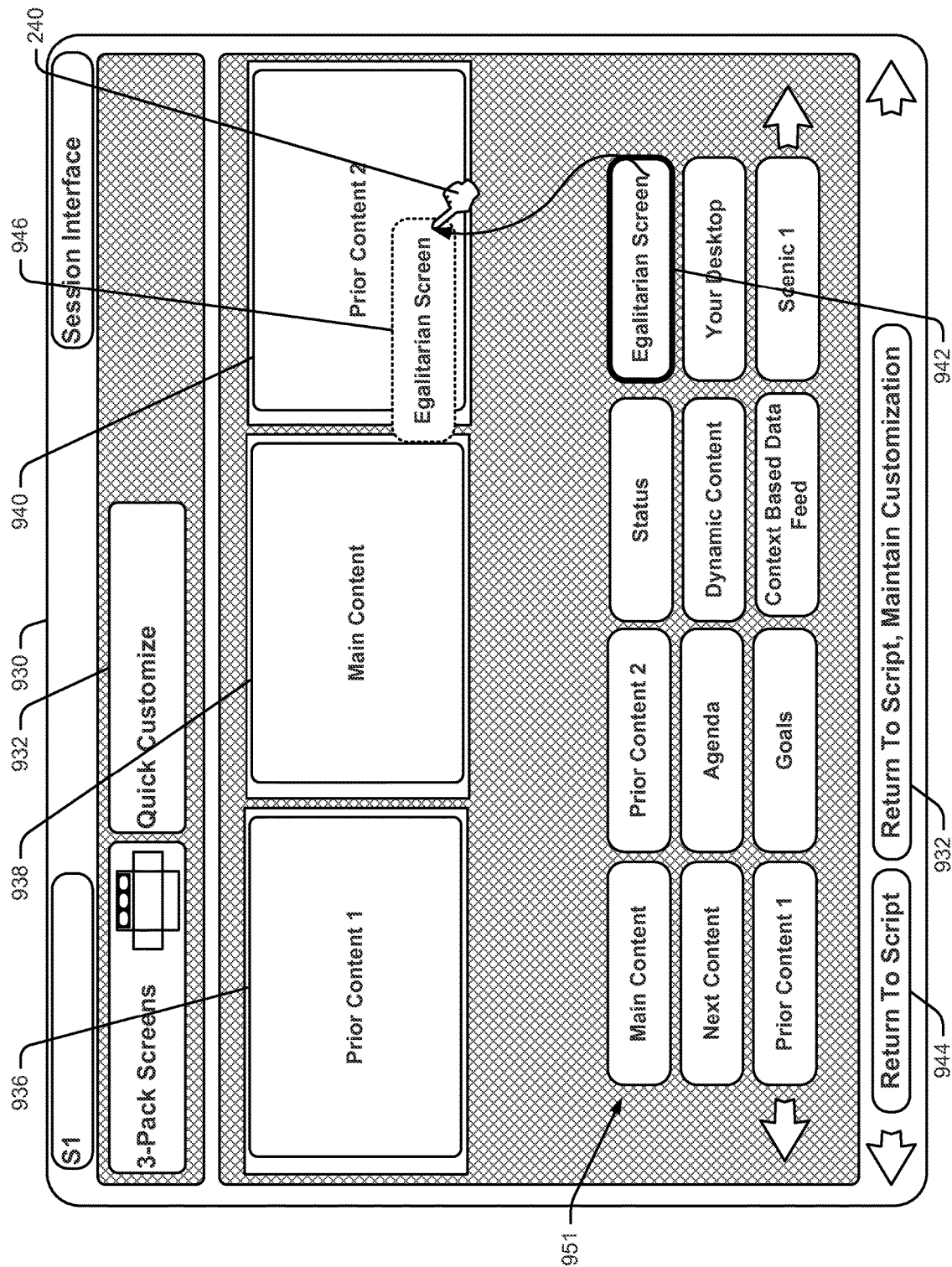
FIG. 46 is an image of a browser screen that may be presented as an interface during an ongoing session where a conferee is able to customize content type presented in one or more vessels essentially in real time during the session.

Referring again to FIG. 42, quick customize icon 920 may be selected to access an interface that enables a conferee to quickly alter content type on one or more displays. Referring also to FIG. 46, an exemplary quick customize interface 930 for a T1 type space (e.g., 3 displays as shown in FIG. 2) is illustrated. Interface 930 includes fields 936, 938 and 940 representing displays 48, 50 and 52 in a T1 type space, a list 951 of content types, a "Return to Script" icon 944 that is selectable to return to a specified session of content presentation and the associated interface (e.g., see again interface in FIG. 42) and a "Return to Script Maintain Customization" icon selectable to return to a scripted session while maintaining any customization performed by a controlling conferee. Here, it is assumed that a session is ongoing and that content consistent with a script is currently presented on vessels 48, 50 and 52 and is mirrored in fields 936, 938 and 940. A conferee can select, drag and drop any one of the content types from list 951 into one of the fields 936, 938 or 940 to move that content type into the field. When a new content type is moved to one of the fields, the content associated with the content type is presented in the vessel 48, 50 or 52 associated with the field. Thus, for instance, if main content from list 951 is moved to field 940, the main content would be duplicated and presented on vessel 52 associated with field 940. In the present example this change would cause the main content to be simultaneously presented on vessels 50 and 52 as main content is already located in field 938 associated with vessel 50.

As another instance, as shown in FIG. 46, if the egalitarian screen content at 942 in list 951 is dropped as shown at 946 into field 940, vessel 52 in FIG. 2 would be converted to an open screen for receiving content from any conferee attending the session. Here, in addition to opening up vessel 52 to receive content from any attending conferee, a system server would automatically provide or render available an egalitarian type sharing interface for each of the attending conferees. For instance, the sharing interface may simply include a single hovering field over the desktop image on each conferee's laptop or tablet type computing device associated with vessel 50 which, when selected, causes the conferee's desktop image to be replicated on vessel 50. Where the sharing interface is not automatically provided, there may be some type of opt in process where each conferee has to confirm that she would like the sharing interface.

Referring still to FIG. 46, after a conferee uses interface 930 to deviate from scripted session content, selection of icon 932 will return the session to the scripted content but maintain the conferee's customization. Thus, for instance, where an egalitarian screen was moved to field 940 prior to selection of icon 932, the egalitarian screen will remain in vessel 52 associated with field 940 during the remainder of the session unless again changed by the controlling conferee.

Figure 47:
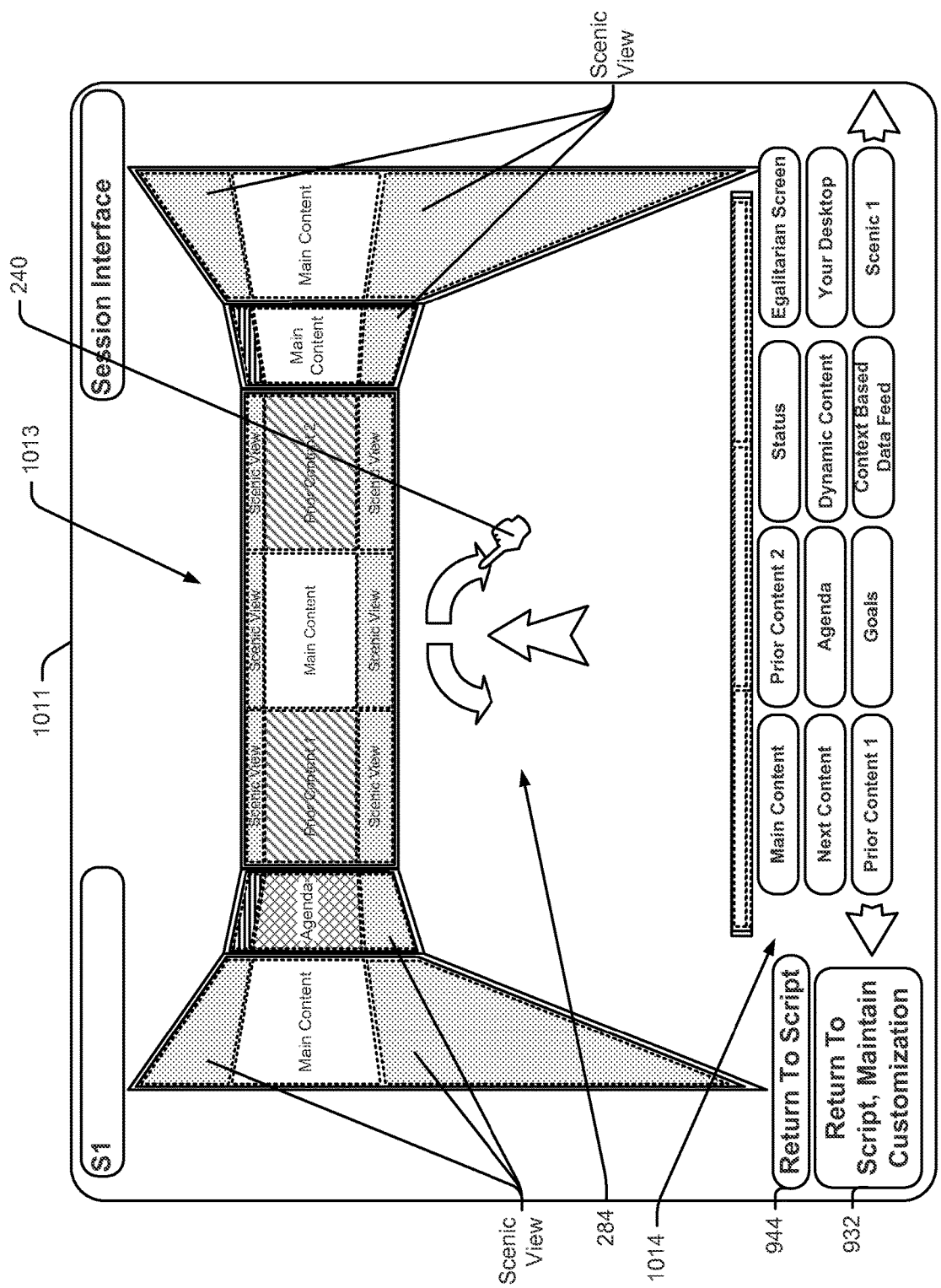
FIG. 47 is similar to FIG. 46, albeit for a FIG. 5 space type.

An exemplary T3 type customization interface 1011 is shown in FIG. 47. Interface 1011 includes a virtual 3D view or representation 1013 of a T3 type space showing relative juxtapositions of vessels within a space, a navigation tool set 284 for changing the point of view within the virtual representation, a content type list 1014, a "Return to Script" icon 944 and a "Return to Script Maintain Customization" icon 932. Icons 944 and 932 operate in a fashion similar to that describe above with respect to FIG. 46. In FIG. 47, currently presented content is replicated in the illustrated vessels. A user can modify content type in any of the vessels by selecting a new content type in list 1014 and dragging and dropping that content in one of the illustrated vessels in a fashion similar to that described above with respect to FIG. 46.

Referring to FIG. 40, an interface database 974 is illustrated that defines several different interface types as a function of the four characteristics described above. While only four interface types are shown in FIG. 40, many others are contemplated that have different characteristic mixes. Database 974 includes an interface characteristic column 976 and an interface type section 978 that includes a separate column 980, 982, 984 and 986 for each of the interface types supported by the system. First 980 and third 984 interface types are the same except that the first type only provides a single interface while the third provides a separate interface for each conferee present at a conference. Each of the first and third types places content and content controls on a conferee's device and supports only sequential content control. Second 982 and fourth 986 interface types are the same types except that second type only provides a single interface while the fourth type provides a separate interface for each conferee present at a conference. Each of the second and fourth types places content and content controls in an interface vessel on a common emissive surface (e.g., a section of a wall surface, a table to surface, etc.) within a space.

Figure 39:
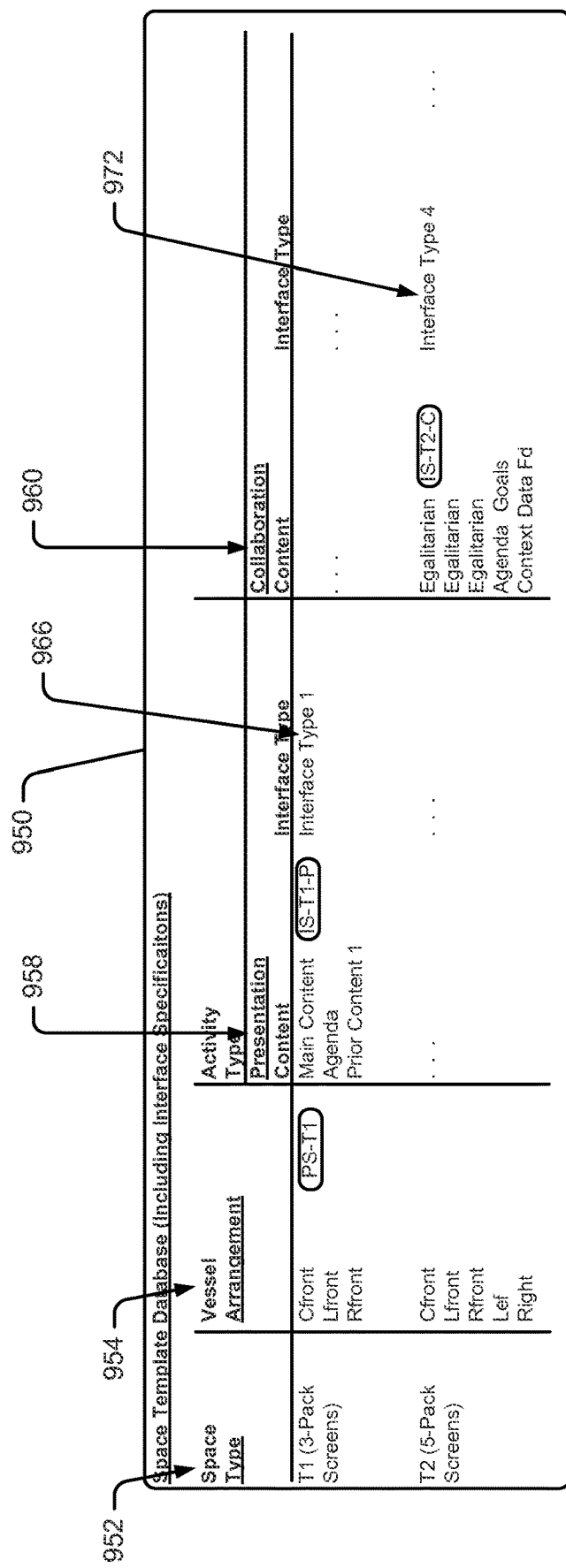
FIG. 39 is a schematic showing another space/activity template database, albeit where the database also includes templatized specification of specific interface types for specific space/activity combinations.

Referring to FIG. 39, a space/activity template database 950 that includes interface characteristics is shown for the T1 and T2 spaces. In addition to specifying content types associated with space displays/fields as in the FIGS. 6A and 6B database, database 950 also indicates interface type 1 for the T1 presentation combination (see T1 row and presentation column 958) (see 966) and interface type 4 for the T2 collaboration combination (see row T2 and collaboration column 960) (see 972). Other interface types for other row and column (e.g., space type/activity type) combinations would also be specified in database 950.

During an ongoing session, the optimal interface type may change. For instance, during the first half of a session, a first conferee may present content to other conferees pursuant to a presentation activity and therefore a type 1 interface (see again 978 in FIG. 40) may be optimal. However, during a second half of the session, one or more emissive fields within the conference space may support egalitarian content control. Here, a type 3 interface (see 984 in FIG. 40) may be optimal. In cases where different interfaces are optimal at different times during a session, the templates may specify the different interface types and may cause a system server to automatically change interfaces during session progression.

Figure 41:
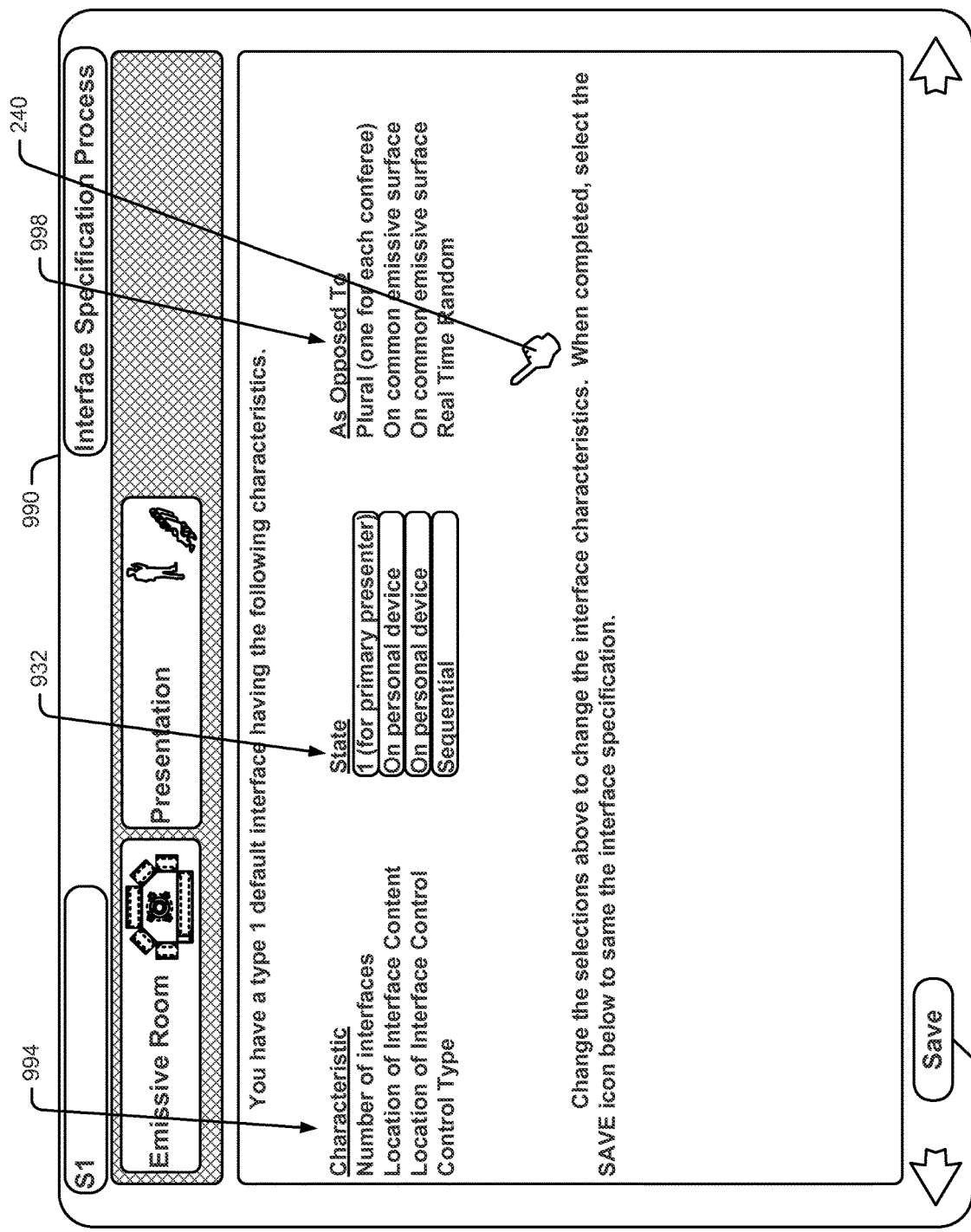
FIG. 41 is an image of a browser screen that may be presented as an interface for customizing session content control interfaces that is consistent with at least some aspects of the present disclosure.

In at least some cases, while a template may specify an optimal interface device, an instantiator may want to customize the interface type. To this end, see FIG. 41 that shows an interface for customizing a control interface to be used during a session. In FIG. 41, a list of interface characteristics is presented at 994, default characteristic attributes are listed at 932 and other options for the characteristics are presented at 998. The default attributes at 932 are consistent with a type 1 interface as specified in FIG. 40 at 978. In FIG. 41, an instantiator can use pointing icon 240 to alter interface attributes by selecting from the "as opposed to" list and dragging options to the "state" list.

In cases where content vessels move or change shape during an ongoing session or where a specific content type is removed from one vessel and presented in a different vessel at some point during a session, it is contemplated that a system server may be programmed to graphically animate the change in vessel size and/or location and/or to animate movement of content from one vessel to another. For instance, in FIG. 5, assume that after the first five minutes of a session, an agenda is to automatically move from the front wall central foveal vessel to the left wall foveal vessel and is to be replaced by main content in the central wall foveal vessel. Here, instead of simply moving content around in an instance, the agenda may shrink down into a thumbnail and be moved about the emissive surfaces within the T3 space illustrated and then be re-expanded into the left wall foveal field while a main content field is expanded in the central wall foveal field. Animations would be templatized in one of the system databases.

The systems above help a conferee take advantage of the capabilities of spaces that have many emissive surfaces and vessels by providing predesigned templates for designing session content layouts, obtaining session content, previewing session activities and controlling session content during an ongoing session. It has been recognized that many session or conference spaces include other resources that have adjustable/controllable operating characteristics that conferees routinely fail to take advantage of either because they are unaware that the characteristics can be adjusted or they do not have the knowledge required to know how best to take advantage of those resources to enhance specific activities.

For instance, in many cases lighting within a space can be adjusted in different ways to enhance activities that occur within the space. For example, a first lighting effect (e.g., bright green tinted light throughout a space) may be optimal during an initial session sub-period (e.g., an arrive sub-period) while a second lighting effect (e.g., white light centrally within a space and dimmed lighting along peripheral portions of the space) may be optimal during content presentation (e.g., an attend sub-period). As another instance, transparency controlled glass walls (see again 33 in FIG. 1) may optimally be transparent during an arrive sub-period and opaque during an attend sub-period.

In addition to lighting effects and wall opacity, many other adjustable resource operating characteristics are contemplate including but not limited to temperature, air circulation, window shade adjustment, microphone sensitivity (e.g., ability to sense sound), positioning of structural affordances (e.g., drop ceiling assemblies, walls, moveable display screens, doors, etc.), sound (e.g., audio sounds selected to elicit specific responses in conferees, etc.), etc. In this disclosure templates are described that specify lighting and wall opacity control only in the interest of simplifying this explanation but the concepts described here would also be applicable to any other adjustable or controllable affordance characteristics.

To facilitate optimal use of other adjustable affordance characteristics associated with a space type, it is contemplated that optimal controllable characteristics may, in at least some embodiments, be specified in a space/activity template database for each space/activity combination. To this end, the FIG. 50 database 1040 includes lighting and wall transparency columns 1056 and 1058, respectively, for the presentation activity type and, while not illustrated, would includes similar columns for each of the other activities (e.g., see collaboration column 1050) in the database. Lighting column 1056 includes a different lighting effect for each of the arrive, attend and adjourn sub-periods in column 1052 indicating different pre-determined lighting effects for each of those sub-periods that would be automatically implemented by a system server unless a conferee changed the effect or manually adjusted the effect. Similarly, wall transparency column 1058 includes a different wall transparency effect for each of the arrive, attend and adjourn sub-periods in column 1052 indicating different pre-determined effects for each of those sub-periods that would be automatically implemented by a system server unless a conferee changed the effect or manually adjusted the effect. Here, it is contemplated that the lighting and wall transparency effects may be different for each of the different activity types listed in the database. Thus, for instance, lighting and wall transparency may be very different for a rejuvenation session than for a presentation or collaboration session, and the rejuvenation specific effects would be defined in a template associated with that activity.

Figure 48:
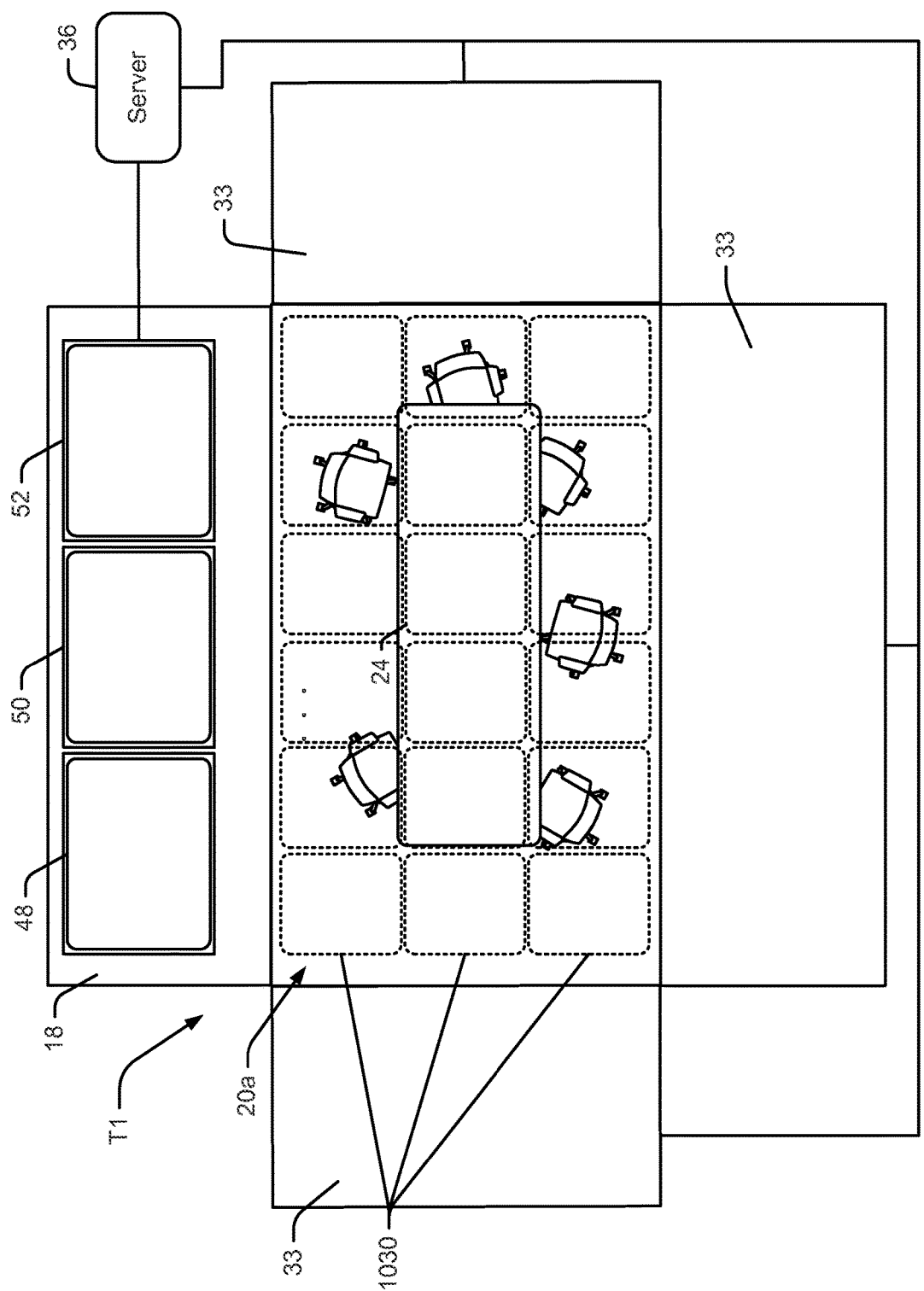
FIG. 48 is a view of a space type similar to FIG. 2 space type, albeit where controllable lighting and transparency controllable glass walls are provided and linked to a system server for templatized control of affordances within the space and where the lighting and walls are shown in a first state.

Referring to FIG. 48, an exemplary T1 type space is illustrated that is similar to the FIG. 2 space described above which includes lighting and transparency controllable wall affordances. Eighteen distinct sub-lighting zones within space 20a are indicated by numeral 1030. Here, for instance, each zone 1030 may be associated with a uniquely controllable overhead (e.g., ceiling mounted) lighting fixture where a system server 36 is linked to each lighting fixture and can control various lighting aspects such as intensity and color. Hereafter, unless indicated otherwise, representations 1030 will be referred to as lighting devices.

Each of three walls collectively identified by numeral 33 in FIG. 48 is a transparency controllable glass wall assembly while wall 18 in this example is a standard opaque wall structure. Server 36 is also linked to each of the walls 33 for controlling transparency thereof.

Figure 49:
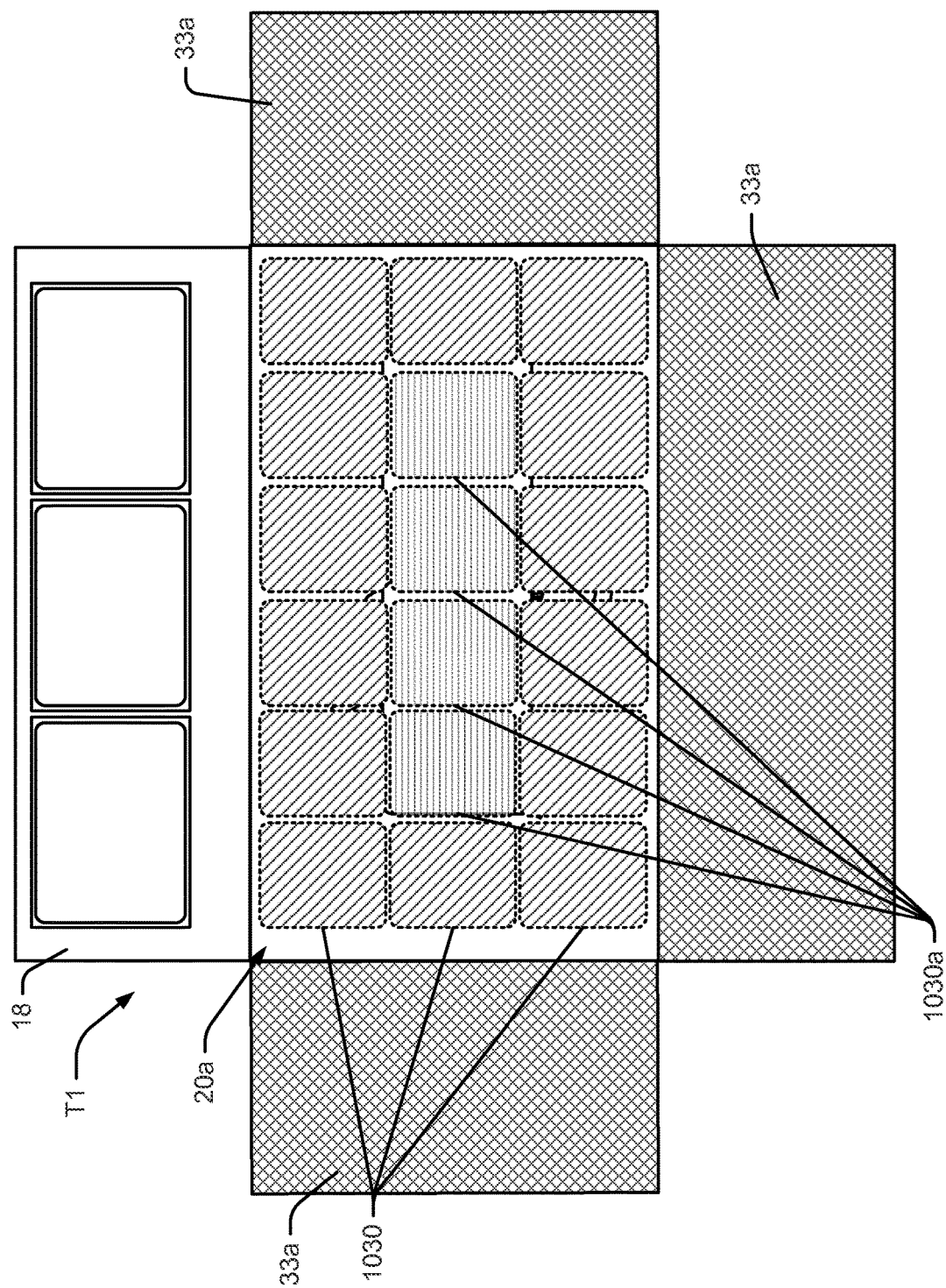
FIG. 49 is similar to FIG. 48, albeit showing the lighting and walls in a second state.
Figure 51:
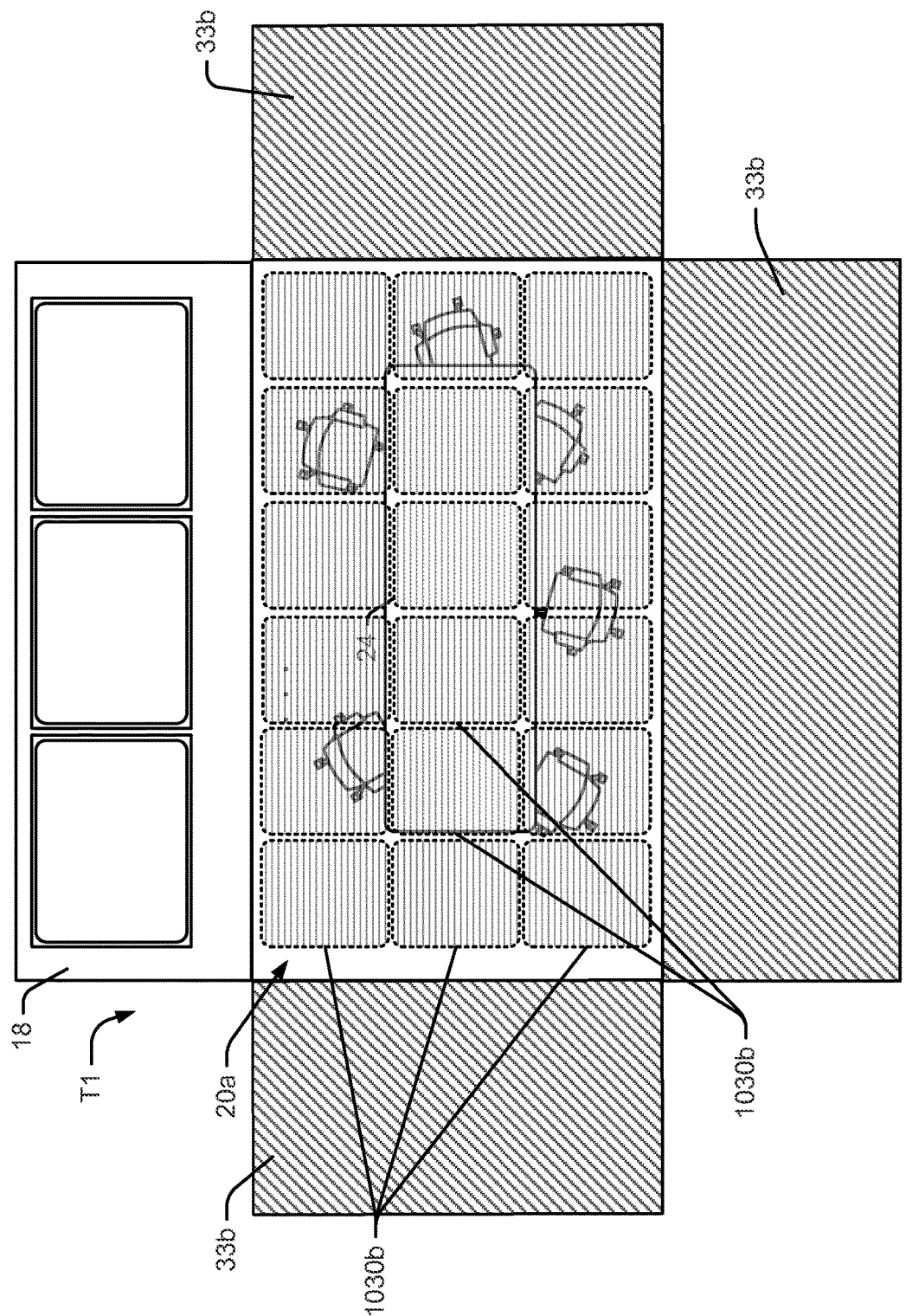
FIG. 51 is similar to FIG. 48, albeit showing the lighting and walls in a third state.

In FIGS. 48, 49 and 51, non-hatched lighting devices 1030 and 1030a will indicate light devices generating relatively bright green illumination, devices 1030 and 1030a having horizontal hatching will indicate brightly lit white light generating devices and devices that are diagonally cross hatched will indicate dimly lit white light generating devices. Similarly, non-hatched walls 33 will indicate completely transparent walls, double cross hatched walls 33a will indicate opaque walls and walls 33b that are singly cross hatched will indicate semi-transparent walls.

FIG. 48 shows the T1 type space with lighting and wall opacity that corresponds to the arrive sub-period specified in FIG. 50 where illumination is light green for all devices 1030 and walls 34 are completely transparent. Similarly, FIG. 49 shows the T1 space with lighting and wall effects corresponding to the attend sub-period specified in FIG. 50 where illumination is bright white for central lighting devices 1030a over a conference table and dim white for peripheral lighting devices 1030 and walls 33a are transparent and FIG. 51 shows T1 space with lighting and wall effects corresponding to the adjourn sub-period specified in FIG. 50 where illumination is bright white for all lighting devices 1030 and walls 33b are semi-transparent.

In operation, once a space/activity combination is selected by an instantiator, lighting and wall transparency control information may be automatically specified by an associated template so that the instantiator and a conferencing group as a whole is able to take advantage of the capabilities lighting and controllable wall transparency without having to perform any additional specifying processes. In some cases, as in the case of content presentation, an interface may be provided to allow an instantiator to customize lighting, wall transparency and other affordance effects to suit personal or group preferences. In addition, during an ongoing session, one or more interface devices may allow one or more of the conferees to override instantaneous affordance settings.

In many cases a facility will only have a limited number of conference spaces of the different types T1, T2 and T3 and, despite session content having been developed for one type of space with one set of affordances, a conferee may not have the option to use a space of the space type for which session content was developed at a time when a session must occur. For instance, a conferee may need to schedule a specific session during the morning on a specific day and a space of the type associated with a session content specification for the session may be unavailable during any period during the morning of the day on which the session is to occur. As another instance, a conferee may need to unexpectedly present a session content set immediately to other conferees and a space of the type associated with the set may not be immediately available. As still one other instance, a specific facility may not include a space of the type required to present a specific session content set and the conferee may need to use a different space type.

The problem of unavailability of space of the type for which session content was developed is easily handled where an available space has more affordances than the optimal space as the affordances in the available space can accommodate all of the developed content. For instance, referring again to FIGS. 2 and 4, where content has been developed for a T1 space but a session using that content has to take place in a T2 space, the T2 space should include enough emissive surface vessels to accommodate all of the content developed for the T1 space. For instance, content developed for vessels 48, 50 and 52 in a T1 space can simply be presented on the similarly numbered vessels in the T2 space shown in FIG. 4.

Where a reduced set of content is presented in a better afforded space, in at least some embodiments a system server will automatically fill in content on other emissive surface vessels not needed for the reduced content set. For instance, in the example above where T1 content is presented in vessels 48, 50 and 52 in a T2 space (see again FIG. 4), a system server may simply present a scenic view in vessels 66 and 68. In the alternative, the server may simply duplicate some of the content that was developed for the T1 space on the additional displays 66 and 68 in the T2 space. In still other cases it is contemplated that a template database may include default content types for vessels for which content type has not been specified. For instance, see again FIG. 6A where left and right wall content is specified for a T2 space in column 118 for a presentation activity. Where a T1 content set is presented in a T2 space, the left and right wall content types for a T2 space may be decided using the content types specified in column 118 for the T2 space.

The problem of unavailability of an optimal space for which session content was developed is slightly more complicated in the case where an available space has less emissive surface vessels than the space for which session content was developed. For instance, referring again to FIGS. 2 and 4 where exemplary T1 and T2 spaces are illustrated, where a content set is developed for a T2 space and therefore includes content to fill five vessels 66, 48, 50, 52 and 58 and an associated session then has to occur in a T1 space that only includes vessels 48, 50 and 52, there is more content than space available for presentation. Here, a system server may be programmed to select a subset of the total session content set for presentation on the three T1 vessels and rules for selecting the subset of content may be provided within the template database. For instance, where a T2 space content set is to be presented in a T1 space, a default from the template database may automatically cause the center front, left front and right front content from the T2 content set may be presented on the center front, left front and right front vessels in the T1 space. Other template based default rules for formatting T2 content sets to a T1 space type are contemplated.

When a T3 content set (e.g., a set developed for an emissive room) is to be presented in either a T1 or T2 space, a different template based rule may apply. For instance, referring again to FIGS. 6A and 6B, content that is common between the templates associated with a presentation activity between spaces T1 and T3 may be mapped to the T1 vessels indicated in column 118 for the T1 space. Thus, here, the main content, agenda and prior content 1 from the T3 portion of column 118 in FIG. 6B may be mapped to the same content types in the T1 section of column 118 in FIG. 6A if the smaller space is a T1 space. Similarly, content that mirrors the content types in the T2 section of column 118 in FIG. 6A may be mapped from the T3 section of column 118 in FIG. 6B. Other automatic content mapping rules are contemplated.

Figure 52:
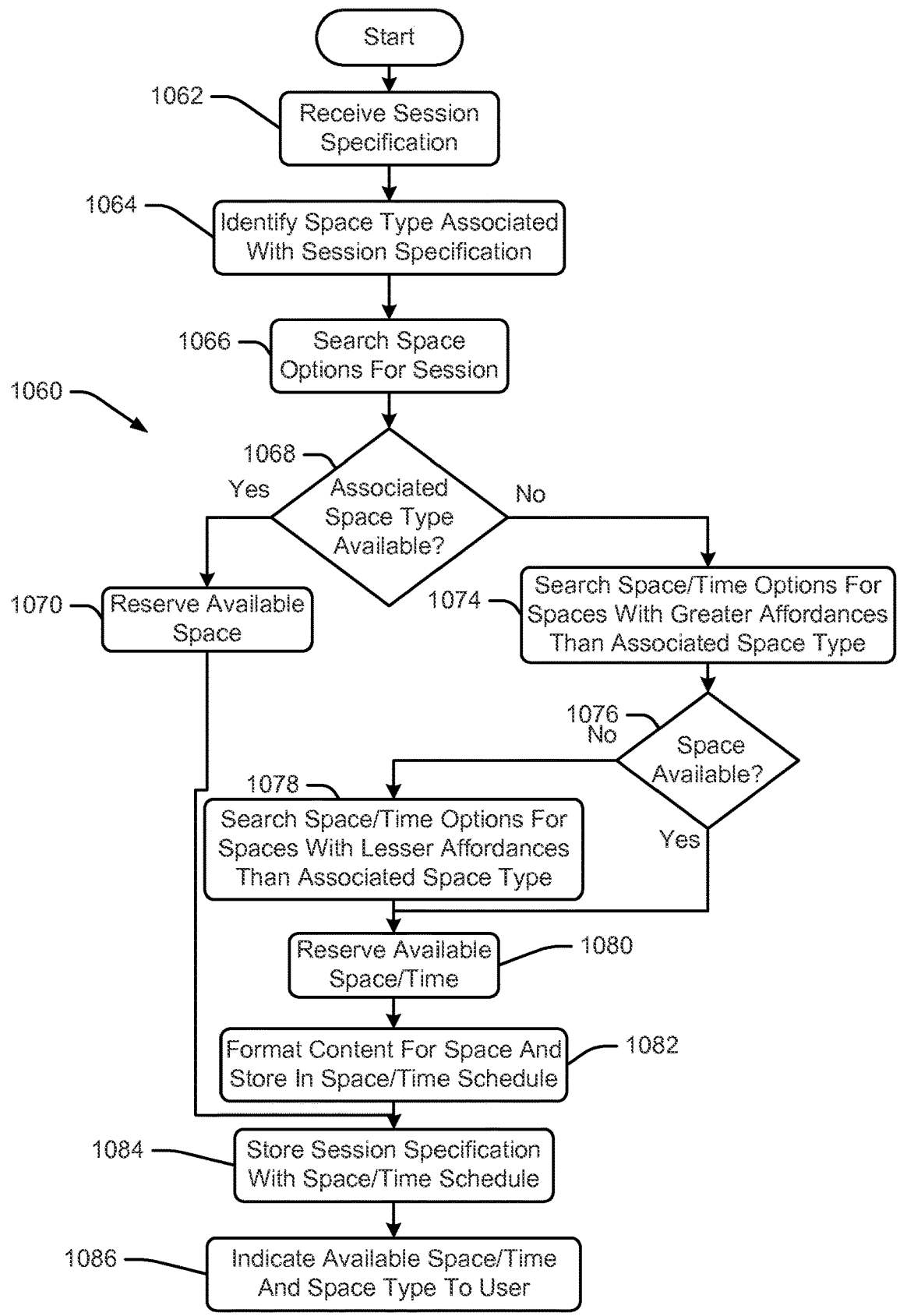
FIG. 52 is a flow chart illustrating a process whereby, when a session specification has been developed for a specific first space type and has to be presented in a different space of a second type, a system server automatically maps session specification content to vessels associated with the second space type.

Referring now to FIG. 52, an exemplary process 1060 for scheduling a session for which session content has been previously specified and stored in a session content specification database like the one shown in FIG. 8 for a specific space type is illustrated. It is contemplated that a conferee that instantiated session content intending to schedule a session at a specific time has access to space scheduling software that provides interfaces designed to schedule a session. Here, it will also be assumed that the conferee has already selected a general time of day (e.g., morning) on a specific date when a session is to occur. At block 1062, the conferee indicates a specific session to schedule during some period within the general time of day specified. At block 1064, a system server identifies the space type (e.g., T1, T2, T3, etc.) associated with the session to be scheduled and at block 1066 the server searches a space schedule for a space of the type associated with the session that is not scheduled for some other activity. At block 1068, where a space of the type sought is available, control passes to block 1084 where the session is associated with the open time slot in the space schedule and at block 1086 the scheduled space is indicated to the conferee via the interface to be accepted.

Referring again to block 1068, if a space of the type sought is not available, control passes to block 1074 where the server searches for other space types with greater affordances (e.g., a larger number of emissive vessels) than the space already sought at block 1068. At block 1076, if a greater afforded space is available, control passes to block 1080 where the session is scheduled for the open time slot for the space. If a greater afforded space is not available at 1076, control passes to block 01878 were a lesser afforded space is sought. When a lesser afforded space is identified, control passes to block 1080 where the session is scheduled for that space during an open time slot. After block 1080, control passes to block 1082 where content for the session is reformatted for the space to be used during the session and then control passes down to block 1084. Where a space type other than the type for which session content was developed is scheduled to be used for an associated session, step 1082 or an additional step would include indicating to the conferee scheduling the session that a different space type has been assigned thereby allowing the conferee to access the reformatted session content virtually prior to the scheduled time for the session if desired.

The process of specifying a session content set for a specific session described above is intended to be relatively quick where the system server effectively only obtains the minimal content required from an instantiator and then fills in the rest of the content in a fashion optimized to facilitate a specific activity. For instance, referring again to FIG. 21 where an interface for entering session content for a T1/presentation combination is shown. As shown, all that a conferee needs to instantiate a session is to enter an agenda and to enter a source of main content. As shown, the main content may simply be selected from an existing file. For instance, an instantiator may simply assign an existing Power Point presentation to field 602 as main content.

One way to minimize the need to specify session content even more is to provide default content that does not require conferee development or selections for one or more of the vessels within a space of a certain type. To this end, see again FIG. 6A where default content types are shown in round brackets in column 118. For instance, where no agenda information is presented at the intersection of the T1 row and column 118, a system server would be programmed to present prior content 2 via a left front display. While defaults for only a subset of the content types in column 118 are shown, in some embodiments there may be different defaults presented for each of the content types or, in other cases, there may be one default content type (e.g., scenic 1) for all unspecified content types.

In at least some embodiments it is contemplated that, instead of selecting a space type and then selecting an activity as described above, an instantiator may simply select an activity type and indicate a number of conferees and a system server may then, based on the activity type and the number of conferees that are to attend, select an optimal space type. Thus, if a first conferee intends to present session content during a presentation activity to two other conferees, the system may select a T1 type space and if the same first conferee were to present the same session content to ten other conferees, the system may automatically select a T3 type space for the session. Here, after the system automatically selects space type, the system may follow a process similar to that described above to guide the instantiator to provide content required for each of the vessels that needs to be populated to instantiate a full session content specification for the specific space type and the selected activity.

In still other embodiments, an interface may guide an instantiator to select content types that the instantiator would like to present and, based on the content types the instantiator selects, the system may automatically select a space type, an activity type or both a space type and an activity type.

In still other cases, instead of initially selecting space type and activity type for a specific session, a session instantiator may simply provide session content of various content types to be stored as a session content set where the individual session content set (e.g., main content 1, main content 2, agenda, goals, etc.) is not initially associated with any space type or activity type. Thereafter, the instantiator may be provided the option to select any space/activity combination and apply that combination to the stored content set causing the server to map content to specific vessels within the selected space type and to be consistent with the selected activity for the session. Here, content that does not map to a space vessel would not be presented. Here, interfaces, lighting, wall transparency and other controllable affordances may be automatically controlled as a function of the space/activity combination selected by the system server.

In at least some cases project files may already exist where each file includes content of different types or information that can be used by a system server to automatically distinguish one type of content from another in the project file. Again, one data subset in a file may be labeled main content, a second data subset may be labeled agenda, a third data subset may be labeled goals, a fourth data subset may be labeled remote conferee AA, a fifth data subset may be labeled remote conferee BB, and so on, where the remote conferees AA and BB correspond to specific conferees that are routinely remotely located when a project group holds project sessions. Here, in at least some cases it is contemplated that a conferee may simply associate a specific project file with a specific space, a specific activity and a time and a system server would use the content in the project file to populate templatized vessels at the scheduled session time for the specific activity type. Thus, in this case, the system server would identify space vessels associated with the space/activity combination and project file content required to populate the vessels for the specific activity type and would then facilitate an optimized session accordingly.

As described above, it is particularly advantageous to use the space/activity type templates in a system where there is a limited number of space types and each space type includes relatively well defined sets of affordances. Nevertheless, it has also been recognized that the template system may also be useful in cases where each specific space in a system or at least each of a subset of the system spaces has a unique affordance sets where that information can be captured in templates useable to help users identify affordances associated with unique spaces, provide session content to drive vessels within those spaces, to preview a progressing session in a virtual view where content is shown on vessels within the unique space, and to control the content within the space during an actual session. Thus, for instance, here, an enterprise may have 200 different conference spaces scattered about throughout fifteen facilities located in various locations in several countries. Here, each of the 200 conference spaces may be differently afforded regarding emissive surface arrangements, vessels provided by surfaces, lighting capabilities, wall transparency capabilities (e.g., some may include transparency controllable wall assemblies and other may not), etc. A database may be developed for each of the spaces that specifies different activity based templates for each of the spaces where all affordance characteristics that can be controlled to optimize for specific activities are specified within the database. Here, each template may be used to allow an instantiator to specify session content for an associated space type, preview a session virtually for the space, control content in the space during an ongoing session, customize content presentation during a session and take advantage of all controllable features of space affordances.

In some conference spaces at least some affordances can be moved about within the spaces to change juxtapositions of affordances within those spaces. Thus, for instance, some flat panel electronic displays have been mounted to carts that are moveable to different positions within a conference space to provide different display arrangements. For example, cart mounted large displays can be used in some cases to divide a single conference space into smaller spaces for breakout conferencing sessions. As another example, cart mounted large displays can be moved to locations behind and to the sides of two facing conferees so that the two conferees can share content with each other thereon and can view the shared content with only a small change in eye gaze trajectory from the other conferee to the content presented on the display. Other display repositioning systems are contemplated.

As another instance, in some cases a ceiling structure may be mounted to be raised and lowered about the periphery of a conference table to control the sense of space for conferees about the table. For example, a height adjustable drop ceiling structure may be controllable about a round table to change the sense of space thereabout. As still one other instance, one or more wall members within a space may be moved to increase or decrease the size and sense of the space.

In some cases affordances may be manually moved to optimal positions within space. In other cases that are particularly interesting in the present disclosure, some type of activator may be provided for at least some affordances to move those affordances to different optimal locations in an automated fashion without requiring manual movement by a conferee. For instance, in the case of a cart mounted display vessel, a motor or the like may be linked to one or more casters on the underside of the cart for rotating the caster and thereby moving the cart. In the case of a moveable wall structure, the wall may be supported on casters that again can be driven by one or more motors to move the wall about to different locations within a space.

In still other cases moveable space affordances may not include emissive surfaces and instead may simply provide moveable opaque screen or privacy panel structures. In some cases the privacy panel structures may be manually moveable while in other cases the structures may be actuated and controlled by a system server to assume optimal positions within a space. Many other moveable space affordances are contemplated.

Where space affordances can be moved within a space, in at least some embodiments it is contemplated that space/activity templates may specify optimal affordance locations selected to enhance associated activities. For example, see FIG. 53 that shows a set of three cart mounted display vessel assemblies. Unless indicated otherwise hereafter, the cart assemblies 1090*a*, 1090*b*, 1090*c*, etc., will be referred to as first, second and third totems. Each of the totems is similarly constructed and operates in a similar fashion and therefore, in the interest of simplifying this explanation, only totem 1090*a* will be described here in detail. Totem 1090*a* includes a housing structure 1094 that forms the general external shape of the totem and that forms an internal cavity for receiving various totem components. Casters or wheels 1096 are mounted to the undersurface of the housing structure or are inset within the undersurface so that the base portion 1092 of the housing structure can be as low as possible while still supported above an ambient floor surface.

Figure 53:
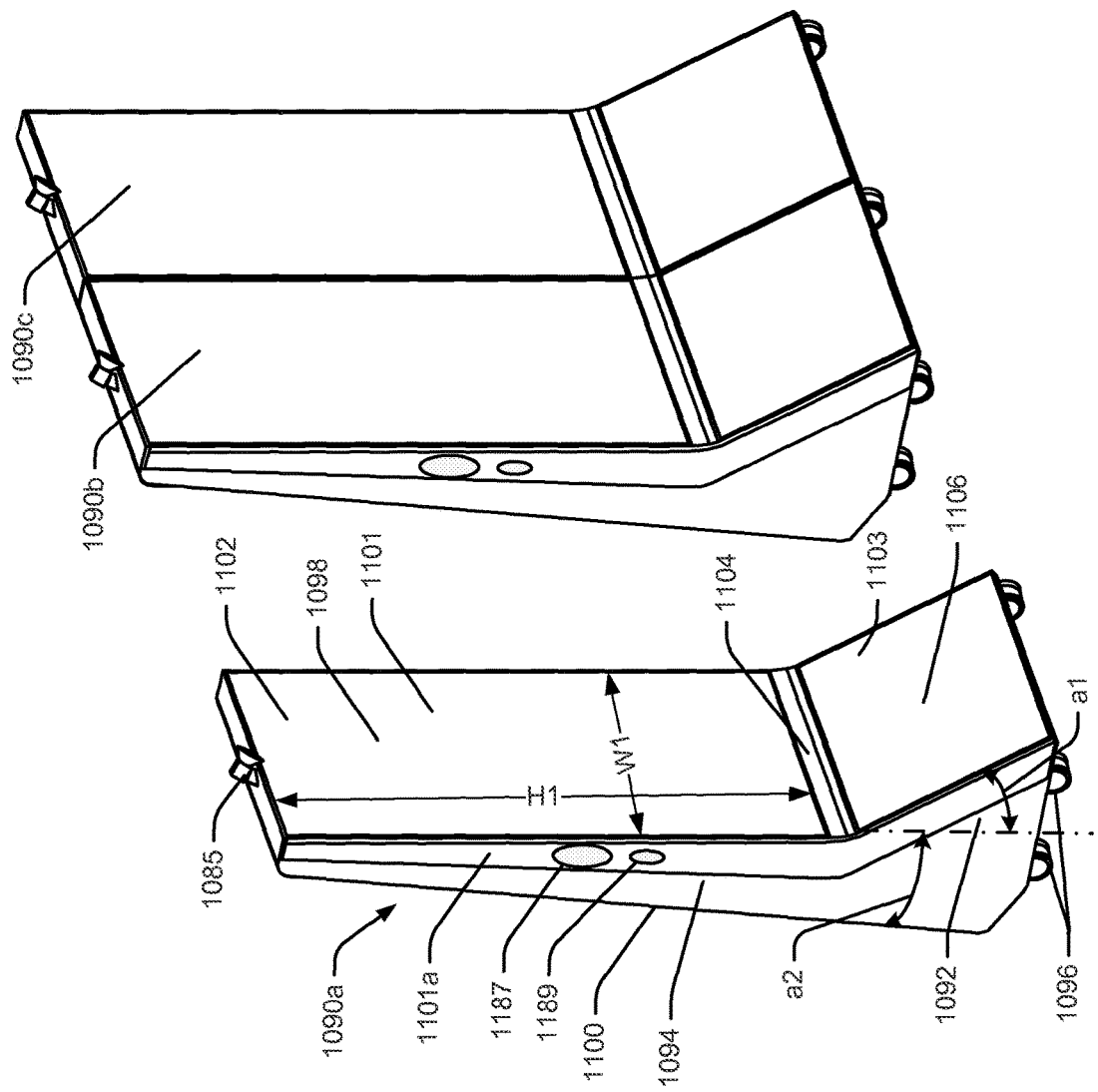
FIG. 53 is a perspective view of three exemplary totem assemblies including emissive surfaces that are consistent with at least some aspects of the present disclosure.
Figure 54:
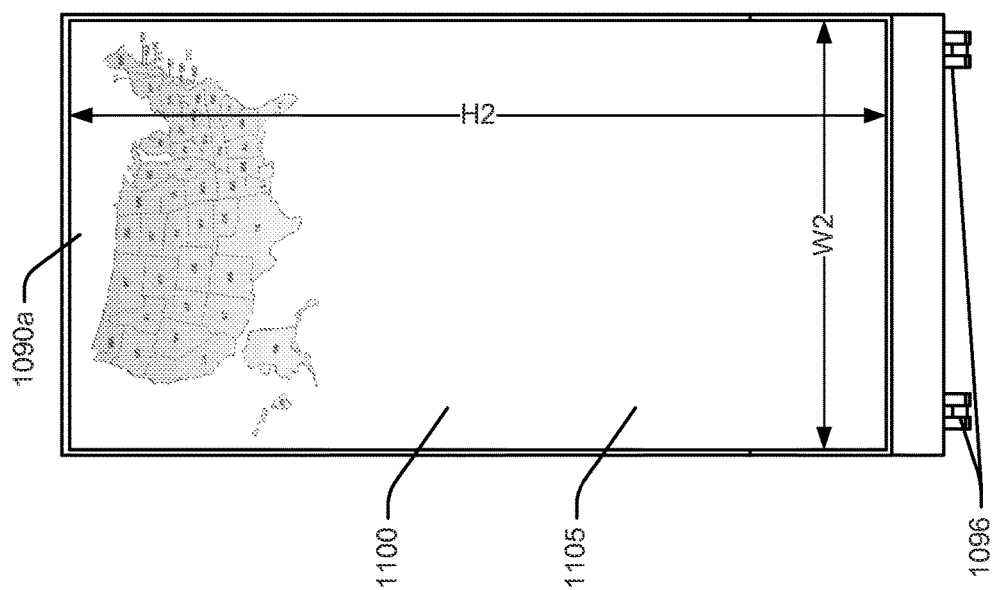
FIG. 54 is a front plan view of one of the totems of FIG. 53.

Referring still to FIG. 53, the housing structure has front and rear surfaces 1098 and 1100 that generally face in opposite directions and first and second lateral wall members that are substantially parallel to each other and that traverse the distance between the front and rear surfaces 1098 and 1100. Referring also to FIG. 54, rear surface 1100 is generally rectangular and flat and covers substantially the entire surface back portion of totem 1090*a*. Surface 1100 angles toward the front surface when moving from bottom to top and forms an acute angle a2 or between 3 degrees and about 20 degrees with a vertical axis 1091. Front surface 1098 includes three sections including a lower section 1106, an upper section 1102 and an intermediate section 1104. The lower section is substantially rectangular and flat and extends upward from a lower end of the housing to the intermediate section, forming an angle a1 with the vertical axis 1091 as it angles toward the rear surface 1100 when moving from the bottom end toward the top. Angle a1 is substantially greater than angle a2 and, in some embodiments is between 5 degrees and 60 degrees. In particularly advantageous embodiments angle a1 is within a range between 30 degrees and 45 degrees so that the face of section 1106 generally faces upward. In at least some embodiments a width dimension from lateral edge to lateral edge of section 1106 is greater than a dimension between the top and bottom edges of section 1106.

Upper section 1102 is also generally flat and rectangular and extends upward angling toward rear surface 1100 to form an acute angle with vertical axis 1091 that is within a range of between 3 degrees and 20 degrees. In some cases, the angle formed by surface 1102 is slightly less than angle a2. Intermediate section 1104, in at least some embodiments, curves between the surface sections 1102 and 1106 so that there is a smooth transition between those two sections.

Referring still to FIG. 53, in at least some embodiments, totem 1090*a* includes a flat panel display screen or surface 1101 mounted within the housing where the emissive surface forms substantially the entire surface of section 1102. In particularly advantageous embodiments, only a very small bezel (e.g., 1/16th to 1/2 an inch) exists along at least the lateral edges of the display 1101 so that an image presented thereby stretches substantially to the lateral edge of the totem 1090*a* itself. In at least some embodiments display 1101 may curve about the side edges of the housing structure (see 1101*a* in FIG. 53) so that an image presented thereby curves about the lateral edges. The lateral edge may have a radius (not shown) of between one half an inch and four inches in some embodiments so that a presented image can be seen as continuous around the lateral edge when viewed from an angled trajectory as in FIG. 53.

In at least some embodiments, another flat panel display 1103 is mounted within the housing where the emissive surface formed by the display forms substantially the entire surface of section 1106. In particularly advantageous embodiments, only a very small bezel (e.g., 1/16th to 1/2 an inch) exists along at least the lateral edges of the display 1103 so that an image presented thereby stretches substantially to the lateral edge of the totem 1090*a* itself. Although not shown, in at least some embodiments display 1103 may curve about the side edges of the housing structure so that an image presented thereby curves about the lateral edges. Again, the curve at the lateral edges of display 1103 may have a radius of between one half and four inches.

Referring yet again to FIG. 53, in some cases intermediate section 1104 may also be emissive so that an image or visual effect presented via displays 1101 and 1103 can continue substantially unimpeded through the intermediate section 1104. In some embodiments, displays 1101, 1103 and the emissive surface at the intermediate section 1104 may be formed by a single emissive surface that curves at 1104 between the two flat planar sections at 1101 and 1103.

Referring still to FIG. 53 and now also to FIG. 54, in at least some embodiments totem 1090*a* includes a flat panel display screen 1105 mounted within the housing where the emissive surface formed by the display forms substantially the entire surface of section 1100. In particularly advantageous embodiments, only a very small bezel (e.g., 1/16th to 1/2 an inch) exists along at least the lateral edges of the display 1105 so that an image presented thereby stretches substantially to the lateral edge of the totem 1090a itself. Although not shown, in at least some embodiments display 1105 may curve about the side edges of the housing structure so that an image presented thereby curves about the lateral edges. Display 1105 has height H2 and width W2 dimensions. The height dimension H2 is substantially the entire height of the totem 1090a.

Referring again to FIG. 53, in at least some embodiments, totem 1090a includes a high definition camera mounted adjacent the top edge of emissive surface 1101 that is aimed along a trajectory so that a field of view is generally to the unobstructed side of surface 1101. Totem 1090a may also include speakers 1087 and, in at least some embodiments, one or more microphones 1089, to facilitate communications with remote conferees and to provide sound to go along with content presented on the totem emissive surfaces. Here, because the totems may be in different positions, it will often be advantageous to generate audio from the instantaneous position of a totem. Camera 1085, speakers 1087 and microphones 1089 may be used to facilitate a telepresence process as known generally in the art. In other cases, audio associated with content (e.g., telepresence or other content) presented on a totem surface may be generated via speakers (see 30 in FIG. 2) mounted within a space associated with the totem. Similarly, microphones 27 (see again FIG. 2) mounted within a space may be used along with a moveable totem during telepresence or other activity. Here, microphones mounted within a space will likely be better located to pick up audio within the space than microphones provided on the totems themselves. In a particularly advantageous embodiment video cameras and speakers will be provided on each totem while microphones used with the totems will be mounted at optimal locations (e.g., table tops) within the space associated with the totem. Again, while an overall system that includes moveable totems, speakers, video cameras, microphones, stationary emissive surfaces, etc., is relatively complex and may be intimidating in general, the templates that pre-define different coordinated operations of those components to optimally facilitate different activity types should encourage the use of many space capabilities that would otherwise be unused or at least underutilized.

The totem height may be within a range between five feet and eight feet and, in particularly advantageous embodiments, will be between six feet and seven feet. Totem width (e.g., W2) will be within a range between one foot and five feet and in particularly advantageous embodiments will be between two feet and three and one half feet. Other dimensions are contemplated but the dimensions here are particularly useful in cases where multiple totems may be aligned next to each other to provide a single image across adjacent display vessels (see FIG. 62 for example) as will be described in greater detail below. For instance, where totem widths are 2 and ½ feet, two adjacent totems can present a combined image having a 5 foot width dimension.

In at least some cases optimal totem dimensions may be related to the average or maximum dimensions of a typical adult human being. For instance, the totem height may be six and one half feet tall and the width may be two and one half feet wide so that a complete and life size image of a remote conferee can be presented via the front facing emissive surface 1101 or the rear facing emissive surface 1105 (see FIG. 54). It is believes that life size high definition representations of remote conferees result in a more connected and intimate collaboration in many cases.

In particularly advantageous embodiments, totem 1190a includes displays or emissive surfaces on each of surfaces 1102, 1104, 1106 and 1105 so that displays face in opposite forward and rearward directions from the totem 1090a.

Figure 55:
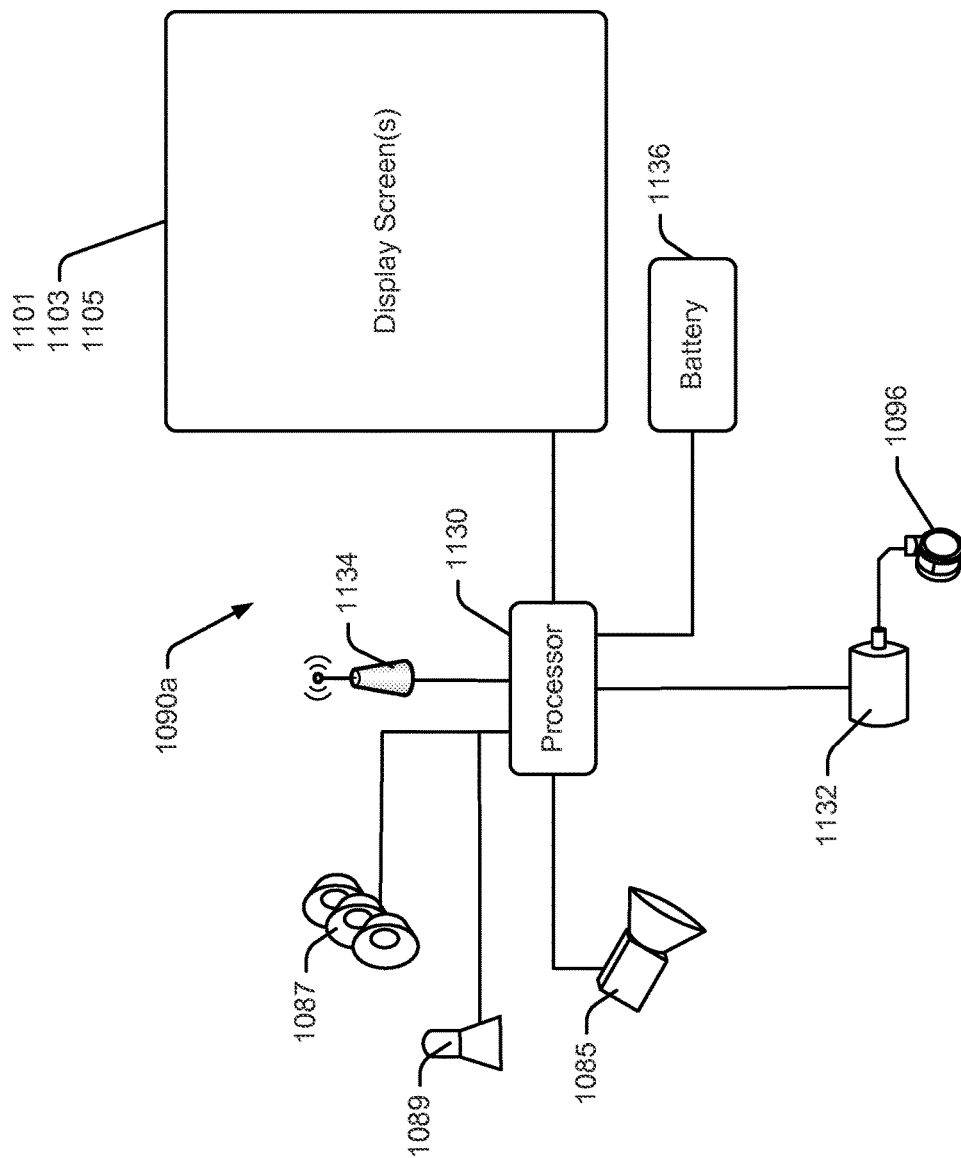
FIG. 55 is a schematic showing various components of the totem of FIG. 54.

Referring now to FIG. 55, a simplified schematic diagram 1090a is illustrated that shows various components of the exemplary totem 1090a. As illustrated, totem 1090a includes emissive surfaces 1101, 1103, 1105, a camera 1085, casters 1096, a processor 1130, a wireless transceiver 1134, a power source or battery 1136 and one or more actuators 1132. Processor 1130 is linked to each of the transceiver 1134, camera 1085, displays 1101, 1103 and 1105, battery 1136 and actuator 1132. Processor 1130 receives power from battery 1136 for operation and also provides battery power to the other totem components. Processor 1130 communicates with a system server (see again 36 in FIG. 1) via wireless access points (see 28 in FIG. 1) located within facility spaces. In particular, processor 1130 receives signals from a system server indicating where the totem 1090a should be located and its required juxtaposition with respect to other space affordances and perhaps with respect to different conferees within a space at different times as well as content to be presented on the totem displays 1101, 1103 and 1105, at different times. Processor 1130 drives displays 1101, 1103 and 1105 with content received from the system server.

Referring still to FIG. 55, actuator 1132 includes one or more motors that are coupled to casters or wheels 1096 for moving totem 1090a about within an associated space. In particularly useful embodiments, actuator 1132 is capable of moving a totem 1090a to essentially any location within an associated space and to reorient the totem to face in any direction within the space. Thus, for instance, see totem 1090a in each of FIGS. 57 and 58 where the totem 1090a is in a parked and stored location and is facing a different direction in a second location within an associated space, respectively.

Figure 56:
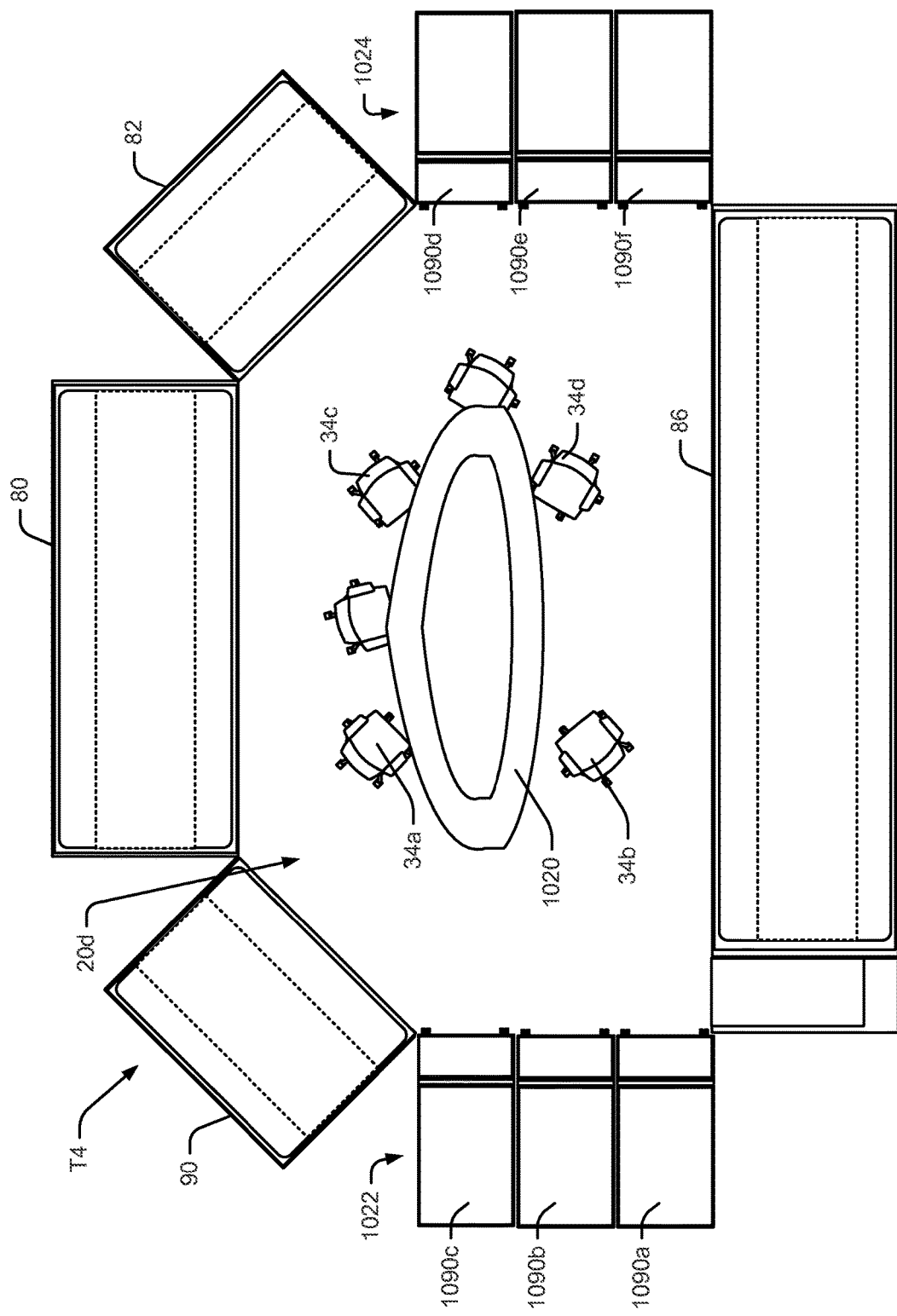
FIG. 56 is a view similar to the FIG. 5 view, albeit of another space type that includes six totems like the FIG. 53 totems.

Referring now to FIG. 56, an exemplary fourth space type T4 is illustrated that defines a space 20d similar to space 20c defined by space type T3 shown in FIG. 5 and described above. Space type T4 includes an elongated table assembly 1020 and a plurality of task chairs 34a through 34d, among other affordances. In FIG. 56, the space shape 20d is defined by four emissive walls 90, 80, 82 and 86 that are similar to and arranged in a similar fashion to the similarly numbered emissive walls in FIG. 5. In FIG. 56, however, the left and right side emissive walls 88 and 84 from FIG. 5 are replaced by multi-totem systems 1022 and 1024, respectively. Each of totem systems 1022 and 1024 is similar and the components thereof operate in a similar fashion and therefore only system 1022 will be described here in some detail in the interest of simplifying this explanation. For the purposes of this disclosure it should suffice to say that system 1024 includes a parking station 1027 (see FIG. 58) and three totems 1090d, 1090e and 1090f that will be referred to herein after as fourth, fifth and sixth totems, respectively.

Figure 57:
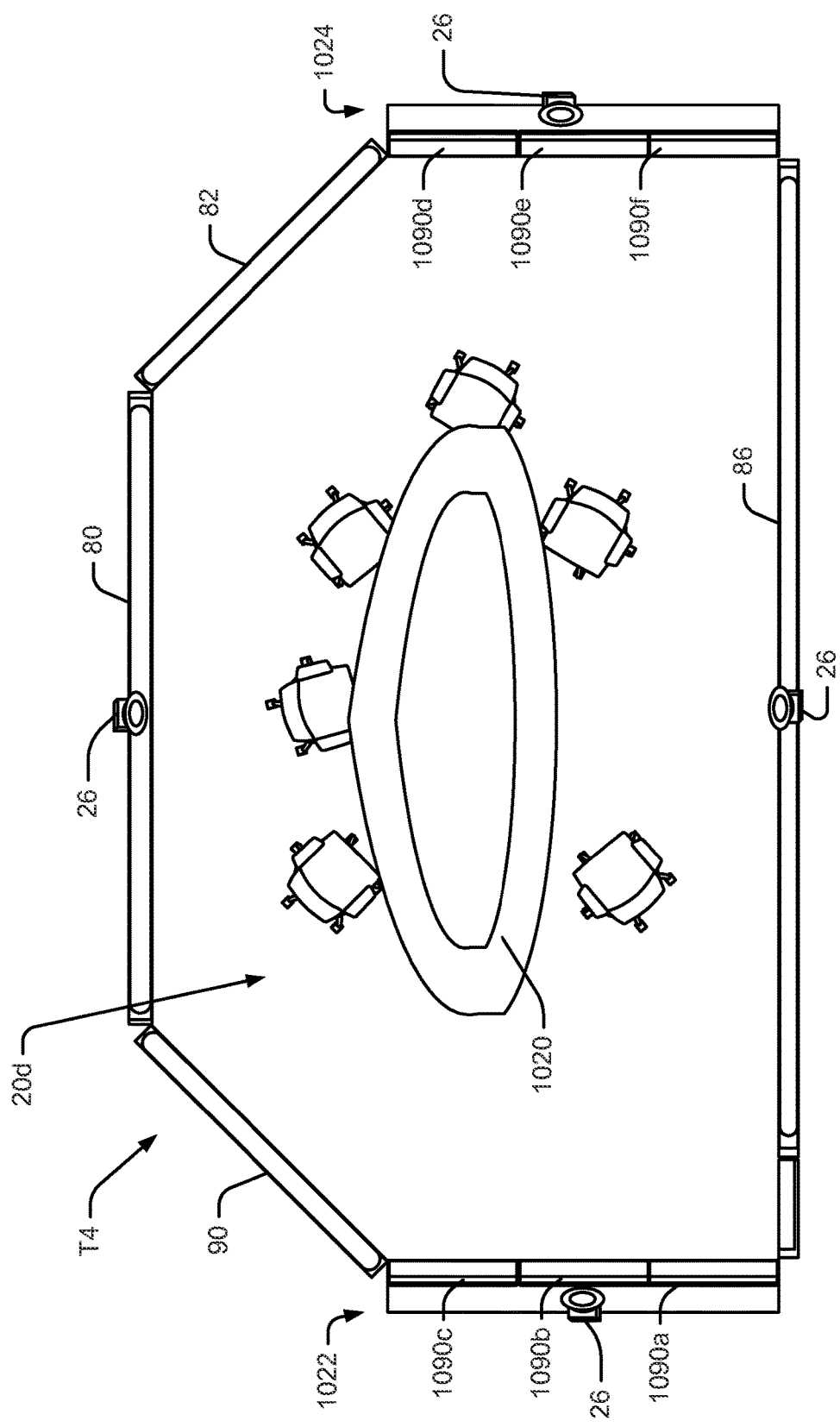
FIG. 57 is another view of the FIG. 56 space type where the totems are parked in storage locations.
Figure 58:
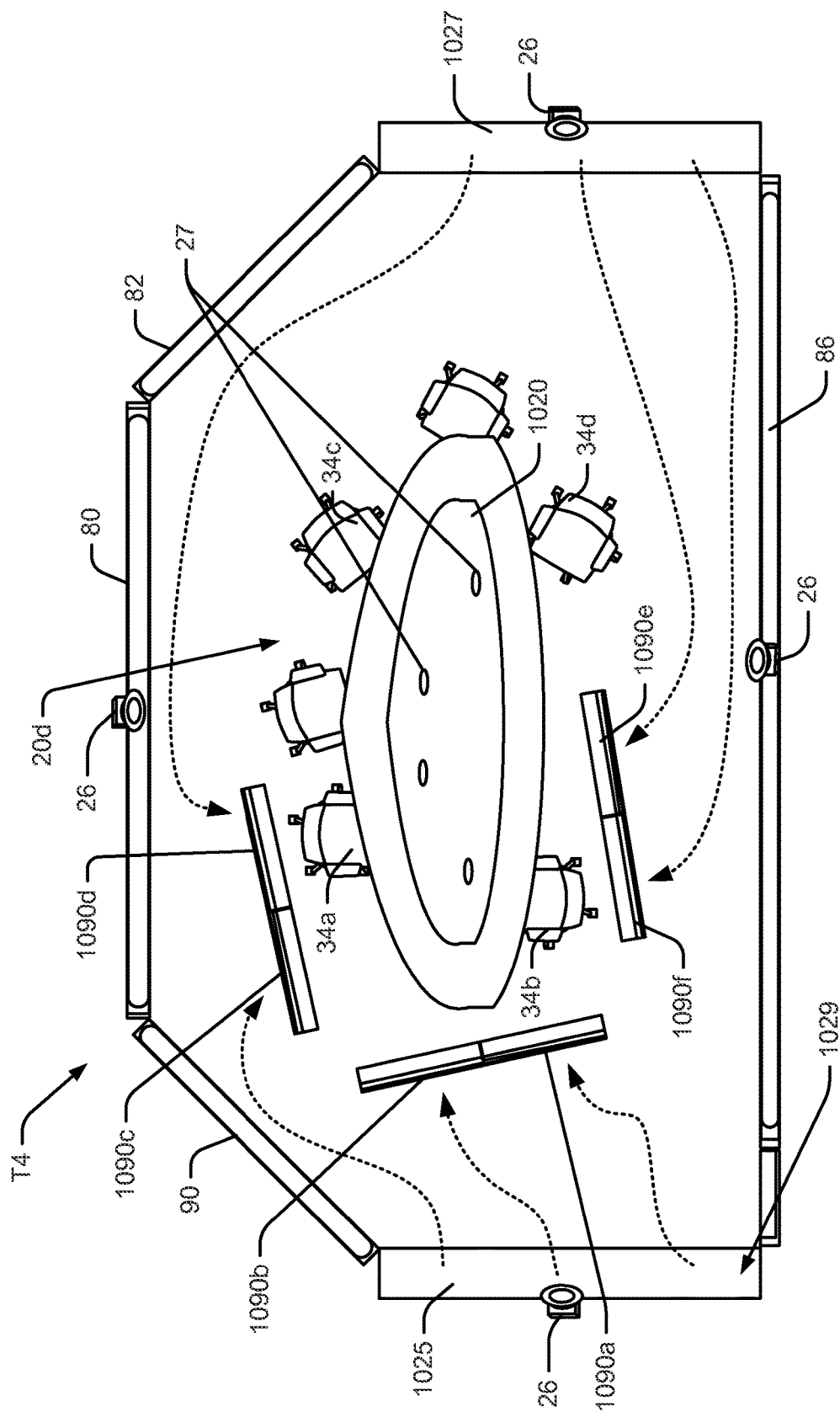
FIG. 58 is similar to FIG. 57, albeit showing the totems in use positions to support a dyadic collaboration session by two conferees within the space.

Referring to FIGS. 56 through 58, totem system 1022 includes a parking station 1025 and first, second and third totems 1090a, 1090b and 1090c, respectively. Station 1025 includes structure that forms a receiving alcove 1029 that opens into space 20d and that is dimensioned to receive all three of totems 1090a, 1090b and 1090c in an edge to edge arrangement with the displays that form the front surfaces thereof aligned edge to edge and substantially coplanar (see FIGS. 56 and 57). When parked in station 1022, a lateral edge of totem 1090c is immediately adjacent a lateral edge of emissive wall 90. Thus, when parked adjacent each other as in FIG. 56, the front display surfaces of totems 1090a, 1090b and 1090c generally continue the emissive surface arrangement of the other stationary wall structures about space 20*d* except for minimal areas associated with the thin bezels about each display. When totems are arranged with front displays adjacent and co-planar, a single image can be presented across two, three or more displays at times. To this end, see FIG. 62 where totems 109*a* and 1090*b* are shown with lateral edges adjacent with coplanar front displays and where a single large image 1112*a* is presented across adjacent coplanar displays. Where three totems are aligned (see FIGS. 56 and 57), an even larger image may be presented when desired.

In at least some embodiments station 1022 will include, among other components, charging assemblies for each of the totems so that when a totem is parked therein a link is automatically formed to battery 1136 (see again FIG. 55) to charge the battery. U.S. provisional patent application No. 62/106,040 (hereinafter "the '040 application") which was filed on Jan. 21, 2015 and which is titled "Powered Furniture Assembly" describes several charging assemblies for a chair and more generally for different types of furniture where a mobile furniture assembly can be moved to a charging station to link to a charging assembly for charging a battery and is incorporated herein in its entirety by reference. Any of the charging systems described in the '040 application may be incorporated in station 1022 (e.g., see the system in FIGS. 9 and 10).

In other embodiments, totem systems 1022 and 10245 may not include parking stations 1025 and 1027 and instead, the totems 1090*a* through 1090*f* may simply be moved to locations adjacent left and right walls to be stored or positioned for stationary use at times as additional emissive surfaces. Where totems 1090*a* through 1090*f* are not parked in stations, a robotic wireless charging station like one of the robotic stations described in the '040 application may be provided to move about within space 20*d* and perhaps in other spaces (e.g. on an entire floor of a facility) to recharge totems.

In addition to the types of activities (e.g., presentation, collaboration, generation, rejuvenation, etc.) described above with respect to database 6A and 6B and related figures, another type of activity that may be supported by a system consistent with at least some aspects of the present disclosure is a two person collaborative activity which will be referred to herein as "dyadic collaboration". In at least some cases it is believed that a particularly advantageous type of communication occurs when only two people collaborate together as opposed to a case where a larger number of people collaborate at the same time. It is believed that in many cases where three or more conferees collaborate, strong personalities often take over and points of view of relatively timid conferees are never voiced or are overshadowed by others. Where two persons collaborate, even relatively timid or introverted conferees are more apt to voice their opinions and add value to a project.

In dyadic collaboration, because only two conferees are present, a relatively small conference space is often preferred. In addition, in dyadic collaboration, as in other collaboration types, locations of emissive surfaces can appreciably affect the quality of a collaborative session. More specifically, in dyadic collaboration, placement of emissive surfaces close to two conferees often provides a strong sense of being immersed in session content and can increase a level of content understanding as well as retention rates. Moreover, by placing important content at the same vertical level as and just to the side of each conferee, minimal effort is needed to change gaze back and forth between a conferee and content during collaborative activity.

Figure 59:
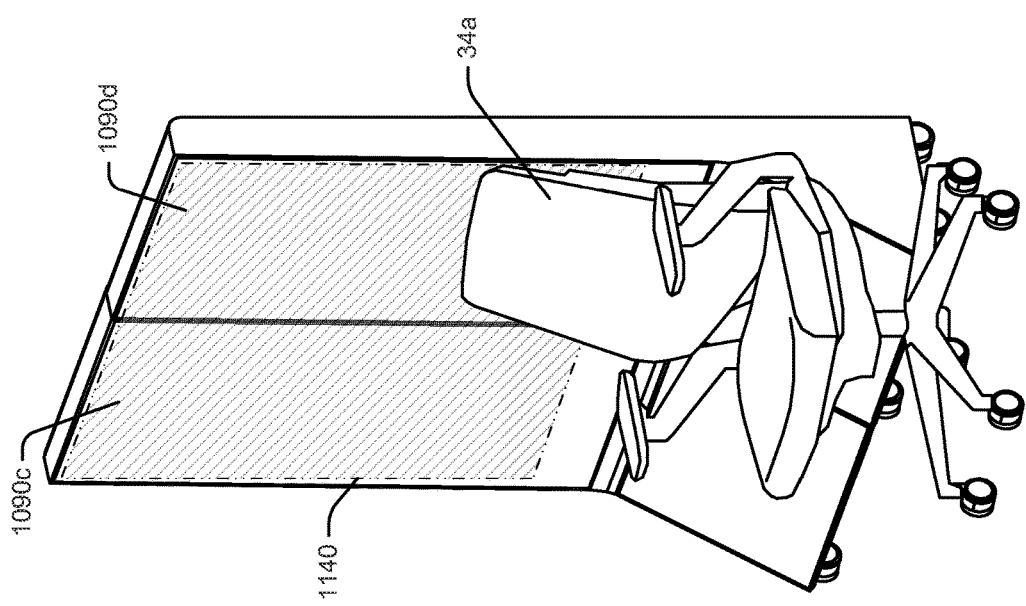
FIG. 59 is a perspective view showing two FIG. 53 totems adjacent a task chair and that a single content presenting vessel may be presented across adjacent emissive surfaces of two totems.

To best support at least certain types of activities, system totems may be moved about within a conference space. For instance, to best support dyadic collaboration, referring to FIG. 58, system totems 1090*a* through 1090*f* may be moved to the positions generally about first and second conferees seated in chairs 34*a* and 34*b*, respectively, as illustrated. In the illustrated arrangement, totems 1090*c* and 1090*d* have been moved to locations behind and generally to the side of a first conferee in chair 34*a* and should have the juxtapositions shown in FIG. 59. When so positioned, the two front surface displays on totems 1090*c* and 1090*d* are coplanar and adjacent and, if desired, may be used to present a large image on a combined space 1140 that covers the adjacent and coplanar displays. To the second conferee in chair 34*b* facing the first conferee in chair 34*a*, content shared in space 1140 is at the same general height as the first conferee's face and offset to the left side thereof so that the second conferee can minimally change the trajectory of eye gaze back and forth between the first conferee's eyes and content in space 1140 during the dyadic collaboration session. In FIG. 58, the locations of totems 1090*c* and 1090*d* will be referred to herein as "rear conferee 1-1" and "rear conferee 1-2" positions indicating that the totems are in first and second positions to the rear of the first conferee (e.g., "conferee 1").

Referring again to FIG. 58, totems 1090*e* and 1090*f* are shown in positions behind and to the left (when viewed by the first conferee in seat 34*a*) of the second conferee seated in chair 34*b*. Consistent with the position naming formula above, the positions of totems 1090*e* and 1090*f* will be referred to herein as "rear conferee 2-1" and "rear conferee 2-3", respectively, indicating that the totems are in first and second positions to the rear of the second conferee (e.g., "conferee 2"). Thus, the first conferee in chair 34*a* has the same advantageous view of the second conferee and shared content that the second conferee has of the first conferee and shared content (e.g., see again FIG. 59).

Referring still to FIG. 58, totems 1090*a* and 1090*b* are shown in an aside location (at an "aside 1" location and an "aside 2" location, respectively) to one side of the first and second conferees in chairs 34*a* and 34*b*, respectively, at one end of the table assembly 1020. Here, other content may be presented on the totem 1090*a* and 1090*b* displays such as, for instance, prior content 1, an agenda, etc., or whatever content is specified during an instantiation session.

While the totems 1090*a* through 1090*f* may be moved manually to the locations shown in FIG. 58, in particularly advantageous embodiments a system server will be programmed to automatically control totem positions within space 20*d* via wireless communication with totem processors (e.g., see 1130 in FIG. 55 and transceiver 1134). In this regard, for instance, where the first conferee has indicated that dyadic activity is associated with a particular session, once first and second conferees enter space 20*d* and sit in chairs 34*a* and 34*b*, a system server may automatically determine the locations of the first and second conferees within space 20*d* and then move the totems to the FIG. 58 locations. To determine conferee locations, cameras 26 are provided within space 20*d* for generating images useable by the system server or other processor to detect conferee locations and orientations within space 20*d*.

In at least some embodiments microphones 27 or other devices (e.g., cameras 26 for receiving gestures) capable of receiving signals from conferees within space 20*d* may also be provided within space 20*d* for receiving commands from conferees for controlling totem locations. For instance, near the end of a dyadic session, the first conferee may want to end the session and may be able to verbally annunciate "Session ending", to signal to a system server to move the totems back to parked locations so that the conferees have unobstructed paths out of space 20*d*. Other conferee signals may be useable to control totem locations such as gestures identified via images generated by system cameras 26, an indication via a personal portable device (e.g., laptop, smart phone, tablet device, etc.), etc.

Referring to FIG. 58, in addition to providing content near conferees during a dyadic collaboration session, the totem locations about the first and second conferees totally change the feeling of the overall space 20*d* for the first and second conferees, making the space and the experience feel more intimate and private. Here, it is believed that the dyadic experience should be enhanced by the closeness of the shared content and the overall smaller feeing of the space used by the conferees in the present example.

Referring now to FIG. 60, an exemplary space/activity template database 1200 is illustrated that includes specifications for a T4 type space and a dyadic collaboration activity (e.g., a T4/dyadic collaboration combination). Database 1200, like the FIGS. 6A and 6B database, includes a space type column 1202, a vessel arrangement column 1204 and an activity type section 1206. The T4 space type (e.g., emissive 6 totem room) is listed in column 1202 and all of the emissive surface vessels associated with the T4 type space are listed in column 1204. Of particular interest, 18 separate vessels are listed at 1212 for the six totems 1090*a* through 1090*f*, including cloud, foveal and ground vessels for each of the six totems. Section 1206 includes a dyadic collaboration section 1208 including a content type column 1209 and a position column 1210 that define content types for each vessel in the T4 type space and positions for each of the totems 1090*a* through 1090*f*. Consistent with the description above, the positions for totems 1090*a*, 1090*b*, 1090*c*, 1090*d*, 1090*e* and 1090*f* are listed as "aside 1", "aside 2", "rear conferee 1-1", "rear conferee 1-2", "rear conferee 1-2" and "rear conferee 2-2", respectively. Content on the totems includes a context data feed, main content and a scenic view for each of the cloud, foveal and ground vessels, respectively. Here, adjacent context data feed vessels may present a single context data feed image, adjacent main content vessels (e.g., adjacent foveal vessels) may present a single main content image (see again FIG. 62), and so on. In at least some cases the same main content will be presented on each of the totem subsets 1090*c*, 1090*d* and 1090*e*, 1090*f*, so that conferees in chairs 34*a* and 34*b* see the same main content over each other's shoulders.

Where totems 1090*a* through 1090*f* are moved to positions within a space 20*d* relatively near table assembly 1020, in at least some embodiments, it is contemplated that a system template may divide up session content on emissive surfaces within a space 20*d* in other meaningful ways. For instance, referring still to FIG. 58, the displays associated with totems 1090*a* through 1090*f* would clearly be closer to the first and second conferees seated in chairs 34*a* and 34*b*, respectively, than are the emissive surfaces provided by wall structures 80, 82, 86 and 90, which are generally located rearward of totems 1090*a* through 1090*f*. Here, in at least some cases, main content may be presented on the totem displays while other content that is of less immediate interest or relatively less import may be presented on the wall based emissive surfaces. For instance, while main content may be presented on totem surfaces, an agenda, session goals, a context data feed, etc., may be presented via the wall based emissive surface 90, 80 and 86 in at least some templates.

While the exact locations of totems 1090*a* through 1090*f* in space 20*d* may be set for a specific type of activity in some cases, in other cases locations of totems 1090*a* through 1090*f* may be determined as a function of where conferees are located within space 20*d*. For instance, in FIG. 58, if the first and second conferees were to sit in chairs 34*c* and 34*d* instead of chairs 34*a* and 34*b*, totems 1090*a* through 1090*f* may be moved to locations about chairs 34*c* and 34*d* that are similar to the locations of chairs 34*a* and 34*b* shown in FIG. 58. Here, camera 26 images would be used to identify conferee locations and then totem positions would be controlled by a system server accordingly.

In some cases where a session has been instantiated and a session specification has been stored prior to occurring, prior to a start time associated with the session, a system server may configure totems or other moveable affordances (e.g., walls, ceiling structure, tables, etc.) within a space to facilitate a specific activity scheduled to occur in the space during a session. For instance, referring again to FIG. 58, where a dyadic collaboration activity is scheduled to occur in space 20*d*, twenty minutes before the activity is to commence and while no person is located in space 20*d* (as determined via images from cameras 26), a system server may control totems 1090*a* through 1090*f* to arrange those totems as shown. When the first and second conferees enter space 20*d* to start their session, the conferees may be able to simply discern that they should sit in chairs 34*a* and 34*b* based on prior experience or training on how to use the space arrangement for dyadic collaboration. In other cases, a server may be programmed to provide content that leads the conferees to sit in chairs 34*a* and 34*b*. For instance, conferee names gleaned from a session schedule may be provided on totem displays on totems 1090*d* and 1090*f* indicating where the first and second conferees should sit. Where a surface on table assembly 1020 is emissive, conferee names may be presented on the emissive surface to indicate locations that the first and second conferees should assume. In still other cases a map of the conference space may be presented via one of the emissive surfaces where positions to be assumed by the conferees are indicated on the map when conferees enter the space 20*d*.

Where totems 1090*a* through 1090*f* are positioned in space 20*d*, one or more of the totems may block views of conferees to at least portions of the emissive wall surfaces. For this reason, in at least some embodiments, a system server may be programmed to at least roughly identify sections of emissive wall surfaces or other display screens where one or more conferees have impeded views and may adjust locations of content on emissive surfaces as a function thereof. For instance, images of space 20*d* in FIG. 58 may be used by a system server to determine locations of first and second conferees seated on chairs 34*a* and 34*b* and of totems 1090*a* through 1090*f*, the server may use those locations to identify impeded sections of emissive walls 90, 80 and 86 and vessels on each of the walls 90, 80 and 86 may be moved accordingly to other locations on those walls so that content can be presented at viewable locations.

In at least some cases, even in systems that only include stationary emissive surfaces (see again FIG. 4), templates may alter locations of content on the emissive surfaces based on where the conferees are located within a space. For instance, where first and second conferees are seated in chairs 34*a* and 34*b*, a system server may use images from cameras 26 or other position sensing devices to identify conferee locations and may specify a mix of content on the space vessels that is different than if the same first and second conferees were seated in chairs 34c and 34d at the other end of table 24.

Figure 64:
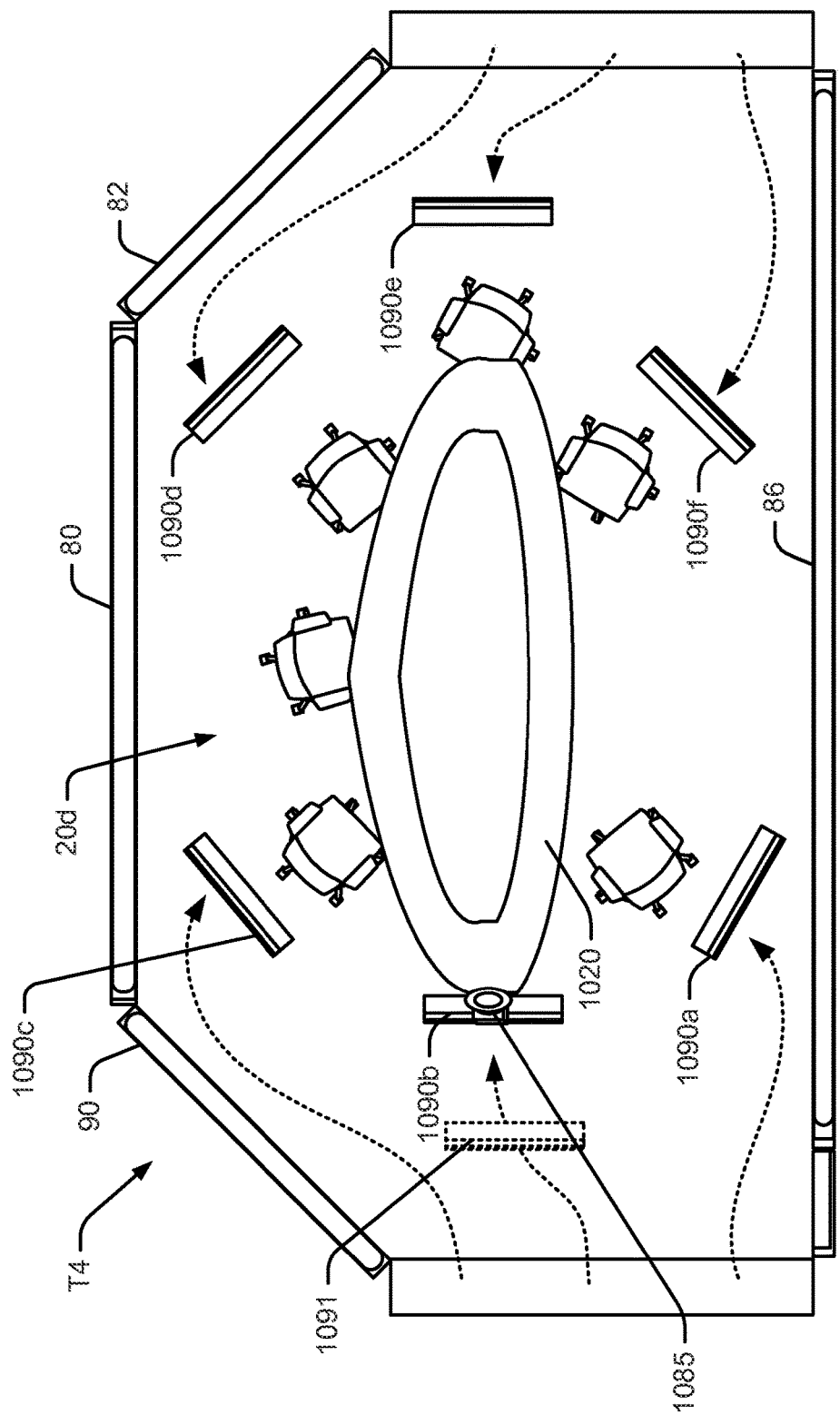
FIG. 64 is similar to FIG. 59, albeit showing the totems positioned in a different arrangement to support a different activity type within the space.

Referring now to FIG. 64, another arrangement of totems 1090a through 1090f within space 20d is shown where each of totems 1090a and 1090c through 1090f are shown spaced about table assembly 1020 generally behind conferees seated in chairs about the table 1020. The FIG. 64 arrangement may be particularly useful during a six person collaboration session where conferees can share content on totem displays in an egalitarian fashion. Although not shown, a database akin to the FIG. 60 database would include a template that specifies the arrangement of FIG. 64 for a collaboration session and that could be used to generate an instantiated instance of a specific collaboration session including session content.

In at least some embodiments it is contemplated that a remote participant may participate in a session. Where a remote participant participates, in at least some cases, it will be advantageous to locate a video image of the remote conferee immediately adjacent the edge of a table assembly within a conference space so that the conferee appears to be at the table with local conferees. In addition, locating a video image of a remote conferee at the end of a long table is advantageous as local conferees at the table each has a good viewing angle of the vessel that presents the remote conferee's video. In FIG. 64, totem 1090b is shown immediately adjacent an edge of table assembly 1020 as opposed to spaced behind conferee chairs and may present a video image of a remote conferee.

Referring still to FIG. 64, a template may specify different locations of totem 1090b for a collaboration activity type based on whether or not one or more remote conferee participates. For instance, as shown in FIG. 64, if one remote conferee participates, totem 1090b may be located at the end of table 1020. In the alternative, if no remote conferee is to participate in a session, totem 1090b in FIG. 64 may be positioned at the location 1091 shown in phantom spaced away from table 1020 and may be used to present some other content type via totem vessels. Similarly, where two remote conferees participate in a session, a second totem 1090e may be moved to the other end of table 1020 opposite totem 1090b to present an image of the second remote conferee at the table. In the alternative, first and second totems may be presented side by side at one end of the table 1020 with videos of the first and second conferees thereon, respectively. In any case where a remote conferee participates in a session via telepresence and one of the totems, the totem camera 1085 obtains high definition video of the session as it occurs and a system server may transmit that video to a computer or workstation used by the remote conferee to be presented. Thus, the remote conferee has a view point which is aligned with an image of the remote conferee within the session space so that local conferees and the remote conferee can make eye contact while communicating directly with each other via the totem.

In addition to group collaboration and dyadic collaboration, many other activity types may be specified by system templates where the totems are arranged in other positions within the space 20d that are selected to enhance the associated activity. For instance, see FIG. 65 where totems 1090a through 1090f are arranged in a different arrangement designed to allow one person in chair 34a to have a personal experience (e.g., focused individual work or some other personal experience) and to allow others in chairs 34b through 34e to have a smaller group session. To this end see that totems 1090a through 1090c are arranged near sections of emissive walls 90 and 80 to define a relatively small personal space optimized for personal activities while totems 1090d through 1090f are arranged at a right end of table assembly 1020 as illustrated to help separate the right end of table assembly 1020 and associated space from the rest of space 20d. Thus, in some cases a template may support two or more activities within a space at the same time. Here, different content will often times be presented via different sets of totem screens to the different conferee groups in the space 20d.

Figure 65:
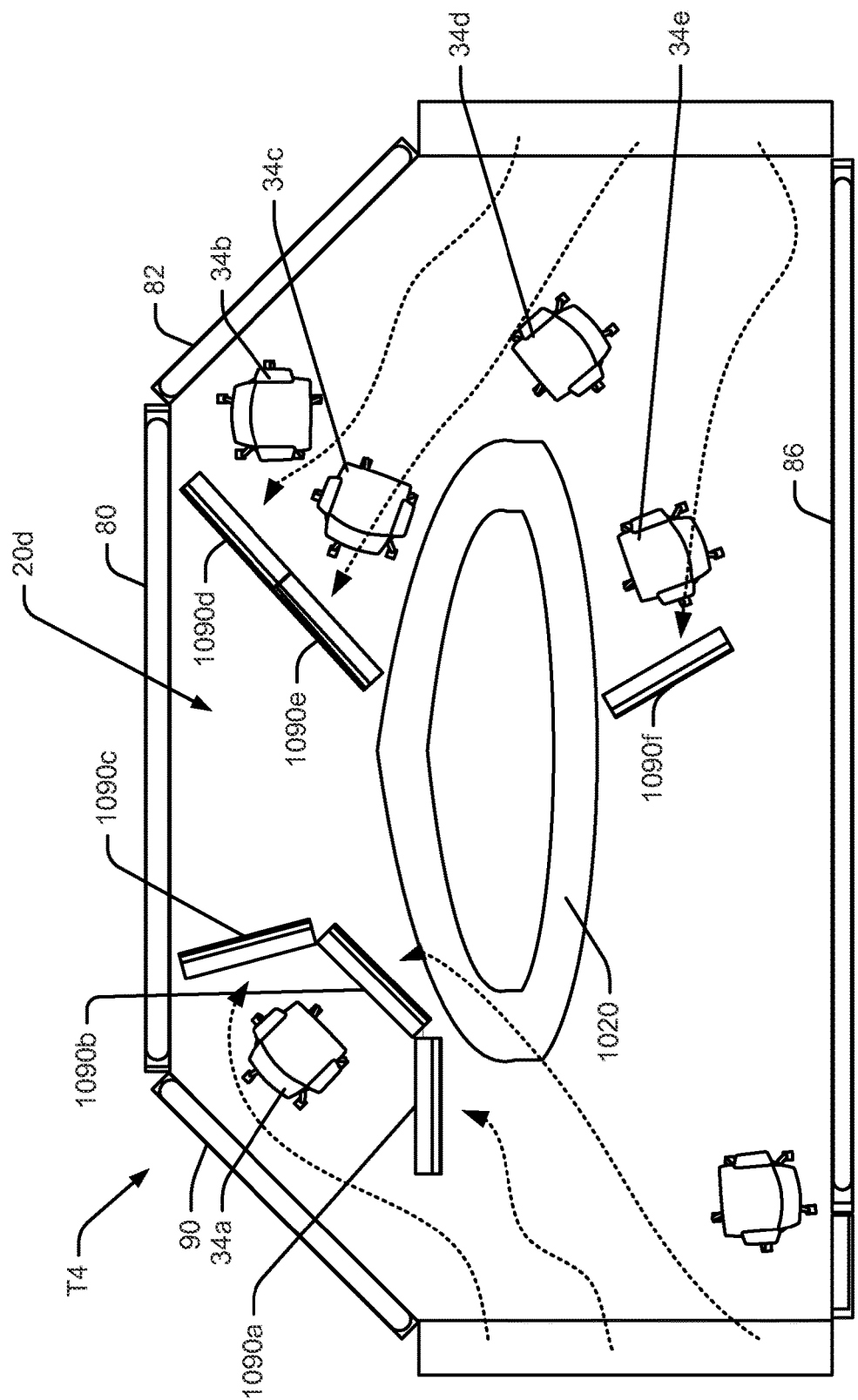
FIG. 65 is similar to FIG. 59, albeit showing the totems in yet another configuration to support two different activity types.

At least some embodiments described above contemplate that different activity types may occur in a conference space at different times during a single session and that content to support the different activities may change automatically as the session progresses. Similarly, as activities change during a session, session affordances like totems 1090a through 1090f that can move may be automatically moved to different positions within a space to support the different activities. For instance, one session may have two halves where a collaboration activity occurs during the first half and breakout sessions occur during the second half. In this case, during the first half, totems may be arranged as shown in FIG. 64 with a remote conferee present on the totem 1090b display at the table 1020 edge as shown. During the second half of the session, totems may be arranged as illustrated in FIG. 65 with the remote conferee conferencing with a local conferee seated in chair 34a and other conferees conferencing at the right end of table 1020 as illustrated. The transition from the FIG. 64 arrangement to the FIG. 65 arrangement may be automatic during a session break. During a wrap up of the session, totems 1090a through 1090f may be parked in storage positions as in FIG. 57 for concluding remarks. Again, all of the movements of the totems to optimally support different activities at different times may be automated.

Figure 66:
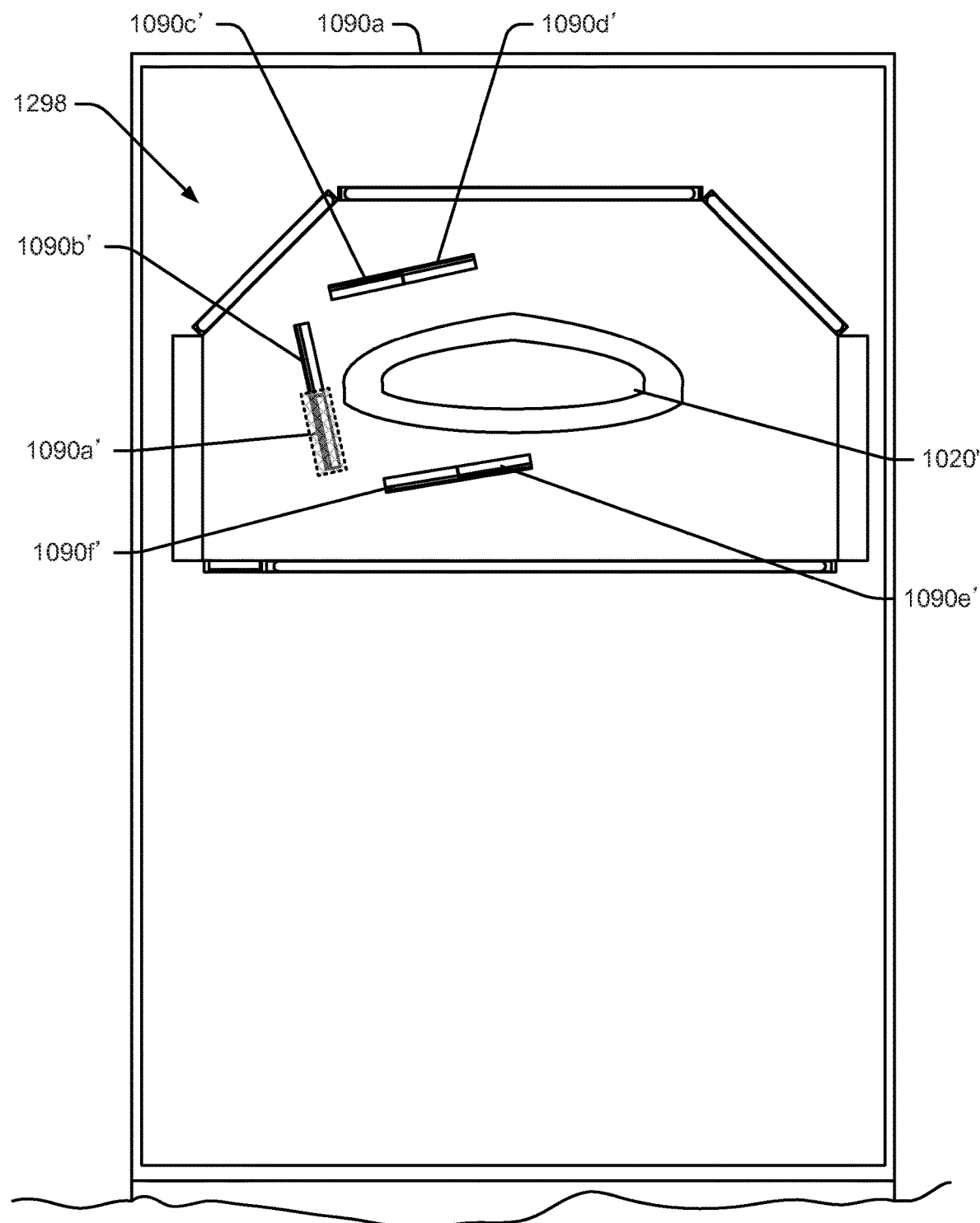
FIG. 66 is an image of an interface that may be presented via one of the totems in FIG. 58 to help a conferee position a totem at a specific location within a space that is optimized for facilitating a specific type of activity.
Figure 67:
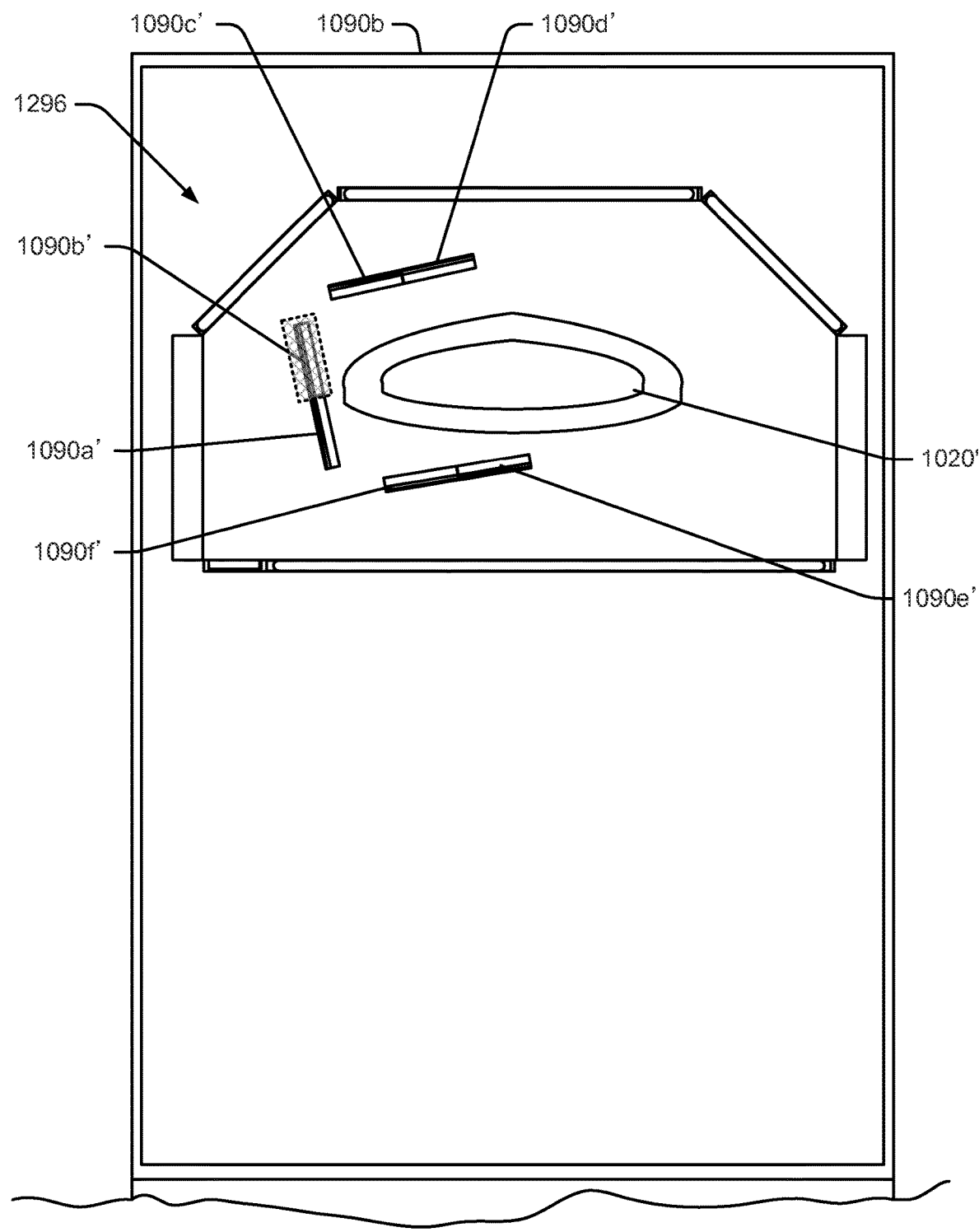
FIG. 67 is similar to FIG. 66, albeit showing an interface that may be presented via another totem to help a conferee position the other totem in space at an optimal location.

While not optimal, in some embodiments where totems do not include motors or other type of actuators for automatically moving the totems about within a space, a system server may instead request that one or more conferees in a space move totems to optimal positions within space 20d. For instance, when totems 1090a through 1090f are to be repositioned, a system server may present a simple map on each of the totem surfaces 1101 showing a top plan view of the space 20d and an optimal location for the totem presenting the map. Here, each map presented by a totem would be different than the maps presented by other totems as each map would indicate the optimal location of the totem presenting the map. For example, see FIGS. 66 and 67 that show two different map images that may be presented on surfaces 1101 of totems 1090a and 1090b, respectively, to guide a conferee to move totems 1090a and 1090b to the dyadic collaboration positions shown in FIG. 58. In each map image, the space conference table is presented at 1020', space walls are shown and totems 1090a through 1090f are represented at 1090a' through 1090f, respectively. The image 1298 in FIG. 66 that would be presented on vessel 1101 of totem 1090a highlights totem representation 1090a' to indicate where that specific totem should be positioned while the image 1296 in FIG. 67 that would be presented on vessel 1101 of totem 1090b highlights totem representation 1090b' to indicate where that specific totem should be positioned within the space.

In other embodiments where a conferee has to reposition totems manually, a system server may track locations of each totem in a space and may present specific directions on how to move each totem to optimized positions where the directions are updates as a function of the changing location of each totem until the optimized position is achieved. Thus, for instance, referring again to FIGS. 57 and 58, assume that totems 1090a through 1090f are first parked in their storage positions as shown in FIG. 57 but that optimal positions for the totems are as shown in FIG. 58. Here, directions may be presented on vessel 1101 of first totem 1090a instructing a conferee to pull the totem forward. Once totem 1090a is removed from the parked position, the instructions may be updated to guide the conferee to move the totem forward and to the right. As totem 1090a is moved about, the instructions may be updated in real time. For instance, if totem 1090a is moved too far forward, the instructions may guide the conferee to move totem 1090a rearward. Once totem 1090a is in the optimal position as in FIG. 58, the server may confirm the optimized location via a message on vessel 1101 on totem 1090a. The conferee can then manually move the other totems to the optimized positions as in FIG. 58 under the guidance of the system server. In some cases the directions may be presented on all totems 1090a thorough 1090f at the same time while in other cases the directions may be provided on each totem separately and in sequence so that the conferee moving the totems to the optimal positions is not confused regarding what action to take first, second, etc.

Figure 61:
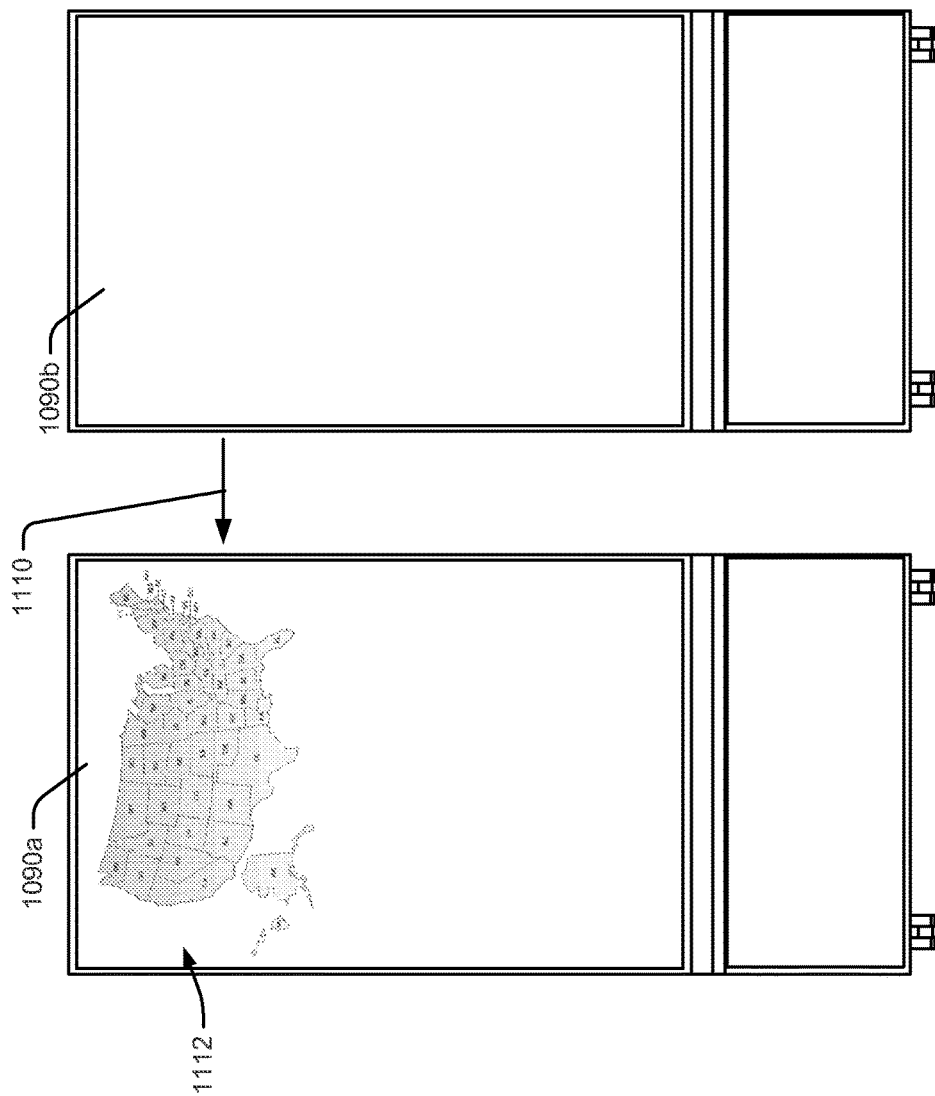
FIG. 61 shows two totems adjacent each other with one of the totems being moved toward the other and where an initial image is presented on one of the totems.
Figure 62:
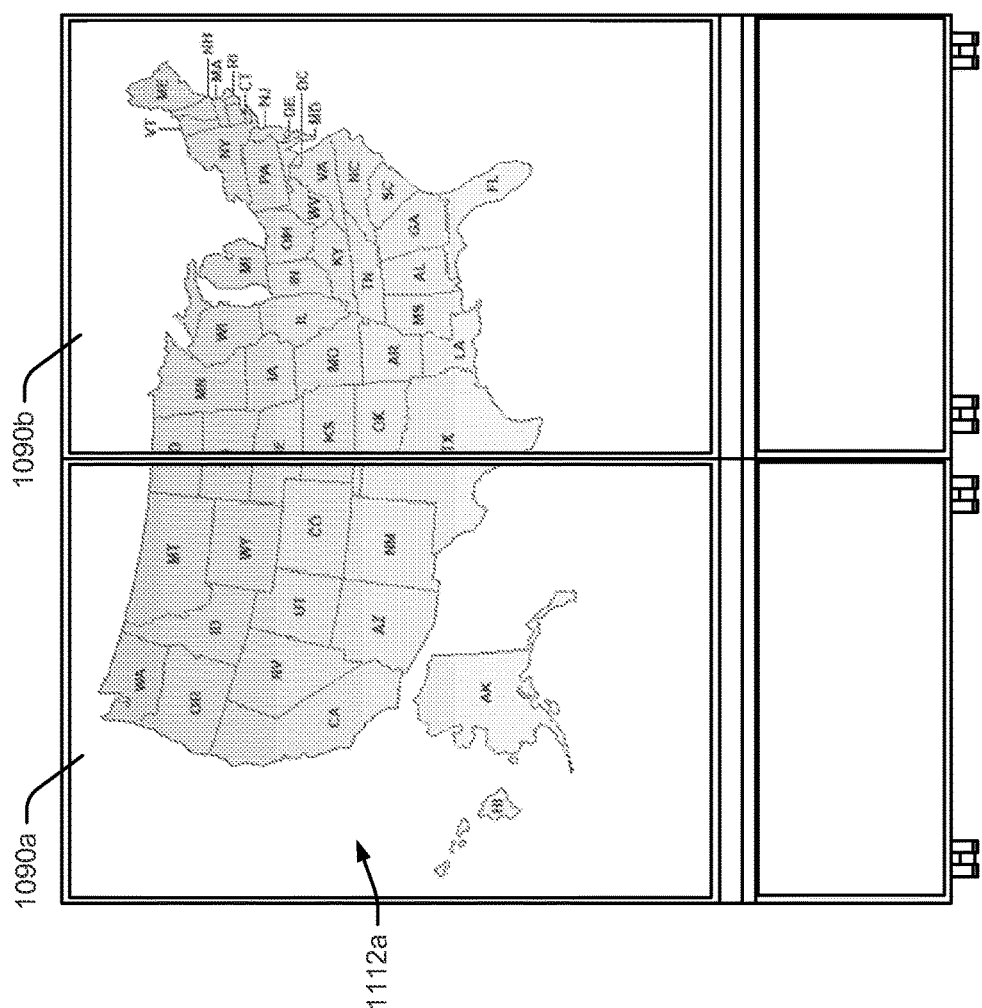
FIG. 62 shows the FIG. 61 totems immediately adjacent where the initial FIG. 61 image has been expanded to extend over the emissive surfaces provided by both totems.

In at least some cases a system server may be programmed to alter how content is presented on the vessels provided by totem surfaces as a function of relatively juxtapositions of two or more totems. For instance, an auto-enlarge process may be facilitated automatically when a first totem is moved into a position adjacent a second totem to present an image or other content from one totem in a larger format that extends across adjacent vessels provided by two or more totems. In this regard see FIG. 61 where an image of the united states is presented at 112 via a totem 1090a vessel initially while second totem 1090b is spaced away from totem 1090a. Referring also to FIG. 62, when second totem 1090b is moved to a location immediately adjacent first totem 1090a, a system server may recognize the immediate juxtaposition and may control images on the two totems to expand the size of image 1112 to cover both vessels as shown at 1112a automatically. Although not shown, it a third totem were moved to a position immediately adjacent either one of totems 1090a and 1090b, the image 1112a may again be expanded to extend across all three adjacent vessels. Here, the automatic enlargement may be supported by one of the templates so that an instantiating conferee does not have to specify the enlarging function to obtain the benefits associated therewith.

As another instance of how content presentation can be automatically controlled by a system server, in some embodiments it is contemplated that a system server may be programmed to allow content gaps between adjacent totem vessels. Here, it has been recognized that, where at least some types of content are presented on spaced apart emissive vessels, the human brain can stitch together content that includes gaps and can fill in the content for the human. For instance, strips or portions of an image of something familiar to a person can be presented where at least intermediate sections of the image are missing and the person's brain will fill in the missing sections of the familiar image and create an effect as if the full image was presented. For example, see FIG. 63 in this regard where totems 1090a and 1090b are spaced apart and an image of the United States is presented at 1112b where the image extends across co-planar emissive vessels provided by totems 1090a and 1090b, but where a central portion of the image of the United States is missing (see that the east half of Texas and essentially all of Louisiana are not presented via either of totems 1090a or 1090b). Here, the brain of a person viewing the split image naturally fills in the missing content.

Figure 63:
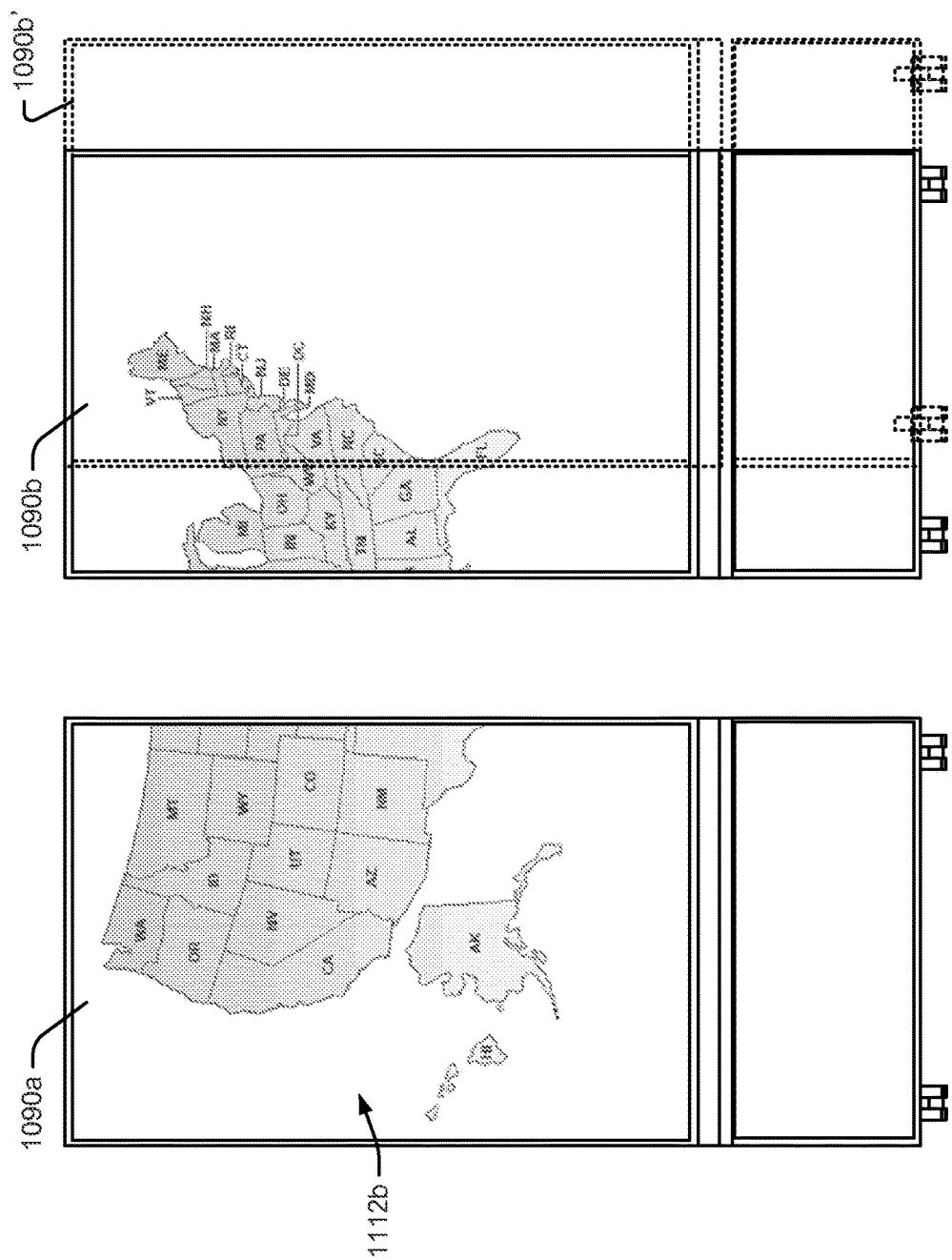

Referring still to FIG. 63, in at least some embodiments, where one of totems 1090a or 1090b is moved further away from the other totem, the image presented by the moving totem may be modified to show less of the split image so that the missing section of the image between the two totems becomes larger. Here, in at least some cases, content in the image presented by the moving totem may remain stationary within space while the totem moves within space. Thus, for instance, in FIG. 63, if totem 1090b were to be moved one foot to the right as shown in phantom at 1090b' (e.g., away from totem 1090a), the representation of Maine would remain stationary in space despite movement to location 1090b'.

Referring once again to FIGS. 53 and 54, in at least some embodiments emissive vessels 1101 and 1105 are provided on opposite front and rear surfaces of exemplary totem 1090a. At times, different information may be presented on opposite sides of totem 1090a. For instance, in FIG. 65 where a local conferee is conferencing with a remote conferee via telepresence on the front side of totem 1090b, a scenic view may be presented via the rear side vessel 1105 (see again FIG. 54) of totem 1090b. In fact, while content may be presented on front facing vessels of totems 1090a and 1090c in FIG. 65, a split scenic view akin to the FIG. 63 view may be presented on the rear facing vessels of totems 1090a through 1090c.

Figure 68:
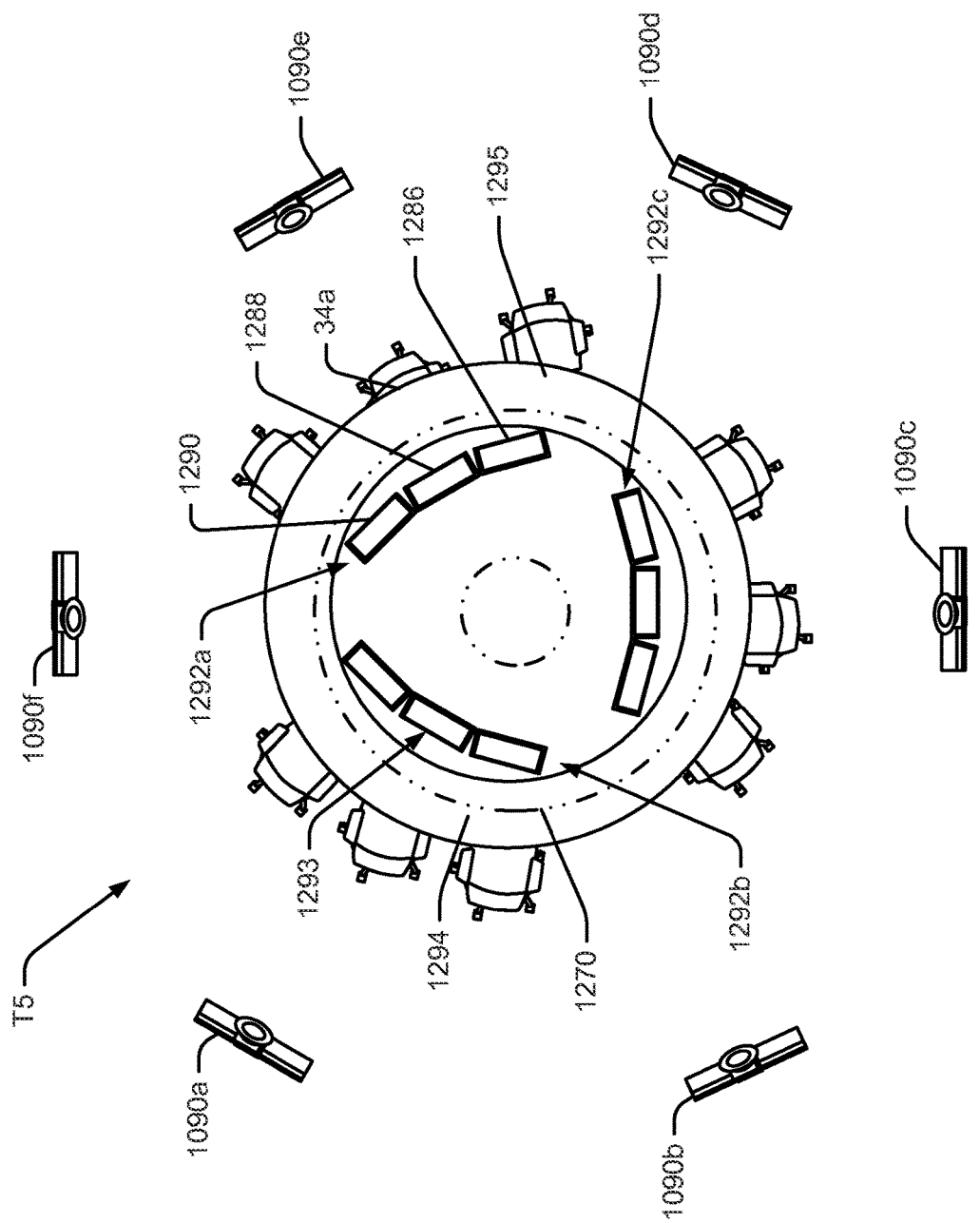
FIG. 68 is a top plan view of yet another space system that may be provided in an open space area that includes six totems like the FIG. 53 totems.
Figure 69:
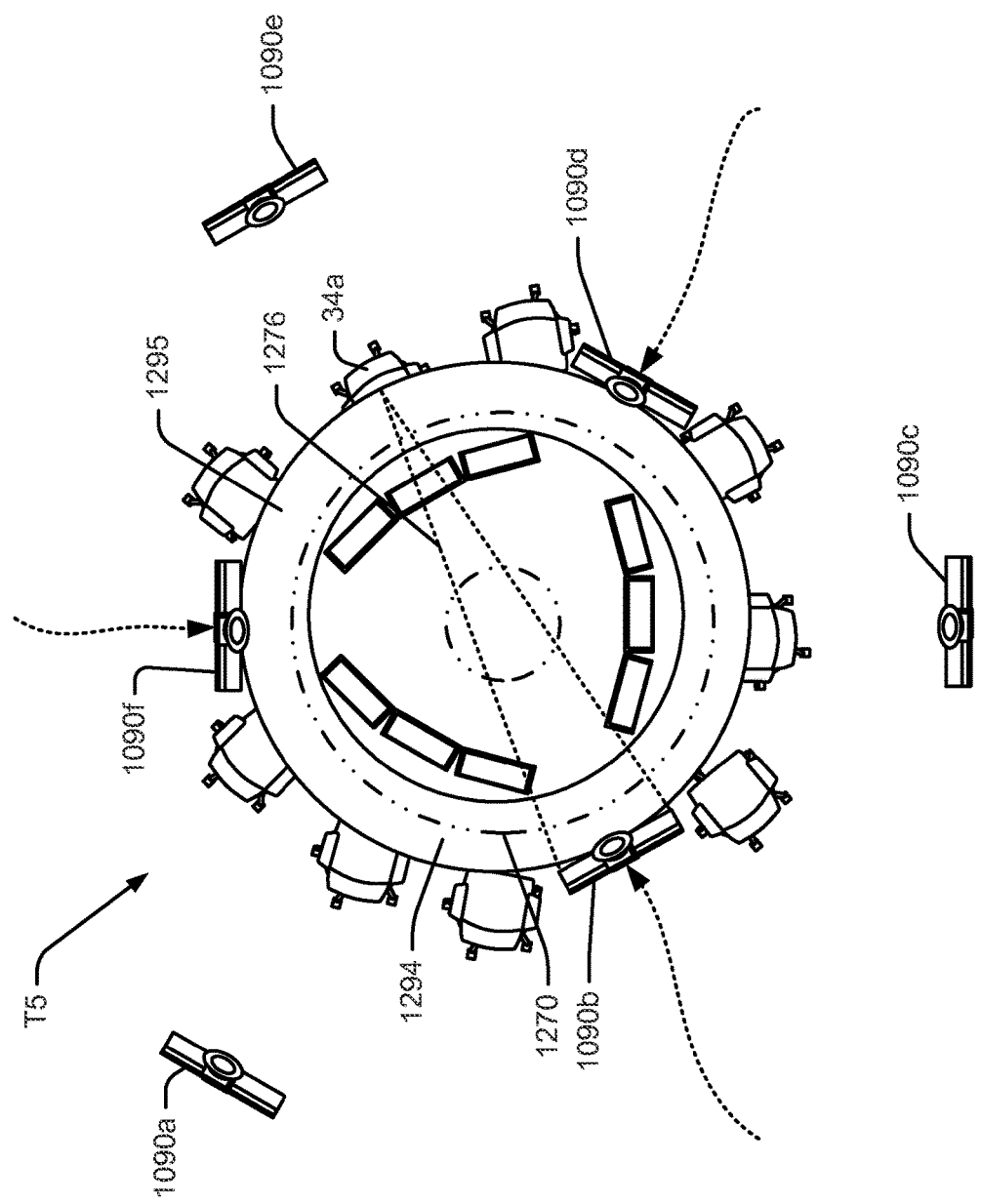
FIG. 69 is similar to FIG. 58, albeit showing a subset of the totems in different positions to optimally support a specific activity.

In at least some embodiments it is contemplated that totems may be provided in an open office plan where the totems can be moved about within an open space (e.g., where the space is not defined by wall structures) about a conference area to optimally support different activity types within the space per template specifications. To this end, see the exemplary T5 space type illustrated in FIGS. 68 through 72 that includes a table assembly 1294 that forms an opening in a middle portion thereof, five totems 1090a through 1090f that are similar to the totems described above and a plurality of task chairs 34a arranged about the table assembly 1294. In FIG. 68, the totems are shown in parked or storage positions about the table and chairs. In FIG. 69, three of the totems 1090b, 1090d and 1090f are shown in use positions after have been moved up to edges of the table assembly. Here, for instance, where three remote conferees patch into a session, a template may specify that the three totems 1090b, 1090d and 1090f move into the use positions shown and that a video image of each of the three remote conferees be provided on a separate one of the edge located totems.

The T5 space shown in FIGS. 68 through 72 has other interesting aspects. To this end, the table assembly 1294 has a particularly interesting and advantageous shape and a central display screen subassembly 1293 that includes additional display subassemblies 1292a, 1292b and 1292c that provide additional vessels to conferees in the T5 space and that can be driven via template specified information. Exemplary table assembly 1294 includes a table top member 1295 supported in a generally horizontal position by a supporting leg structure 1278. The table top 1295 has a central opening and an outer edge that have similar circular shapes. A distance between the outer and inner edges of the table top 1295 may be within a range between one and ½ foot and three feet and in particularly advantageous embodiments may be substantially two feet. Here, it is believed that the outer to inner edge dimension is important to allow a conferee positioned adjacent one of the outer edges to see one of the display screens located within the central opening formed by the table top 1295 while still allowing the display to be positioned at least in part below a top surface of table top 1295 (see display 1288 shown in FIG. 70) and enabling the conferee to see over the top edge of the display to conferees and/or a totem positioned across the table assembly 1294 from the conferee as described in detail below. Chairs 34*a*, etc., are provided along the long lateral edges of table top 1295.

Central display screen assembly 1293 includes three three-packs of displays 1292*a*, 1292*b* and 1292*c* that are supported by support arm structures 1280 (see again FIG. 70) adjacent the inner edge of table top 1295. Each display (e.g., see 1288 in FIG. 70) is angled to face generally upward and outward from a central location within the table top opening so that the display can be viewed by a conferee sitting across the table top member 1295 from the display (see FIG. 70). Structure 1280 may be mounted to an undersurface of table top member 1295, extend outward past the inner edge of member 1295 and then extend upward to connect to a rear surface of a supported display (e.g., 1288). In other embodiments support structure separate from the table assembly 1294 may be provided to independently support the display packs 1292*a* through 1292*c* in positions shown.

In at least some embodiments, a lower edge of each of the centrally mounted displays (e.g., 1288) is located below an undersurface of the table top member 1295 and an upper edge is located at a height above the top surface of the table top member 1295. In this position, because a conferee can gaze over the rear edge of the top member 1295 and at least somewhat into the table top opening, the conferee can see the full image presented on display 1288 despite its lower position as shown at 1274. In addition, because the display 1288 only extends above the top member top surface a reduced distance, the conferee can see over the top edge of display 1288 across the conference table assembly as shown at 1276. Thus, when a totem 1090*b* is positioned at one of the corner edges opposite chair 34*a*, the conferee in chair 34*a* can see at least the top portion of the front facing emissive surface 1101 of totem 1090*b* (see 1276 in each of FIGS. 69 and 70). Displays 1290 and 1286 are supported on opposite sides of display 1288 to face other conferees on opposite sides of the conferee in chair 34*a*. Thus, each display 1286, 1288 and 1290 presents yet another vessel in which different content types may be presented and which may be supported by space/activity templates designed for a T5 type space.

Figure 71:
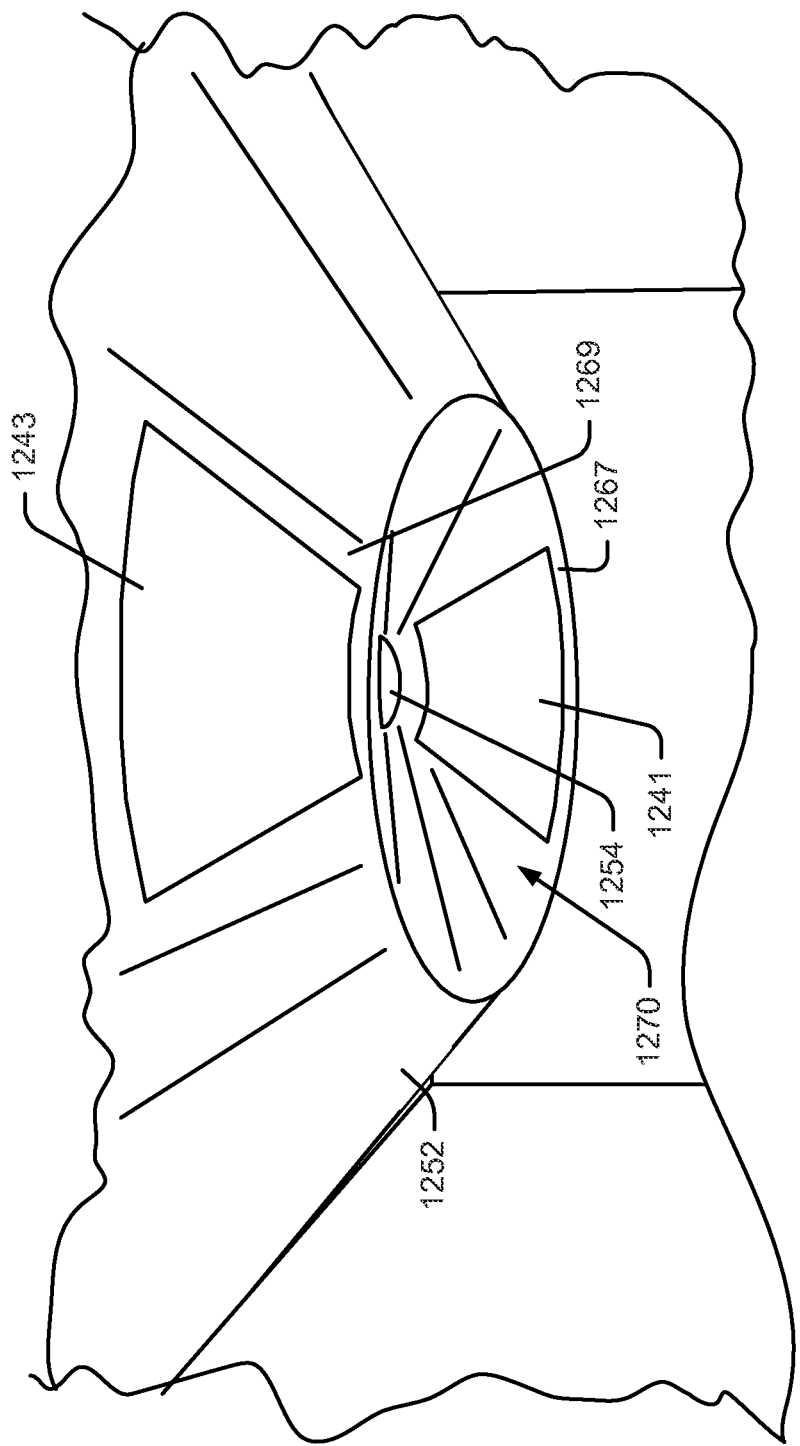
FIG. 71 is a perspective view of the ceiling assembly of FIG. 70 in a contoured state.
Figure 72:
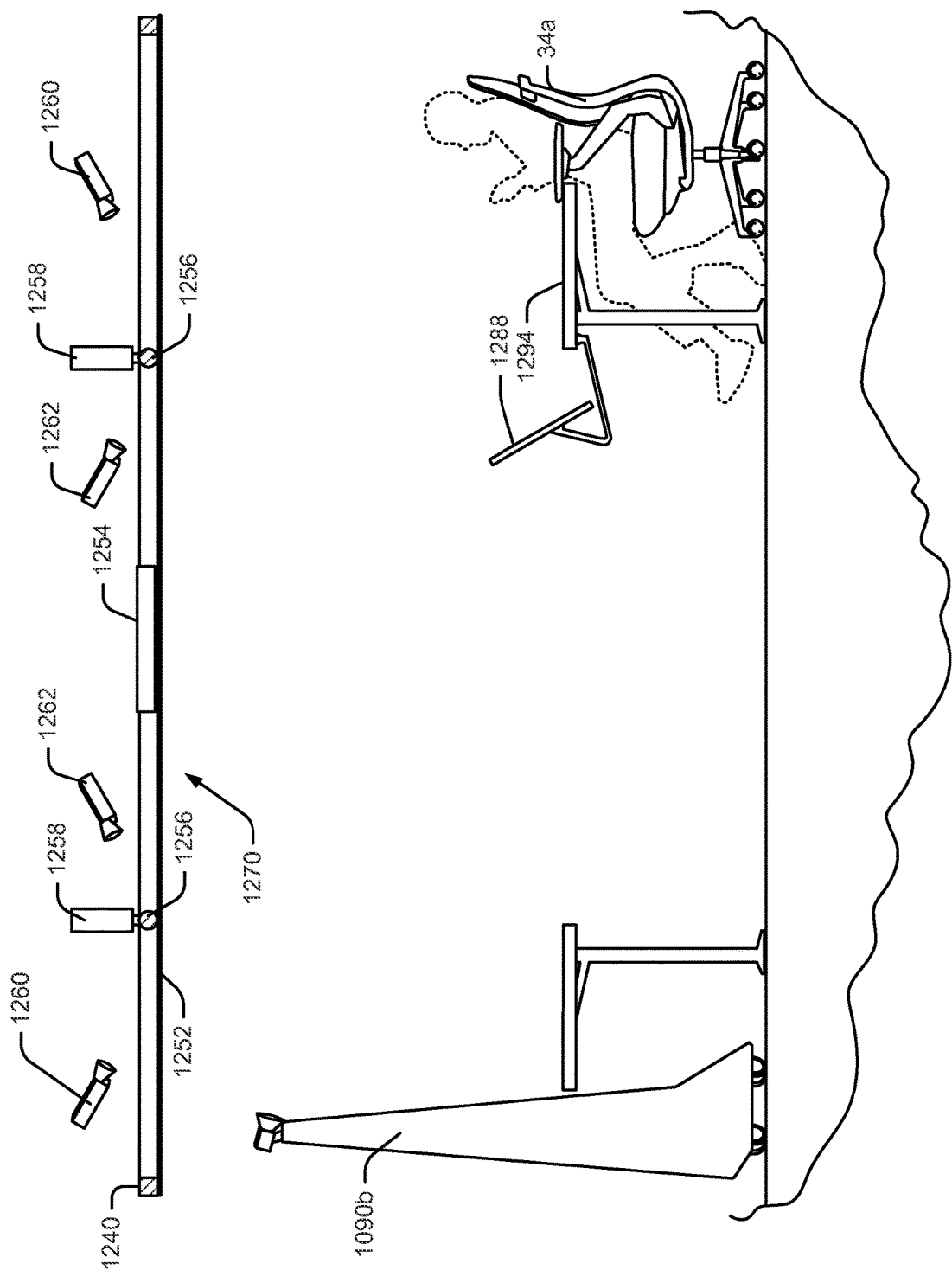
FIG. 72 is similar to FIG. 70, albeit showing the ceiling assembly in a flat state.

As indicated above, in addition to totems that can be moved about in a space, other moveable affordances that may provide vessels within a space and that can be controlled via space/activity templates are contemplated. To this end, again FIGS. 68 through 72 where the T5 space type is shown to include an emissive ceiling assembly 1270 shown in phantom in FIGS. 68 and 69, in a schematic cross sectional view in FIGS. 70 and 72 and in a perspective view in FIG. 71. Here, ceiling assembly 1270 can be controlled to change the shape and locations of surfaces of a membrane 1252 to change the sense of space there under and specifically, change the sense of space associated with the table assembly 1294 and totems 1090*a* through 1090*f* associated with the T5 space. For instance, at some times the ceiling assembly 1270 may be controlled to provide a flat ceiling arrangement as shown in FIG. 72 while at other times, ceiling assembly 1270 may be controlled to provide the contoured shape shown in FIGS. 70 and 71 that includes inner and outer conical shaped surfaces 1267 and 1269, respectively. In addition, when in the contoured shape, assembly 1270 projectors (e.g., 1260, 1262) may be controlled to project images onto the rear or upper surfaces of the conical shaped surfaces 1267 and/or 1269 to form additional vessels on those surfaces as shown at 1241 and 1243 in FIG. 71 for viewing by a properly positioned conferee (e.g., a conferee located directly in front of the vessels 1241 and 1243 within the T5 space. Hereinafter, unless indicated otherwise, the two states (e.g., flat and contoured dual conical) will be referred to as the "flat state" and "contoured state", respectively. When in the flat state, an undersurface of membrane 1252 may have the appearance of a substantially uniform and undistorted or uninterrupted ceiling surface.

Figure 70:
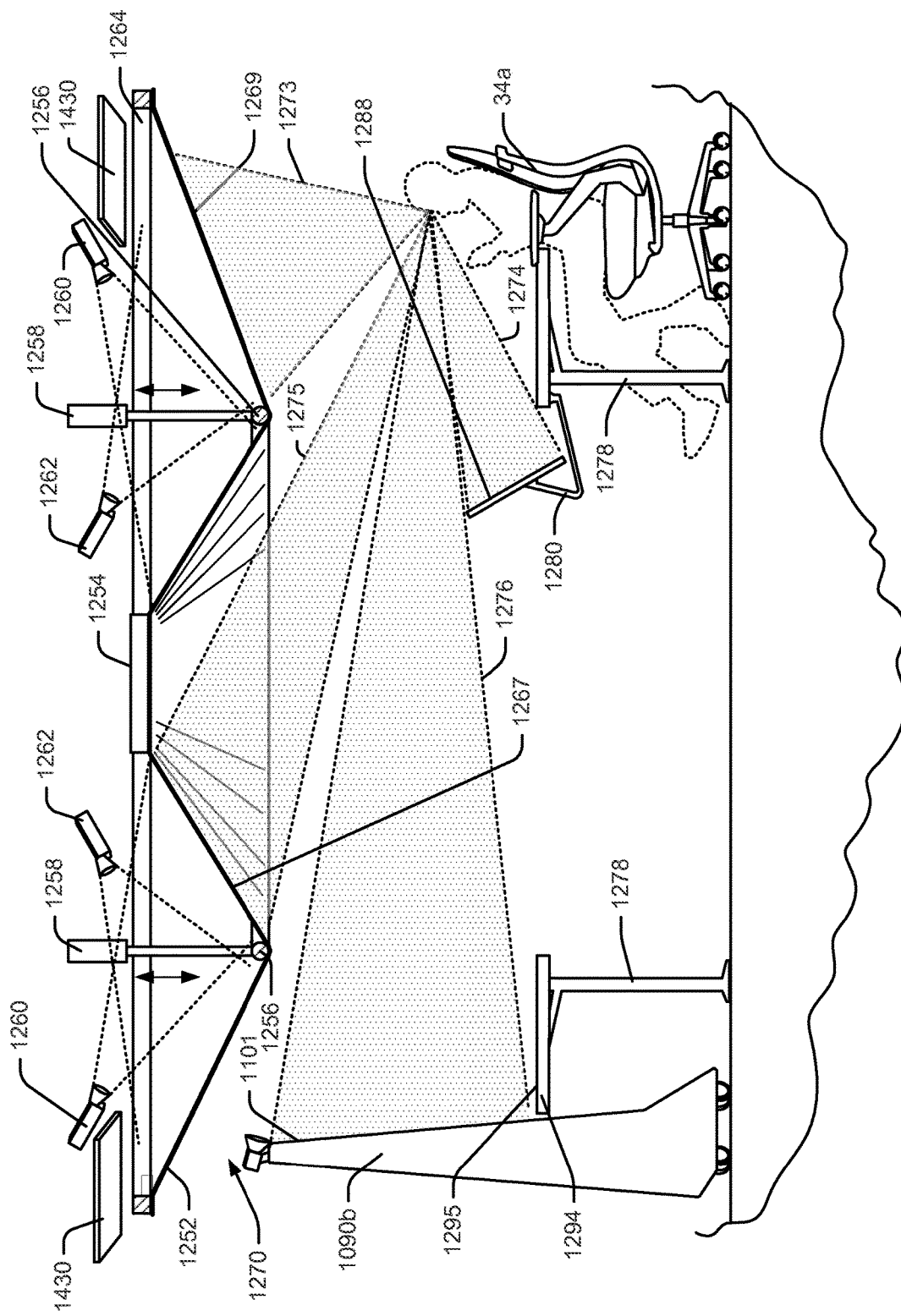
FIG. 70 is a side schematic view of the system of FIG. 68 showing various system components in a specific state and their relative juxtapositions with respect to a conferee located at the edge of a space table assembly.

Referring still to FIG. 70, exemplary ceiling assembly 1270 includes a membrane or sheet member 1252, a central anchor member 1254, an intermediate ring member 1256 (shown in cross section in FIG. 70), an outer ring member 1240, first and second actuators collectively identified by numeral 1258, a plurality of inwardly directed projectors collectively identified by numeral 1260 and a plurality of outwardly directed projectors collectively identified by numeral 1262. Membrane 1252, in at least some embodiments, is circular in shape and is formed of a flexible resilient material such as a heavy duty nylon material.

Membrane 1252, while generally opaque, should be formed of a fabric or other flexible, stretchable and resilient material that can pass relatively high fidelity images that are projected onto the rear or upper surface of the membrane. In at least some cases membrane 1252 will be colored white while in other cases other colors are contemplated. Membrane 1252 should be stretchable enough to assume the frusto-conical contoured state shown in FIGS. 70 and 71 when stretched and still revert back into the storage state when not contorted by mechanical components as shown in FIG. 72.

A lateral circumferential edge of membrane 1252 is anchored to a ceiling structure (not illustrated) via outer ring member 1240. Here, outer ring member 1240 may be formed of aluminum, steel, wood, or any other rigid and relatively light weight material. Central anchor member 1254 includes a ring or disc shaped member that is secured to a ceiling structure (again not illustrated) above a central portion of membrane 1252. The central portion of membrane 1252 is secured to central ring member 1254 so that the central portion of membrane 1252 remains stationary in at least some embodiments of the present disclosure. How membrane 1252 is secured to the outer ting member 1240 and central anchor member 1254 is a matter of designer choice but may include adhesive, staples or other mechanical fasteners, etc.

Actuators 1258 are mounted to the ceiling structure generally between the central anchor member 1254 and outer ring member 1240 and include, in the illustrated embodiment, motors or other types of actuators that move motor shafts along linear trajectories. Each of actuators 1258 is mounted to the ceiling structure in a vertical orientation so that distal ends of the actuator shafts extend downward and therefore, as the shafts are linearly moved along their trajectories, the vertical height of each distal end is controllable. In at least some embodiments the range of motion of the distal shaft ends may be between one foot and three feet and in particularly advantageous embodiments will be between one and ½ feet and two and ½ feet.

Intermediate ring member 1256 is mounted to the distal or bottom ends of the motor shafts so that as the vertical heights of the distal shaft ends are controlled, the height of ring member 1256 can be moved vertically up and down. Ring 1256 is dimensioned to have a diameter which is generally half the diameter of membrane 1252. Thus, for instance, where membrane 1252 has a diameter of 20 feet, ring 1256 may have a diameter within a range between eight feet and fourteen feet. In other cases, where membrane 1252 has a diameter of 30 feet, ring 1256 may have a diameter within a range between ten feet and twenty feet and in some cases may have a diameter within a range between fourteen feet and sixteen feet. Central ring 1254 maintains a central portion of the membrane substantially flat and horizontal and is important as it helps orient surfaces of the inner cone shape 1267 to face conferees there below along edges of the table assembly 1294 more directly. To this end, a larger diameter of ring 1254 means that when membrane 1252 is in the contoured stat, sections of inner cone 1267 are relatively more vertical than if the ring member 1254 had a smaller diameter. In some cases the central ring 1254 will have a diameter within a range between one foot and five feet and in particularly useful embodiments the diameter will be within a range between two and three feet.

When membrane 1252 is in the contoured state (see FIGS. 70 and 71), the lower surface section of the membrane 1252 that forms the inner cone shape 1267 may form a substantially continuous angle with a vertical axis which, in some embodiments, will be within a range between 20 degrees and 70 degrees and in particularly advantageous embodiments, may be within a range between 30 degrees and 60 degrees. Similarly, the lower surface section of the membrane 1252 that forms the outer cone shape 1269 may form a substantially continuous angle with a vertical axis which, in some embodiments, will be within a range between 20 degrees and 70 degrees and in particularly advantageous embodiments, may be within a range between 30 degrees and 60 degrees. Other angles are contemplated.

Projectors 1260 and 1262 are mounted to the supporting ceiling structure (not shown) above membrane 1252 with projectors 1260 spaced laterally outward from the actuators 1258 and projectors 1262 spaced inwardly from actuators 1258. Projectors 1260 are positioned to direct images onto the rear or upper surfaces of inner cone portions 1267 of the membrane 1252 when the membrane is in the countered state shown in FIGS. 70 and 71 while projectors 1262 are positioned to direct images onto the rear or upper surfaces of outer cone portions 1269 of membrane 1252. Thus, the projectors 1260 and 1262 may form additional emissive vessels for viewing by conferees associated with a T5 space type. Referring to FIG. 71, the inner and outer cone shapes sections of membrane 1252 formed when the membrane is in the contoured state are not flat and instead are curved so that different portions thereof are at different distances from the projectors 1260 and 1262 that project images thereon. For this reason, each projector may be controlled to compensate for the curvature of the section of the membrane subtended by projected images so that content presented in vessels projected on the membrane have a non-distorted appearance. To this end, see exemplary vessels 1241 and 1243 projected onto membrane 1252 in FIG. 71.

Referring again to FIG. 72, when the actuator shafts are in retracted positions, lower surfaces of the intermediate ring 1256 are generally coplanar with lower surfaces of central anchor member 1254 and outer ring member 1240 and the membrane is in the flat state. In this arrangement, membrane 1252 is de-stressed and reverts to a flat ceiling shape. When actuator shafts are extended as in FIGS. 70 and 71, intermediate ring 1256 is forced against the upper surface of membrane 1252 into the lower contoured position in which membrane 1252 forms the dual cone shape illustrated. When in the contoured state, projectors 1260 and 1262 are controlled to present content, in at least some cases, on the dual cone surfaces.

Referring again to FIG. 70, ceiling assembly 1270 is located directly above table assembly 1294 so that conferees located adjacent lateral table edges have unobstructed views of different section subsets of the membrane 1252 when the membrane is in the contoured state. Thus, for instance, see the conferee in FIG. 70 in chair 34*a*. As shown, the conferee in chair 34*a* has views 1275 and 1273 of different sections 1267 and 1269 of the inner and outer cone portions of membrane 1252, respectively. Here, vessels provided as in FIG. 71 as shown at 1241 and 1243 are viewable by the conferee in chair 34*a* and therefore can be used to present content to that conferee. Other conferees located at different positions about table assembly 1294 have views of different subsets of vessels presented via membrane 1252 that are similar to the 1241 and 1243 vessels shown in FIG. 71.

Consistent with the above disclosure, it is contemplated that templates may specify different affordance configurations and vessel arrangements as well as content types and content locations to optimally support different activity types within the T5 space type that includes the ceiling assembly 1270. For instance, referring again to FIGS. 68 and 72, prior to commencement of a session, totems 1090*a* through 1090*f* may be positioned as shown equi-spaced apart around table assembly 1294 to allow conferees to move into the general space about assembly 1294 and the ceiling membrane 1252 may be in the flat state. At this point various types of content may be presented via any of the totem vessels or the central display assembly 1293 vessels to greet conferees arriving for the session or present interesting content (e.g., a news feed, background information about conferees to attend, locations of remote conferees, a weather report, etc.).

Once conferees arrive and assume seated positions in the chairs about table assembly 1294 and the start time for the session occurs, a system server may control the totems and ceiling assembly 1270 to change the orientation of the re-arrangeable system components, as specified by a template to optimize for the activity associated with the session. Again, assume that at least one remote conferee is scheduled to attend the session. Here, as seen in FIG. 69, a system server may control the totem actuators to move each of totems 1090*b*, 1090*d* and 1090*f* forward to positions immediately adjacent the edges of table top 1295. In this example, totems 1090*a*, 1090*c* and 1090*e* remain stationary. Once totems 1090*b*, 1090*d* and 1090*f* are parked adjacent the table edges, video of one or more remote conferees or other content (based on the content types specified in a template or customized by an instantiator) may be presented on each of the totems to facilitate a telepresence or content sharing function. Because of the positions of the totems at an edge that is 120 degrees spaced from the other totems, each local conferee along one of the edges of the top member 1295 should have an unobstructed view of the front facing vessels provided by those totems.

Referring again to FIGS. 70 and 71, in addition to moving the totems, when the session starts, a system server may control actuators 1258 to move the intermediate ring 1256 down so that membrane 1252 contorts into the contoured state illustrated and projectors 1260 and 1262 may be controlled, per a template specification, to start presenting content via vessels to the local conferees. Here as seen in FIG. 70, a local conferee may have views of many different vessels provided within the T5 space type including a view 1274 of one of the central displays 1288, a view 1276 of the front facing screen 1101 of totem 1090b, a view 1275 of a vessel provided at an inner cone section 1267 of membrane 1252 and a fourth view 1273 of a vessel provided at an outer cone section 1269 of membrane 1252.

In addition to providing additional content receiving vessels within a space at different locations, moveable affordances like totems and the ceiling assembly also substantially affect the sense of space that users feel during system user. For instance, when ceiling assembly 1270 is in the contoured state as in FIG. 70, conferees at table assembly 1294 have a sense of a more intimate and smaller space. Similarly, movement of totems toward conferees causes conferees to feel more connected to the content presented on the totem emissive vessels.

Figure 73:
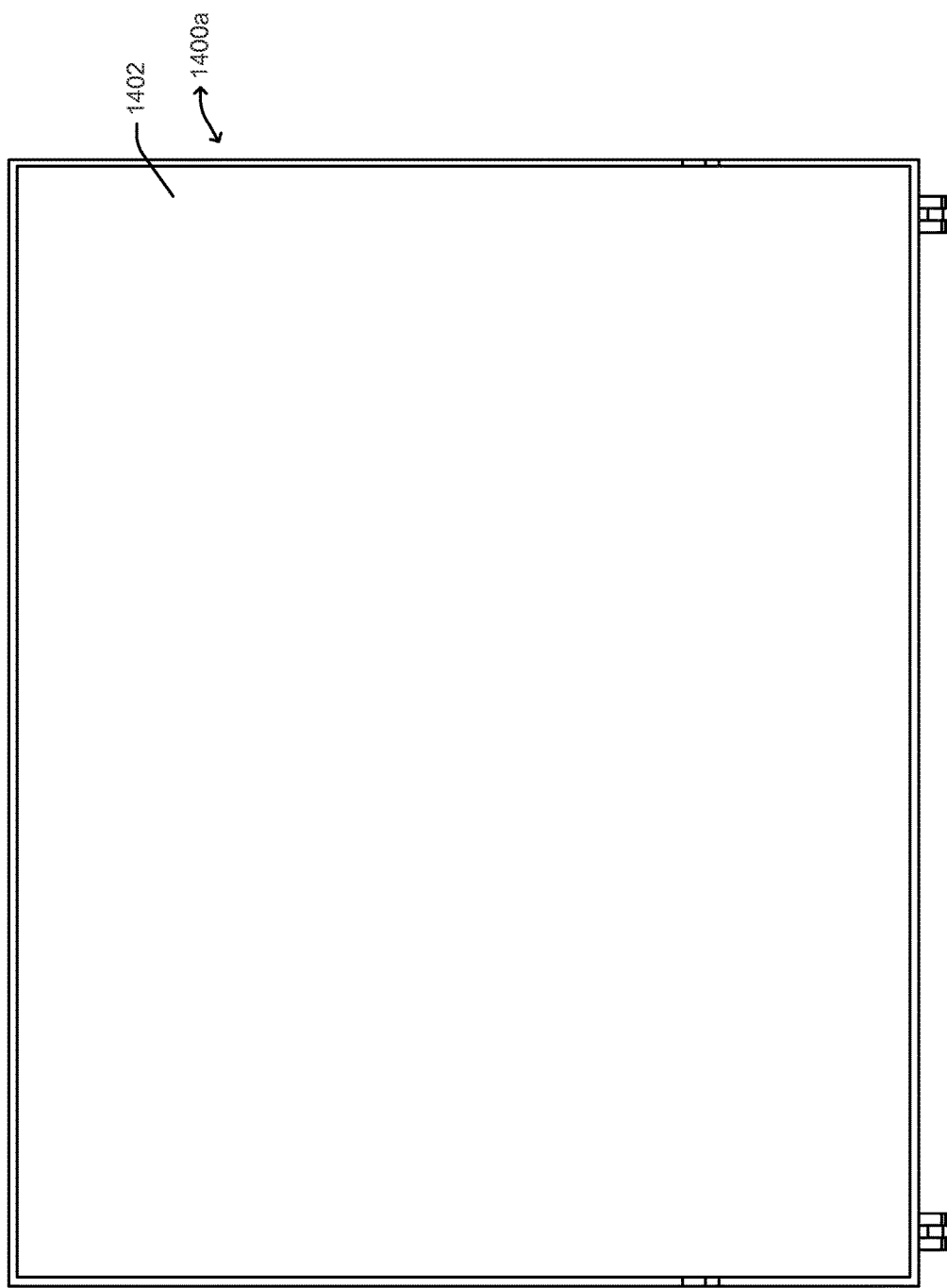
FIG. 73 is a front plan view of a moveable wall structure similar to the FIG. 53 totems, albeit having a larger width, that is consistent with at least some aspects of the present disclosure.

Referring now to FIG. 73, an exemplary moveable wall affordance 1400 is similar in construction to the totems (e.g., 1090a) described above including a relatively large emissive surface 1402 mounted within a wall housing where the housing is supported by casters that allow the wall structure to be moved about within a space. In some cases the wall structure 1400 will include the component set shown in FIG. 55 so that a system server can be used to control movement of the wall structure 1400 to different positions within an associated space when desired.

Figure 74:
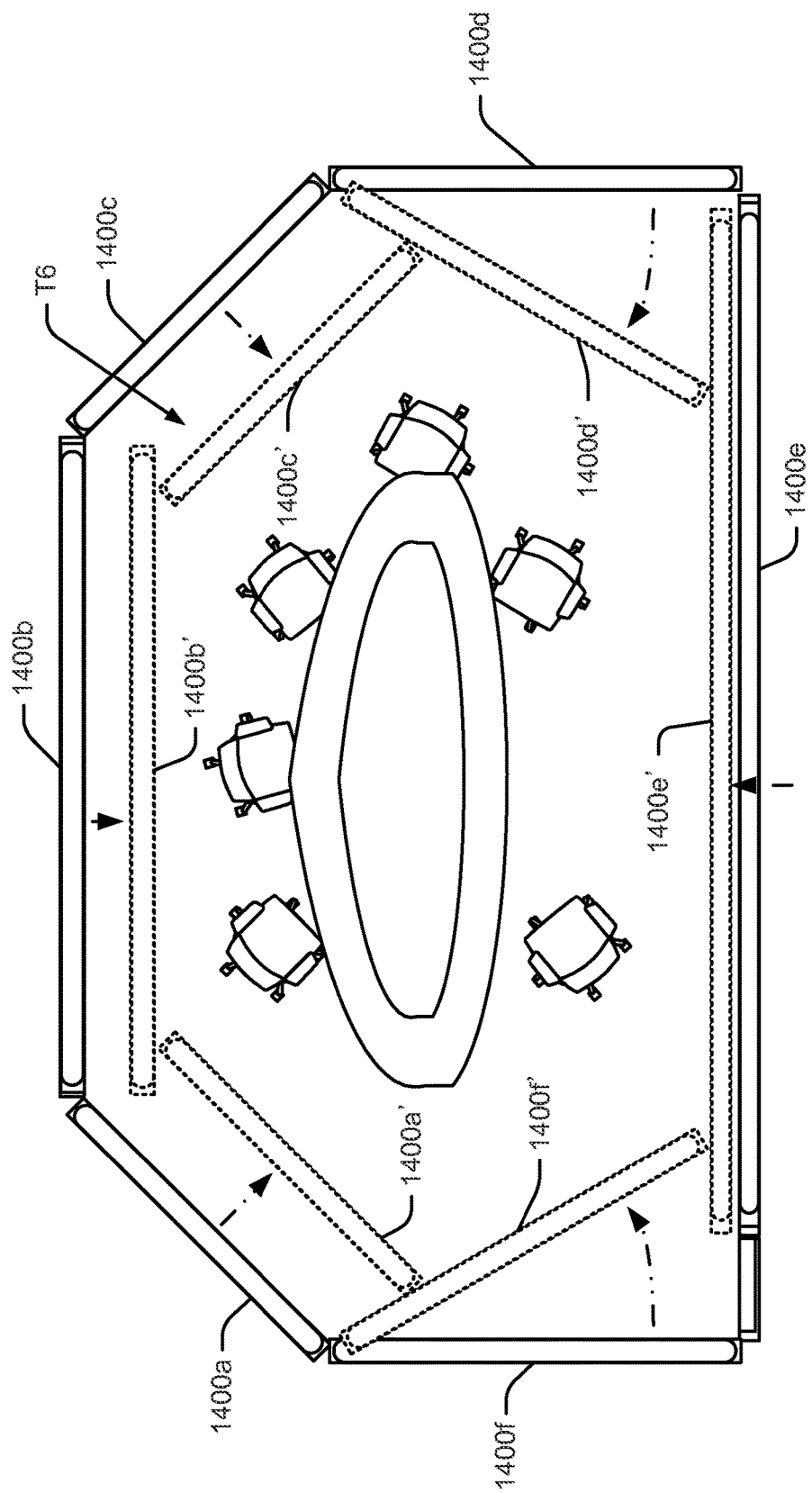
FIG. 74 is a top plan view of another space type that includes several of the FIG. 73 wall structures shown in parked storage locations and in other locations (e.g., see phantom representations) optimized to support a particular activity type.

Referring to FIG. 74, a space type T6 is illustrated that includes six wall structures 1400a through 1400f that are all similarly constructed, albeit where some have different width dimensions than others. As shown in phantom, it is contemplated that at times, a system server may control the wall structures to reposition those structures to change the overall size of a space defined by the T6 configuration by moving the wall structures in or out and or by causing one or more of the wall structures to pivot about one or the other lateral ends thereof. Again, a template may coordinate all wall structure movements to optimize for specific activities or circumstances that occur within the T6 space so that conferees do not have to script all the detail required to reap the benefits of such control.

Other totem assemblies are contemplated. To this end, see FIGS. 75 and 76 that show an exemplary curved totem assembly 1300a. Assembly 1300a is similar to assembly 1090a described above except that, instead of including substantially flat emissive surfaces (e.g., 1101, 1103, 1105), assembly 1300a includes at least somewhat concave front facing emissive surfaces 1302 and 1310 and a somewhat convex rear facing emissive surface 1304. In some cases totem 1300a may have to be manually positioned within an associated space while in other cases totem 1300a may include motors or other types of actuators for moving the totem to different positions within a space under system server control.

Figure 75:
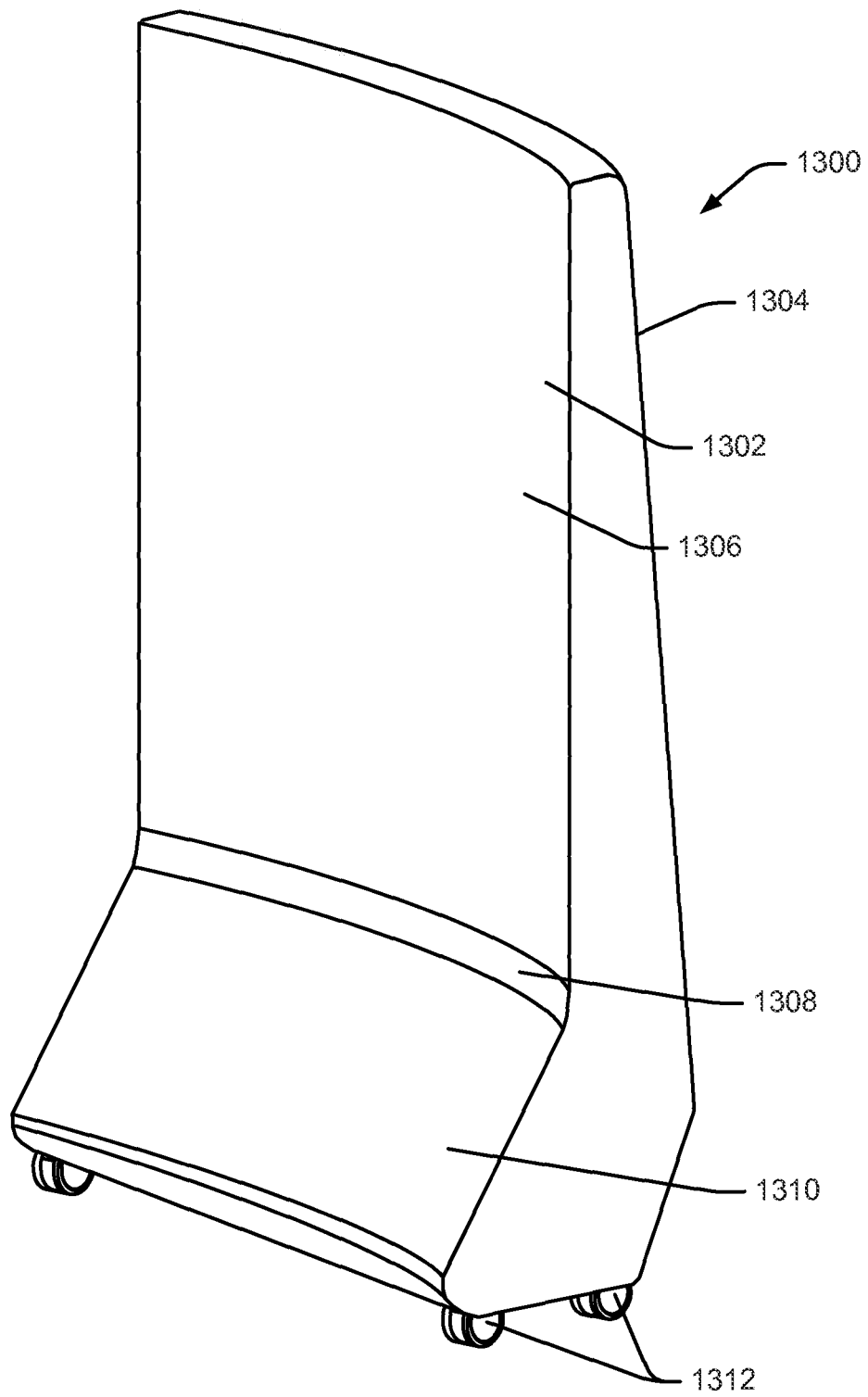
FIG. 75 is a perspective view of another moveable totem type that is consistent with at least some aspects of the present disclosure.
Figure 76:
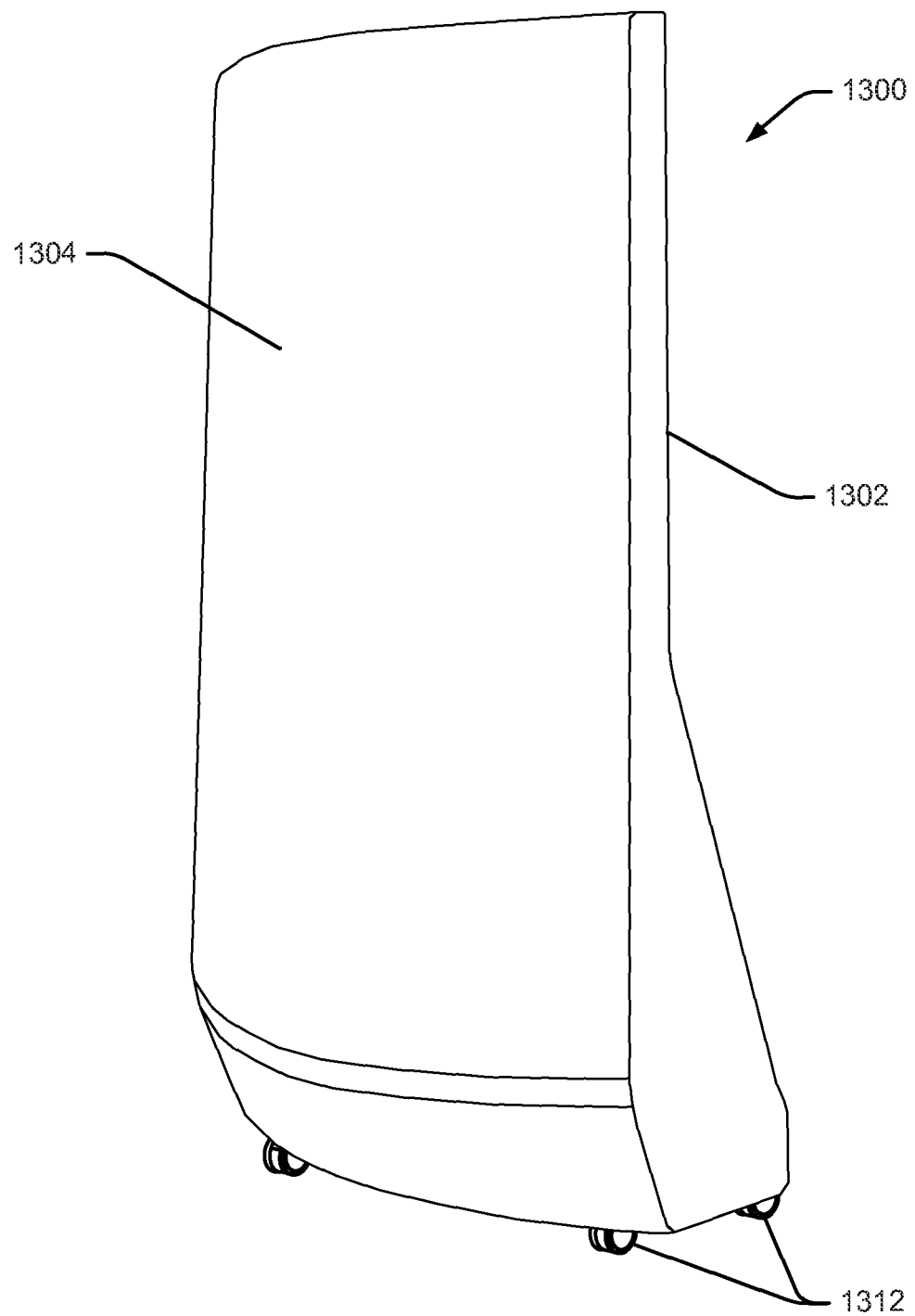
FIG. 76 is another perspective view of the FIG. 75 totem.
Figure 77:
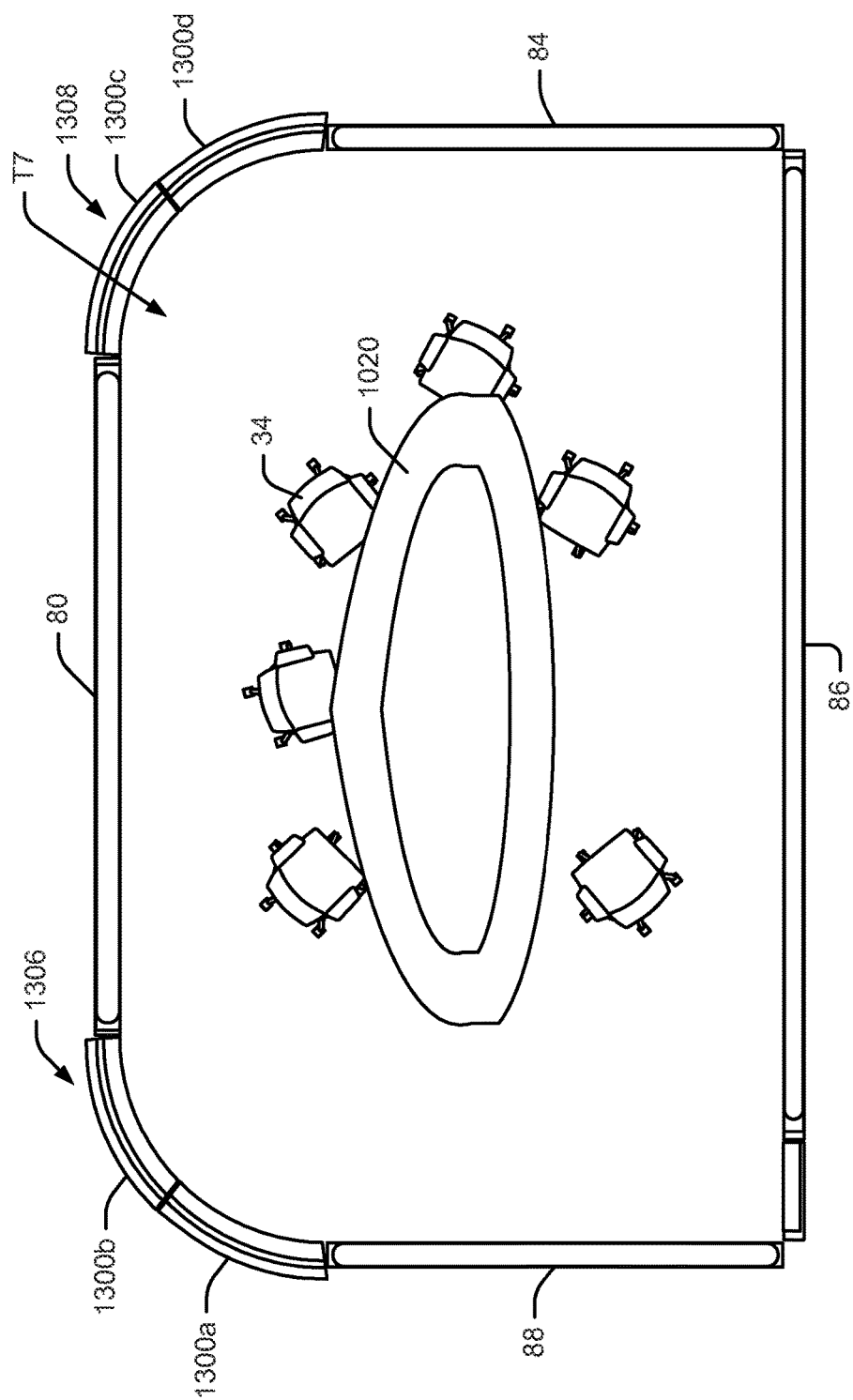
FIG. 77 is a top plan view of another space type including four of the FIG. 75 totems that are shown in storage locations.
Figure 78:
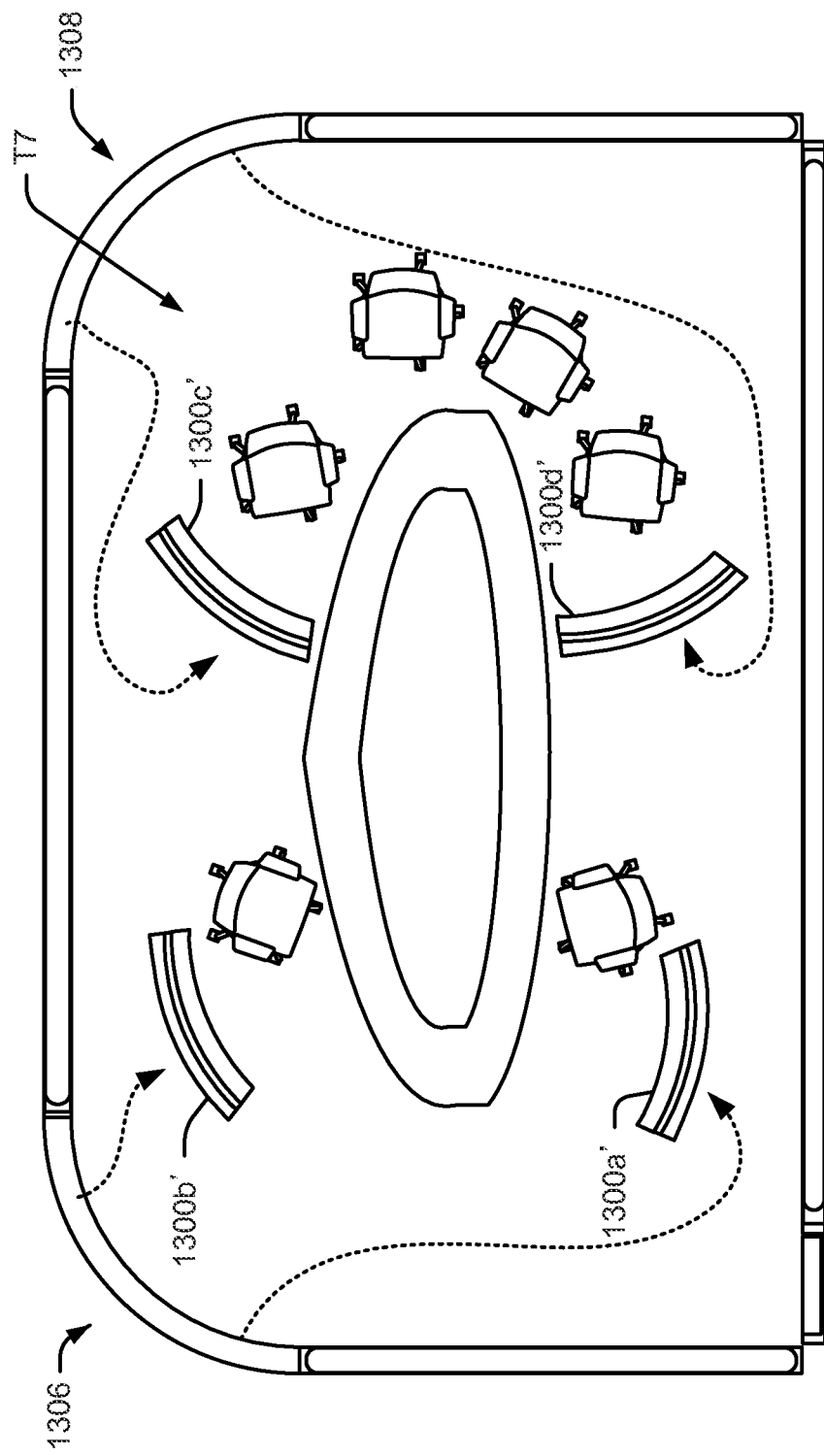
FIG. 78 is similar to FIG. 77, albeit showing the totems in use positions designed to optimize a particular activity type.

An exemplary seventh space type T7 is shown in FIG. 77 which is similar to the FIG. 5 T3 space type, albeit where the diagonal wall structures 82 and 90 have been replaced by totem subsets 1306 and 1308 that each includes two curved totems. Thus, subset 1306 includes first and second totems 1300a and 1300b while subset 1308 includes third and fourth totems 1300c and 1300d, respectively. When parked in storage locations as shown in FIG. 75, totems 1300a and 1300b are aligned along lateral edges so that the front facing emissive surfaces (e.g., 1302) on the adjacent totems form a generally continuous curved emissive surface for presenting one or more vessels. As in the case of totems 1090a through 1090f, totems 1300a through 1300b may be controlled to move to different locations within the T7 specified by templates to support different activity types. For instance, see FIG. 78 where totems 1300a and 1300b have been moved to locations adjacent one end of a table assembly to support a dyadic collaboration activity between two conferees while totems 1300c and 1300d have been moved to locations adjacent a second end of the table assembly to support a four conferee group activity.

Figure 79:
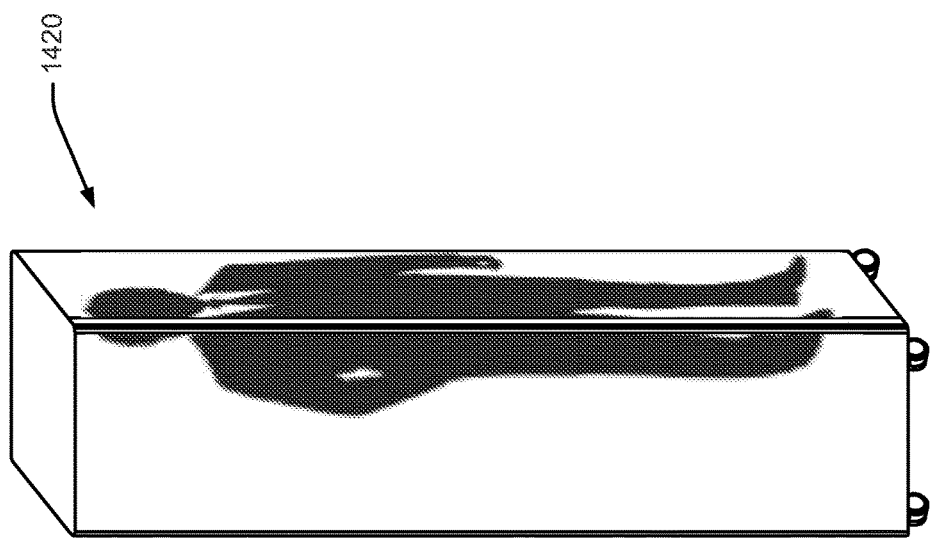
FIG. 79 is a perspective view of another type of totem that is consistent with at least some aspects of the present disclosure.

Referring now to FIG. 79, an exemplary rectilinear totem assembly 1420 has four exterior wall members that generally form a square structure when viewed from the top where each wall structure includes an emissive surface. In at least some cases there may be a slight radius (e.g., one half to three inches) of curvature at the corners of totem 1420 between adjacent broad surfaces so that a generally continuous emissive surface can extend from one board surface into the adjacent surface. As shown in FIG. 79, an image presented via totem 1420 may be presented such that the image wraps about one or more corners of totem 1420 from one broad surface to an adjacent broad surface.

It is believed that when an image wraps about two surfaces separated by a corner, when a person views the image from a point of view that is skewed with respect to the flat surfaces, the person's brain takes in both sections of the image and can compensate for the way the image is presented in two planes to perceive a 3D view of the image presented in the two planes. In at least some cases this type of 3D view of an image that would otherwise be presented in 2D will be advantageous. This is particularly true in cases where the presented image can be aligned with the two non-planar broad surfaces to reflect 3D characteristics of content presented via the image. For instance, in FIG. 79, the image shown on totem 1420 is of a standing man. In reality, if the man in the image were standing where the totem 1420 is located, the side portion of the image associated with the man's shoulder would be viewable from the side while the man's face would be viewable from a front on perspective. Here, by splitting the image along an area to the side of the man's face between the two adjacent broad surfaces, an allusion of a 3D representation of the man is enhanced.

In at least some embodiments where a totem has adjacent non-coplanar emissive surfaces as in FIG. 79, it is contemplated that a system server will be programmed to analyze content being presented via the adjacent surfaces to identify specific attributes in the content that can be used to split an image or video into different sections that are then presented on different adjacent emissive surfaces to facilitate the 3D effect of the presented content. For example, where a live telepresence feed of a remote conferee is to be presented via totem 1420 in FIG. 79, the server may be programmed, via a template, to recognize a person in a video via face recognition and to divide the video images into different sections as a function of where the person's face is in the video and to then present the different video sections on different adjacent and non-coplanar vessels of totem 1420. Other systems are contemplated where a server divides a 2D image or video into different sections based on other image or video characteristics to facilitate 3D effects.

Again, for each of the space types described above and for other space types, each space/activity combination template may specify each of (1) locations, states or juxtapositions of all moveable space affordances, (2) how many, sizes and locations of all vessels presented by the moveable and stationary space affordances and (3) content types to be presented via each of the vessels during a session. In some cases templates may pre-specify affordance locations and juxtapositions, vessel numbers, sizes and shapes and content locations to occur regardless of locations of conferees within a space.

In other cases, templates may modify or control affordance locations and juxtapositions, vessel numbers, sizes and shapes and content locations as a function of conferee related information such as the number of conferees scheduled to locally attend a session (e.g., where a space includes different vessel sets viewable by different conferees, the number of vessel sets may be modified based on the number of conferees to attend), the number of conferees that actually attend a session, locations of conferees within a space during a session (e.g., where two conferees attend a dyadic session, the locations of the conferees may cause a server to change locations of affordances, vessels, different content types, etc.), the number of remote conferees that are scheduled to or that actually attend a session (e.g., a separate vessel or totem may be assigned to each remote conferee for telepresence functionality), different rolls of different conferees during a session (e.g., content may be arranged based on the location of a leader in a presentation type session), etc.

In some embodiments at least some templates may specify that moveable vessel positions be static during an entire session while in other embodiments at least some templates may specify that vessel positions be automatically or manually changed at different times during a session or at different points in the progression of content presentation or development or based on some sensed condition within a session space (e.g., a conferee gets up from her chair within the last 10 minutes of a scheduled session causing one or more totems to move into different positions (e.g., parked)). Similarly, in some embodiments at least some templates may specify that content types be static during an entire session while in other embodiments at least some templates may specify that content types presented via different vessels change with time, as a set of content progresses during an ongoing session or based on some sensed condition within a session space (e.g., a conferee gets up from her chair within the last 10 minutes of a scheduled session causing content to be rearranged). In addition to controlling affordance, vessel and presented content, at least some templates will specify other affordance (e.g., lighting, sound, temperature, wall transparency, window shades, etc.) control. The point here is that even extremely complex affordance, vessel and content control schemes that are optimized for specific activities can be made readily available to conferees by templatizing sessions based on space type/activity type combinations.

Referring yet again to FIG. 70, instead of or in addition to providing the projectors 1260 and 1262 in the space above membrane 1252, in other embodiments, lighting devices 1430 may be provided above the membrane for generating different light effects under the control of a system server. Ceiling lighting effects for different activities may be templatized so that conferees can reap the benefits of activity specific optimized effects without requiring substantial time or effort to select those effects.

Figure 80:
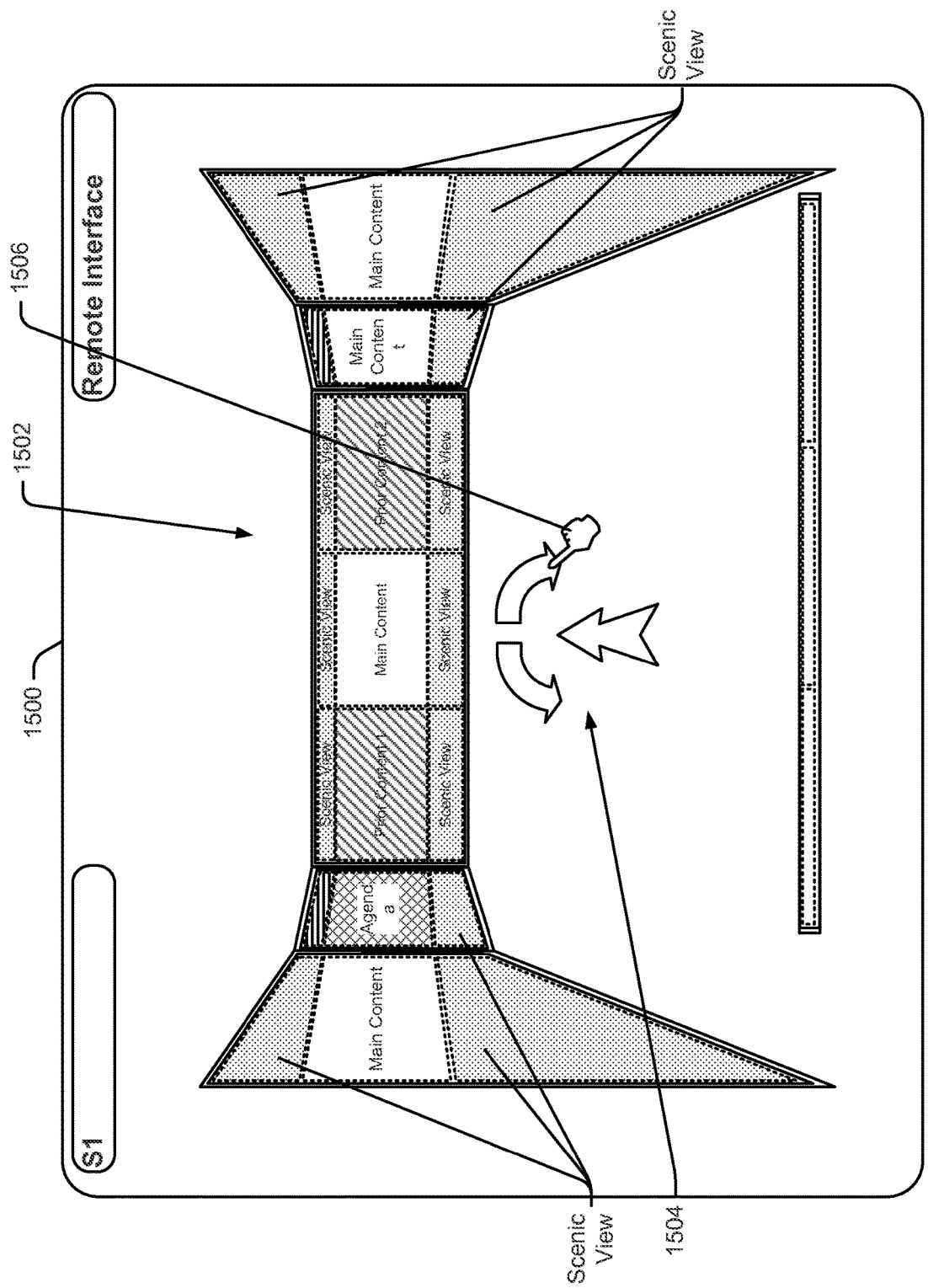
FIG. 80 is an view of an interface screen shot that may be presented via a remotely linked computing device.
Figure 81:
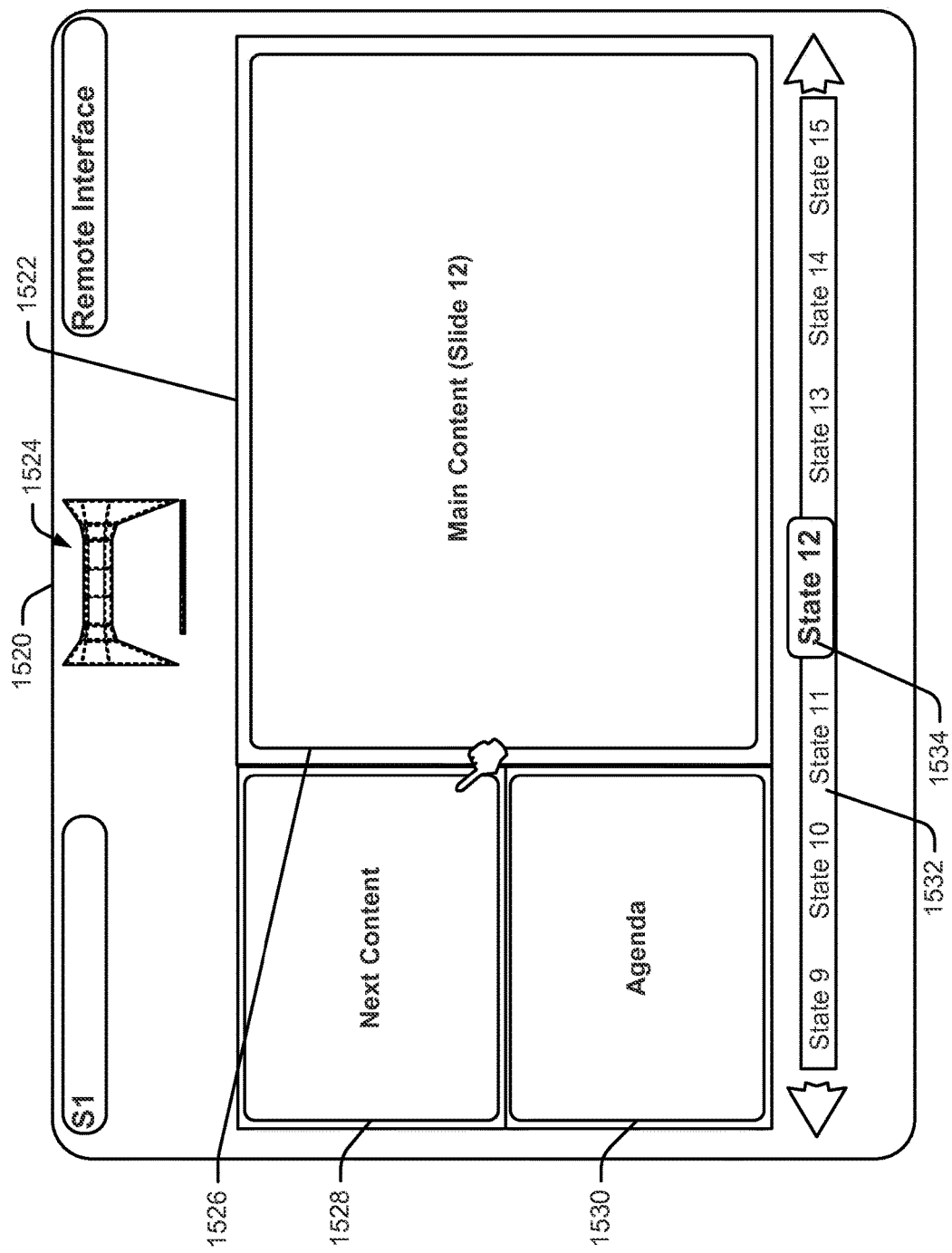
FIG. 81 is similar to FIG. 80, albeit showing a simplified remote device interface screen shot.

In the case of remote conferees that attend a session, where many different vessels in a local conference space present many different content types within the space, in at least some cases it is contemplated that templates will pre-define remote interfaces that are different for different space/activity combinations so that remote interfaces can be optimized for specific activities. For instance, in some cases, one way content presented in vessels in a local space could be presented on a remote interface may be to simply present every vessel within the local space on the remote interface as a separate field with local content replicated in the remote interface fields. Thus, see FIG. 80 that shows one exemplary remote interface 1500 for a T3 emissive room space type that includes a 3D representation 1502 of space vessels in a format similar to the local interface representation 1013 shown in FIG. 47 along with a control icon set 1504 and a pointing icon 1506 for changing a point of view within the 3D space representation. As another instance, only most important content that is presented in a local space may be presented as part of a simplified remote interface. In this regard, for example, see FIG. 81 where an exemplary remote interface 1520 is shown that includes only main content, next content and agenda in separate fields 1526, 1528 and 1530 for a T3 type space despite the fact that a T3 space has 30 separate vessels as described above. Interface 1520 also includes a small 3D representation 1524 of the T3 type space that can be selected, in some cases, to access the 3D interface type shown in FIG. 80. Interface 1520 further includes a state line 1532 and a field 1534 that indicates a current state of the content presented in fields 1526, 1528 and 1530 and the general current state of session content representation. Here, again, the templates can specify different remote interfaces for different space/activity combinations as well as different content types to be presented in different remote interface fields based on space/activity combinations or even just on a selected activity type.

In some cases it is contemplated that a remote interface may be automatically altered in real time by a system server as circumstances within a local session space change during a session. For instance, system cameras 26 (see again FIG. 1) or other sensing devices within a system space may generate data useable to identify a specific vessel within a local space that local conferees are instantaneously focused on. Focus can be perceived by determining where local conferees are directing their points of view, where content is being added or modified in a vessel (e.g., in the case of an electronic whiteboard), by analyzing content of spoken words in a space and correlating those words with content presented within the vessels in a space, by combinations of these sensed activities, etc. A server may identify content presented via one or more of the vessels that is being focused on at any one time and may switch which content is presented in at least one of the remote interface fields as a function of which vessel is currently focused on. For instance, assume that during a session, a server determines that a group's focus has changed from main content presented locally in a first vessel to whiteboard content (e.g., a whiteboard application) presented locally in a second vessel. Referring again to FIG. 81, a remote interface may be controlled to switch the content presented in relatively large field 1526 from main content to a replication of the whiteboard content that is currently the focus of local attention. At some subsequent time, if focus is redirected to the main content locally, the remote interface may again be updated to present the main content in field 1526 automatically. Here, it is contemplated that hysteresis may be built into the automatic changing of content based on perceived point of focus in a local space so that remotely presented content does not toggle too rapidly between different types based on misperceived changes in point of local focus. Thus, for instance, a perceived change in point of local focus may have to be perceived for at least a threshold duration (e.g., one to three minutes) prior to an automatic change in content types remotely presented.

In still other embodiments, it is contemplated that at least some content that is either earmarked or perceived by the system server to be particularly important may be presented via a first remote interface field persistently while content associated with an instantaneous point of local reference is periodically updated in a second remote interface field. To this end, see again FIG. 81 that includes relatively large field 1526 and two relatively smaller fields 1528 and 1530. Where main content is particularly important, the main content may persistently be presented in field 1526 regardless of the point (e.g., vessel and associated content) of instantaneous local focus. However, content associated with a discerned point of instantaneous local focus may be updated in a hysteretic or immediate fashion in field 1528. Where main content is the point of instantaneous local focus at a specific time, the system server may cause the most recent prior point of local focus to be persistently presented in field 1016 until a different point of local focus is identified or discerned.

Thus, relatively complex remote interfaces may be optimized automatically via the template based system to support any of several different session activities without requiring either a session instantiator or a remote conferee to select interface options. For this reason, advantages associated with remote interfaces optimized for specific activities can be obtained without requiring much if any conferee or instantiator specification.

In at least some embodiments it is contemplated that when a point of local focus changes and is detected or discerned from information sensed in a space, at least some templates will modify vessel arrangements or content within presented vessels as a function of the change in point of local focus. For instance, referring again to FIG. 5 which shows an exemplary emissive room T3 type space, on emissive wall structure 80 there are nine vessels shown that are distinguished by phantom lines. Two of the vessels including the left foveal vessel and the center foveal vessel which are labelled 1450 and 1452, respectively. As illustrated, vessel 1452 has a larger overall area than vessel 1450. Usually a template will specify that relatively important content be presented in relatively large vessels like vessel 1452 for local conferees to see effectively.

Assume also that a local point of reference is initially on the content in vessel 1452 but that at some point, a system server uses camera or other sensor data to determine that the point of local focus has changed to vessel 1450. In this case, the server may automatically resize the vessels 1450 and 1452 so that vessel 1450 is made larger and vessel 1452 is made smaller. Subsequently, if the point of local focus changes back to vessel 1452 or at least away from vessel 1450, the original sizes of vessels 1450 and 1452 can again be presented. Here, again, hysteresis may be built into the resizing of local content based on point of focus process so that content is not being resized all the time.

In some cases it is contemplated that one or more most recent prior points of focus may be maintained in a relatively large vessel when a new point of focus is established and an associated new vessel is enlarged so that there is a sort of point of focus trail that persists for a least some time during a session. Here, for instance, in some cases the vessels associated with the most recent prior two points of local focus as well as a current point of focus may be presented in a relatively large format.

In at least some cases where virtual tools may be used with an application that is provided within an emissive vessel, those tools may be hidden unless or until the vessel becomes at least a point of local focus. For example, in the case of a whiteboard application presented as content in a specific vessel, a tool field including virtual whiteboard tools may not be presented with the whiteboard representation until a conferee approaches the vessel presenting the whiteboard representation. The tool field may be provided as part of expanding the size of the whiteboard presenting vessel when the vessel becomes a point of local focus.

In some cases, whether or not a vessel can be enlarged when the vessel becomes a point of focus may be a function of the type of content presented in the vessel and/or the type of content presented in other vessels adjacent to the specific vessel. For instance, in some embodiments in may be that only vessels presenting main content, a whiteboard application or a context data feed may be automatically enlarged when they become points of local focus. Thus, in this case, if a system server determines that the point of local focus becomes a vessel presenting a scenic view (e.g., flowers blowing in a field), the server would not enlarge the scenic view vessel but if the point of local focus turned to a whiteboard presented in a different vessel, the server would enlarge that other vessel. As another instance, a system server may never reduce the size of a vessel presenting main content in some embodiments. Here, even if the point of local focus was on a first vessel presenting a whiteboard that is adjacent a second vessel presenting main content, the server would not increase the size of the first vessel if it meant reducing the size of the second vessel.

In at least some embodiments it is contemplated that at least some templates may specify that some vessels within a space will always replicate content that is the point of instantaneous local focus (e.g., either immediate or with a hysteretic delay). For instance, referring yet again to FIG. 5, fovial vessels 1540, 1542 and 1544 may always replicate content presented on a vessel that is the point of local focus. Thus, for example, assume that a current point of focus is on fovial vessel 1452. At this point, the content in vessel 1452 would be automatically replicated in other fovial vessels 1540, 1542 and 1544. If, however, the content in vessel 1450 becomes the point of local focus, the vessel 1450 content would automatically be replicated in each of vessels 1540, 1542 and 1544. Content that replicates a point of local focus will be referred to herein as "focus replicating content".

Again, all of the point of focus complexity described above may be templatized so that conferees can reap the benefits thereof in supporting specific types of activities with little or no particular knowledge about optimal affordance control and with little or no need for independent specification.

Some of the space types describes above include moveable totems that provide emissive surfaces for creating content vessels. While a set of totems may be associated with a specific space type (e.g., T4 as described above), in other cases it is contemplated that totems may not be persistently associated with a specific space within an overall system and instead may be associated with a area within a facility that includes multiple conference spaces. Thus, here, totems may be automatically or manually moved in and out of spaces when required for specific sessions. For instance, a session specification developed using a T2/presentation template may include content developed for a T2 type space as illustrated in FIG. 4. An overall template system may specify that, when one or more conferees patch into a session remotely in a T2 type space, a separate system totem (as opposed to a room persistent totem) be moved into an associated space to augment the vessels already associated with the space and positioned next to a short edge of a conference table automatically to enhance the T2 space and best present each remote conferee to local conferees. Thus, here, if a conferee is scheduled or is physically located at a location that is remote from a conference space when a session is to commence in the space, a system server may automatically move a totem into the space to present video of the remote conferee and, if the same conferee is locally present when the session is to commence, the server would not move a totem into the space. In the case of a dyadic collaboration in a space, a system server may control totems to move those totems into optimal positions within any space in which the collaboration is to occur. Thus, space dedicated totems are not required.

In some cases a template may specify a different arrangement of vessels, totems and other affordances associated with a space as a function of how many conferees locally attend a session. Thus, for instance, assume that a session specification has been developed for a T4 space as shown in FIG. 56 and that at least initially six conferees are scheduled to attend the session. When the session commences at a later time, assume that only three conferees show up locally for the session. Here, a system server may recognize via camera or other sensor data that only three local conferees attend and may automatically move totems 1090d, 1090e and 1090f to the positions shown in FIG. 65 to support a smaller group of local conferees. Here, while the session specification content was to be presented on all of the vessels provided in the space, after rearranging the totems to separate the right end of the space as illustrated from the larger space, the server may present a different set of templatized vessels via totems 1090d, 1090e and 1090f and the emissive surface provided by structure 82 and may map the session content to the new vessel set accordingly and automatically.

Thus, it should be appreciated that templates may specify emissive surface vessels and content types for those vessels for any combination of space type and activity type, may specify different vessel arrangements as activity types change within a space, may specify different positions for totems and other repositionable affordances (e.g., ceilings, walls, etc.) that support emissive surfaces and may specify different content types in different vessels as well as different positions for vessel supporting affordances and may specify different lighting, sound, and other affordance characteristics for different activity types.

While the systems described above are described as including space/activity combination templates, it should be appreciated that other templates types may be supported in at least some embodiments. For instance, a default template for any space may be used to specify where content is to be presented I vessels within the space when an instantiator does not select an activity type. For example, a default template may specify one main content vessel, an agenda vessel and a scenic view for all other vessels in the space. Here, the template would still walk an instantiator through the process of specifying content (e.g., main and agenda) needed to generate a session specification.

As another instance, where an instantiator is unclear which space type should be associated with a particular session (e.g., an instantiator may be unclear which type of space will be used for a session) but the instantiator can specify an activity type for a session, a default space type may be automatically selected by a system server for the purpose of identifying content types to be specified during the instantiation process. For example, in some cases, the default space may be the most richly afforded space (e.g., a T3 or higher space in the above examples) or a space type for which the most content needs to be specified to ensure that the instantiator provides all content that would be required if the session is ultimately held in a richly afforded space. Here, if a lesser afforded space is ultimately used for a session, the system server would pair down the content to fit the lesser afforded space automatically.

In many cases a conferee in a conference space may have a personal device like a laptop (see 36 in FIG. 2), a tablet type device, a smart phone, etc. In these cases, as described above, a template may specify an interface that may be provided on one or several of the personal device display screens located in a space during a session. In other cases, one or more templates may also specify different content types to be presented on one or more personal device display screens. For instance, a template may specify that every personal device located in a space present a context data feed. Here, during a session, each personal device user can view their context data feed for ideas and content related to the session in real time. As another instance, a template may specify that every personal device located in a space present a note taking application for taking hand or type written notes during the session. As still one other instance, another content type that may be presented automatically via personal devices in a space may be a personal content data feed that, instead of presenting results based on an internet search, presents results based on a search of a device user's personal data (e.g., documents, images, videos, web pages, etc., that are stored by the device user as personal content).

Where at least some templates specify content to be presented on personal device displays or vessels, it is contemplated that any type of software application that provides output may comprise a content type. Thus, for instance, personal device content may include a drawing tool, personal device content may include a browser search engine interface, personal device content may include a series of images that are related to but that are supplemental to main content, etc.

In some cases, a template may specify different content types for different personal devices within a space. For instance, a presenter interface may be presented on a personal device display used by a specific conferee that is presenting content to other conferees in a space while personal device content may be presented on personal device displays used by other conferees in the space.

In some embodiments, content may be forced on to any personal devices located within a conference space. In other cases, a conferee may have to associate her personal device with a space or a session in order to receive the templatized content during a session. For instance, in some cases, a password may be presented on a vessel located within a space when conferees enter the space and a conferee may be prompted to enter the password into a password field in order to indicate which of several different spaces the conferee would like to associate her device with. When the proper password is entered, the content may then be pushed to the conferee's personal device.

In at least some cases it is contemplated that the moveable totems may be controlled via templates to move to different locations in space and to perform different processes as a function of what is happening in space. For instance in some cases a totem may move outside an associated space and operate as a threshold or reception device as conferees arrive in the space for a specific meeting. As another instance, one or more totems may operate as an escort for a specific conferee arriving in a conference space to greet the conferee as the conferee enters the space and to guide the conferee to an open task chair in the space. Here, depending on who the conferee is and what the conferee's roll is in the meeting, the totem may move the conferee to a different location in the space (e.g., a leader to the front of the space and an observer to the back). Here, in at least some cases, in there is more than a threshold amount of time prior to the scheduled start time for a meeting, the totem may be controlled to provide some other diversion for the escorted employee. For instance, the totem may present a news feed to the conferee that is tailored to the specific conferee's preferences. As another instance, the totem may present a content queue for the meeting that is to take place in the space and allow the conferee to access the queue content to prepare for the meeting.

While gesture and voice control of totems is contemplated above, in some embodiments templates will be useable to enable gesture and voice control interfaces for many other conference features and affordance characteristics. Thus, for instance, in a case where different content vessels are presented on different display screens arranged about a space and content can be moved from one filed to another and back again, a gesture interface may enable a single lead conferee within a space to move content about among fields by pointing at a first field and swiping toward a second field. In this example, when the employee points at the first field, recognition of the pointing and hence selection action may be indicated by increasing the brightness of the field or otherwise distinguishing the field from other presented content. Recognition of the swiping action may be indicated by movement of a pointing icon or the like along with the swiping action across screens to a target screen. Here, by templatizing available control gestures, a conferee can gain access to the gesture capability.

In at least some cases it is contemplated that when a specific space configuration supports gesture or voice interfaces, some tool may be provided within the template tool to allow an instantiator simulate a session and interaction with content developed for the session. For instance, in a case where content can be moved via a pointing gesture from one field to another, during a simulation on a single screen, a pointing icon akin to a gesture may be presented on the screen and used to move content around from field to field on the single screen during the simulation. Where a voice interface is templatized, the template may also allow the same voice commands that are useable in a conference space to be used during simulation to change content in virtual fields shown during the simulation.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims. To apprise the public of the scope of this invention, the following claims are made:

What is claimed is:

1. A system for use with at least a first space type, each space type including at least a first emissive surface, each emissive surface controllable to present at least first and second vessels for presenting content within a conference space during a conference session, the conference space useable to facilitate a plurality of different activity types, the system for preparing content for a session and comprising:
   a database that includes a plurality of templates, each template associated with a specific activity type and indicating vessels associated with the associated activity type, relative juxtapositions of the vessels on the at least a first emissive surface and content types to be presented in each vessel, wherein the vessels are any environmental affordance to present information or content within the conference space;
   a processor programmed to perform the steps of:
   (i) providing a user interface screen displayed on a display device that includes a separate activity type representation for each activity type;
   (ii) receiving a selection of one of the activity types from a user via the interface screen;
   (iii) identifying a template from the plurality of templates associated with the selected activity type;
   (iv) identifying content types for each vessel specified by the identified template;
   (v) receiving content from a system user for each of the identified content types; and
   (vi) storing the received content in a session specification for subsequent access during a session within a space wherein the session specification includes content for each vessel in the identified template associated with the selected template type.

2. The system of claim 1 wherein the step of receiving includes providing at least another user interface screen displayed on the display device for receiving content of each identified content type and receiving user input specifying the content of each type.

3. The system of claim 1 wherein at least a subset of the templates specify different content types to be presented within at least a subset of the vessels at different times during the session.

4. The system of claim 1 wherein at least a subset of the templates specify vessel placement as a function of a number of session attendees.

5. The system of claim 4 wherein the processor is further programmed to provide at least another interface screen displayed on the display device for receiving information from the user specifying a number of local attendees to attend the session.

6. The system of claim 4 further including a sensor for sensing number of attendees within the conference space during the session.

7. The system of claim 6 wherein at least a subset of the templates specify vessel locations based on locations of attendees within the conference space during the session.

8. The system of claim 1 wherein at least a subset of the templates specify content to be presented within at least a subset of the vessels as a function of a number of session attendees.

9. The system of claim 8 wherein at least a subset of the templates specify vessel placement as a function of a number of session attendees.

10. The system of claim 9 wherein at least a subset of the templates specify different content types to be presented within at least a subset of the vessels at different times during the session.

11. The system of claim 1 wherein at least a subset of the templates specify vessel sizes as a function of the selected activity type.

12. The system of claim 1 wherein the first space further includes additional controllable space affordances including at least a subset of lighting devices, audio devices, transparency controllable walls, and interface devices and wherein each template further specifies parameter controls for each of the additional controllable space affordances based on the selected activity type.

13. The system of claim 12 wherein the processor is further programmed to receive an indication of a number of local conferees to attend the session and wherein at least a subset of the templates specify the parameter controls for additional controllable affordances based on the number of local attendees.

14. The system of claim 12 wherein the processor is further programmed to receive an indication of a number of remote conferees to attend the session and wherein at least a subset of the templates specify the parameter controls for additional controllable affordances based on the number of remote attendees.

15. The system of claim 1 further including at least a second emissive surface controllable to present at least first and second vessels for presenting content within the space, the template for at least the first space type indicating relative juxtapositions of the vessels on each emissive surface and content types to be presented in each vessel for each of a plurality of different activity types.

16. The system of claim 12 wherein the additional controllable affordances includes at least a first moveable affordance and wherein at least a first template indicates at least one location for the at least a first moveable affordance during the session.

17. The system of claim 16 wherein the at least a first template indicates different locations at different times during the session for the at least a first moveable affordance.

18. The system of claim 17 wherein the moveable affordance includes a display screen.

\* \* \* \* \*